United States Patent [19]

Duwel

[11] Patent Number: 4,536,850

[45] Date of Patent: Aug. 20, 1985

[54] MONITORING THE STATUS OF THE TRIP CYCLE IN AN ELECTRONIC POSTAGE METER

[75] Inventor: Edward C. Duwel, Trumbull, Conn.

[73] Assignee: Pitney Bowes Inc., Stamford, Conn.

[21] Appl. No.: 447,915

[22] Filed: Dec. 8, 1982

[51] Int. Cl.[3] .............................................. G06F 15/20

[52] U.S. Cl. .................................... 364/550; 364/900; 364/464

[58] Field of Search ........................ 364/464, 466, 550; 371/20, 9, 18, 16

[56] References Cited

U.S. PATENT DOCUMENTS 4,301,507 11/1981 Soderberg ........................... 364/464

4,302,821 11/1981 Eckert et al. ....................... 364/900

*Primary Examiner*—Edward J. Wise

*Attorney, Agent, or Firm*—Peter Vrahotes; William D. Soltow, Jr.; Albert W. Scribner

[57] ABSTRACT

A method and associated apparatus for monitoring the trip status of the trip cycle in an electronic postage meter, comprising the steps of reading the state of a bistable member having a Home and In cycle states, setting a plurality of bits if the bistable member is Home, re-reading the state of the bistable member after a predetermined period of time has elapsed, storing a fatal error bit if the bistable member is in the Home state after the re-reading and attempting to complete the trip cycle, further re-reading the state of the bistable member after a predetermined period of time has elapsed if the re-reading of the state of the bistable member discloses that the bistable member is In cycle, resetting certain of the set bits if the further reading of the bistable member discloses that it is Home, and ending the trip cycle.

26 Claims, 10 Drawing Figures

MONITORING THE STATUS OF THE TRIP CYCLE IN AN ELECTRONIC POSTAGE METER

CROSS REFERENCE TO RELATED APPLICATIONS

This application is related to copending application Ser. No. 447,918, filed on even date herewith in the name of EDWARD C. DUWEL, entitled, COMPLETING AN INCOMPLETE TRIP IN AN ELECTRONIC POSTAGE METER, the disclosure of which is incorporated herein by reference. This application is also related to copending application Ser. No. 447,815, filed on even date herewith in the name of DANILO BUAN, entitled STAND-ALONE ELECTRONIC MAILING MACHINE, the disclosure of which is incorporated herein by reference.

PROGRAM APPENDIX

A program listing for an electronic postage meter such as disclosed in the aforementioned related patent application in the name of DANILO BUAN is set forth as part of the specification at the end of the detailed description and before the claims.

BACKGROUND OF THE INVENTION

The present invention relates to electronic postage meters, and more particularly to electronic postage meters of the stand-alone type such as disclosed in copending application Ser. No. 447,815, filed on even date herewith in the name of DANILO BUAN and entitled, STAND-ALONE ELECTRONIC MAILING MACHINE.

Known electronic postage meters like their earlier mechanical forerunners have generally included two separate units, i.e., a postage meter and a base or mailing machine to enable the postage meter to be physically taken to the Post Office periodically to recharge the meter. Such a meter is disclosed in U.S. Pat. No. 4,301,507 issued on Nov. 17, 1981 and assigned to Pitney Bowes, Inc. of Stamford, Conn.

With the advent of remote meter resetting systems, it is no longer necessary that the postage meter be separated into two distinct units since the necessity to take the meter to the Post Office for recharging has been eliminated. Further, it is desirable to have a self-contained electronic postage meter that includes the metering function as well as all drive mechanisms to reduce the size and weight of the meter as well as making it more economical to produce. The mechanical construction of such a meter is disclosed in detail in the aforementioned patent application entitled, STAND-ALONE ELECTRONIC MAILING MACHINE.

The program for use in such a stand-alone postage meter is disclosed in the accompanying Program Appendix. There are certain similarities between the program disclosed in the aforementioned U.S. Pat. No. 4,301,507 and the present program. However, there are also several unique exceptions, one of which is the routine for monitoring the status of the trip cycle through power down as will be described more fully hereinafter.

SUMMARY OF THE INVENTION

It is an object of the present invention to monitor the status of the trip cycle in an electronic postage meter.

It is a further object of the present invention to store the status of the trip during the trip cycle in an electronic postage meter.

It is another object of the present invention to utilize non-volatile memory to control the trip through power down in an electronic postage meter.

It is a still further object of the present invention to store bits representative of the trip status during the trip cycle in an electronic postage meter.

Briefly, in accordance with the present invention, a method and associated apparatus is provided for monitoring the status of the trip cycle in an electronic postage meter including the steps of reading the state of the bistable member having at Home and In cycle states, setting a plurality of bits if the bistable member is Home, re-reading the state of the bistable member after a predetermined period of time has elapsed, storing a fatal error bit if the bistable member is in the Home state after the re-reading and attempting to complete the trip cycle, further re-reading the state of the bistable member after a predetermined period of time has elapsed if the re-reading of the state of the bistable member discloses that the bistable member is In cycle, resetting certain of the set bits if the further reading of the bistable member discloses that it is Home, and ending the trip cycle.

Other objects, aspects and advantages of the present invention will be apparent from the detailed description considered in conjunction with the preferred embodiment of the invention illustrated in the drawings, as follows.

DETAILED DESCRIPTION

Figure 1:
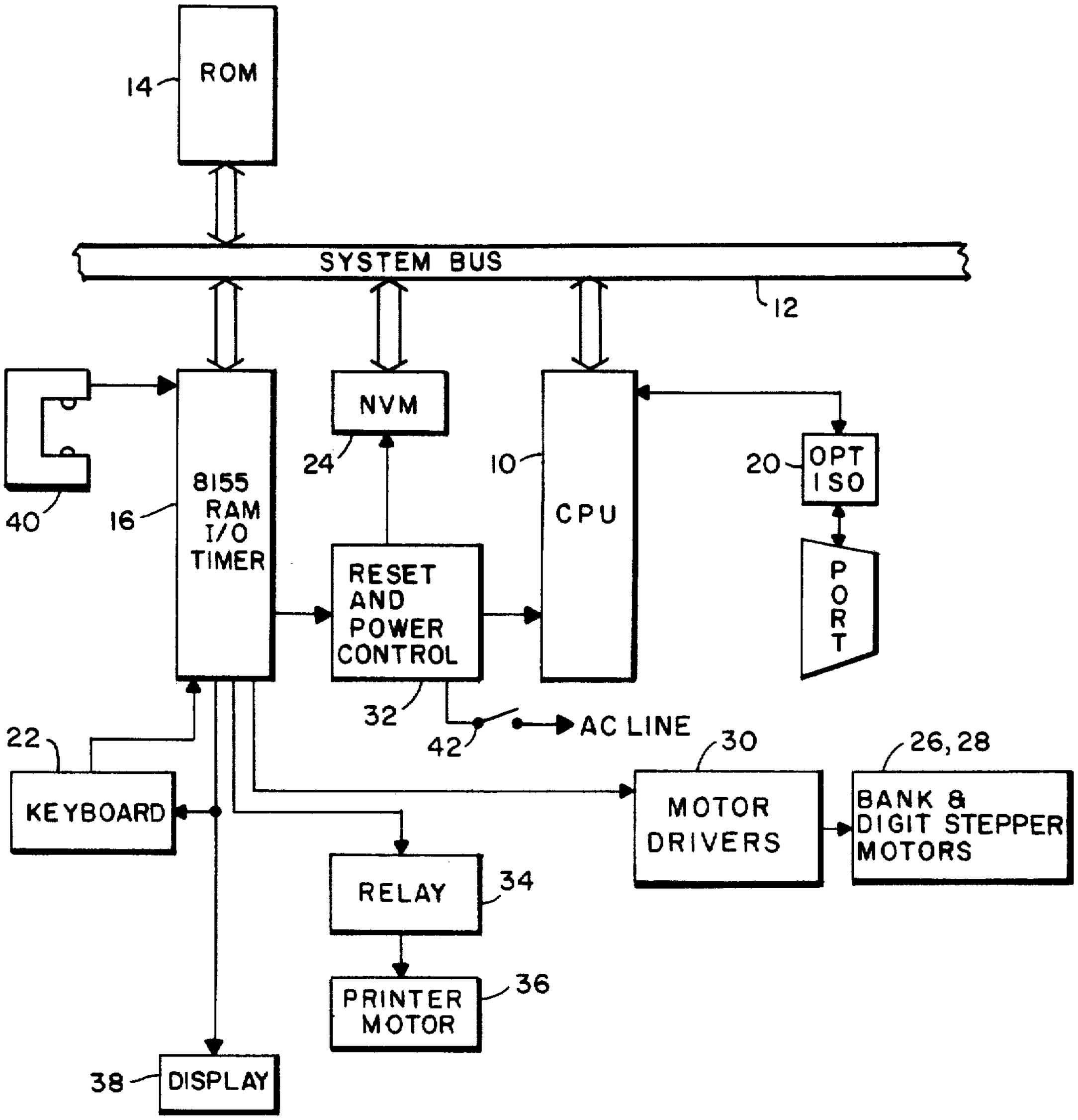
FIG. 1 is a block diagram of the general electronic circuit for a stand-alone electronic postage meter.

Referring to FIG. 1, the electronic postage meter includes an 8-bit microprocessor 10 (CPU), such as an Intel Model 8085A microprocessor which is connected to various components through a system bus 12. ROM 14 is connected to the microprocessor 10 through the system bus 12. The ROM 14 stores the programs for controlling the postage meter. It should be understood that the term ROM as used herein includes permanently programmed and reprogrammable devices. An integrated circuit 16, which may be Intel Model 8155, is connected to the system bus 12 and includes RAM, input and output lines and a timer. The RAM portion of the intergrated circuit 16 has memory space allocated for transient storage of the data for the ascending register and descending register. An external data communication port 18 is connected to the microprocessor 10 through optical isolator 20. The external data communication port 18 allows connection with devices such as an electronic scale, an external computer, servicing equipment and the like. Also electrically connected to the microprocessor 10 through the system bus 12 is the keyboard 22 of the postage meter and a non-volatile memory (NVM) 24. Stepper motors 26, 28 are also in electrical connection with the microprocessor 10 via motor drivers 30 and the integrated circuit 16. A reset and power control 32 is electrically connected between the integrated circuit 16, the NVM 24 and the microprocessor 10. A relay 34 connects the AC printer motor 36 to the integrated circuit 16. A display 38 is also electrically connected to the integrated circuit 16. Trip photosensor 40 is connected to the microprocessor 10 through integrated circuit 16 to indicate the presence of an envelope to be stamped, as described more fully in the aforementioned patent application entitled, STAND-ALONE ELECTRONIC MAILING MACHINE.

The electronic postage meter is controlled by the microprocessor 10 operating under control of the programs stored in the ROM 14. The microprocessor 10 accepts information entered via the keyboard 22 or via the external communication port 18 from external message generators. Critical accounting data and other important information is stored in the non-volatile memory 24. The non-volatile memory 24 may be an MNOS semiconductor type memory, a battery augmented CMOS memory, core memory, or other suitable non-volatile memory component. The non-volatile memory 24 stores critical postage meter data during periods when power is not applied to the postage meter. This data includes, in addition to the serial number of the mailing machine or postage meter, information as to the value in the descending register (the amount of postage available for printing), the value in the ascending register (the total amount of postage printed by the meter), and the value in the piece count register (the total number of cycles the meter has performed), as well as other types of data, such as trip status, initialization and service information, which are desired to be retained in the memory even though no power is applied to the meter.

When an on/off power switch 42 is turned on (closed) a power supply internal to the mailing machine energizes the microprocessor 10 and the balance of the electronic components. The information stored in the non-volatile memory 24 is transferred via the microprocesor 10 to the RAM of the integrated circuit 16. After power up the RAM contains an image or copy of the information stored in the non-volatile memory 24 prior to energization. During operation of the postage meter, certain of the data in the RAM is modified. Accordingly, when postage is printed, the descending register will be reduced by the value of the printed postage, the ascending register increased by the value of the printed postage and the piece counter register incremented. When the power switch 42 is turned off (opened), the updated data in the RAM is transferred via the microprocessor 10 back into a suitably prepared area of the non-volatile memory 24. A like transfer of information between the non-volatile memory 24 and the RAM takes place during power failure.

Figure 2A:
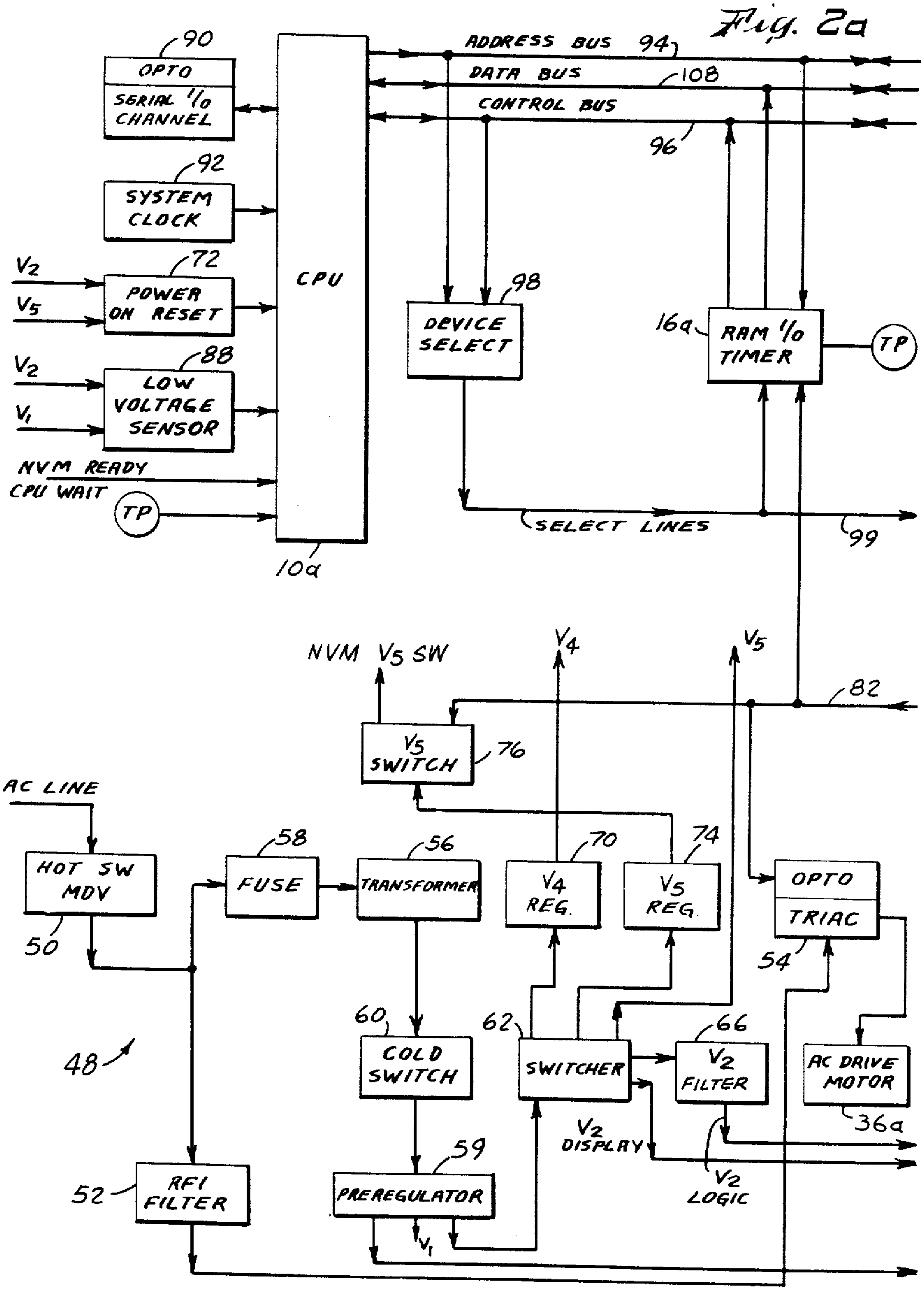
FIGS. 2A and 2B are a detailed block diagram of the electronic circuitry for a stand-alone electronic postage meter.
Figure 2B:
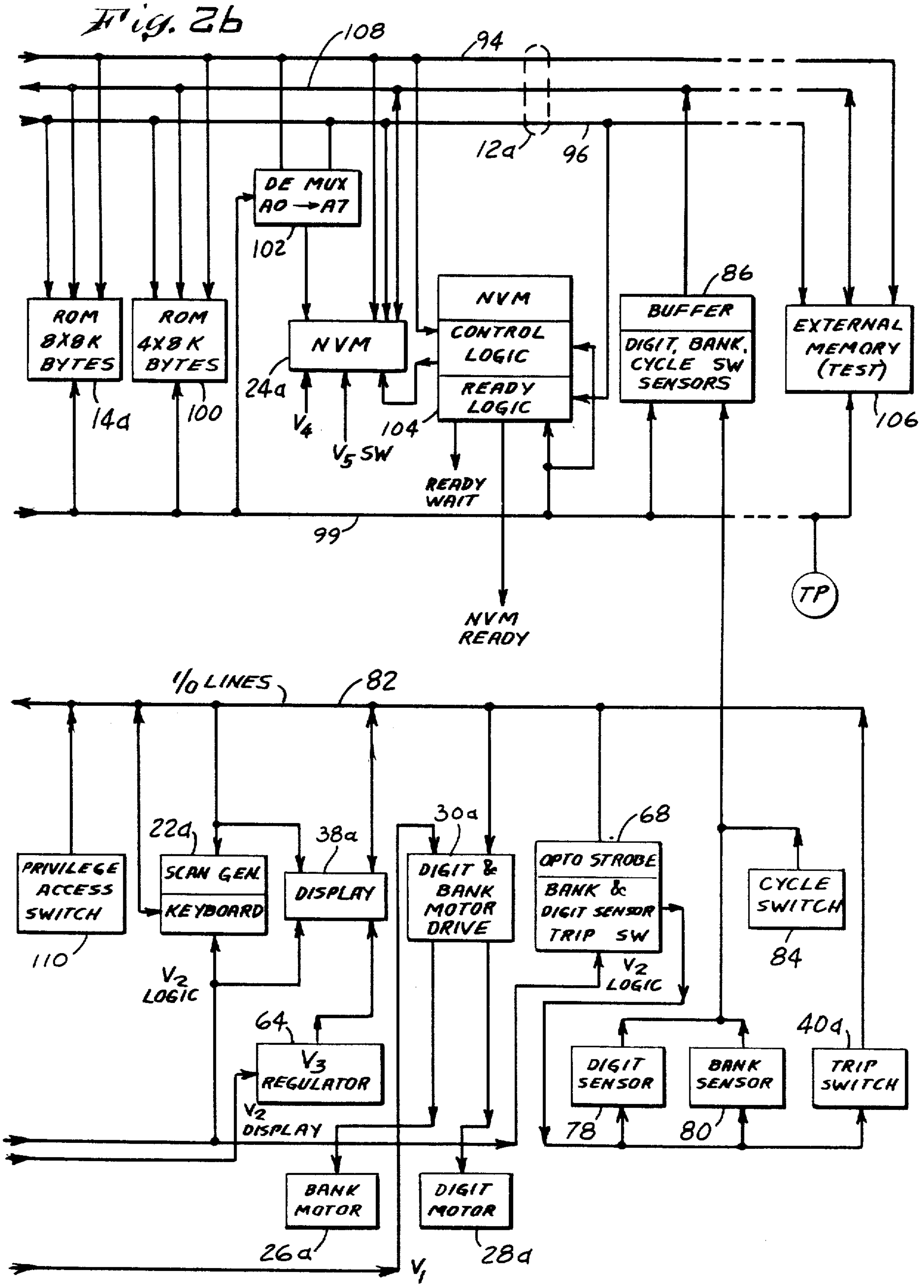

Referring to FIGS. 2A and 2B, a more detailed block diagram of the arrangement of the electrical components for the postage meter is illustrated generally as 48. Power is supplied to the postage meter from the AC line voltage, typically 115 volts. This line voltage is applied to the meter through a hot switch 50 which cuts off power to the postage meter to protect the electrical components thereof if the temperature rises above a preset limit, nominally 70° C. The hot switch 50 is connected to the AC drive motor 36A through an RF filter 52 and an opto-triac 54 which provides isolation between the line voltage and the control logic for the meter. The hot switch 50 is also connected to a transformer 56 protected by a fuse 58. The output of the transformer 56 is coupled to a pre-regulator 59 through a cold switch 60. The cold switch 60 cuts off power to the pre-regulator 59 if the temperature drops below a preset limit, nominally 0° C. The pre-regulator 59 provides an output voltage of a predetermined range to a switcher 62 which generates the output voltage +5 V; and the voltages for generating −12 V and −30 V.

The +5 V is applied to a +3 volt regulator 64 and then to the display 38A. The +5 V from the switcher 62 is also applied to a +5 V filter 66 which provides +5 V for logic circuits. Specifically, the +5 V is applied to the keyboard 22A, the display 38A, and bank, digit and trip sensor logic 68 and to the integrated circuits. The −12 V is applied to a −12 V regulator 70 and then to the non-volatile memory 24A.

The −30 V output from the switcher 62 is also applied to a −30 V regulator 74 and then to a −30 V switch 76 which switches its output voltage on and off in response to the requirements of writing in NVM as dictated by the program. The output of the −30 V switch is applied to the non-volatile memory 24A. The −30 V supply is connected to the power on reset 72 of the microprocessor 10A.

+5 V from the switcher 62 is also supplied to one input of he power on reset 72; the other input receives −30 V from the regulator 74 as previously described. A low voltage sensor 88 also receives one input of +5 V from the switcher 62 and its other input from the pre-regulator 59; its output is applied to the microprocessor 10A. The low voltage sensor 88 detects power failure and communicates this to the microprocessor 10A which in turn addresses the RAM through system bus 12A to transfer all security data present in the RAM to the non-volatile memory 24A.

Another output from the pre-regulator 59 in the form of +24 V is applied to the digit and bank motor drive 30A for the bank motor 26A and digit motor 28A, which selects the particular printing wheel (bank) which is to be activated and the particular digit of the selected printing wheel which is to be set.

An output strobe from the integrated circuit 16A is buffered through buffer driver 68 and applied to digit sensor (encoder) 78, bank sensor (encoder) 80, and trip sensor 40A. The opto strobe applies power to the digit sensor 78, bank sensor 80 and trip sensor 40A when needed. The output from the trip sensor 40A is applied to the input/output lines 82 which are coupled to the intergrated circuit 16A. The outputs from the digit sensor 78 and bank sensor 80 and cycle switch 84 are applied to a storage buffer 86.

During power up, the key switch 42, see FIG. 1, is closed, and the AC line voltage energizes the electrical components previously described and an Initialization process will occur. Such initialization may include a hard and/or soft initialization process as disclosed in the aforementioned U.S. Pat. No. 4,301,507. Preferably the Initialization process is that described in copending application Ser. No. 447,913, filed on even date herewith in the names of Alton B. Eckert and Easwaran C. N. Nambudiri entitled, INITIALIZING THE PRINT WHEELS IN AN ELECTRONIC POSTAGE ME- TER, and assigned to the same assignee as the present invention.

In operation, the microprocessor 10A under control of the ROM 14A and possibly the auxiliary ROM 100 communicates over the address bus 94 and control bus 96 with the device select 98. The output of the device select 98 communicates with the particular module to be addressed over select lines 99. The modules to be addressed are the RAM, the ROM 14A, an auxiliary ROM 100, a demultiplexer 102, NVM logic 104 and the buffer 86. The RAM of integrated circuit 16A provides the working memory for the postage meter and the microprocessor 10A. The ROM 14A stores the program; the auxiliary ROM 100 may be used to provide additional program storage space. The non-volatile memory 24A provides storage of all security information for the meter and retains such information during power down or power failure. The demultiplexer 102 latches the lower eight (8) bits of address information that defines a particular location which is used immediately thereafter. The NVM logic 104 controls the mode of operation of the NVM 24A and also provides ready wait and NVM ready signals to the microprocessor 10A to indicate the presence of the slow speed device (NVM) as active on the bus 12A.

As previously mentioned, the digital sensor 78 (optical encoder) and bank sensor 80, (optical encoder) and cycle switch 84 whose current state is read, i.e., "Home" or "In Cycle", apply input signals to the buffer 86 which sends output signals over data bus 108 to the microprocessor 10A for storage in the proper RAM location.

The RAM is also electrically coupled to I/O lines to transmit or receive data from the trip sensor 40A, the display 38A, keyboard 22A, and privilege access switch 110, if present. The privilege access switch 110 may be used in applications which require manual resetting of meter postage via a switch which is kept under seal.

Figures 3, 3B:
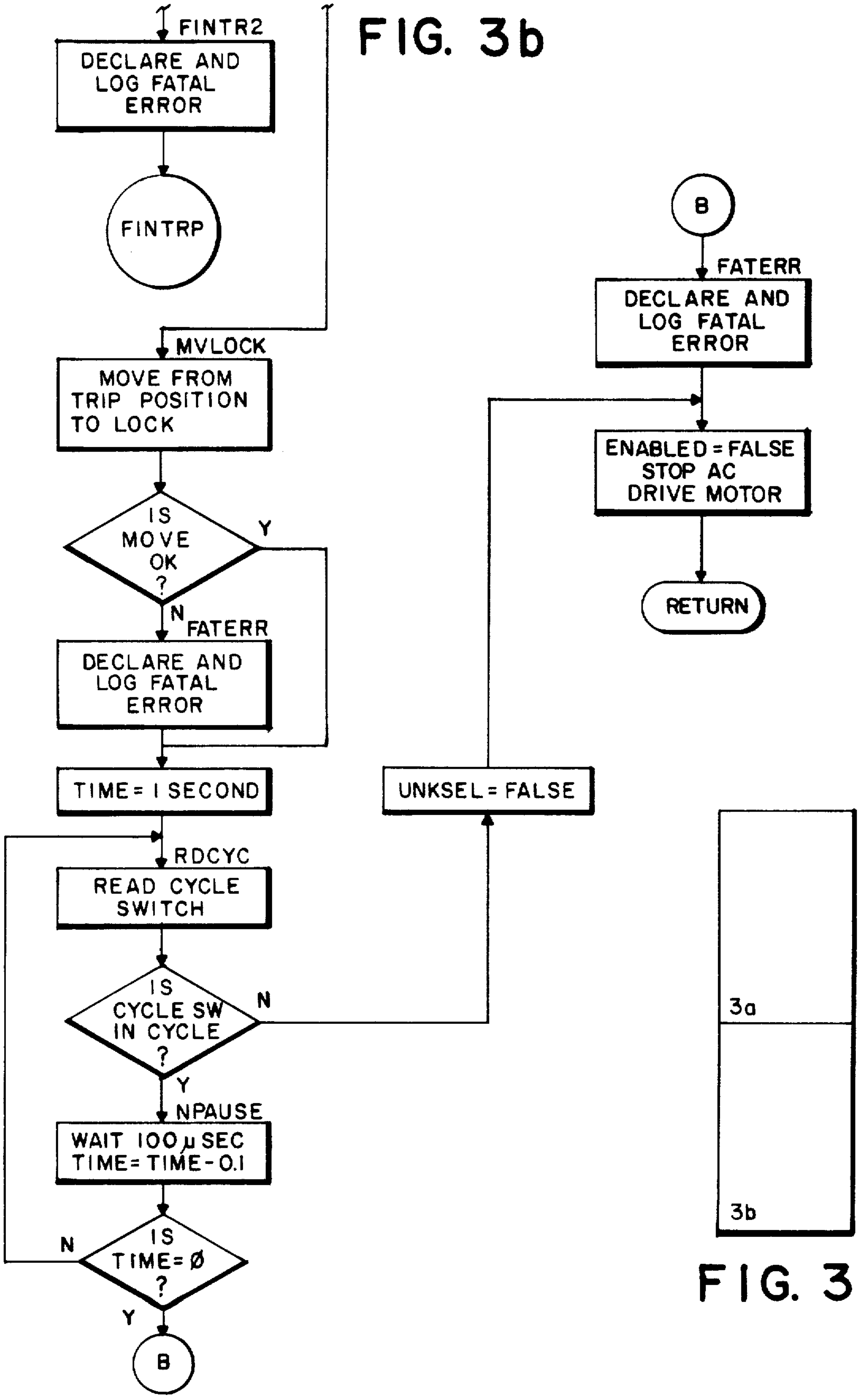
FIGS. 3A and 3B are a flowchart of the DOTRIP Routine illustrating the present invention.
Figure 3A:
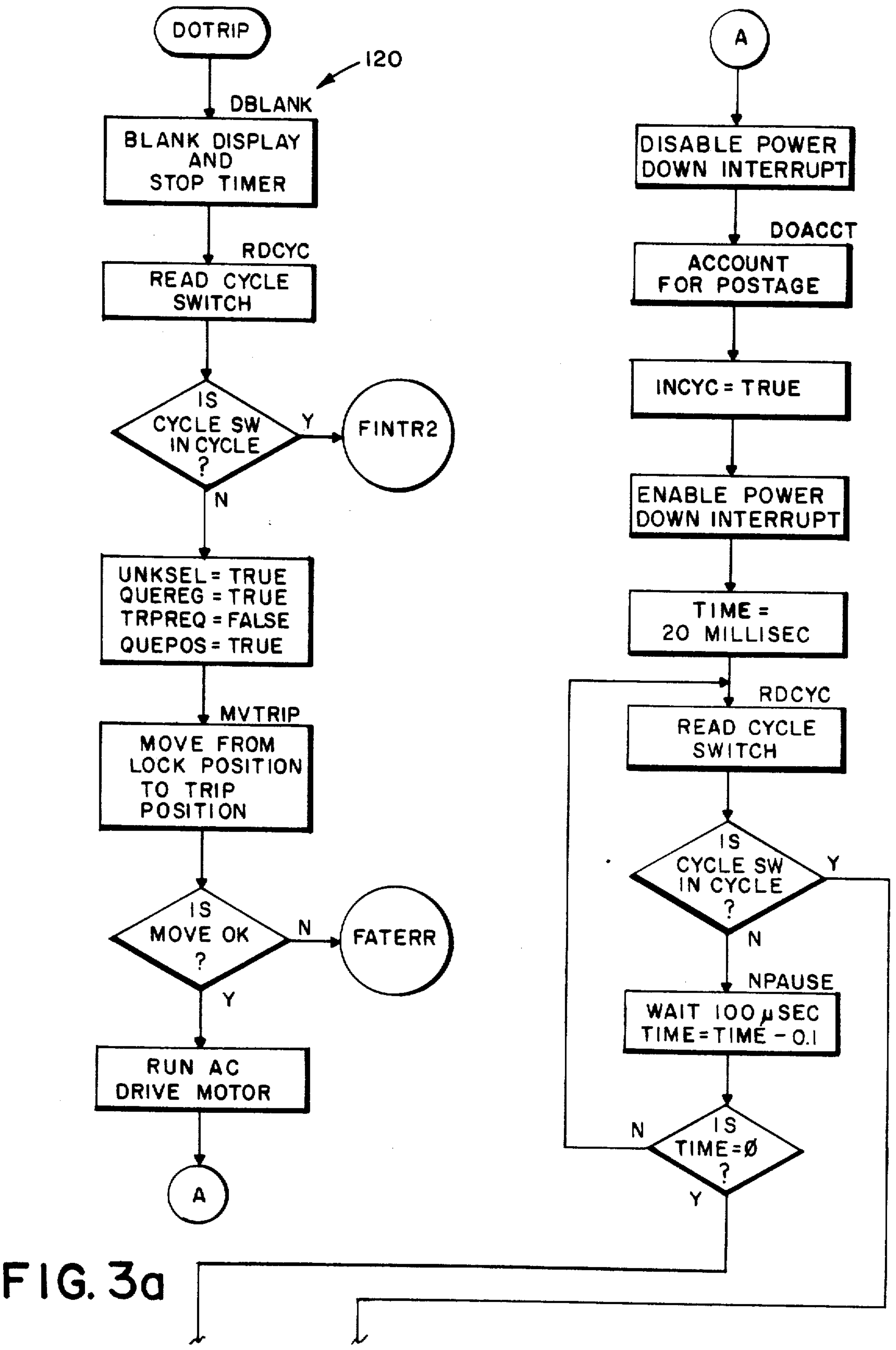

A program listing for an electronic postage meter of the type described in the aforementioned patent application entitled, STAND-ALONE ELECTRONIC MAILING MACHINE is set forth in the accompanying Program Appendix. This program is similar in certain respects to the program disclosed in the aforementioned United States Letters Patent. However, there are significant differences in certain of the routines of the present program which interact with the electrical and mechanical components of the electronic postage meter disclosed in the aforementioned patent application entitled, STAND-ALONE ELECTRONIC MAILING MACHINE. Specifically, one such exception occurs during the trip routine in that the trip cycle is monitored as illustrated in FIGS. 3A and 3B. After the postage meter is properly initialized during power up and the desired postage values are set via the keyboard 22A, the postage meter is ready for the trip cycle or the printing of postage on an envelope. (See the aforementioned patent application entitled, INITIALIZING THE PRINT WHEELS IN AN ELECTRONIC POSTAGE METER). To accomplish this operation, an envelope is inserted in the throat of the postage meter. The end of the envelope is sensed by the trip sensor 40A which sends a signal to the RAM which communicates with the microprocessor 10A under control of the program in the ROM 14A to begin the trip cycle, illustrated as DOTRIP Routine 120 in FIG. 3. Additionally, the meter may be tripped by an external trip as disclosed in copending application Ser. No. 447,925, filed on even date herewith in the names of John H. Sodenberg and Edward C. Duwel entitled, CONTROLLING FIRMWARE BRANCH POINTS IN AN ELECTRONIC POSTAGE METER.

When DOTRIP Routine 120 commences, the display 38A is blanked and the timer which provides a blinking display is deactivated. The position of the cycle switch 84 is then read by reading its current state. This current state is then stored in the storage buffer 86 and eventually communicated to the RAM. If the cycle switch is in its "Home" or "off" position, the routine proceeds. However, if the cycle switch is In Cyle (current flowing) FINTR2 sequence occurs and a fatal error is declared and logged by setting a bit in non-volatile memory 24A. The meter is then locked up and rendered non-functional.

If the cycle switch 84 is Home (not in cycle), certain flags or bits are then set. Specifically, the following bits are set:

1. UNKSEL—not certain where the trip mechanism is or if in a postage selection—this is set TRUE. If not set TRUE, i.e., FALSE, nothing mechanically is being done.
2. QUEREG—end of a trip cycle to output extra information—this is set TRUE for a trip and false for no trip.
3. TRPREQ—request has been made for a trip—set FALSE when we start the trip.
4. QUEPOS—at the end of the trip cycle this will result in a postage value message—this is set TRUE. After the trip is completed it is set FALSE.

The UNKSEL and QUEREG bits are transmitted from the RAM 16A to the non-volatile memory 24A. The trip lever 142 of the selection mechanism is then moved under control of the microprocessor 10A from its lock position to its trip position, see FIG. 6. A sensor sends a flag to the microprocessor 10A to indicate whether this movement was accomplished. If it is not accomplished, a fatal error is declared and logged by setting a bit in the non-volatile memory 24A. The meter is then locked up and rendered inoperative.

If the move is okay the AC drive motor is energized and the power down interrupt is disabled so that the postage can be accounted for by undergoing a DOACCT Subroutine similar to that disclosed in the aforementioned U.S. Pat. No. 4,301,507.

In the DOACCT Subroutine, the value of the ascending register in the RAM is increased to the value present in the ascending register plus the preset postage value which was just used in printing postage on an envelope. Thereafter a new cycle redundancy character (CRC) is computed for the ascending register. The descending register in the RAM is then reduced to the present value in the descending register minus the preset postage value which was just used in printing postage on an envelope. Likewise, a new cyclic redundancy character is computed for the descending register. The value of the piece count register in the RAM is then incremented to the value present in the price count register plus one (1) to account for the piece of mail just stamped with preset postage. The DOACCT Subroutine is then completed and its completion is reported to the superordinate process, e.g., the DOTRIP. After completion of the accounding Subroutine DOACCT, another flat or bit is set INCYC=TRUE. If INCYC=FALSE, the DOTRIP routine has not progressed far enough to complete the accounting. This INCYC bit is transmitted from the ram to the non-volatile memory 24A.

After setting INCYC=TRUE, the power down interrupt is then enabled once again. A period is then entered where the cycle switch must change from "Home" indication to "In-Cycle" indication before the elapse of a predetermined period of time, e.g., 20 milliseconds. If this time period expires and the cycle switch still yields a "Home" indication, a fatal error is declared and stored in non-volatile memory 24A and the remainder of the trip is attempted to be completed by procedure FINTRP as disclosed in the aforementioned related copending patent application entitled, COMPLETING AN INCOMPLETE TRIP IN AN ELECTRONIC POSTAGE METER.

Once the cycle switch 84 yields the desired "In-Cycle" condition, the trip selection mechanism is moved from the trip position back to its lock position. If this move is unsuccessful, the error condition is stored in non-volatile memory and the remainder of the trip completed as normal.

The last portion of the trip cycle is waiting for the cycle switch to change from "In-Cycle" back to "Home" condition. This transition has a time limit, e.g., of one (1) second, and if exceeded will result in a fatal error being declared and stored in non-volatile memory 24A. Once the cycle switch again indicates a "Home" condition, the UNKSEL bit is set FALSE and the INCYC bit set FALSE. Both the INCYC bit and the UNKSEL bit are stored in non-volatile memory 24A for the purpose of being tolerant of power interruptions during the trip process. Thereafter, the AC drive motor 36A is de-energized and the ENABLED bit is set FALSE completing the DOTRIP Routine. The fact of completion is reported to the superordinate process, e.g., the executive.

Figure 4:
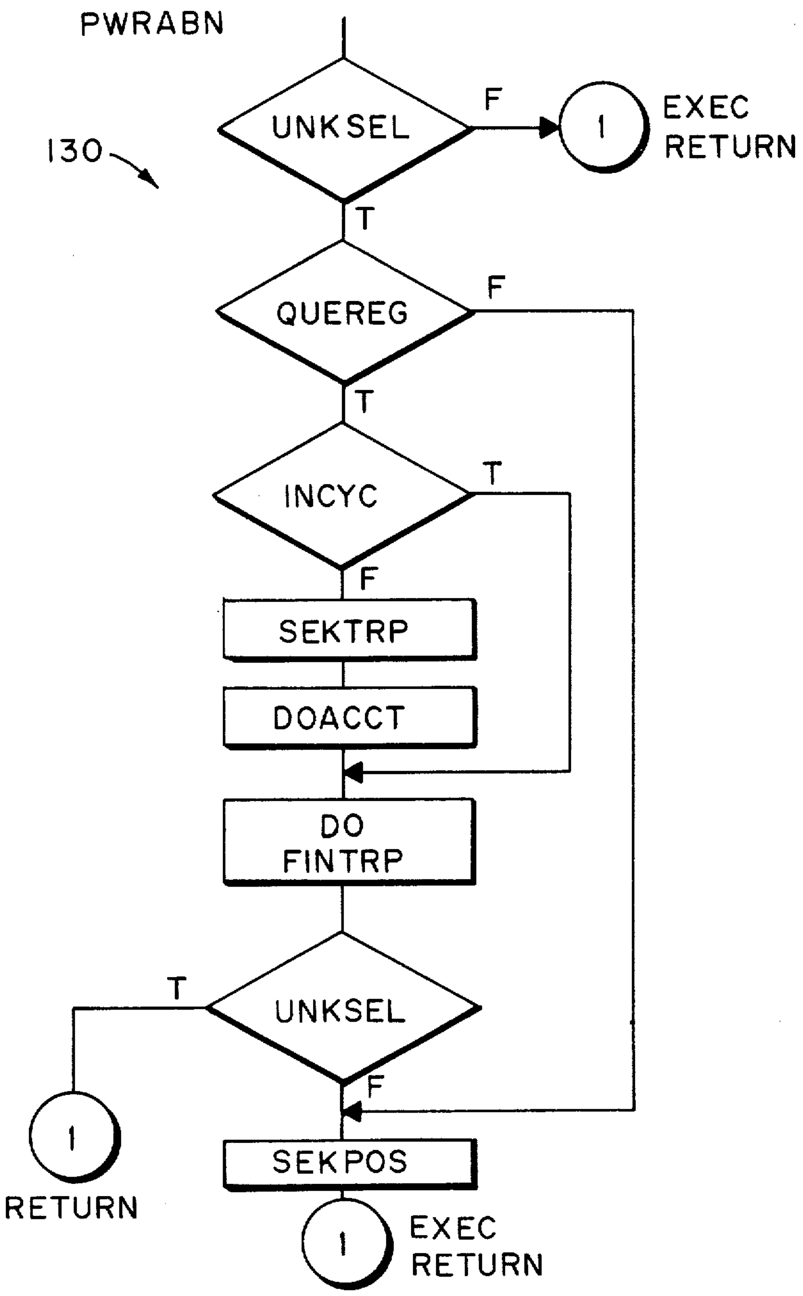
FIG. 4 is a flowchart for the logic used in the DOTRIP Routine.

Referring to FIG. 4, a flow chart for the logic is set forth as 130, designated PWRABN which occurs during the power up cycle. If the UNKSEL bit is FALSE, control is resumed by the superordinate process since no trip or postage selection is in progress. However, if UNKSEL bit is TRUE, the QUEREG bit is TRUE and the INCYC bit is TRUE the FINTRP Routine as disclosed in the aforementioned copending patent application entitled, COMPLETING AN INCOMPLETE TRIP IN AN ELECTRONIC POSTAGE METER, is commenced. Upon completion of the FINTRP Routine the UNKSEL bit is examined, and if determined to be TRUE, control is resumed by superordinate process. If UNKSEL is FALSE a SEKP08 Routine is undertaken to establish a predefined reference for the entire selection mechanism. If the INCYC bit is FALSE, SEKTRP and DOACCT Routines are undergone prior to the FINTRP Routine. The DOACCT Subroutine has been previously discussed. The SEKTRP Subroutine moves the trip selection mechanism from its current position to the trip position.

Figure 5:
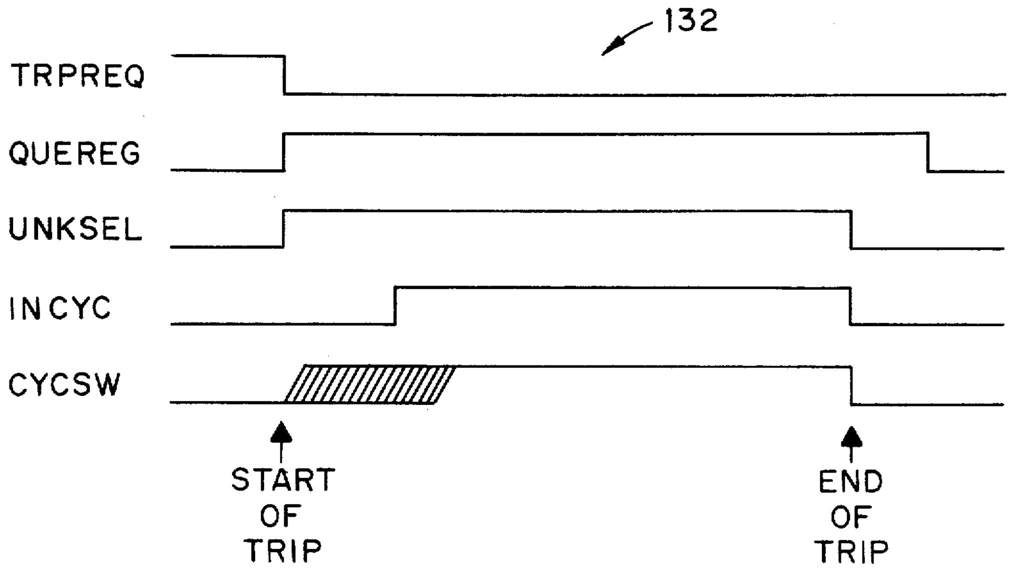
FIG. 5 is a timing diagram for the logic used in the DOTRIP Routine.

Referring to FIG. 5, the timing diagram for the bits and cycle switch referred to in FIGS. 3 and 4 is illustrated generally as 132. As seen by the arrow indicating the start of the trip cycle, the trip cycle commences with the TRPREQ bit changing from TRUE to FALSE and the QUEREG and UNKSEL bits changing from FALSE to TRUE. Sometime subsequent to the start of the trip cycle the CYCSW bit (cycle switch) goes TRUE (positive) since it is in cycle. Either shortly before or shortly after the CYCSW bit goes TRUE the INCYC bit is set TRUE. At the end of the trip as indicated in FIG. 5, the UNKSEL, INCYC and CYCSW bits change from TRUE to FALSE. Subsequently, to allow for certain administrative actions to take place in the meter, the QUEREG bit goes FALSE and the trip is complete. Thereafter, TRPREQ may be set TRUE in preparation for another trip. The commitment to start a trip begins when the TRPREQ bit changes from TRUE to FALSE.

Figure 6:
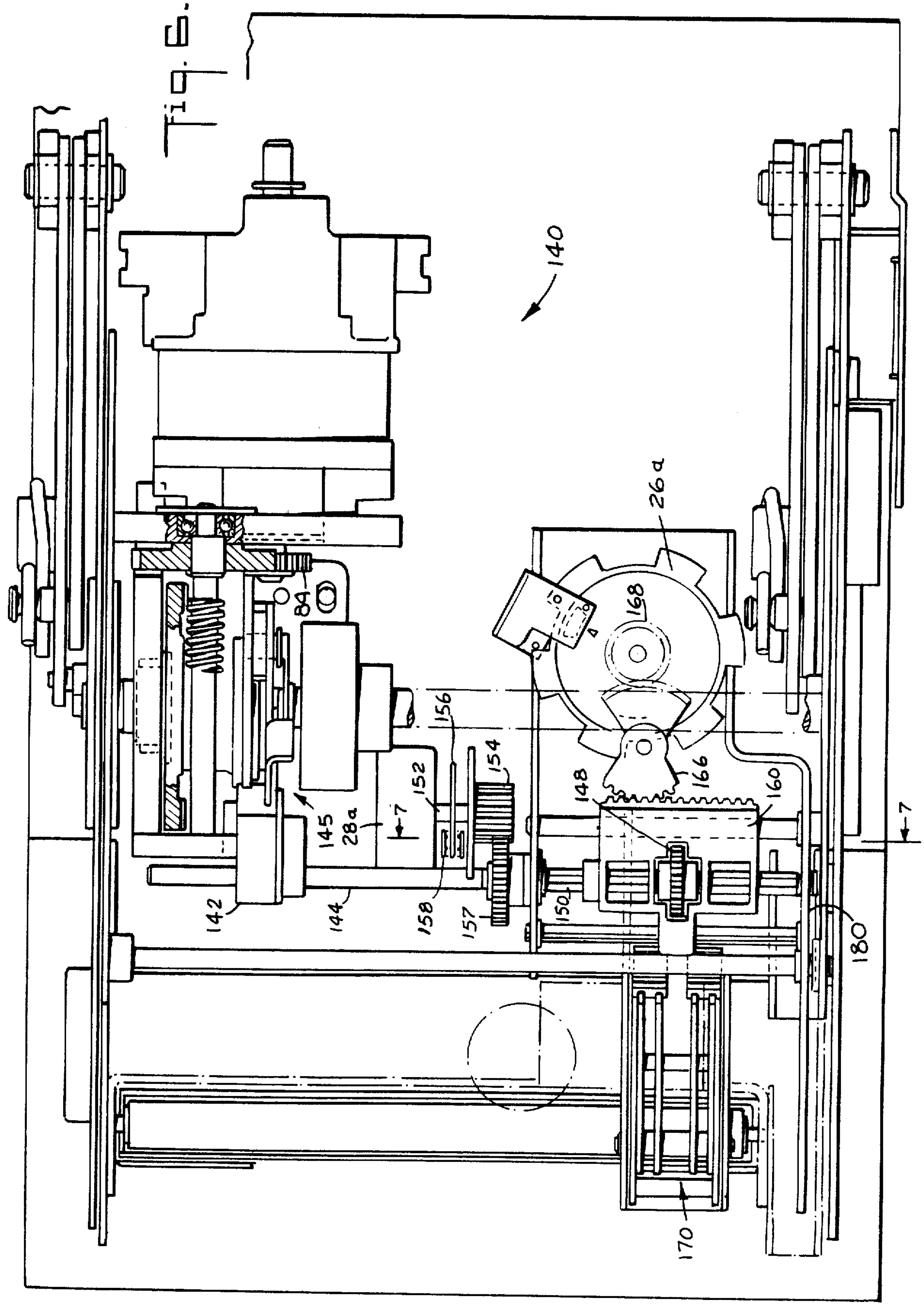
FIG. 6 is a plan view of the print wheel selection mechanism for a stand-alone electronic postage meter.
Figure 7:
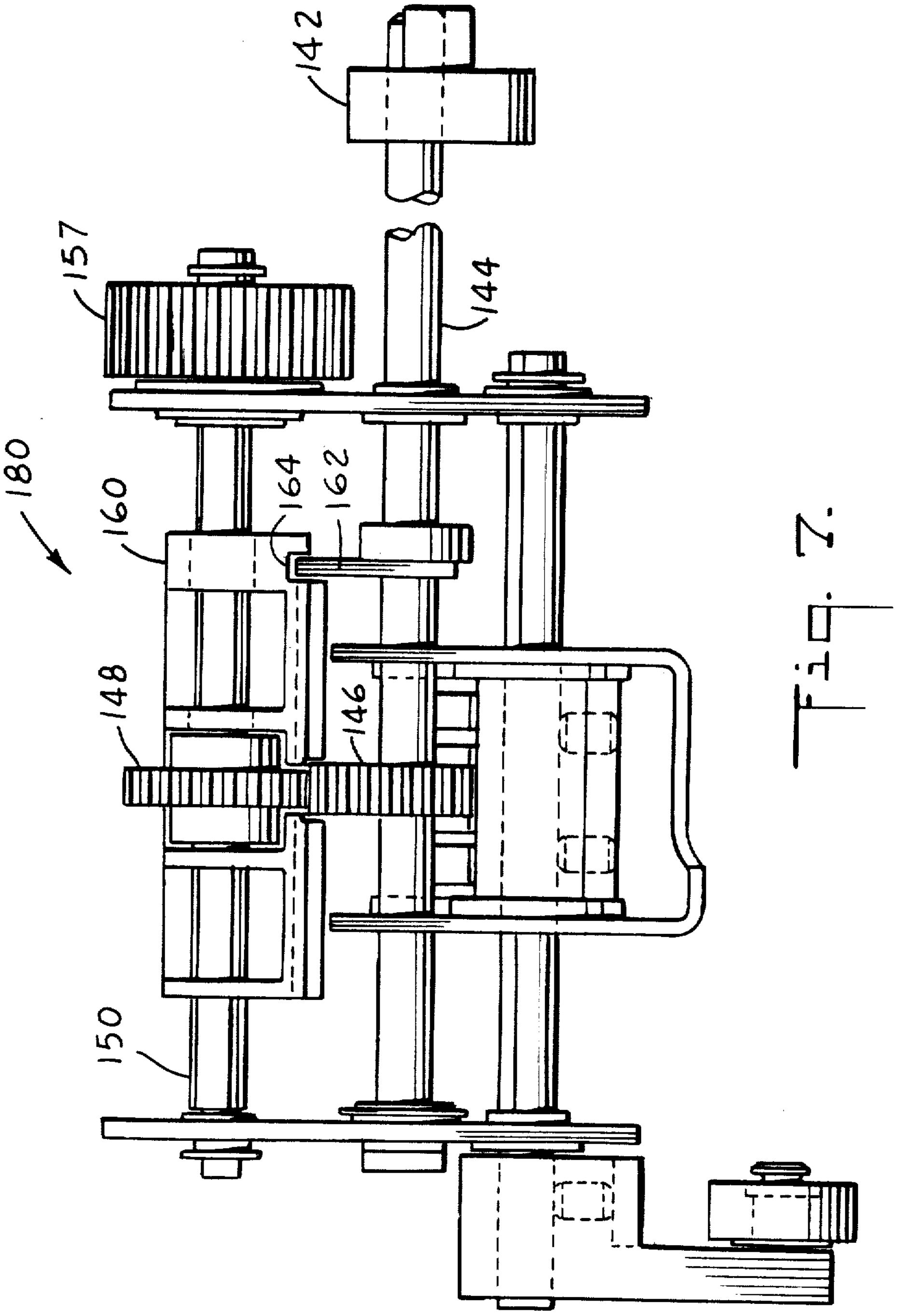
FIG. 7 is a side elevation of the locking mechanism for the print wheel selection mechanism.

Referring to FIGS. 6 and 7, the trip selection mechanism for an electronic postage meter of the type disclosed in the aforementioned copending patent application entitled, STAND-ALONE ELECTRONIC MAILING MACHINE, is illustrated generally as 140 and 180, respectively. Further details regarding the trip selection mechanism and the other mechanical components of such an electronic postage meter may be obtained from said aforementioned patent application, the disclosure of which is incorporated by reference as previously noted. The trip selection mechanism 140 includes a trip lever 142 affixed to a rotatable trip shaft 144 adjacent to one end thereof for engagement and disengagement with a clutch 145. The trip shaft 144 also includes a gear 146 affixed thereto for engagement with and rotation by a gear 148 affixed to a tri-lobed shaft 150. A stepper motor 28A includes an output shaft 152 having a gear 154 and an optical encoder disk 156 (not to scale) on the output shaft 152. The optical encoder disk 156 is received within a sensor 158 so that the position of the stepper motor shaft 152 can be determined. The gear 154 engages a gear 157 affixed to the tri-lobed shaft 150. The gear 148 is disposed within an opening of a carriage 160.

In operation, as seen in FIGS. 6 and 7, the stepper motor 28A is energized to rotate the stepper motor gear 154 and the gear 157 affixed to the tri-lobed shaft 150. Rotation of the tri-lobed shaft 150 rotates gear 146 affixed to the trip shaft 144 which rotates a locking lever 162 affixed to the trip lever shaft 144 out of engagement with a carriage slot 164, thereby freeing the carriage 160 for movement along the tri-lobed shaft 150. As shown in FIGS. 6 and 7, the trip shaft 144 and trip lever 142 are in their home or middle position. The down position of the trip lever 142 is the set position. The up position of the trip lever 142 is the trip position. In the middle or intermediate position of the trip lever 142, as shown in FIG. 6., a locked position exists. Rotation of the trip lever 142 to the set position disengages the locking lever 162 from the carriage slot 164 and allows movement to be imparted to the carriage 160 in either direction along the tri-lobed shaft 150 for selecting the appropriate bank of the print wheels (not shown) in response to energization of bank stepper motor 26A which moves gear 166 via stepper motor gear 168. The individual digit of the desired print wheel is then selected by the stepper motor 28A which rotates the tri-lobed shaft 150 and thus gear 148 which is engageable with the teeth of a selected one of four print wheel racks 170.

From the foregoing description it is apparent that the bistable member, i.e., the cycle switch, provides the only system feedback for the DOTRIP Routine in monitoring the status of the trip cycle. When the cycle switch is engaging a clutch (trip lever unlocked), the cycle switch is in cycle. When the cycle switch is not engaging the clutch (trip lever locked), the cycle switch is Home.

It is known and understood for the purpose of the present application that the term postage meter refers to the general class of device for the imprinting of a defined unit value for governmental or private carrier delivery of parcels, envelopes or other like application for unit value printing. Thus, although the term postage meter is utilized, it is both known and employed in the trade as a general term for devices utilizied in conjunction with services other than those exclusively employed by governmental postage and tax services. For example, private, parcel and freight services purchase and employ such meters as a means to provide unit value printing and accounting for individual parcels.

It should be understood by those skilled in the art that various modifications may be made in the present invention without departing from the spirit and scope thereof as described in the foregoing description and defined in the appended claims.

PROGRAM APPENDIX

PATENT APPLICATION

OF: EDWARD C. DUWEL

FOR: MONITORING THE STATUS OF THE TRIP CYCLE IN AN ELECTRONIC POSTAGE METER

```
    <<< ASSEMBLY COMMAND STRING >>>

/LIST=_DRA1:[OPT1.DEBUG]PATENT.LIS
/OBJECT=_DRA1:[OPT1.DEBUG]PATENT.OBJ
+       LINES 60
+       LIST    A,E,G,O,S,X
+       NLIST   M
_DRA1:[OPT1.DEBUG]SYMBOL.SRC
;       I N T E R R U P T   V E C T O R   T A B L E
_DRA1:[OPT1.DEBUG]VECTBL.SRC
;       I N T E R R U P T   P R O C E S S I N G
+       ORG     40H
_DRA1:[OPT1.NEWINT]CLKDEC
_DRA1:[OPT1.NEWINT]DBOUNC
_DRA1:[OPT1.NEWINT]DISPLY
_DRA1:[OPT1.NEWINT]INT75
_DRA1:[OPT1.NEWINT]KDIO
_DRA1:[OPT1.NEWINT]MVDDAT
_DRA1:[OPT1.NEWINT]RDROW
_DRA1:[OPT1.NEWINT]STPTMR
_DRA1:[OPT1.NEWINT]STRTMR
_DRA1:[OPT1.NEWINT]TIMINT
;       P O W E R   U P   &   D O W N
;_DRA1:[OPT1.DEBUG]PWRUP
_DRA1:[OPT1.NEWCTL]PWRABN
_DRA1:[OPT1.NEWCTL]PWRDN
_DRA1:[OPT1.NEWCTL]PWRNOR
_DRA1:[OPT1.NEWCTL]PWRUNG
_DRA1:[OPT1.NEWCTL]PWRUOK
;       K E Y B O A R D   &   D I S P L A Y
_DRA1:[OPT1.NEWKEY]CDBUF
_DRA1:[OPT1.NEWKEY]FILDIM
_DRA1:[OPT1.NEWKEY]KEYBRD
_DRA1:[OPT1.NEWKEY]MODDSP
_DRA1:[OPT1.NEWKEY]PAUTHK
_DRA1:[OPT1.NEWKEY]PCLRK
_DRA1:[OPT1.NEWKEY]PDCMK
_DRA1:[OPT1.NEWKEY]PERDSP
_DRA1:[OPT1.NEWKEY]PNUMK
_DRA1:[OPT1.NEWKEY]PROKEY
_DRA1:[OPT1.NEWKEY]PSETK
_DRA1:[OPT1.NEWKEY]SEGCOD
_DRA1:[OPT1.NEWKEY]VALDSP
;       C O N T R O L   &   P R O C E S S I N G
;+      ORG     400H
_DRA1:[OPT1.NEWCTL]CMDDSB
_DRA1:[OPT1.NEWCTL]CMDENB
_DRA1:[OPT1.NEWCTL]CONFIG
_DRA1:[OPT1.NEWCTL]CONSUM
_DRA1:[OPT1.NEWCTL]CTLSUM
_DRA1:[OPT1.NEWCTL]DBLHDR
_DRA1:[OPT1.NEWCTL]DECADD
_DRA1:[OPT1.NEWCTL]DECCOM
_DRA1:[OPT1.NEWCTL]DECERR
_DRA1:[OPT1.NEWCTL]DECSUB
_DRA1:[OPT1.NEWCTL]DOACCT
_DRA1:[OPT1.NEWCTL]DOSTAT
_DRA1:[OPT1.NEWCTL]DOTRIP
_DRA1:[OPT1.NEWCTL]ENDENT
_DRA1:[OPT1.NEWCTL]ENTAMT
_DRA1:[OPT1.NEWCTL]ENTSER
_DRA1:[OPT1.NEWCTL]EXTSER
_DRA1:[OPT1.NEWCTL]EXTTRP
_DRA1:[OPT1.NEWCTL]FATERR
_DRA1:[OPT1.NEWCTL]FINTRP
_DRA1:[OPT1.NEWCTL]HDRONY
_DRA1:[OPT1.NEWCTL]HDRPLS
_DRA1:[OPT1.NEWCTL]IDLE
_DRA1:[OPT1.NEWCTL]MANRST
_DRA1:[OPT1.NEWCTL]MESAGE
_DRA1:[OPT1.NEWCTL]MSERNO
_DRA1:[OPT1.NEWCTL]MSG2MU
_DRA1:[OPT1.NEWCTL]MTRSTS
_DRA1:[OPT1.NEWCTL]NPAUSE
_DRA1:[OPT1.NEWCTL]POSUPD
_DRA1:[OPT1.NEWCTL]PROERR
_DRA1:[OPT1.NEWCTL]RDCYC
_DRA1:[OPT1.NEWIO]RECEVE
_DRA1:[OPT1.NEWCTL]REDSTS
_DRA1:[OPT1.NEWCTL]SELVAL
_DRA1:[OPT1.NEWCTL]SEREOE
_DRA1:[OPT1.NEWCTL]SETPOS
_DRA1:[OPT1.NEWCTL]SRVCNV
_DRA1:[OPT1.NEWCTL]SRVREQ
_DRA1:[OPT1.NEWCTL]VALREQ
_DRA1:[OPT1.NEWCTL]XEQHDR
_DRA1:[OPT1.NEWIO]XMIT
;       U T I L I T I E S
_DRA1:[OPT1.NEWUTL]CLRBLK
_DRA1:[OPT1.NEWUTL]CMPARE
```

```
_DRA1:[OPT1.NEWUTL]CRC
_DRA1:[OPT1.NEWUTL]CRCNIB
_DRA1:[OPT1.NEWUTL]DBLANK
_DRA1:[OPT1.NEWUTL]DFLUSH
_DRA1:[OPT1.NEWUTL]DSBKBD
_DRA1:[OPT1.NEWUTL]ENAKBD
_DRA1:[OPT1.NEWUTL]FILNIB
_DRA1:[OPT1.NEWUTL]GETNIB
_DRA1:[OPT1.NEWUTL]LSTATE
_DRA1:[OPT1.NEWUTL]MOVBIT
_DRA1:[OPT1.NEWUTL]MVLNIB
_DRA1:[OPT1.NEWUTL]MVRNIB
_DRA1:[OPT1.NEWUTL]PUTNIB
_DRA1:[OPT1.NEWUTL]RSCAN
_DRA1:[OPT1.NEWUTL]TDBITM
_DRA1:[OPT1.NEWUTL]VCALL
_DRA1:[OPT1.NEWUTL]VCALLS
;       N O N   V O L A T I L E   M E M O R Y
_DRA1:[OPT1.NEWNVM]NVM30F
_DRA1:[OPT1.NEWNVM]NVM30T
_DRA1:[OPT1.NEWNVM]NVMBYT
_DRA1:[OPT1.NEWNVM]NVMCHG
_DRA1:[OPT1.NEWNVM]NVMDED
_DRA1:[OPT1.NEWNVM]NVMDXB
_DRA1:[OPT1.NEWNVM]NVMER
_DRA1:[OPT1.NEWNVM]NVMFND
_DRA1:[OPT1.NEWNVM]NVMLOD
_DRA1:[OPT1.NEWNVM]NVMMAP
_DRA1:[OPT1.NEWNVM]NVMNBK
_DRA1:[OPT1.NEWNVM]NVMNXT
_DRA1:[OPT1.NEWNVM]NVMOPN
_DRA1:[OPT1.NEWNVM]NVMPRP
_DRA1:[OPT1.NEWNVM]NVMRD
_DRA1:[OPT1.NEWNVM]NVMSTO
_DRA1:[OPT1.NEWNVM]NVMWN
_DRA1:[OPT1.NEWNVM]NVMWR
;       V R M R S
_DRA1:[OPT1.VRMRS]ACCODE
_DRA1:[OPT1.VRMRS]BINOCT
_DRA1:[OPT1.VRMRS]VRCDR
_DRA1:[OPT1.VRMRS]VRCLR
_DRA1:[OPT1.VRMRS]VRCREC
_DRA1:[OPT1.VRMRS]VRMRS
_DRA1:[OPT1.VRMRS]VRSET
_DRA1:[OPT1.DEBUG]PATENT
;       M O T O R   S U B S Y S T E M
;_DRA1:[OPT1.DEBUG]STUB
_DRA1:[EASWARAN.CONTROL]DMOVE
_DRA1:[EASWARAN.CONTROL]ENCMOV
_DRA1:[EASWARAN.CONTROL]ENDMOV
_DRA1:[EASWARAN.CONTROL]MDSEEK
_DRA1:[EASWARAN.CONTROL]MOPEN
_DRA1:[EASWARAN.CONTROL]MOTMOV
_DRA1:[EASWARAN.CONTROL]POHOME
_DRA1:[EASWARAN.CONTROL]RENC
_DRA1:[EASWARAN.CONTROL]SETCLS

    <<< end of assembly command string >>>
```

```
  1                   LINES 60
  3                   NLIST  M
  5           ;  ********************************
  6           ;  ***   RAM LABEL DEFINATIONS   ***
  7           ;  ********************************
 21  0000                  +FIXSED  EQU  PTR
 26  0008                  +VARSED  EQU  PTR
 31  0010                  +CTLCRC  EQU  PTR
 36  0012                  +RSTCNT  EQU  PTR
 41  0013                  +ERRST   EQU  PTR
 46  0014                  +ERRCOD  EQU  PTR
 51  0016                  +ERRCNT  EQU  PTR
 56  0018                  +UNLOCK  EQU  PTR
 61  001C                  +LOWWRN  EQU  PTR
 66  001E                  +SETLIM  EQU  PTR
 71  0020                  +SERFLG  EQU  PTR
 76  0021                  +SERNUM  EQU  PTR
 81  0028                  +PCEREG  EQU  PTR
 86  002F                  +DSCREG  EQU  PTR
 91  0036                  +DSCCRC  EQU  PTR
 96  0038                  +ASCREG  EQU  PTR
101  0040                  +ASCCRC  EQU  PTR
106  0042                  +POSREG  EQU  PTR
111  0046                  +MTRCHR  EQU  PTR
116  0048                  +MRSTS1  EQU  PTR
121  004A                  +MRSTS2  EQU  PTR
126  004C                  +NORFLG  EQU  PTR
131  004E                  +KDCTRL  EQU  PTR
136  0050                  +BLKTMR  EQU  PTR
141  0052                  +DSPTMR  EQU  PTR
146  0054                  +KEYBKT  EQU  PTR
151  0056                  +CTLBKT  EQU  PTR
156  0058                  +CHRBKT  EQU  PTR
161  005A                  +CURBKT  EQU  PTR
166  005C                  +DBCTR   EQU  PTR
171  005E                  +SKPVAL  EQU  PTR
176  0060                  +SKPCNT  EQU  PTR
181  0062                  +TIMVEC  EQU  PTR
186  0066                  +NVMCTL  EQU  PTR
191  0068                  +OLDSWT  EQU  PTR
196  006A                  +DIEDCM  EQU  PTR
201  006C                  +DEFDCM  EQU  PTR
206  006E                  +PORTBI  EQU  PTR
214  0070                  +SPARE   EQU  PTR
219  0080                  +DBUF    EQU  PTR
224  008C                  +SPARE1  EQU  PTR
229  0090                  +RECBUF  EQU  PTR
234  00A0                  +XMTBUF  EQU  PTR
239  00B0                  +SPARE2  EQU  PTR
244  00C0                  +WORK1   EQU  PTR
249  00D0                  +WORK2   EQU  PTR
254  00E0                  +AMTBUF  EQU  PTR
259  00F0                  +CMBBUF  EQU  PTR
265  0000                  +DIMAGE  EQU  PTR
269                   NLIST M
```

SYMBOL TABLES

```
272           ;                       FLAG ASSIGNMENTS

274           ; RAM                 BIT
275           ; LABEL     BIT       LABEL     DESCRIPTION

277           ; Serflg    0         Dead      Unrecoverable Fatal Error
278           ;            1
279           ;             2       Weknvm    Retention qualities of NVM poor
280           ;              3      Snolck    Sernum can no longer be changed
```

```
        ;
        ; Mrsts1   0          Unksel    Unknown selection value
        ;           1         Datdor    Check date warning
        ;            2        Insfnd    Insufficient funds
        ;             3       Lowpos    Low postage warning
        ;              4      Sermod    In service mode
        ;               5     Enabld    Meter enabled
        ;                6    Incyc     Trip mechanism in cycle
        ;                 7   Quereg    Trip request being processed
        ;
        ; Mrsts2   0          Fatmod    Detected fatal error condition
        ;           1
        ;            2
        ;             3
        ;              4      Trpsw     Trip switch status
        ;               5
        ;                6
        ;                 7   Prvmod    Privileged mode set
        ;
        ; Norflg   0          Quests    Status is to be transmitted
        ;           1         Quepos    Current selection is to be transmitted
        ;            2        Cmbin     Combination entered
        ;             3       Amtin     Amount entered
        ;              4      Trpreq    Trip waiting to be processed
        ;               5     Comdsb    External communications disabled
        ;                6    Unvsel    Selected postage not verified
        ;                 7   Latdsb    Commanded disable (latched)
        ;
        ; Kdctrl   0          Stgdsp    Setting is on display
        ;           1         Flsdsp    Flashing display
        ;            2        Timed     Display is timed
        ;             3
        ;              4
        ;               5     Flsdcm    Flashing decimal
        ;                6
        ;                 7   Kbddsb    Keyboard disabled

        ;  *************************************
        ;  ***   HARDWARE ADDRESS POINTERS   ***
        ;  *************************************

7400    X        EQU   7400H  BASE ADDRESS OF RAM
7480    Y   EQU   7480H  BASE ADDRESS OF RAM UPPER HALF
7000    CTLREG   EQU   7000H  8155 CONTROL REGISTER
6800    DATA1    EQU   6800H  SWITCH DATA ADDRESS
02BE    KILCOD   EQU    2BEH  ADDRESS OF KILCODES IN NVM
4800    NVMWRT   EQU   4800H  WRITE ADDRESS FOR NON VOLATILE MEMORY
4400    NVMRED   EQU   4400H  READ ADDRESS FOR NON VOLATILE MEMORY
4000    NVMERS   EQU   4000H  ERASE ADDRESS FOR NON VOLATILE MEMORY
6800    PORT2A   EQU   DATA1
7001    PORTA    EQU   7001H  8155 PORT A ADDRESS
7002    PORTB    EQU   7002H  8155 PORT B ADDRESS
7003    PORTC    EQU   7003H  8155 PORT C ADDRESS
00FE    RETAIN   EQU    0FEH  ADDRESS OF NVM RETENTION LOCATION
8000    TEST     EQU   8000H  ADDRESS OF EXTERNAL TEST SOFTWARE
7004    TIMER    EQU   7004H  8155 TIMER DATA ADDRESS

        ;  ******************************
        ;  ***   P A R A M E T E R S   ***
        ;  ******************************

0002    DBVAL    EQU   2      DEBOUNCE COUNT
0007    DSPVAL   EQU   7.     COUNT FOR 5.5 SEC TIMED DISPLAY
0002    KDSKIP   EQU   2      TIMER INT SKIP COUNT
4C96    KEYINT   EQU   (18.*179.).OR.4000H   VALUE FOR 1.8 MILLI SEC INT RATE
7FA1    MAXINT   EQU   (91.*179.).OR.4000H  MAX TIMER INTERVAL , 9.1 MILLI SEC
0080    MULKEY   EQU   80H    VALUE ASSIGNED TO MULTI KEY DEPRESSION
0002    NDISP    EQU   2      NO. OF DISPLAY PACKS
0008    DSPCHR   EQU   (NDISP*4) MAX NO. OF CHAR DISPLAYABLE
        ;   NON-VOLATILE MEMORY PARAMETERS
```

```
0000          SRVSTR   EQU   FIXSED  NIBB OFFSET FOR START OF SERVICE BLOCK IN RAM
0028          NORSTR   EQU   PCEREG  NIBB OFFSET FOR START OF NORMAL BLOCK IN RAM
0028          SRVSIZ   EQU   NORSTR-SRVSTR
0022          NORSIZ   EQU   MRSTS2-NORSTR

              ;  *******************************************
              ; ***   VALUE SIZE IN NIBBLES ( DIGITS )   ***
              ; ********************************************

0008          ASCSIZ   EQU   8     ASCENDING REGISTER
0007          DSCSIZ   EQU   7     DESCENDING REGISTER
0004          NBANKS   EQU   4     BANKS FOR POSTAGE PRINTING
0007          PCESIZ   EQU   7     PIECE REGISTER

              ; *************************************
              ; ***   V A L U E   F O R M A T S   ***
              ; *************************************

              ; FORMAT OF DATA  2 DIGITS
              ;    LEFT DIGIT = NO. OF DIGITS
              ;    RIGHT DIGIT = NO. OF DECIMAL PLACES EXCEPT
              ;                = F HEX  NOT DECIMAL NO ( COUNT )
              ;                = 0 USE NO. OF DECIMALS INDICATED BY DIEDCM

008F          ACCFMT  EQU   8FH    ACCESS CODE
0080          ASCFMT  EQU   80H    ASCENDING REG
0080          CSMFMT  EQU   80H    CONTROL SUM
005F          DIAFMT  EQU   5FH    DIAGNOSTIC STATUS
0070          DSCFMT  EQU   70H    DESCENDING REG
0040          LOKFMT  EQU   40H    UNLOCK
007F          MSNFMT  EQU   7FH    METER SERIAL NO
007F          PCEFMT  EQU   7FH    PEICE COUNT
0040          POSFMT  EQU  NBANKS*10H SELECTION

              ; *************************************
              ; ***   MISSING ENTRY POINT TRAPS   ***
              ; *************************************

              ; ****************************
              ; ***   FATAL ERROR CODES   ***
              ; ****************************

0002          SFTWRE   EQU   02H  DETECTED INCONSISTANT SET OF ARGUMENTS ON CALL
0008          TRPTIM   EQU   08H  TRIP FAILED TO COMPLETE WITHIN ALLOWED TIME
0009          RSTTRY   EQU   09H  EXCEEDED ALLOWED NO OF UNSUCESSFUL RESET ATTEMPTS
0011          BADSW    EQU   11H  DETECTED ILLOGICAL SWITCH CONDITION
0012          BUFOVR   EQU   12H  INFORMATION WAS OVER WRITTEN IN TRANSMIT BUF
0017          BARF     EQU   17H  UNEXPECTED INTERRUPT
0018          NINCYC   EQU   18H  CYCLE SWITCH FAILED TO INDICATE NOT HOME

              ; *********************
              ; ***   KILL CODES   ***
              ; *********************

              ; CODES 0 - 9 WILL RESULT IN THE METER BEING
              ;              PERMINITELY INOPERATIVE
              ; CODES A - E WILL RESULT IN CPU BEING HALTED
              ; CODE F  IS NORMAL OPERATION
0000          BADCRC   EQU    0H  DETECTED BAD CRC
0001          NVMBAD   EQU    1H  ERRASE OR WRITE TO NVM UNSUCESSFUL
0002          NVMRET   EQU    2H  READ BEFORE ERASE FAILED,  IE UNACCEPTABLE RETENTIO
0003          FATRST   EQU    3H  DESCENDING REG CLEARED WHILE FATAL MODE
0004          BADCYC   EQU    4H  UNACCEPTABLE RESPONSE FROM CYCLE SWITCH
              ;        EQU    5H  SPARE
              ;        EQU    6H  SPARE
              ;        EQU    7H  SPARE
              ;        EQU    8H  SPARE
              ;        EQU    9H  SPARE
              ;   WILL RESULT IN CPU HALTING ON POWER UP
```

```
000A    BADRAM  EQU   0AH    DETECTED BAD RAM ON POWERUP
        ;       EQU   0BH    SPARE
        ;       EQU   0CH    SPARE
        ;       EQU   0DH    SPARE
        ;       EQU   0EH    SPARE

        ; **************************
        ; ***  MESSAGE HEADERS  ***
        ; **************************

        ; COMMANDS
0041    HENABL  EQU   41H    ENABLE METER
0042    HDISAB  EQU   42H    DISABLE METER
0043    HENDEN  EQU   43H    END OF ENTRY
0046    HSETSV  EQU   46H    SET SERVICE MODE
0047    HCLRSV  EQU   47H    CLEAR SERVICE MODE
004E    HEXTRP  EQU   4EH    EXTERNAL TRIP
0062    HENAKB  EQU   62H    ENABLE KEYBOARD
0063    HDISKB  EQU   63H    DISABLE KEYBOARD

00C0    HSETMN  EQU   0C0H   ENTER METER SERIAL NUMBER
00C1    HSETPO  EQU   0C1H   SET POSTAGE
00C4    HSETDA  EQU   0C4H   CLEAR CHECK DATE
00C5    HENTAM  EQU   0C5H   ENTER AMOUNT
00C6    HENTCO  EQU   0C6H   ENTER COMBINATION
        ; SERVICE
        ; NAME              COMBO   AMT FMT MAX
        ; UNLOCK VALUE        0        42
        ; LOW POSTAGE WARN    1        2F
        ; SETTABLE LIMIT      2        2F

        ;REQUESTS - NORMAL MODE
0040    HREQAC  EQU   40H    ACCESSCODE REQUEST
0050    HREQST  EQU   50H    STATUS REQUEST
0051    HREQPO  EQU   51H    CURRENT SELECTION VALUE
0052    HREQAR  EQU   52H    ASCENDING REGISTER VALUE
0053    HREQDR  EQU   53H    DESCENDING REGISTER VALUE
0054    HREQCS  EQU   54H    CONTROL SUM VALUE
0055    HREQPC  EQU   55H    PEICE COUNT VALUE
005B    HREQCF  EQU   5BH    CONFIGURATION REQUEST
005C    HREQSN  EQU   5CH    SERIAL NUMBER VALUE

        ;REQUESTS - SERVICE MODE

        ;             50H    STATUS REQUEST
        ;             51H    CURRENT SELECTION VALUE
0052    HREQDL  EQU   52H    LOCK VALUE
0053    HREQLP  EQU   53H    LOW POSTAGE WARNING
0054    HREQMN  EQU   54H    METER SERIAL NO.
0055    HREQDS  EQU   55H    DIAGNOSTIC STATUS
0056    HREQSL  EQU   56H    SETTABLE LIMIT
        ;             5CH    SERIAL NUMBER VALUE
0000    EJEC
        ;VALUE HEADERS
0080    HSTAT   EQU   80H    METER STATUS
0081    HPSET   EQU   81H    POSTAGE VALUE
0082    HAREG   EQU   82H    ASCENDING REGISTER
0083    HDREG   EQU   83H    DESCENDING REGISTER
0084    HCSUM   EQU   84H    CONTROL SUM
0085    HPCNT   EQU   85H    PIECE COUNT
008A    HDLOCK  EQU   8AH    UNLOCK VALUE
008B    HLOPOS  EQU   8BH    LOW POSTAGE WARNING
008C    HMTRNO  EQU   8CH    METER SERIAL NUMBER
008D    HDIAGS  EQU   8DH    DIAGNOSTIC STATUS
008E    HHSLIM  EQU   8EH    SETTABLE LIMIT
0090    HACODE  EQU   90H    ACCESS CODE
00AB    HCONFG  EQU   0ABH   METER CONFIGURATION
```

VECTOR INTERRUPTS

```
                ;   INTERRUPT JUMP TABLE TO VECTOR INTERRUPTS TO CORRECT ENTRY POINT
                ORG   0
0000 C3 C5 01   JMP   PWRUP      RST 0  POWER ON RESET
                ORG   8H         RST1
0008 C3 A1 0B   JMP   PROERR
                ORG   10H        RST2
0010 C3 A1 0B   JMP   PROERR
                ORG   18H        RST3
0018 C3 A1 0B   JMP   PROERR
                ORG   20H        RST4
0020 C3 A1 0B   JMP   PROERR
                ORG   24H        TRAP  ( WATCH DOG TIMER )
0024 C3 7E 08   JMP   FATINT
                ORG   28H        RST5
0028 C3 A1 0B   JMP   PROERR
                ORG   2CH        5.5  ( POWER FAIL )
002C C3 7E 08   JMP   FATINT
                ORG   30H        RST6
0030 C3 A1 0B   JMP   PROERR
                ORG   34H        6.5
0034 C3 B6 01   JMP   PWRDN
                ORG   38H        RST7
0038 C3 A1 0B   JMP   PROERR
                ORG   3CH        7.5  ( TIMER )
003C C3 9D 00   JMP   INT75
                   ORG     40H
```

CLKDEC

```
                ;CLKDEC/CLKDGT(KDCTRL,BLKMSK,PORTA )
                ;             (BITSTR,BYTE  ,BITSTR)
                ;             ( I    , I    , I/O  )
                ;             ( PSW  , B    , @HL  )
                ;             ( C    , NC   , C    )
                ;
                ;REGISTER A DESTROYED
                ;PSW DESTROYED
                ;
                ;CLOCK DECIMAL/DIGIT BITS FROM PORTA INTO DISPLAYS.
                ;MODIFIES BITS TO CAUSE BLINKING.
                ;
                CLKDEC;              ****ENTRY FROM DSPLY ONLY
0040 EA 46 00     JPE  CLKD01        IF(KDCTRL.FLSDCM .OR. KDCTRL.FLSDSP)
                ;                      .EQ. TRUE
                ;                      MODIFY BITS WITH BLINK CONTROL MASK
                ;                    ENDIF
                ;                    PULSE CLOCK BITS
                ;                    RETURN
                CLKDGT;              ****ENTRY FROM DSPLY ONLY
0043 C2 49 00     JNZ  CLKD02        IF KDCTRL.FLSDSP .EQ. TRUE
                CLKD01;                MODIFY BITS WITH BLINK CONTROL MASK
0046 7E           MOV  A,M             PORTA = PORTA .OR. BLKMSK
0047 B0           ORA  B
0048 77           MOV  M,A
                CLKD02;              ENDIF
0049 35           DCR  M             PULSE CLOCK BIT
004A 34           INR  M
004B C9           RET                RETURN
```

DBOUNC

```
                ;DBOUNC()(KEYBKT,CTLBKT,CHRBKT)(DBCTR)
                ;        (BYTE  ,BYTE  ,BYTE  )(UBYTE)
                ;        ( I    , O    , O    )( I/O )
                ;        ( RAM  , RAM  , RAM  )( RAM )
                ;        ( NC   , C    , C    )( C   )
                ;
                ;REGISTERS DESTROYED
                ;PSW DESTROYED
                ;
                ;DEFINES DEBOUNCED KEYCODES CTLBKT AND CHRBKT FOR USE OF
                ;MAINLINE KEYBOARD ROUTINE.  CHRBKT DIFFERS FROM CTLBKT
```

```
                      ;IN THAT THE MAINLINE ROUTINE MAY SET CHRBKT = 0.
                      ;
                      DBOUNC;                    ****ENTRY FROM KDIO ONLY
0040 3A 2A 74           LDA  KEYBKT/2+X          A = KEYBKT
                      ;                          DECREMENT DBOUNCE COUNTER
004F 21 2E 74           LXI  H,DBCTR/2+X         HL = ADDRESS, DBCTR
0052 35                 DCR  M                   DBCTR = DBCTR - 1
                      ;                          CHECK WHETHER COUNTER WAS STOPPED AT 1
0053 C2 5D 00           JNZ  DBOUN1              IF DBCTR .EQ. 0
                      ;                            KEEP COUNTER AT 1
0056 34                 INR  M                     DBCTR = 1
                      ;                            KEYBOARD IS DEBOUNCED
                      ;                            DEFINE NEW KEYCODE OUTPUT BUCKETS
0057 32 2C 74           STA  CHRBKT/2+X            CHRBKT = KEYBKT
005A 32 2B 74           STA  CTLBKT/2+X            CTLBKT = KEYBKT
                      DBOUN1;                    ENDIF
                      ;                          CHECK WHETHER KEY IS  PRESSED
005D B7                 ORA  A                   IF KEYBKT .NE. HEX00
005E C8                 RZ
                      ;                            SET DEBOUNCE PERIOD
005F 36 02              MVI  M,DBVAL               DBCTR = DBVAL
                      ;                          ENDIF
0061 C9                 RET                      RETURN

DISPLY

                      ;DISPLY()(KDCTRL,BLKTMR,PORTA )
                      ;         (BITSTR,BYTE  ,BITSTR)
                      ;         ( I    , I    , I/O   )
                      ;         ( RAM  , RAM  , 7001  )
                      ;         ( NC   , NC   , C     )
                      ;
                      ;REGISTERS DESTROYED
                      ;PSW DESTROYED
                      ;
                      ;DISPLAY ROUTINE
                      ;
                      DISPLY:                    ****ENTRY FROM KDIO ONLY
                      ;                          FETCH DISPLAY CONTROL BYTE
0062 2A 27 74           LHLD KDCTRL/2+X
                      ;                          L = KDCTRL
                      ;                          H = BLKTMR
0065 5D                 MOV  E,L                 E = KDCTRL
                      ;                          DEFINE DISPLAY BLINK CONTROL MASK
0066 06 01              MVI  B,01H               B = BLKMSK = HEX01, FOR DISPLAY ON
0068 24                 INR  H                   IF (BLKTMR+1) .GE. 0
0069 FA 72 00           JM   DISP02
006C 2C                 INR  L                     IF KDCTRL.STGDSP .EQ. TRUE
006D F2 72 00           JP   DISP01
0070 06 0F              MVI  B,0FH                   B = BLKMSK = HEX0F, FOR DISPLAY OFF
                      DISP01:                      ENDIF
                      DISP02;                    ENDIF
                      ;                          OUTPUT START BITS FOR DISPLAY LOAD
0072 21 01 70           LXI  H,PORTA             HL = ADDRESS, PORTA
0075 7E                 MOV  A,M                 PORTA = PORTA.AND.HEXF1, 3 START BITS
0076 E6 F1              ANI  0F1H
0078 77                 MOV  M,A
0079 35                 DCR  M                   PULSE CLOCK BIT
007A 34                 INR  M
                      ;                          SET TO LOAD 4 DIGITS INTO EACH DISPLAY
007B 0E 04              MVI  C,4                 C = CHRCNT = 4
                      DISP03;                    DO UNTIL CHRCNT .EQ. 0
                      ;                            DEFINE BIT SELECTION MASK
007D 16 80              MVI  D,80H                 D = BITMSK = HEX80
                      DISP04;                      DO UNTIL BITMSK .EQ. HEX01
                      ;                              MOVE DIGIT BITS FROM DIMAGE TO
                      ;                              PORTA
007F CD DE 00           CALL MVDDAT                  MVDDAT(CHRCNT,BITMSK,KDCTRL,PORTA,
                      ;                                     ( C    , D    , E    , @HL ,
                      ;                                     ( I    , I    , I    , I/O ,
                      ;
                      ;                                     KDCTRL)
```

```
                        ;                        PSW  )
                        ;                        0    )
                        ;                     CLOCK OUT DIGIT BITS
0082 CD 43 00   CALL CLKDGT                   CLKDGT(KDCTRL,BLKMSK,PORTA )
                        ;                           ( PSW  , B    , @HL  )
                        ;                           ( I    , I    , I/O  )
                        ;                     SHIFT BIT SELECTION MASK TO RIGHT
0085 7A         MOV  A,D                      D = BITMSK = BITMSK/2
0086 0F         RRC
0087 57         MOV  D,A
0088 1F         RAR                           TEST BITMSK
0089 D2 7F 00   JNC  DISP04
                        ;                   ENDDO
                        ;                   MOVE DECIMAL BITS FROM DIMAGE TO
                        ;                   PORTA
008C CD DE 00   CALL MVDDAT                 MVDDAT(CHRCNT,BITMSK,KDCTRL,PORTA,
                        ;                         ( C    , D    , E    , @HL ,
                        ;                         ( I    , I    , I    , I/O ,
                        ;
                        ;                         KDCTRL)
                        ;                          PSW  )
                        ;                          0    )
                        ;                   CLOCK OUT DECIMAL BITS
008F CD 40 00   CALL CLKDEC                 CLKDEC(KDCTRL,BLKMSK,PORTA)
                        ;                         ( PSW  , B    , @HL )
                        ;                         ( I    , I    , I/O )
0092 0D         DCR  C                      C = CHRCNT = CHRCNT-1
0093 C2 7D 00   JNZ DISP03
                        ;                 ENDDO
0096 35         DCR  M                    3 CLOCK CYCLES TO FINISH LOAD
0097 34         INR  M
0098 35         DCR  M
0099 34         INR  M
009A 35         DCR  M
009B 34         INR  M
009C C9         RET                       RETURN

INT75
                        ;INT75
                        ;
                        ;SERVICE INTERRUPT 7.5
                        ;
                        INT75;              ****INTERRUPT ENTRY 7.5
009D E5         PUSH H                      SAVE HL
009E 21 7C 01   LXI  H,TIMINT               HL = ADRESS = ADDRESS, TIMINT
00A1 CD 25 10   CALL VCALLS                 VCALLS(ADRESS)
                        ;                          ( HL   )
                        ;                          ( I    )
00A4 E1         POP  H                      RESTORE HL
00A5 FB         EI                          ENABLE INTERRUPTS
00A6 C9         RET                         RETURN

KDIO
                        ;KDIO()(KDCTRL,PORTBI,PORTB ,BLKTMR,DSPTMR,KEYBKT)
                        ;      (BITSTR,BITSTR,BITSTR,BYTE  ,UBYTE ,BITSTR)
                        ;      ( I    , I    , I/O  , I/O  , I/O  , O     )
                        ;      ( RAM  , RAM  , 7002 , RAM  , RAM  , RAM   )
                        ;      ( NC   , NC   , C    , C    , C    , C     )
                        ;
                        ;REGISTERS DESTROYED
                        ;PSW DESTROYED
                        ;
                        ;KEYBOARD/DISPLAY I/O ROUTINE MAKES REAL TIME ASPECTS OF
                        ;KEYBOARD/DISPLAY PROCESSING INVISIBLE TO APPLICATION
                        ;LEVEL ROUTINES.
                        ;
                        KDIO;               ****ENTRY FROM TIMINT ONLY
                        ;                   INCREMENT CONTINUOUS RUN BLINK TIMER
00A7 21 28 74   LXI  H,BLKTMR/2+X           HL = ADDRESS, BLKTMR
00AA 34         INR  M                      BLKTMR = BLKTMR+1
00AB 5E         MOV  E,M                    E = BLKTMR
```

```
00AC C2 B7 00   JNZ  KDI002        IF BLKTMR .EQ. 0
               ;                     DECREMENT TIMED DISPLAY TIMER. 1=STOP
00AF 21 29 74   LXI  H,DSPTMR/2+X    HL = ADDRESS, DSPTMR
00B2 35         DCR  M               DSPTMR = DSPTMR-1
00B3 C2 B7 00   JNZ  KDI001          IF DSPTMR .EQ. 0
00B6 34         INR  M                 DSPTMR = 1
               KDI001;               ENDIF
               KDI002;             ENDIF
               ;                   TOGGLE MOTOR FOR HALF POWER HOLD
00B7 3A 37 74   LDA  PORTBI/2+X    A = PORTBI
00BA 21 02 70   LXI  H,PORTB       HL = ADDRESS, PORTB
00BD AE         XRA  M             PORTB = PORTB .XOR. PORTBI
00BE 77         MOV  M,A
               ;                   DEFINE PROGRAM CONTROL COUNTER
00BF 7B         MOV  A,E           E = IOCTR = BLKTMR .AND. HEX07
00C0 E6 07      ANI  07H
00C2 5F         MOV  E,A
               ;                   CASE (IOCTR)
00C3 FE 05      CPI  5
00C5 D2 D0 00   JNC  KDI003
               ;                     **0,1,2,3,4: READ KEYROWS
00C8 3A 27 74   LDA  KDCTRL/2+X        IF KDCTRL.KBDDSB .EQ. FALSE
00CB 1F         RAR
               ;                         KEYBOARD IS NOT DISABLED
00CC D2 0A 01   JNC  RDROW               RDROW(IOCTR)
               ;                              ( E   )
               ;                              ( I   )
               ;                       ENDIF
00CF C9         RET
               KDI003;
00D0 C0         RNZ                  **5: START KEYBOARD/DISPLAY OUTPUT
00D1 CD 4C 00   CALL DBOUNC            DEBOUNCE KEYBOARD
               ;                       INITIALIZE FOR NEXT KEYBOARD SCAN
00D4 AF         XRA  A                 KEYBKT = 0
00D5 32 2A 74   STA  KEYBKT/2+X
00D8 CD F6 0E   CALL DFLUSH            FLUSH NOISE FROM DISPLAY SHIFT REG
00DB C3 62 00   JMP  DISPLY            OUTPUT TO DISPLAY
               ;                     **ELSE:
               ;                       COMPLETE PROCESSING INITIATED
               ;                       IN CASE **5:. THIS INTERRUPT LEVEL
               ;                       ROUTINE IS ITSELF INTERRUPTED.
               ;                   ENDCASE
               ;                   RETURN

MVDDAT
               ;MVDDAT(CHRCNT,BITMSK,KDCTRL,PORTA ,KDCTRL)(DIMAGE)
               ;      (BYTE  ,BYTE  ,BITSTR,BITSTR,BITSTR)(BYTSTR)
               ;      ( I    , I    , I    , I/O  , O    )( I    )
               ;      ( C    , D    , E    , @HL  , PSW  )( RAM  )
               ;      ( NC   , NC   , NC   , C    , C    )( NC   )
               ;
               ;REGISTER A DESTROYED
               ;PSW DESTROYED
               ;
               ;FETCH SELECTED BITS FROM DIMAGE, INVERT THEM,
               ;AND MOVE THEM TO PORTA.
               ;COPY KDCTRL INTO PSW FOR LATER USE
               ;
               MVDDAT;             ****ENTRY FROM DSPLY ONLY
00DE C5         PUSH B             SAVE REGISTERS
00DF E5         PUSH H
               ;                   SET DATA AND CLOCK BITS
00E0 7E         MOV  A,M           PORTA = PORTA .OR. HEXOF
00E1 F6 0F      ORI  0FH
00E3 77         MOV  M,A
               ;                   DEFINE INVERTED OUTPUT BIT FOR PORTA
00E4 06 FD      MVI  B,0FDH        B = OUTBIT = HEXFD
               ;                   CALCULATE INDEX
00E6 3E 04      MVI  A,4           A = INDEX = 4-CHRCNT
00E8 91         SUB  C
```

```
                   ;                   SET TO MOVE 1 BIT INTO EACH DISPLAY
00E9 0E 02          MVI  C,NDISP       C = BITCTR = NDISP
                   ;                   HL = ADDRESS,
                   ;                   DIMAGE[INDEX+(NDISP-BITCTR)*4]
00EB 21 80 74       LXI  H,DIMAGE/2+Y
00EE 85             ADD  L
00EF 6F             MOV  L,A
                   MVDD01;             DO UNTIL BITCTR .EQ. 0
00F0 7E             MOV  A,M             IF(DIMAGE[INDEX+(NDISP-BITCTR)*4]
                   ;                       .AND. BITMSK) .NE. 0
00F1 A2             ANA  D
00F2 CA FA 00       JZ   MVDD02
                   ;                       PUT OUTBIT INTO PORTA
00F5 E3             XTHL                   HL = ADDRESS, PORTA
00F6 7E             MOV  A,M               PORTA = PORTA .AND. OUTBIT
00F7 A0             ANA  B
00F8 77             MOV  M,A
00F9 E3             XTHL                   HL = ADDRESS,
                   ;                       DIMAGE[INDEX+(NDISP-BITCTR)*4]
                   MVDD02;               ENDIF
                   ;                     SHIFT OUTBIT TO LEFT
00FA 78             MOV  A,B             B = OUTBIT = OUTBIT*2+1
00FB 07             RLC
00FC 47             MOV  B,A
00FD 0D             DCR  C               C = BITCTR = BITCTR-1
                   ;                     HL = ADDRESS,
                   ;                     DIMAGE[INDEX+(NDISP-BITCTR)*4]
00FE 23             INX  H
00FF 23             INX  H
0100 23             INX  H
0101 23             INX  H
0102 C2 F0 00       JNZ  MVDD01          TEST BITCTR
                   ;                   ENDDO
0105 E1             POP  H             RESTORE REGISTERS
0106 C1             POP  B
                   ;                   SET PSW FOR CALL TO CLKDEC/CLKDAT
0107 D5             PUSH D             PSW = KDCTRL
0108 F1             POP  PSW
0109 C9             RET                RETURN

RDROW
                   ;RDROW(IOCTR )(PORTA ,PORTC ,KEYBKT)
                   ;     ( MOD8 )(BITSTR,BITSTR,NIBSTR)
                   ;     ( I    )( I/O  , I    , I/O  )
                   ;     ( E    )( 7001 , 7002 , RAM  )
                   ;     ( C    )( C    , NC   , C    )
                   ;
                   ;REGISTERS DESTROYED
                   ;STATUS DESTROYED
                   ;
                   ;READS THE KEYROWS DESIGNATED BY IOCTR.  CONSOLIDATES
                   ;DATA AS THE SCAN OF 5 KEYROWS PROGRESSES.  OUTPUTS
                   ;CODES TO KEYBKT INDICATING WHICH KEY, OR WHETHER NO
                   ;SINGLE KEY IS DOWN.
                   ;
                   RDROW;              ****ENTRY FROM KDIO ONLY
                   ;                   FORM STROBE MASK
010A 7B             MOV  A,E           B = STRMSK = (2*IOCTR) .XOR. HEXFF
010B 07             RLC
010C 2F             CMA
010D 47             MOV  B,A
                   ;                   FORM ROW CODE
010E 2F             CMA                C = ROWCOD = IOCTR*HEX10
010F 07             RLC
0110 07             RLC
0111 07             RLC
0112 4F             MOV  C,A
                   ;                   STROBE KEYROW
0113 21 01 70       LXI  H,PORTA       HL = ADDRESS, PORTA
0116 7E             MOV  A,M           PORTA =
                   ;                   PORTA .OR. HEX0F .AND. STRMSK
```

```
0117 F6 0F        ORI  0FH
0119 A0           ANA  B
011A 77           MOV  M,A
                ;                          READ POSITIVE LOGIC IMAGE OF KEYROW
011B 3A 03 70     LDA  PORTC               A = COLCOD = PORTC .AND. HEXOF
011E E6 0F        ANI  0FH
0120 C8           RZ                       IF COLCOD .NE. 0
                ;                            A KEY IN CURRENT ROW IS DOWN
0121 21 2A 74     LXI  H,KEYBKT/2+X          HL = ADDRESS, KEYBKT
0124 34           INR  M                     PSW:Z = NOPREV = KEYBKT .EQ. 0
0125 35           DCR  M
                ;                            ASSUME MULTIPLE KEYS DOWN
0126 36 80        MVI  M,MULKEY              KEYBKT = MULKEY
0128 C0           RNZ                        IF NOPREV .EQ. TRUE
                ;                              NO KEY SEEN IN PREVIOUS ROW
0129 FE 09        CPI  9                       IF COLCOD .LT. 9
012B D0           RNC
                ;                                COL CODE VALUES 1 THRU 8 REMAIN
012C B7           ORA  A                         PSW:P = PARITY, COLCOD
012D E8           RPE                            IF PARITY .EQ. ODD
                ;                                  COL CODES 1,2,4,7,8 REMAIN
012E FE 07        CPI  7                           IF COLCOD .NE. 7
0130 C8           RZ
                ;                                    A SINGLE KEY IN ROW IS DOWN
0131 B1           ORA  C                             KEYBKT = ROWCOD .OR. COLCOD
0132 77           MOV  M,A
                ;                                  ENDIF
                ;                                ENDIF
                ;                              ENDIF
                ;                            ENDIF
                ;                          ENDIF
0133 C9           RET                      RETURN

STPTMR
                ;STPTMR(WASOFF)(PORTBI,PORTB ,SKPCNT,CTLREG)
                ;      (BIT   )(BITSTR,BITSTR,UBYTE ,TIMCTL)
                ;      ( 0    )( I    , 0    , 0    , 0    )
                ;      (PSW:Z )(RAM   ,7002  ,RAM   ,7000  )
                ;      ( C    )( NC   , C    , C    , C    )
                ;
                ;PSW:CY = NO CHANGE
                ;PSW:S, Z, P CHANGED; CORRESPOND TO SKPCNT AT ENTRY
                ;
                ;STOP INTERRUPT TIMER
                ;
                STPTMR;                  ****ENTRY POINT
0134 E5           PUSH H                 SAVE HL
                ;                        INDICATE TIMER STATUS AT ENTRY
0135 2A 30 74     LHLD SKPCNT/2+X        L = SKPCNT
0138 2C           INR  L                 PSW:Z = WASOFF = SKPCNT .EQ. 0
0139 2D           DCR  L
013A E1           POP  H                 RESTORE HL
013B F5           PUSH PSW               SAVE A, PSW:CY, WASOFF
                ;                        CHECK FOR RUNNING TIMER
013C CA 51 01     JZ   STPTM1            IF WASOFF .EQ. FALSE
013F 3E 43        MVI  A,43H               STOP TIMER
0141 32 00 70     STA  CTLREG
                ;                          DISABLE TIMER INTERRUPT
0144 3E 0D        MVI  A,0DH               A = HEXOD
0146 30           SIM
                ;                          INDICATE THAT TIMER IS STOPPED
0147 AF           XRA  A                   SKPCNT = 0
0148 32 30 74     STA  SKPCNT/2+X
                ;                          HOLD DIGIT MOTOR IN POSITION
014B 3A 37 74     LDA  PORTBI/2+X          PORTB = PORTBI
014E 32 02 70     STA  PORTB
                STPTM1;                  ENDIF
0151 F1           POP  PSW               RESTORE A, PSW:CY
                ;                        PSW:Z = WASOFF
0152 C9           RET                    RETURN
```

```
STRTMR
                   ;STRTMR(ISADR,SKIPCT,PERIOD,WASOFF)(TIMER ,SKPCNT,SKPVAL,
                   ;      (ADDR ,UBYTE ,TMODCT,BIT   )(TMODCT,UBYTE ,UBYTE ,
                   ;      ( I   , I    , I    , O    )( O    , O    , O    ,
                   ;      ( HL  , A    , DE   , PSW:Z)(7004  , RAM  , RAM  ,
                   ;      ( NC  , NC   , NC   , C    )( C    , C    , C    ,
                   ;
                   ;      TIMVEC,CTLREG,PORTB ,PORTBI)
                   ;      ADDR  ,TIMCTL,BYTE  ,BYTE  )
                   ;       O    , O    , I    , O    )
                   ;      RAM   ,7000  ,7002  , RAM  )
                   ;       C    , C    , NC   , C    )
                   ;
                   ;PSW:CY = NO CHANGE
                   ;PSW:S, Z, P CHANGED; CORRESPOND TO SKPCNT AT ENTRY
                   ;
                   ;STARTS TIMER INTERRUPTS AFTER DEFINING INFORMATION NEEDED
                   ;BY TIMINT.  ISADR IS ADDRESS OF INTERRUPT SERVICE RTN
                   ;WHICH WILL BE ENTERED EVERY SKIPCT(TH) OCCURRENCE OF
                   ;INTERRUPT.
                   ;PERIOD WILL CONTAIN THE PARAMETER VALUE KEYINT.
                   ;
                   STRTMR;              ****ENTRY POINT
    0153 E5          PUSH H             SAVE HL
                   ;                    INDICATE TIMER STATUS AT ENTRY
    0154 2A 30 74    LHLD SKPCNT/2+X    L = SKPCNT
    0157 2C          INR  L             PSW:Z = WASOFF = SKPCNT .EQ. 0
    0158 2D          DCR  L
    0159 E1          POP  H             RESTORE HL
    015A F5          PUSH PSW           SAVE A, PSW:CY, WASOFF
                   ;                    CHECK FOR STOPPED TIMER
    015B C2 7A 01    JNZ  STRTM1        IF WASOFF .EQ. TRUE
                   ;                      SET TIMER MODE AND COUNT
    015E EB          XCHG                 HL = PERIOD
                   ;                      DE = ISADR
    015F 22 04 70    SHLD TIMER           TIMER = PERIOD
    0162 EB          XCHG                 HL = ISADR
                   ;                      DE = PERIOD
                   ;                      INITIALIZE SKIP COUNTER
    0163 32 30 74    STA  SKPCNT/2+X      SKPCNT = SKIPCT
                   ;                      SET REINITIALIZATION VALUE
    0166 32 2F 74    STA  SKPVAL/2+X      SKPVAL = SKIPCT
                   ;                      SET INTERRUPT SERVICE ROUTINE ADDR
    0169 22 31 74    SHLD TIMVEC/2+X      TIMVEC = ISADR
    016C 3E 19       MVI  A,19H           RESET AND ENABLE TIMER INTERRUPT
    016E 30          SIM
    016F 3E C3       MVI  A,0C3H          START TIMER
    0171 32 00 70    STA  CTLREG
                   ;                      UPDATE IMAGE OF PORTB
    0174 3A 02 70    LDA  PORTB           PORTBI = PORTB
    0177 32 37 74    STA  PORTBI/2+X
                   STRTM1;              ENDIF
    017A F1          POP  PSW           RESTORE A, PSW:CY
                   ;                    PSW:Z = WASOFF
    017B C9          RET                RETURN

TIMINT
                   ;TIMINT()(SKPCNT,SKPVAL,TIMVEC)
                   ;        (UBYTE ,UBYTE ,ADDR  )
                   ;        ( I/O  , I    , I    )
                   ;        ( RAM  , RAM  , RAM  )
                   ;        ( C    , NC   , NC   )
                   ;
                   ;PSW:S, Z, P, CY CHANGED
                   ;
                   ;DETERMINE WHETHER IT IS TIME TO TRANSFER CONTROL
                   ;TO CURRENTLY ACTIVE INTERRUPT SERVICE ROUTINE.
                   ;
                   TIMINT;              ****ENTRY FROM INT75 ONLY
    017C CD C7 0B    CALL RECEVE        TRY TO RECEIVE MESSAGE
                   ;                    DECREMENT SKIP COUNTER
```

```
017F 21 30 74   LXI  H,SKPCNT/2+X HL = ADDRESS, SKPCNT
0182 35         DCR  M            SKPCNT = SKPCNT-1
               ;                  CHECK FOR COMPLETED COUNTDOWN
0183 C0         RNZ               IF SKPCNT .EQ. 0
               ;                    REINITIALIZE SKIP COUNTER
0184 3A 2F 74   LDA  SKPVAL/2+X     A = SKPVAL
0187 77         MOV  M,A            SKPCNT = SKPVAL
0188 FB         EI                  ENABLE INTERRUPT
               ;                    PERFORM CURRENT INTRPT SERVICE RTN
0189 2A 31 74   LHLD TIMVEC/2+X     HL = ADRESS = TIMVEC
018C E9         PCHL
               ;                  ENDIF
               ;                  RETURN
```

PWRABN

```
               ;PWRABN
               ;
               ;A,PSW DESTROYED
               ;REGISTERS DESTROYED
               ;
               ;ABNORMAL POWER-UP OF METER WHICH POWERED DOWN DURING
               ;SETTING OR TRIP CYCLE
               ;
               PWRABN;                 ****ENTRY POINT
018D 3A 24 74   LDA  MRSTS1/2+X    IF MRSTS1.QUEREG .EQ. TRUE
0190 1F         RAR
0191 D2 AA 01   JNC  PWRAB2
               ;                     POWERED DOWN DURING TRIP
0194 1F         RAR                  IF MRSTS1.INCYC .EQ. FALSE
0195 DA A7 01   JC   PWRAB1
               ;                       ACCOUNTING NOT COMPLETED
0198 CD 71 18   CALL SEKTRP            PREPARE TO TRIP
019B F3         DI                     DISABLE INTERRUPTS
019C CD 44 07   CALL DOACCT            DO ACCOUNTING
               ;                       INDICATE ACCOUNTING COMPLETE
019F 21 24 74   LXI  H,MRSTS1/2+X      HL = ADDRESS, MRSTS1
01A2 7E         MOV  A,M               MRSTS1.INCYC = TRUE
01A3 F6 02      ORI  2
01A5 77         MOV  M,A
01A6 FB         EI                     ENABLE INTERRUPTS
               PWRAB1;               ENDIF
01A7 C3 A0 08   JMP  FINTRP          COMPLETE TRIP CYCLE
               PWRAB2;             ENDIF
               ;                   TRIP CYCLE COMPLETE
               ;                   PREPARE TO ZERO SET METER
01AA CD 4E 0F   CALL LSTATE        LSTATE(FATMOD,NORMOD,SERMOD,PRVMOD)
               ;                         (PSW:S ,PSW:Z ,PSW:P ,PSW:CY)
               ;                         ( 0    , 0    , 0    , 0     )
01AD F8         RM                 IF FATMOD .NE. TRUE
               ;                     METER IS HOME AND NOT DEAD
               ;                     DRIVE METER TO ZERO SETTING
01AE CD 25 16   CALL SEKPOS          SEKPOS(ERROR)
               ;                           ( A    )
               ;                           ( 0    )
01B1 B7         ORA  A               IF ERROR .NE. 0
               ;                       DECLARE FATAL ERROR
01B2 C2 80 08   JNZ  FATERR            FATERR(ERROR,ERRFLG)
               ;                             ( A    ,PSW:Z )
               ;                             ( I    , 0    )
               ;                     ENDIF
               ;                   ENDIF
01B5 C9         RET                RETURN
```

PWRDN/PWRUP

```
               ;PWRDN/PWRUP
               ;
               ;A,PSW DESTROYED
               ;REGISTERS DESTROYED
               ;
               ;ENFORCE ORDERLY POWER-UP AND POWER-DOWN
               ;
```

```
                   PWRDN;                  ****ENTRY POINT
     01B6 F3         DI                    DISABLE INTERRUPTS
                   ;                       TURN OFF DEVICES ON PORTA AND PORTB
     01B7 AF         XRA  A                PORTB = HEX00
     01B8 32 02 70   STA  PORTB
     01BB 3D         DCR  A                PORTA = HEXFF
     01BC 32 01 70   STA  PORTA
     01BF CD DE 0E   CALL DBLANK           CLEAR DISPLAY
                   ;                       WRITE AND CLOSE ANY OPEN BLOCK
     01C2 CD 9E 12   CALL NVMWR            NVMWR(ERRFLG)
                   ;                            (PSW:Z )
                   ;                            ( 0    )
                   PWRUP;                  ****ENTRY POINT
                   PWRU01;                 DO UNTIL INT6.5 .EQ. 0
     01C5 20         RIM
     01C6 07         RLC
     01C7 07         RLC
     01C8 07         RLC                     PSW:CY = INT6.5
                   ;                         A.0  = INT5.5
     01C9 DA C5 01   JC   PWRU01
                   ;                       ENDDO
                   ;                       POWER IS NOW FULLY ON
     01CC B7         ORA  A                PSW:S = INT5.5
                   ;                       IF INT5.5 .EQ. TRUE
     01CD FA 00 80   JM   TEST               GO TO SPECIAL SERVICE ROUTINE
                   ;                       ENDIF
                   ; >>OMITTED<<           PULSE DEAD STICK TIMER
                   ;                       INITIALIZE STACK POINTER
     01D0 31 00 75   LXI  SP,7500H         SP = HEX7500
                   ;                       INITIALIZE 8155 TIMER AND PORTS
     01D3 3E 43      MVI  A,043H           CTLREG = HEX43
     01D5 32 00 70   STA  CTLREG
                   ;                       TIMER SET FOR REPETITIVE SQUARE WAVE
                   ;                       PORTA = PORTB = 0; OUTPUT MODE SET
                   ;                       PORTC; INPUT MODE SET
     01D8 3E FF      MVI  A,0FFH           PORTA = HEXFF
     01DA 32 01 70   STA  PORTA
                   ;                       TEST AND CLEAR ALL OF RAM
                   ;                       FILL 256 BYTES OF RAM WITH HEXAA
     01DD 06 AA      MVI  B,0AAH           B = HEXAA
     01DF 21 00 74   LXI  H,X              HL = ADDRESS, X(I=0)
                   PWRU02;                 DO UNTIL (ADDR,X(I)) .EQ. (ADDR,X(0))
     01E2 70         MOV  M,B                X(I) = HEXAA
     01E3 2C         INR  L                  HL = ADDRESS, X(I=I+1)
     01E4 C2 E2 01   JNZ  PWRU02
                   ;                       ENDDO
                   ;                       XOR 256 BYTES OF RAM WITH HEX55
     01E7 06 55      MVI  B,55H            B = HEX55
                   PWRU03;                 DO UNTIL (ADDR,X(I)) .EQ. (ADDR,X(0))
     01E9 7E         MOV  A,M                X(I) = X(I) .XOR. HEX55
     01EA A8         XRA  B
     01EB 77         MOV  M,A
     01EC 2C         INR  L                  HL = ADDRESS, X(I=I+1)
     01ED C2 E9 01   JNZ  PWRU03
                   ;                       ENDDO
     01F0 3E 0A      MVI  A,BADRAM         A = BADRAM
                   ;                       INCREMENT AND TEST 256 BYTES OF RAM
                   PWRU04;                 DO UNTIL (ADDR,X(I)) .EQ. (ADDR,X(0))
     01F2 34         INR  M                  X(I) = X(I)+1
     01F3 CA FC 01   JZ   PWRU05             IF X(I) .NE. 0
                   ;                           DECLARE DEAD METER. BAD RAM
     01F6 CD 85 10   CALL NVMDED               NVMDED(BADRAM,ERRFLG)
                   ;                                  ( A     ,PSW:Z )
                   ;                                  ( I     , 0    )
     01F9 C3 00 02   JMP  PWRU06               BREAK
                   PWRU05;                   ENDIF
     01FC 2C         INR  L                  HL = ADDRESS, X(I=I+1)
     01FD C2 F2 01   JNZ  PWRU04
                   PWRU06;                 ENDDO
                   ;                       READ SPECIAL NVM LOCATION
     0200 3A BE 46   LDA  NVMRED+KILCOD A = NVMRED[KILCOD]
```

```
0203 3C              INR  A               IF (A .GE. 10).AND.(A .LT. 15) = TRUE
0204 E6 0F           ANI  0FH
0206 FE 0B           CPI  11
0208 DA 0C 02        JC   PWRU07
                    ;                      METER IS OUT OF SERVICE
020B 76              HLT                   HALT
                    PWRU07;              ENDIF
020C CD 6D 15        CALL INITSM          INITIALIZE STEPPER MOTORS
                    ;                     FILL NVM DATA AREA WITH HEXFF
020F 01 00 48        LXI  B,((MTRCHR+1)-(FIXSED+0)+1)*100H+(FIXSED+0)
                    ;                     B = NIBCNT; NVM DATA AREA
                    ;                     C = OFFSET, FIXSED[0]
0212 3E FF           MVI  A,0FFH          A = HEXFF
0214 CD 24 0F        CALL FILNIB          FILNIB(FIXSED[0],HEXFF,NIBCNT)
                    ;                           ( @C      , A   , B    )
                    ;                           ( O       , I   , I    )
                    ;                     CLEAR DISPLAY IMAGE
0217 AF              XRA  A               A = HEX00
0218 CD 22 03        CALL FILDIM          FILDIM(HEX00)
                    ;                           ( A    )
                    ;                           ( I    )
                    ;                     ENABLE INTERRUPT 6.5
021B 3E 0D           MVI  A,0DH           INTMSK = HEX0D
021D 30              SIM
021E CD 6B 11        CALL NVMLOD          LOAD AND CHECK NON VOLATILE MEMORY
                    ;                     CHECK METER STATUS
0221 CD 4E 0F        CALL LSTATE          LSTATE(FATMOD,NORMOD,SERMOD,PRVMOD)
                    ;                           (PSW:S ,PSW:Z ,PSW:P ,PSW:CY)
                    ;                           ( O    , O    , O    , O    )
0224 FA 45 02        JM   PWRU09          IF FATMOD .EQ. FALSE
                    ;                       NVM LOADED OK
                    ;                       DEFINE DECIMAL POSITIONS ON DIE
0227 3A 23 74        LDA  MTRCHR/2+X        A = MTRCHR
022A E6 03           ANI  3                 DIEDCM = MTRCHR .AND. HEX03
022C 32 35 74        STA  DIEDCM/2+X
                    ;                       DEFINE DEFAULT DECIMAL POSITION
022F E6 02           ANI  2                 DEFDCM = DIEDCM .AND. HEX02
0231 32 36 74        STA  DEFDCM/2+X
                    ;                       CHECK NVM STATUS
0234 21 45 02        LXI  H,PWRU08          SET TO RETURN TO ENDIF
0237 E5              PUSH H
0238 3A BE 46        LDA  NVMRED+KILCOD     A = CODE = NVMRED[KILCOD]
023B E6 0F           ANI  0FH
023D FE 0F           CPI  0FH               IF NVMRED[KILCOD] .EQ. HEX0F
023F CA 9B 02        JZ   PWRUOK              CONTINUE NORMAL INITIALIZATION
                    ;                       ELSE
                    ;                         CONTINUE FATAL INITIALIZATION
0242 C2 83 02        JNZ  PWRUNG              PWRUNG(CODE)
                    ;                                ( A  )
                    ;                                ( I  )
                    PWRU08;                 ENDIF
                    PWRU09;               ENDIF
                    ;                     RECHECK METER STATUS
0245 CD 4E 0F        CALL LSTATE          LSTATE(FATMOD,NORMOD,SERMOD,PRVMOD)
                    ;                           (PSW:S ,PSW:Z ,PSW:P ,PSW:CY)
                    ;                           ( O    , O    , O    , O    )
0248 F2 50 02        JP   PWRU10          IF FATMOD .EQ. TRUE
                    ;                       TURN ON SENSOR LEDS FOR SERVICE CHECK
024B 3E DF           MVI  A,0DFH            PORTA = HEXDF
024D 32 01 70        STA  PORTA
                    PWRU10;               ENDIF
                    ;                     INITIALIZE DEBOUNCE COUNTER
0250 3E 01           MVI  A,1             DBCTR = 1
0252 32 2E 74        STA DBCTR/2+X
0255 C3 7E 09        JMP  IDLE            ENTER IDLE STATE
```

PWRNOR

```
                    ;PWRNOR
                    ;
                    ;A,PSW DESTROYED
                    ;REGISTERS DESTROYED
```

```
                ;
                ;CONTINUE POWER-UP FOR NORMAL SITUATION THAT POWER-DOWN
                ;OCCURRED WHEN METER WAS HOME
                ;
                PWRNOR;               ****ENTRY POINT
                ;                     SET METER TO ALL NINES
0258 21 24 74     LXI  H,MRSTS1/2+X   HL = ADDRESS, MRSTS1
025B 7E           MOV  A,M            MRSTS1.UNKSEL = TRUE
025C F6 80        ORI  80H
025E 77           MOV  M,A
025F 01 CC 04     LXI  B,NBANKS*100H+(WORK1+16-NBANKS)
                ;                     B = NIBCNT = NBANKS
                ;                     C = OFFSET, WORK1[I=16-NBANKS]
0262 3E 09        MVI  A,9            A = HEX09
0264 CD 24 0F     CALL FILNIB         FILNIB(WORK1[I],HEX09,NIBCNT)
                ;                           ( @C     , A   , B    )
                ;                           ( O      , I   , I    )
0267 CD 25 1A     CALL MVPOST         MVPOST(ERROR)
                ;                           ( A   )
                ;                           ( O   )
026A B7           ORA  A              IF ERROR .NE. 0
                ;                       SETTING ERROR IS FATAL
026B C2 80 08     JNZ  FATERR           FATERR(ERROR,ERRFLG)
                ;                             ( A    ,PSW:Z )
                ;                             ( I    , O    )
                ;                     ELSE
                ;                       UPDATE BUFFER TO AGREE WITH SETTING
026E 01 42 04     LXI  B,NBANKS*100H+POSREG
                ;                       B = NIBCNT = NBANKS
                ;                       C = OFFSET, POSREG
0271 3E 09        MVI  A,9              A = HEX09
0273 CD 24 0F     CALL FILNIB           FILNIB(POSREG,HEX09,NIBCNT)
                ;                             ( @C    , A   , B    )
                ;                             ( O     , I   , I    )
                ;                       SET METER TO ALL ZEROES
0276 3E C0        MVI  A,WORK1          A = OFFSET, WORK1
0278 CD 85 0E     CALL CLRBLK           CLRBLK(WORK1)
                ;                             ( @A   )
                ;                             ( O    )
027B CD 25 1A     CALL MVPOST           MVPOST(ERROR)
                ;                             ( A    )
                ;                             ( O    )
027E B7           ORA  A                IF ERROR .NE. 0
                ;                         SETTING ERROR IS FATAL
027F C2 80 08     JNZ  FATERR             FATERR(ERROR,ERRFLG)
                ;                               ( A    ,PSW:Z )
                ;                               ( I    , O    )
                ;                       ENDIF
                ;                     ENDIF
0282 C9           RET                 RETURN

PWRUNG
                ;PWRUNG(CODE  )
                ;      (NIBBLE)
                ;      ( I    )
                ;      ( A    )
                ;      ( C    )
                ;
                ;A,PSW DESTROYED
                ;REGISTERS CHANGED
                ;
                ;HANDLE POWER-UP OF METER PREVIOUSLY DECLARED DEAD
                ;
                PWRUNG;               ****ENTRY POINT
0283 F5           PUSH PSW            SAVE A,PSW
                ;                     DECLARE FATAL ERROR
                ;                     FLAG METER DEAD
0284 47           MOV  B,A            B = CODE
0285 CD 99 10     CALL NVMDE1         NVMDE1(CODE,ERRFLG)
                ;                           ( B   ,PSW:Z )
                ;                           ( I   , O    )
```

```
0288 F1          POP  PSW            RESTORE A,PSW
0289 FE 03       CPI  FATRST         IF CODE .EQ. FATRST
028B C0          RNZ
                ;                      FAILED WHILE CLEARING DESC REGISTER
                ;                      CLEAR DESCENDING REGISTER
028C 01 2F 07    LXI  B,DSCSIZ*100H+DSCREG
                ;                      B = NIBCNT = DSCSIZ
                ;                      C = OFFSET, DSCREG
028F AF          XRA  A                A = HEX00
0290 CD 24 0F    CALL FILNIB         - FILNIB(DSCREG,HEX00,NIBCNT)
                ;                            ( @C   , A   , B    )
                ;                            ( 0    , I   , I    )
                ;                      UPDATE CRC
0293 CD B1 0E    CALL CRC              CRC(DSCREG,NIBCNT,CRCVAL)
                ;                         ( @C   , B    , D    )
                ;                         ( I    , I    , 0    )
0296 7A          MOV  A,D              DSCCRC = CRCVAL
0297 32 1B 74    STA  DSCCRC/2+X
                ;                    ENDIF
029A C9          RET                 RETURN

PWRUOK
                ;PWRUOK
                ;
                ;A,PSW DESTROYED
                ;REGISTERS DESTROYED
                ;
                ;CONTINUATION OF SUCCESSFUL POWER-UP SEQUENCE
                ;
                PWRUOK;              ****ENTRY POINT
                ;                    OPEN NORMAL NVM BLOCK
029B CD C4 11    CALL NVMOPN         NVMOPN(ERRFLG)
                ;                          (PSW:Z )
                ;                          ( 0    )
029E C8          RZ                  IF ERRFLG .EQ. FALSE
                ;                      NVM BLOCK IS NOW OPEN
029F 21 AD 02    LXI  H,PWRU01         SET TO RETURN TO ENDIF
02A2 E5          PUSH H
02A3 3A 24 74    LDA  MRSTS1/2+X       IF MRSTS1.UNKSEL .EQ. TRUE
02A6 B7          ORA  A
                ;                        POWERED DOWN DURING SETTING OR TRIP
02A7 FA 8D 01    JM   PWRABN             PERFORM ABNORMAL POWER-UP
                ;                      ELSE
02AA F2 58 02    JP   PWRNOR             PERFORM NORMAL POWER-UP
                PWRU01;                ENDIF
                ;                      CHECK METER STATUS
02AD CD 4E 0F    CALL LSTATE           LSTATE(FATMOD,NORMOD,SERMOD,PRVMOD)
                ;                            (PSW:S ,PSW:Z ,PSW:P ,PSW:CY)
                ;                            ( 0    , 0    , 0    , 0    )
02B0 FA C1 02    JM   PWRU02           IF FATMOD .EQ. FALSE
                ;                        POWER-UP COMPLETED
                ;                        CONTINUE WITH INITIALIZATION
                ;                        CLEAR POSTAGE REGISTER
02B3 01 42 04    LXI  B,NBANKS*100H+POSREG
                ;                        B = NIBCNT = NBANKS
                ;                        C = OFFSET, POSREG
02B6 AF          XRA  A                  A = HEX00
02B7 CD 24 0F    CALL FILNIB             FILNIB(POSREG,HEX00,NIBCNT)
                ;                              ( @C   , A   , B    )
                ;                              ( 0    , I   , I    )
                ;                        REGISTER NOW MATCHES SETTING
02BA 21 24 74    LXI  H,MRSTS1/2+X       HL = ADDRESS, MRSTS1
02BD 7E          MOV  A,M                MRSTS1.UNKSEL = FALSE
02BE E6 7F       ANI  7FH
02C0 77          MOV  M,A
                PWRU02;                ENDIF
                ;                      CHECK MEMORY RETENTION OF NVM
02C1 3A FE 44    LDA  NVMRED+RETAIN    A = NVMRED[RETAIN]
02C4 E6 0F       ANI  0FH
02C6 FE 0A       CPI  0AH              IF NVMRED[RETAIN] .NE. HEX0A
```

```
02C8 CA DE 02   JZ   PWRU04
                ;                      MEMORY IS FAILING
02CB 21 10 74   LXI  H,SERFLG/2+X      HL = ADDRESS, SERFLG
02CE 7E         MOV  A,M               IF SERFLG.WEKNVM .EQ. FALSE
02CF E6 20      ANI  20H
02D1 C2 DE 02   JNZ  PWRU03
                ;                        SERFLG.WEKNVM NOT SET IN NVM
02D4 7E         MOV  A,M                 SERFLG.WEKNVM = TRUE
02D5 F6 20      ORI  20H
02D7 77         MOV  M,A
                ;                        WRITE NORMAL BLOCK
                ;                        LEAVE NO BLOCKS OPEN
02D8 CD 9E 12   CALL NVMWR               NVMWR(ERRFLG)
                ;                             (PSW:Z )
                ;                             ( 0    )
                ;                        WRITE NEW SERVICE BLOCK
                ;                        OPEN ERASED NORMAL BLOCK
02DB CD 19 12   CALL NVMSTO              NVMSTO(ERRFLG)
                ;                              (PSW:Z )
                ;                              ( 0    )
                PWRU03;                  ENDIF
                PWRU04;                ENDIF
02DE CD 47 10   CALL NVM30T            TURN ON -30V FOR NVM
                ;                      START ERASING RETENTION LOCATION
02E1 32 FE 40   STA  NVMERS+RETAIN     NVMERS[RETAIN] = A
                ;                      PAUSE FOR 10 MSEC
02E4 01 64 00   LXI  B,100             BC = LOOPCT = 100
                PWRU05;                DO UNTIL LOOPCT .EQ. 0
02E7 CD 19 0B   CALL NPAUSE              NPAUSE(LOOPCT,ZROFLG)
                ;                              ( BC    ,PSW:Z )
                ;                              ( I/O   , 0    )
02EA C2 E7 02   JNZ  PWRU05
                ;                      ENDDO
                ;                      TERMINATE ERASURE
02ED 3A FE 44   LDA  NVMRED+RETAIN     A[1] = NVMRED[RETAIN] = GARBAGE
                ;                      CHECK ERASURE
02F0 3A FE 44   LDA  NVMRED+RETAIN     A[1] = NVMRED[RETAIN]
02F3 F6 F0      ORI  0F0H              A[0] = HEXF
02F5 3C         INR  A                 PSW:Z=ERASED=NVMRED[RETAIN].EQ.HEXF
02F6 3E 01      MVI  A,NVMBAD          A = NVMBAD
                ;                      IF ERASED .EQ. FALSE
                ;                        DECLARE DEAD METER. BAD NVM.
02F8 C2 85 10   JNZ  NVMDED              NVMDED(NVMBAD,ERRFLG)
                ;                              ( A     ,PSW:Z )
                ;                              ( I     , 0    )
                ;                      ENDIF
                ;                      WRITE HEX0A INTO RETENTION LOCATION
02FB 21 FE 00   LXI  H,RETAIN          HL = BASE = ADDRESS, RETAIN
02FE 3E 0A      MVI  A,0AH             A = HEX0A
0300 CD 61 12   CALL NVMWN             NVMWN(HEX0A,BASE,ERRFLG)
                ;                           ( A[1], HL ,PSW:Z )
                ;                           ( I   , I  , 0    )
0303 C3 31 10   JMP  NVM30F            TURN OFF -30 V TO NVM
                ;                    ENDIF
                ;                    RETURN

CDBUF
                ;CDBUF/CDBUFC/CDBUFD()(DBUF  )
                ;                    (NIBSTR)
                ;                    ( I/O  )
                ;                    ( RAM  )
                ;                    ( C    )
                ;
                ;PSW:S, Z, P, CY = NO CHANGE
                ;
                ;------------------------------------------------------
                ;                    DISABLE METER AND CLEAR DBUF ONLY ON
                ;                    CONDITION THAT DISPLAYED VALUE WAS
                ;                    NOT ENTERED FROM KEYBOARD
                ;
                CDBUFC;              ****ENTRY POINT
```

```
0306 F5          PUSH PSW         SAVE A, PSW
                ;                 CHECK FOR KEY ENTERED DISPLAY
0307 3A 40 74    LDA  DBUF/2+X    A = DBUF[0..1]
030A B7          ORA  A           IF DBUF[0..1] .EQ. HEX00
030B CA 20 03    JZ   CDBUF1
                ; >>JUMP AHEAD<<
                ;                   DISPLAY WAS KEY ENTERED
                ;                   RESTORE A, PSW
                ;                   RETURN
                ;                 ENDIF
030E F1          POP  PSW         RESTORE A, PSW
                ;-----------------------------------------------------
                ;                 DISABLE METER AND CLEAR DISPLAY BUFFER
                ;
                CDBUFD;           ****ENTRY POINT
030F F5          PUSH PSW         SAVE A, PSW
                ;                 DISABLE METER
0310 3E 42       MVI  A,HDISAB    A = HDISAB
0312 CD C7 0D    CALL XEQHDR      XEQHDR(HDISAB,ERROR)
                ;                       ( A    ,PSW:Z)
                ;                       ( I    , O   )
0315 F1          POP  PSW         RESTORE A, PSW
                ;-----------------------------------------------------
                ;                 CLEAR DISPLAY BUFFER
                ;
                CDBUF;            ****ENTRY POINT
0316 F5          PUSH PSW         SAVE A, PSW
                ;                 SET DBUF HEADER TO KEY ENTRY
0317 AF          XRA  A           A = HEX00
0318 32 40 74    STA  DBUF/2+X    OUTPUT DBUF[0..1] = HEX00
                ;                 SET DBUF FORMAT FOR NUL MESSAGE
031B 3E 0F       MVI  A,0FH       DBUF[2..3] = HEX0F
031D 32 41 74    STA  DBUF/2+X+1
                CDBUF1;           >>TARGET OF JUMP AHEAD<<
0320 F1          POP  PSW         RESTORE A, PSW
0321 C9          RET              RETURN

FILDIM
                ;FILDIM(VALUE )(DIMAGE)
                ;      (UBYTE )(BITSTR)
                ;      ( I    )( O    )
                ;      ( A    )( RAM  )
                ;      ( NC   )( C    )
                ;
                ;PSW DESTROYED
                ;REGISTERS DESTROYED
                ;
                ;FILL DISPLAY IMAGE BUFFER WITH VALUE
                ;
                FILDIM;           ****ENTRY POINT
                ;                 SET TO FILL (NDISP*4) BYTES
0322 06 07       MVI  B,NDISP*4-1 B = BYTNO = NDISP*4-1
0324 21 87 74    LXI  H,DIMAGE/2+Y+NDISP*4-1
                ;                 HL = ADDRESS, DIMAGE[BYTNO]
                FILDI1;           DO UNTIL BYTNO .LT. 0
0327 77          MOV  M,A           DIMAGE[BYTNO] = VALUE
0328 05          DCR  B             BYTNO = BYTNO-1
0329 2B          DCX  H             HL = ADDRESS, DIMAGE[BYTNO]
032A F2 27 03    JP   FILDI1        TEST BYTNO
                ;                 ENDDO
032D C9          RET              RETURN

KEYBRD
                ;KEYBRD()(NORFLG,CTLBKT,CHRBKT,KDCTRL,DSPTMR,CURBKT)
                ;        (BITSTR,BYTE  ,BYTE  ,BITSTR,UBYTE ,BYTE  )
                ;        ( I    , I    , I/O  , I    , I    , O    )
                ;        ( RAM  , RAM  , RAM  , RAM  , RAM  , RAM  )
                ;        ( NC   , NC   , C    , NC   , NC   , C    )
                ;
                ;PSW AND REGISTERS DESTROYED
                ;
```

```
                ;SAMPLES INTERRUPT LEVEL KEYCODE BUCKETS.  DEFINES A
                ;STABLE KEYCODE BUCKET FOR APPLICATION USE.  INITIATES
                ;PROCESSING OF KEYPRESS.  UPDATES DISPLAY TO CONFORM TO
                ;METER STATUS.  INITIATES END OF ENTRY PROCESSING.
                ;
                KEYBRD;                  ****ENTRY POINT
032E 3A 27 74     LDA  KDCTRL/2+X    IF (KDCTRL.KBDDSB .EQ. FALSE) .AND.
0331 1F           RAR                  ((NORFLG.CMBIN .AND. NORFLG.AMTIN).EQ.
0332 DA 4A 03     JC   KEYB01          TRUE)
0335 3A 26 74     LDA  NORFLG/2+X
0338 E6 30        ANI  30H
033A FE 30        CPI  30H
033C C2 4A 03     JNZ  KEYB01
033F CD DE 0E     CALL DBLANK          BLANK DISPLAY
                ;                      EXECUTE END OF ENTRY
0342 3E 43        MVI  A,HENDEN        A = HENDEN
0344 CD C7 0D     CALL XEQHDR          XEQHDR(HENDEN,ERROR)
                ;                            ( A    ,PSW:Z)
                ;                            ( I    , 0   )
0347 C3 8C 03     JMP  KEYB09
                KEYB01:              ELSE
                ;                      READ INTERRUPT BUCKETS TOGETHER
034A 2A 2B 74     LHLD CTLBKT/2+X
034D EB           XCHG                 E = CTLBKT
                ;                      D = CHRBKT
034E 1C           INR  E               IF CTLBKT .EQ. HEX00
034F 1D           DCR  E
0350 C2 78 03     JNZ  KEYB06
                ;                        NO KEY IS DOWN
0353 21 27 74     LXI  H,KDCTRL/2+X      HL = ADDRESS, KDCTRL
0356 7E           MOV  A,M               A = KDCTRL
0357 E6 20        ANI  20H               IF KDCTRL.TIMED .EQ. TRUE
0359 CA 75 03     JZ   KEYB05
                ;                          CURRENT DISPLAY IS TIMED
035C 3A 29 74     LDA  DSPTMR/2+X          A = DSPTMR
035F 3D           DCR  A                   IF DSPTMR .EQ. 1
0360 C2 75 03     JNZ  KEYB04
                ;                            DISPLAY TIME IS UP
                ;                            REVERT TO POSTAGE DISPLAY
                ;                            CHECK FOR FATAL ERROR
0363 CD 4E 0F     CALL LSTATE                LSTATE(FATAL,NORM,SERV,PRIV)
                ;                                   (PSW:S, :Z , :P , :C )
                ;                                   ( 0   , 0  , 0  , 0  )
0366 F2 70 03     JP   KEYB02                IF FATAL .EQ. TRUE
                ;                              SET FOR FATAL SETTING DISPLY
0369 7E           MOV  A,M                     KDCTRL.STGDSP = TRUE
036A F6 80        ORI  80H
036C 77           MOV  M,A
036D C3 75 03     JMP  KEYB03
                KEYB02;                      ELSE
                ;                              MAKE NORMAL SETTING DISPLAY
0370 3E 51        MVI  A,HREQPO                A = HREQPO
0372 CD C7 0D     CALL XEQHDR                  XEQHDR(HREQPO,ERROR)
                ;                                     ( A    ,PSW:Z)
                ;                                     ( I    , 0   )
                KEYB03;                      ENDIF
                KEYB04;                    ENDIF
                KEYB05;                  ENDIF
0375 C3 8C 03     JMP  KEYB08
                KEYB06;              ELSE
                ;                      KEYS ARE DOWN
                ;                      RESTART DISPLAY TIMER
0378 3E 07        MVI  A,DSPVAL          DSPTMR = DSPVAL
037A 32 29 74     STA  DSPTMR/2+X
037D 7A           MOV  A,D             A = CHRBKT
037E B7           ORA  A               IF CHRBKT .NE. HEX00
037F CA 8C 03     JZ   KEYB07
                ;                        A SINGLE UNPROCESSED KEY IS DOWN
                ;                        DEFINE A STABLE KEYBUCKET
0382 32 2D 74     STA  CURBKT/2+X        CURBKT = CHRBKT
                ;                        PREVENT REPROCESSING KEYPRESS
```

```
0385 AF         XRA  A                  CHRBKT = NOKEY
0386 32 2C 74   STA  CHRBKT/2+X
0389 CD CE 04   CALL PROKEY             PROCESS KEYPRESS
               KEYB07;                 ENDIF
               KEYB08;                ENDIF
               KEYB09;               ENDIF
038C 3A 26 74   LDA  NORFLG/2+X      IF NORFLG.QUEPOS .EQ. TRUE
038F E6 40      ANI  40H
0391 C0         RNZ                     RETURN
               ;                     ELSE
0392 CD A0 03   CALL MODDSP             MODIFY DISPLAY TO MATCH METER STATUS
               ;                        START KEYBOARD/DISPLAY INTERRUPTS
0395 21 A7 00   LXI  H,KDIO             HL = ADRESS = ADDRESS, KDIO
0398 3E 02      MVI  A,KDSKIP           A = KDSKIP
039A 11 96 4C   LXI  D,KEYINT           DE = KEYINT
039D C3 53 01   JMP  STRTMR             STRTMR(ADRESS,KDSKIP,KEYINT,WASOFF)
               ;                               ( HL   , A    , DE   ,PSW:Z )
               ;                               ( I    , I    , I    , 0    )
               ;                        RETURN
               ;                     ENDIF

MODDSP
               ;MODDSP()(DIMAGE, MRSTS1, KDCTRL)
               ;        (BYTSTR, BITSTR, BITSTR)
               ;        (  0   ,   I   ,   0   )
               ;        ( RAM  ,  RAM  ,  RAM  )
               ;        (  C   ,  NC   ,   C   )
               ;
               ;ALL REGISTERS CHANGED
               ;PSW: S, Z, P, CY CHANGED
               ;
               ;UPDATE DISPLAY CONTROL FLAGS AND DISPLAY IMAGE
               ;TO REFLECT CURRENT METER STATUS
               ;
               MODDSP;               ****ENTRY POINT
               ;                       CHECK DISPLAY TYPE
03A0 21 27 74   LXI  H,KDCTRL/2+X      HL = ADDRESS, KDCTRL
03A3 7E         MOV  A,M               A = KDCTRL
03A4 E6 BB      ANI  0BBH              A.FLSDSP = FALSE
               ;                       A.FLSDCM = FALSE
               ;                       PSW:S = KDCTRL.STGDSP
03A6 FA AD 03   JM   MODD01            IF KDCTRL.STGDSP .EQ. FALSE
               ;                         SETTING NOT ON DISPLAY
               ;                         PREVENT FLASHING DISPLAY
03A9 77         MOV  M,A                 KDCTRL.FLSDSP = FALSE
               ;                         KDCTRL.FLSDCM = FALSE
03AA C3 FF 03   JMP  MODD07
               MODD01;                 ELSE
               ;                         SETTING IS ON DISPLAY
               ;                         DECIDE WHETHER TO FLASH DISPLAY
03AD 3A 24 74   LDA  MRSTS1/2+X          B = MRSTS1
03B0 47         MOV  B,A
               ;                         D.DATDOR = D.0 = MRSTS1.DATDOR
               ;                         E.FLSDSP = E.1 = MRSTS1.DATDOR .OR.
               ;                                          MRSTS1.INSFND
               ;                         E.FLSDCM = E.5 = MRSTS1.LOWPOS
03B1 E6 70      ANI  70H
03B3 57         MOV  D,A
03B4 0F         RRC
03B5 0F         RRC
03B6 B2         ORA  D
03B7 57         MOV  D,A
03B8 07         RLC
03B9 B2         ORA  D
03BA 57         MOV  D,A
03BB E6 44      ANI  44H
03BD 5F         MOV  E,A
               ;                         KDCTRL.FLSDSP = E.FLSDSP
               ;                         KDCTRL.FLSDCM = E.FLSDCM
03BE 21 27 74   LXI  H,KDCTRL/2+X
```

```
03C1 7E          MOV  A,M
03C2 E6 BB       ANI  0BBH
03C4 B3          ORA  E
03C5 77          MOV  M,A
                ;                        DETERMINE METER STATUS
03C6 CD 4E 0F    CALL LSTATE             LSTATE(FATMOD,NORMOD,SERMOD,PRVMOD)
                ;                              (PSW:S ,PSW:Z ,PSW:P ,PSW:CY)
                ;                              ( 0    , 0    , 0    , 0    )
03C9 FA F5 03    JM   MODD04             IF FATMOD .EQ. FALSE
                ;                          METER NOT FATAL
                ;                          TURN DATER DOOR LAMP ON OR OFF
03CC 21 80 74    LXI  H,DIMAGE/2+Y         HL = ADDRESS, DIMAGE
03CF 7E          MOV  A,M                  A = DIMAGE
03D0 E6 FD       ANI  0FDH                 A.DATLMP = FALSE
03D2 14          INR  D                    PSW:S = D.DATDOR
03D3 F2 D8 03    JP   MODD02               IF D.DATDOR .EQ. TRUE
03D6 F6 02       ORI  2                      A.DATLMP = TRUE
                MODD02;                    ENDIF
03D8 77          MOV  M,A                  DIMAGE = A
                ;                          SELECT WING TYPE
03D9 16 02       MVI  D,02H                D = WING, DISABLED
03DB 3E 04       MVI  A,04H                A = MRSTS1.ENABLD
03DD A0          ANA  B
03DE CA E3 03    JZ   MODD03               IF MRSTS1.ENABLD .EQ. TRUE
03E1 16 92       MVI  D,92H                  D = WING, ENABLED
                MODD03;                    ENDIF
                ;                          INSERT RIGHT HAND WING
03E3 21 87 74    LXI  H,DIMAGE/2+Y+(NDISP*4-1)
                ;                          HL = ADDRESS, DIMAGE[(NDISP*4-1)]
03E6 72          MOV  M,D                  DIMAGE[(NDISP*4-1)] = WING
                ;                          INSERT LEFT HAND WING
03E7 06 82       MVI  B,DBUF+2             B = OFFSET, DBUF[2]
03E9 CD 35 0F    CALL GETNIB               GETNIB(NCHAR,ZERO ,DBUF[2])
                ;                                ( A    ,PSW:Z, @B     )
                ;                                ( 0    , 0   , I      )
03EC 2F          CMA                       BC = -NCHAR-1
03ED 4F          MOV  C,A
03EE 06 FF       MVI  B,0FFH
03F0 09          DAD  B                    HL = ADDRESS,
                ;                          DIMAGE[(NDISP*4-2)-NCHAR]
03F1 72          MOV  M,D                  DIMAGE[(NDISP*4-2)-NCHAR] = WING
03F2 C3 FF 03    JMP  MODD06
                MODD04;                  ELSE
                ;                          METER IS FATAL
                ;                          SET TO DISPLAY ALL DECIMALS
03F5 3E 01       MVI  A,01H                A = DECBIT = HEX01
03F7 E2 FC 03    JPO  MODD05               IF SERMOD .EQ. TRUE
                ;                            SET TO DISPLAY DECIMALS+DASHES
03FA 3E 11       MVI  A,11H                  A = DECBIT = HEX11
                MODD05;                    ENDIF
03FC CD 22 03    CALL FILDIM               FILDIM(DECBIT)
                ;                                ( A      )
                ;                                ( I      )
                MODD06;                  ENDIF
                MODD07;                ENDIF
                ;                      BUILD SERVICE/NORMAL MODE EDIT MASK
03FF AF          XRA  A                A = MASK, BLANK
0400 CD 4E 0F    CALL LSTATE           LSTATE(FATMOD,NORMOD,SERMOD,PRVMOD)
                ;                            (PSW:S ,PSW:Z ,PSW:P ,PSW:CY)
                ;                            ( 0    , 0    , 0    , 0    )
0403 E2 08 04    JPO  MODD08           IF SERMOD .EQ. TRUE
0406 3E 10       MVI  A,10H              A = MASK, UNDERSCORE
                MODD08;                ENDIF
0408 4F          MOV  C,A              C = MASK
                ;                      EDIT MASK INTO DISPLAY
0409 06 07       MVI  B,(NDISP*4-1)    B = DISPNO = (NDISP*4-1)
040B 21 87 74    LXI  H,DIMAGE/2+Y+(NDISP*4-1)
                ;                      HL = ADDRESS, DIMAGE[DISPNO]
                MODD09;                FOR DISPNO = (NDISP*4-1) DOWNTO 0
040E 7E          MOV  A,M                IF(DIMAGE[DISPNO] .AND. HEXEE).EQ.0
040F E6 EE       ANI  0EEH
```

```
0411 C2 19 04   JNZ  MODD10
               ;                    COPY MASK INTO DISPLAY
0414 7E         MOV  A,M            A = IMAGE = DIMAGE[DISPNO]
0415 E6 EF      ANI  0EFH           IMAGE = IMAGE, WITHOUT UNDERSCORE
0417 B1         ORA  C              IMAGE = IMAGE, WITH EDIT MASK
0418 77         MOV  M,A            DIMAGE[DISPNO] = IMAGE
               MODD10;            ENDIF
0419 05         DCR  B            B = DISPNO = DISPNO-1
041A 2B         DCX  H            HL = ADDRESS, DIMAGE[DISPNO]
041B F2 0E 04   JP   MODD09       TEST DISPNO
               ;                ENDFOR
041E C9         RET             RETURN

PAUTHK
               ;PAUTHK()(DBUF  ,NORFLG)
               ;        (NIBSTR,BITSTR)
               ;        ( I    , I    )
               ;        ( RAM  , RAM  )
               ;
               ;PSW DESTROYED
               ;REGISTERS DESTROYED
               ;
               ;PROCESS AUTHORIZATION KEY
               ;
               PAUTHK;          ****ENTRY POINT
               ;                TEST DISPLAY HEADER
041F 21 40 74   LXI  H,DBUF/2+X  HL = ADDRESS, DBUF[0..1]
0422 7E         MOV  A,M         A = DHEAD = DBUF[0..1]
0423 B7         ORA  A           PSW:Z = KEYDAT = DHEAD .EQ. 0
               ;                DEFINE REQUEST HEADER
0424 3E 40      MVI  A,HREQAC    A = RHEAD = HREQAC
               ;                IF KEYDAT .EQ. FALSE
               ;                  NO KEYENTERED DATA IN DISPLAY
               ;                  REQUEST AUTHORIZATION CODE
0426 C2 C7 0D   JNZ  XEQHDR        XEQHDR(RHEAD,ERRFLG)
               ;                        ( A    ,PSW:Z )
               ;                        ( I    , O    )
               ;                ELSE
0429 23         INX  H           HL = ADDRESS, DBUF[2..3]
042A 7E         MOV  A,M         A = FORMAT = DBUF[2..3]
042B FE 4F      CPI  4FH         IF FORMAT .NE. HEX4F
               ;                  DISPLAY NOT 4 CHAR WITHOUT DECIMAL
               ;                  DECLARE PROCEDURAL ERROR
042D C2 A1 0B   JNZ  PROERR        PROERR(ERRFLG)
               ;                        (PSW:Z )
               ;                        ( O    )
               ;                ELSE
0430 23         INX  H           HL = ADDRESS, DBUF[4..5]
0431 7E         MOV  A,M         A = CODE = DBUF[4..5]
0432 FE 69      CPI  69H         IF CODE .NE. HEX69
               ;                  FIRST 2 CHARACTERS IN DISPLAY NOT 69
               ;                  DECLARE PROCEDURAL ERROR
0434 C2 A1 0B   JNZ  PROERR        PROERR(ERRFLG)
               ;                        (PSW:Z )
               ;                        ( O    )
               ;                ELSE
               ;                  ISSUE LAST 2 CHARACTERS OF DISPLAY
               ;                  AS REQUEST HEADER
0437 23         INX  H            HL = ADDRESS, DBUF[6..7]
0438 7E         MOV  A,M          A = RHEAD = DBUF[6..7]
0439 CD C7 0D   CALL XEQHDR       XEQHDR(RHEAD,ERRFLG)
               ;                        ( A    ,PSW:Z )
               ;                        ( I    , O    )
               ;                  TEST THE REQUEST HEADER
043C FE 46      CPI  HSETSV       IF RHEAD .EQ. HSETSV
043E C0         RNZ
               ;                    SERVICE MODE ENTERED VIA KEYBOARD
               ;                    DISABLE COMMUNICATIONS
043F 21 26 74   LXI  H,NORFLG/2+X   HL = ADDRESS, NORFLG
0442 7E         MOV  A,M            NORFLG.COMDSB = TRUE
0443 F6 04      ORI  04H
```

```
0445 77          MOV  M,A
                ;                   ENDIF
                ;                  ENDIF
0446 C9          RET               RETURN

PCLRK
                ;PCLRK
                ;
                ;PSW:S, Z, P, CY = NO CHANGE
                ;
                ;PROCESS CLEAR KEY
                ;
                PCLRK;             ****ENTRY POINT
0447 CD 06 03    CALL CDBUFC       IF DISPLAY WAS NOT KEY ENTERED
                ;                    DISABLE METER
                ;                    CLEAR DISPLAY BUFFER
                ;                  ENDIF
044A CD 16 03    CALL CDBUF        CLEAR DISPLAY BUFFER
044D C3 5A 05    JMP  VALDSP       DISPLAY VALUE IN DBUF
                ;                  RETURN

PDCMK
                ;PDCMK()(DBUF   )
                ;       (NIBSTR)
                ;       ( I/O   )
                ;       ( RAM   )
                ;       ( C     )
                ;
                ;PSW AND REGISTERS DESTROYED
                ;
                ;PROCESS DECIMAL KEY
                ;
                PDCMK;             ****ENTRY POINT
                ;                  CHECK FOR NON KEYENTRY DISPLAY
                ;                  IF DBUF[0..1] .NE. HEX00
0450 CD 06 03    CALL CDBUFC         PUT NUL MESSAGE IN DBUF
                ;                    DISABLE METER
                ;                  ENDIF
                ;                  CHECK THAT DECIMAL NOT ALREADY ENTERED
0453 01 83 83    LXI B,(DBUF+3)*100H+DBUF+3
                ;                  B = OFFSET, DBUF[3]
                ;                  C = OFFSET, DBUF[3]
0456 CD 35 0F    CALL GETNIB       GETNIB(DECPOS,ZERO ,DBUF[3])
                ;                        ( A    ,PSW:Z, @B    )
                ;                        ( O    , O   , I     )
0459 D6 0F       SUI  0FH          IF DECPOS .EQ. HEX0F
045B C2 61 04    JNZ  PDCMK1
                ;                    A = DECPOS = 0, RIGHTMOST POSITION
                ;                    OUTPUT DECPOS
045E CD EE 0F    CALL PUTNIB         PUTNIB(DBUF[3],DECPOS)
                ;                          ( @C     , A     )
                ;                          ( O      , I     )
                PDCMK1;            ENDIF
0461 C3 5A 05    JMP  VALDSP       MAKE NEW DISPLAY
                ;                  RETURN

PERDSP
                ;PERDSP()(KDCTRL,DIMAGE,DSPTMR)
                ;        (BITSTR,BYTSTR,UBYTE )
                ;        ( O    , O    , O    )
                ;        ( RAM  , RAM  , RAM  )
                ;        ( C    , C    , C    )
                ;
                ;PSW:S, Z, P, CY = NO CHANGE
                ;
                ;MAKE PROCEDURAL ERROR DISPLAY
                ;
                PERDSP;            ****ENTRY POINT
0464 F5          PUSH PSW          SAVE A, PSW
                ;                  CLEAR SETTING-ON-DISPLAY FLAG
0465 3A 27 74    LDA  KDCTRL/2+X   A = KDCTRL
```

```
0468 E6 7F      ANI  7FH          KDCTRL.STGDSP = FALSE
               ;                  SET DISPLAY-IS-TIMED FLAG
046A F6 20      ORI  20H          KDCTRL.TIMED = TRUE
046C 32 27 74   STA  KDCTRL/2+X
046F CD 16 03   CALL CDBUF        CLEAR DISPLAY BUFFER
               ;                  CLEAR DISPLAY IMAGE BUFFER
0472 AF         XRA  A            A = BLANK
0473 CD 22 03   CALL FILDIM       FILDIM(BLANK)
               ;                        ( A    )
               ;                        ( I    )
               ;                  INSERT 'ERR' IN DISPLAY IMAGE
0476 3E 9E      MVI  A,9EH        DIMAGE[0] = 'E'
0478 32 80 74   STA  DIMAGE/2+Y
047B 3E 0A      MVI  A,0AH        DIMAGE[1] = 'r'
047D 32 81 74   STA  DIMAGE/2+Y+1
0480 32 82 74   STA  DIMAGE/2+Y+2 DIMAGE[2] = 'r'
               ;                  START DISPLAY TIMER
0483 3E 07      MVI  A,DSPVAL     DSPTMR = DSPVAL
0485 32 29 74   STA  DSPTMR/2+X
0488 F1         POP  PSW          RESTORE A, PSW
0489 C9         RET               RETURN

PNUMK
               ;PNUMK(CURKEY)(DBUF  ,WORK1 )
               ;     (BYTE  )(NIBSTR,NIBSTR)
               ;     ( I    )( I/O  , O    )
               ;     ( A    )( RAM  , RAM  )
               ;     ( C    )( C    , C    )
               ;
               ;PSW AND REGISTERS DESTROYED
               ;
               ;PROCESS NUMERIC KEY
               ;
               PNUMK;             ****ENTRY POINT
048A 57         MOV  D,A          D = CURKEY
048B CD 06 03   CALL CDBUFC       IF DBUF[0..1] .NE. HEX00
               ;                    NOT IN KEYENTRY MODE
               ;                    DISABLE METER
               ;                    ENTER KEYENTRY MODE
               ;                    DBUF[0..1] = HEADER = HEX00
               ;                    DECLARE DBUF CLEAR
               ;                    DBUF[2..3] = FORMAT = HEX0F
               ;                  ENDIF
               ;                  CHECK DATA LENGTH IN DISPLAY
048E 21 41 74   LXI  H,(DBUF+2)/2+X
               ;                  HL = ADDRESS, DBUF[2..3]
0491 7E         MOV  A,M          E = NCHAR*16 = DBUF[2]*16
0492 E6 F0      ANI  0F0H
0494 5F         MOV  E,A
0495 FE 80      CPI  DSPCHR*16    IF NCHAR .LT. DSPCHR
0497 D0         RNC
               ;                    THERE IS ROOM IN DISPLAY FOR CHAR
               ;                    CALCULATE NEXT DECIMAL POSITION
0498 7E         MOV  A,M            A = DECPOS = (DBUF[3]+1) .AND. HEX0F
0499 3C         INR  A
049A E6 0F      ANI  0FH
049C FE 08      CPI  DSPCHR         IF DECPOS .LT. DSPCHR
049E D0         RNC
               ;                      THERE IS ROOM TO SHIFT DECIMAL
049F B7         ORA  A                IF DECPOS .EQ. 0
04A0 C2 A5 04   JNZ  PNUMK1
               ;                        DECIMAL HASN'T BEEN ENTERED
               ;                        INDICATE NO DECIMAL
04A3 3E 0F      MVI  A,0FH              A = DECPOS = HEX0F
               PNUMK1;                ENDIF
               ;                      UPDATE FORMAT BYTE
04A5 B3         ORA  E                DBUF[2..3] = (NCHAR+1)*16+DECPOS
04A6 C6 10      ADI  10H
04A8 77         MOV  M,A
04A9 06 82      MVI  B,DBUF+2         B = OFFSET, DBUF[2]
04AB CD 35 0F   CALL GETNIB           GETNIB(NCHAR,ZROFLG,DBUF[2])
```

```
                   ;                         ( A    ,PSW:Z , @B     )
                   ;                         ( 0    , 0    , I      )
04AE 5F             MOV  E,A            E = NCHAR
                   ;                    COPY DBUF INTO WORK AREA
04AF 01 C0 84       LXI  B,(DBUF+4)*100H+(WORK1+0)
                   ;                    B = OFFSET, DBUF[I=4]
                   ;                    C = OFFSET, WORK1[J=0]
04B2 CD B3 OF       CALL MVLNIB         MVLNIB(WORK1[J],DBUF[I],NCHAR,
                   ;                         ( @C      , @B     , A    ,
                   ;                         ( 0       , I      , I    ,
                   ;
                   ;                         NONBCD,ZROFLG)
                   ;                         PSW:S ,PSW:Z )
                   ;                          0    , 0     )
                   ;                    ZERO PAD DISPLAY BUFFER
04B5 23             INX  H              HL = ADDRESS, DBUF[4..5]
04B6 36 00          MVI  M,0            DBUF[4..5] = 0
                   ;                    INSERT NEW CHAR IN WORK AREA
04B8 81             ADD  C              C=OFFSET, WORK1[J=NCHAR.AND.HEXFE]
04B9 E6 FE          ANI  OFEH
04BB 4F             MOV  C,A
04BC 7A             MOV  A,D            A = CURKEY
04BD CD EE OF       CALL PUTNIB         PUTNIB(WORK1[J],CURKEY)
                   ;                         ( @C      , A     )
                   ;                         ( 0       , I     )
                   ;                    MOVE WORK AREA TO DISPLAY BUFFER
04C0 41             MOV  B,C            B = OFFSET, WORK1[I=J]
04C1 3E 83          MVI  A,DBUF+3       C=OFFSET,DBUF[J=(3+NCHAR).OR.HEX01]
04C3 83             ADD  E
04C4 F6 01          ORI  1
04C6 4F             MOV  C,A
04C7 7B             MOV  A,E            A = NCHAR
04C8 CD C2 OF       CALL MVRNIB         MVRNIB(DBUF[J],WORK1[I],NCHAR,
                   ;                         ( @C     , @B      , A    ,
                   ;                         ( 0      , I       , I    ,
                   ;
                   ;                         NONBCD,ZROFLG)
                   ;                         PSW:S ,PSW:Z )
                   ;                          0    , 0     )
04CB C3 5A 05       JMP  VALDSP         UPDATE DISPLAY IMAGE
                   ;                  ENDIF
                   ;                ENDIF
                   ;                RETURN

PROKEY
                   ;PROKEY()(CURBKT)
                   ;        ( BYTE )
                   ;        ( I    )
                   ;        ( RAM  )
                   ;        ( NC   )
                   ;
                   ;PSW AND REGISTERS DESTROYED
                   ;
                   ;INITIATE PROCESSING OF A KEYPRESS
                   ;
                   PROKEY;             ****ENTRY POINT
04CE CD DE OE       CALL DBLANK        STOP TIMER, BLANK DISPLAY
                   ;                   BUILD INDEX FOR TABLE LOOKUP
                   ;                   CURBKT = ORRR CCCC WHERE:
                   ;                   RRR = 0, 1, 2, 3, OR 4 = ROW CODE
                   ;                   CCCC= 1, 2, 4, OR 8 = COLUMN CODE
04D1 3A 2D 74       LDA CURBKT/2+X     A = CURBKT
04D4 57             MOV  D,A           D = CURBKT
04D5 E6 70          ANI  70H           E = INDEX = (CURBKT .AND. HEX70)/4
04D7 OF             RRC
04D8 OF             RRC
04D9 5F             MOV  E,A
04DA 7A             MOV  A,D           A = CURBKT
                   PROKE1;             DO WHILE COLUMN CODE BIT NOT IN CARRY
04DB 1F             RAR
04DC DA E3 04       JC   PROKE2
```

```
04DF 1C          INR  E              E = INDEX = INDEX + 1
04E0 C3 DB 04    JMP  PROKE1
                PROKE2;             ENDDO
                ;                   DEFINE CURRENT KEYCODE OR HEADER
04E3 16 00       MVI  D,0           DE = INDEX
04E5 21 02 05    LXI  H,PROKE3      HL = ADDRESS, PROKE3
04E8 19          DAD  D             HL = ADDRESS, PROKE3[INDEX]
04E9 7E          MOV  A,M           A = CURKEY = PROKE3[INDEX]
                ;                   PROCESS CURRENT KEYCODE
04EA FE 0A       CPI  10            IF CURKEY .LT. 10
                ;                     PROCESS NUMERIC KEY
04EC DA 8A 04    JC   PNUMK           PNUMK(CURKEY)
                ;                          ( A     )
                ;                          ( I     )
                ;                     RETURN
                ;                   ELSE IF CURKEY .EQ. 10
04EF CA 47 04    JZ   PCLRK           PROCESS CLEAR KEY
                ;                     RETURN
04F2 FE 0C       CPI  12            ELSE IF CURKEY .EQ. 11
04F4 DA 50 04    JC   PDCMK           PROCESS DECIMAL KEY
                ;                     RETURN
                ;                   ELSE IF CURKEY .EQ. 12
04F7 CA 16 05    JZ   PSETK           PROCESS SET KEY
                ;                     RETURN
04FA FE 0D       CPI  13            ELSE IF CURKEY .EQ. 13
04FC CA 1F 04    JZ   PAUTHK          PROCESS AUTHORIZATION KEY
                ;                     RETURN
                ;                   ELSE
                ;                     A = HEADER = PROKE3[INDEX]
                ;                     EXECUTE HEADER
04FF C3 C7 0D    JMP  XEQHDR          XEQHDR(HEADER,ERROR)
                ;                          ( A    ,PSW:Z)
                ;                          ( I    , O    )
                ;                     RETURN
                ;                   ENDIF
                PROKE3;    CURKEY   INDEX   DESCRIPTION
                ;            OR
                ;          HEADER
                ;
0502 C4          DB        HSETDA     0     SET DATE
0503 C6          DB        HENTCO     1     ENTER COMBINATION
0504 C5          DB        HENTAM     2     ENTER AMOUNT
0505 0D          DB        13         3     AUTHORIZATION KEY
0506 0C          DB        12         4     SET KEY
0507 0B          DB        11         5     DECIMAL KEY
0508 00          DB         0         6     0 KEY
0509 0A          DB        10         7     CLEAR KEY
050A 55          DB        HREQPC     8     REQUEST PIECE COUNT
050B 09          DB         9         9     9 KEY
050C 08          DB         8        10     8 KEY
050D 07          DB         7        11     7 KEY
050E 53          DB        HREQDR    12     REQUEST DESCENDING REGISTER
050F 06          DB         6        13     6 KEY
0510 05          DB         5        14     5 KEY
0511 04          DB         4        15     4 KEY
0512 52          DB        HREQAR    16     REQUEST ASCENDING REGISTER
0513 03          DB         3        17     3 KEY
0514 02          DB         2        18     2 KEY
0515 01          DB         1        19     1 KEY

PSETK
                ;PSETK()(DBUF   ,NORFLG)
                ;       (NIBSTR,BITSTR)
                ;       ( I     , O     )
                ;       ( RAM   , RAM   )
                ;       ( C     , C     )
                ;
                ;PSW AND REGISTERS DESTROYED
                ;
                ;PROCESS SET KEY
                ;
```

```
                   PSETK;                   ****ENTRY POINT
                   ;                        PROCESS SET KEY ACCORDING TO DISPLAY
0516 3A 40 74        LDA  DBUF/2+X          A = DBUF[0..1]
0519 B7              ORA  A                 IF DBUF[0..1] .EQ. HEX00
051A C2 2F 05        JNZ  PSETK1
                   ;                          DISPLAY IS IN KEYENTRY MODE
051D 21 36 05        LXI  H,PSETK2            SET TO QUE POSTAGE VIA RETURN
0520 E5              PUSH H
0521 3A 41 74        LDA  (DBUF+2)/2+X        A = DBUF[2..3]
0524 FE 0F           CPI  0FH                 IF DBUF[2..3] .EQ. HEX0F
0526 C8              RZ                         DISPLAY IS CLEAR
                   ; >>RETURN AHEAD<<           QUE POSTAGE REQUEST
                   ;                            NORFLG.QUEPOS = TRUE
                   ;                          ELSE
                   ;                            DISPLAY CONTAINS KEYENTERED VALUE
                   ;                            SET POSTAGE
0527 3E C1           MVI  A,HSETPO              A = HSETPO
0529 CD C7 0D        CALL XEQHDR                XEQHDR(HSETPO,ERRFLG)
                   ;                                  ( A     ,PSW:Z )
                   ;                                  ( I     , O    )
052C C0              RNZ                        IF ERRFLG .EQ. FALSE
                   ; >>RETURN AHEAD<<             QUE POSTAGE REQUEST
                   ;                              NORFLG.QUEPOS = TRUE
                   ;                            ENDIF
                   ;                          ENDIF
052D E1              POP  H                   CLEAN UP STACK
052E C9              RET
                   PSETK1;                  ELSE
                   ;                          DISPLAY NOT IN KEYENTRY MODE
052F FE 81           CPI  HPSET               PSW:Z = SETTING=DBUF[0..1].EQ.HPSET
0531 3E 41           MVI  A,HENABL            A = HENABL
                   ;                          IF SETTING .EQ. TRUE
                   ;                            SETTING IS ON DISPLAY
                   ;                            ENABLE METER
0533 CA C7 0D        JZ   XEQHDR                XEQHDR(HENABL,ERRFLG)
                   ;                                  ( A     ,PSW:Z )
                   ;                                  ( I     , O    )
                   ;                          ELSE
                   ;                            SETTING IS NOT ON DISPLAY
                   PSETK2;                      >>TARGET OF RETURN AHEAD<<
                   ;                            QUE POSTAGE REQUEST
0536 21 26 74        LXI  H,NORFLG/2+X          HL = ADDRESS, NORFLG
0539 7E              MOV  A,M                   A = NORFLG
053A F6 40           ORI  40H                   NORFLG.QUEPOS = TRUE
053C 77              MOV  M,A
                   ;                          ENDIF
                   ;                        ENDIF
053D C9              RET                    RETURN

SEGCOD
                   ;SEGCOD(CODE)
                   ;      (BYTE)
                   ;      (I/O )
                   ;      ( A  )
                   ;      ( C  )
                   ;
                   ;PSW:S, Z, P, CY DESTROYED
                   ;
                   ;CONVERT 4 BIT HEX VALUE INTO 7 SEGMENT DISPLAY CODE
                   ;
                   SEGCOD;                  ****ENTRY POINT
053E E5              PUSH H                 SAVE HL
                   ;                        FETCH 7 SEGMENT DISPLAY CODE
053F C6 4A           ADI  >SEGC01           HL = ADDRESS, SEGC01[CODE]
0541 6F              MOV  L,A
0542 3E 00           MVI  A,0
0544 CE 05           ACI  <SEGC01
0546 67              MOV  H,A
0547 7E              MOV  A,M               A = CODE = SEGC01[CODE]
0548 E1              POP  H                 RESTORE HL
0549 C9              RET                    RETURN
```

```
                       ;
                       SEGC01; 7 SEG CODE;  HEX VALUE;  GRAPHIC
                       ;
054A FC                  DB      0FCH          0         0
054B 60                  DB      060H          1         1
054C DA                  DB      0DAH          2         2
054D F2                  DB      0F2H          3         3
054E 66                  DB      066H          4         4
054F B6                  DB      0B6H          5         5
0550 BE                  DB      0BEH          6         6
0551 E0                  DB      0E0H          7         7
0552 FE                  DB      0FEH          8         8
0553 F6                  DB      0F6H          9         9
0554 9E                  DB      09EH          A         E
0555 0A                  DB      00AH          B         r
0556 3A                  DB      03AH          C         o
0557 92                  DB      092H          D         WING, ENABLED
0558 02                  DB      002H          E         WING, DISABLED
0559 00                  DB      000H          F         BLANK

VALDSP
                       ;VALDSP()(DIMAGE,KDCTRL,DBUF  ,DSPTMR)
                       ;        (BYTSTR,BITSTR,NIBSTR,UBYTE )
                       ;        ( 0    , 0    , I    , 0    )
                       ;        ( RAM  , RAM  , RAM  , RAM  )
                       ;        ( C    , C    , NC   , C    )
                       ;
                       ;PSW:S, Z, P, CY = NO CHANGE
                       ;
                       ;TRANSLATE CONTENTS OF DISPLAY BUFFER INTO 7 SEGMENT
                       ;CHARACTER CODES WHICH ARE PLACED IN THE DISPLAY IMAGE
                       ;BUFFER
                       ;
                       VALDSP;                 ****ENTRY POINT
055A E5                  PUSH H                SAVE HL
055B D5                  PUSH D                SAVE DE
055C C5                  PUSH B                SAVE BC
055D F5                  PUSH PSW              SAVE A, PSW
                       ;                       CLEAR DISPLAY IMAGE BUFFER
055E AF                  XRA A                 A = BLANK
055F CD 22 03            CALL FILDIM           FILDIM(BLANK)
                       ;                              ( A    )
                       ;                              ( I    )
                       ;                       DEFINE DEFAULT DISPLAY MODE
0562 3A 27 74            LDA  KDCTRL/2+X       A = KDCTRL
0565 E6 7F               ANI  7FH              KDCTRL.STGDSP = FALSE
0567 F6 20               ORI  20H              KDCTRL.TIMED = TRUE
0569 57                  MOV  D,A              D = KDCTRL
                       ;                       FETCH VALUES FROM DBUF'S FORMAT BYTE
056A 06 82               MVI  B,DBUF+2         B = OFFSET, DBUF[2]
056C CD 35 0F            CALL GETNIB           GETNIB(NCHAR,ZERO ,DBUF[2])
                       ;                              ( A    ,PSW:Z, @B     )
                       ;                              ( 0    , 0   , I      )
056F 4F                  MOV  C,A              C = NCHAR
0570 04                  INR  B                B = OFFSET, DBUF[3]
0571 CD 35 0F            CALL GETNIB           GETNIB(DECPOS,ZERO ,DBUF[3])
                       ;                              ( A    ,PSW:Z, @B     )
                       ;                              ( 0    , 0   , I      )
0574 5F                  MOV  E,A              E = DECPOS
                       ;                       POINT AT L/O OF DISPLAY IMAGE BUFFER
0575 21 87 74            LXI  H,DIMAGE/2+Y+(NDISP*4-1)
                       ;                       HL = ADDRESS, DIMAGE[NDISP*4-1]
                       ;                       CHECK FOR KEYENTRY IN DISPLAY BUFFER
0578 3A 40 74            LDA  DBUF/2+X         A = DBUF[0..1]
057B B7                  ORA  A                IF DBUF[0..1] .EQ. HEX00
057C C2 8D 05            JNZ  VALDS2
                       ;                        CHECK FOR NULL MESSAGE IN DBUF
057F 3A 41 74            LDA  (DBUF+2)/2+X      A = DBUF[2..3]
0582 FE 0F               CPI  0FH               IF DBUF[2..3] .EQ. HEX0F
0584 C2 89 05            JNZ  VALDS1
                       ;                          PUT SMALL 0 IN DISPLAY
```

```
0587 36 3A      MVI  M,3AH          OUTPUT DIMAGE[NDISP*4-1] = 'o'
               VALDS1;              ENDIF
0589 7A         MOV  A,D            A = KDCTRL
               ;                    MAKE UNTIMED DISPLAY
058A C3 97 05   JMP  VALDS3
               ; >>JUMP AHEAD<<
               VALDS2;            ENDIF
               ;                  CHECK WHETHER SETTING IS ON DISPLAY
058D FE 81      CPI  HPSET        COMPARE DBUF[0..1] WITH HPSET
058F 7A         MOV  A,D          A = KDCTRL
0590 C2 99 05   JNZ  VALDS4       IF DBUF[0..1] .EQ. HPSET
               ;                    SHIFT DESTINATION TO LEFT
0593 1C         INR  E              E = DECPOS = DECPOS + 1
0594 2B         DCX  H              HL = ADDRESS, DIMAGE[DST=NDISP*4-2]
               ;                    SET SETTING-ON-DISPLAY FLAG
0595 F6 80      ORI  80H            KDCTRL.STGDSP = TRUE
               VALDS3;              >>TARGET OF JUMP AHEAD<<
               ;                    CLEAR DISPLAY-IS-TIMED FLAG
0597 E6 DF      ANI  0DFH           KDCTRL.TIMED = FALSE
               VALDS4;            ENDIF
0599 32 27 74   STA  KDCTRL/2+X   OUTPUT KDCTRL
               ;                  POINT AT L/O DATA IN DBUF
059C 79         MOV  A,C          A = N = NCHAR
059D B7         ORA  A            A = N/2;  CY = N .MOD. 2
059E 1F         RAR
059F CE 00      ACI  0            B = OFFSET, DBUF[SRC=(N/2+N.MOD.2)*2+3]
05A1 17         RAL
05A2 C6 83      ADI  DBUF+3
05A4 47         MOV  B,A
               VALDS5;            DO WHILE NCHAR .GT. 0
05A5 0D         DCR  C
05A6 FA B5 05   JM   VALDS6
               ;                    FETCH BCD CHARACTER FROM DBUF
05A9 CD 35 0F   CALL GETNIB         GETNIB(CODE,ZERO ,DBUF[SRC])
               ;                           ( A   ,PSW:Z, @B       )
               ;                           ( O   , O   , I        )
               ;                    TRANSLATE TO 7 BIT DISPLAY CODE
05AC CD 3E 05   CALL SEGCOD         SEGCOD(CODE)
               ;                           ( A  )
               ;                           ( I/O)
               ;                    PUT CODE INTO DISPLAY IMAGE BUFFER
05AF 77         MOV  M,A            DIMAGE[DST] = CODE
               ;                    MOVE INDICES LEFT
05B0 05         DCR  B              B = OFFSET, DBUF[SRC=SRC-1]
05B1 2B         DCX  H              HL = ADDRESS, DIMAGE[DST=DST-1]
05B2 C3 A5 05   JMP  VALDS5
               VALDS6;            ENDDO
               ;                  CHECK WHETHER DECIMAL IS DISPLAYABLE
05B5 7B         MOV  A,E          A = DECPOS
05B6 FE 08      CPI  DSPCHR       IF DECPOS .LT. DSPCHR
05B8 D2 C3 05   JNC  VALDS7
               ;                    CALC DECIMAL'S ADDRESS IN DIAMGE
05BB 2F         CMA                 A = -DECPOS-1
05BC C6 88      ADI  (DIMAGE/2+Y-X)+(NDISP*4)
05BE 6F         MOV  L,A
               ;                    HL = ADDRESS,
               ;                    DIMAGE[N=(NDISP*4-1)-DECPOS]
               ;                    INSERT DECIMAL INTO DISPLAY
05BF 7E         MOV  A,M            DIMAGE[N] = DIMAGE[N] .OR. HEX01
05C0 F6 01      ORI  01H
05C2 77         MOV  M,A
               VALDS7;            ENDIF
               ;                  START DISPLAY TIMER
05C3 3E 07      MVI  A,DSPVAL     DSPTMR = DSPVAL
05C5 32 29 74   STA  DSPTMR/2+X
05C8 F1         POP  PSW          RESTORE A, PSW
05C9 C1         POP  B            RESTORE BC
05CA D1         POP  D            RESTORE DE
05CB E1         POP  H            RESTORE HL
05CC C9         RET               RETURN
```

```
CMDDSB
                  ;CMDDSB/DISABL()(MRSTS1,NORFLG)
                  ;               (BITSTR,BITSTR)
                  ;               ( I/O  , 0    )
                  ;               ( RAM  , RAM  )
                  ;               ( C    , C    )
                  ;
                  ;PSW = NO CHANGE
                  ;
                  ;DISABLE METER
                  ;
                  CMDDSB;                  ****ENTRY POINT FOR EXTERNAL DISABLES
05CD F5             PUSH PSW               SAVE A, PSW
                  ;                        SET TO SET NORFLG.LATDSB = TRUE
05CE 3E 01          MVI  A,1               A = LATMSK = HEX01
05D0 C3 D5 05       JMP  DISAB1
                  ; >>JUMP AHEAD<<
                  DISABL;                  ****ENTRY POINT FOR INTERNAL DISABLES
05D3 F5             PUSH PSW               SAVE A,PSW
                  ;                        SET TO PRESERVE NORFLG.LATSDB
05D4 AF             XRA  A                 A = LATMSK = HEX00
                  DISAB1;                  >>TARGET OF JUMP AHEAD<<
05D5 D5             PUSH D                 SAVE DE
05D6 E5             PUSH H                 SAVE HL
05D7 21 26 74       LXI  H,NORFLG/2+X      HL = ADDRESS, NORFLG
                  ;                        UPDATE NORFLG.LATDSB
05DA B6             ORA  M                 NORFLG = NORFLG .OR. LATMSK
05DB 77             MOV  M,A
05DC 11 24 74       LXI  D,MRSTS1/2+X      DE = ADDRESS, MRSTS1
05DF 1A             LDAX D                 IF MRSTS1.ENABLD .EQ. TRUE
05E0 E6 04          ANI  4
05E2 CA EF 05       JZ   DISAB2
05E5 1A             LDAX D                   MRSTS1.ENABLD = FALSE
05E6 E6 FB          ANI  0FBH
05E8 12             STAX D
05E9 7E             MOV  A,M                 NORFLG.TRPREQ = FALSE
05EA E6 F7          ANI  0F7H
05EC F6 80          ORI  80H                 NORFLG QUESTS = TRUE
05EE 77             MOV  M,A
                  DISAB2;                  ENDIF
05EF E1             POP  H                 RESTORE HL
05F0 D1             POP  D                 RESTORE DE
05F1 F1             POP  PSW               RESTORE A, PSW
05F2 C9             RET                    RETURN

CMDENB
                  ;CMDENB/ENABLE()(MRSTS1,NORFLG,NVMCTL)
                  ;               (BITSTR,BITSTR,BITSTR)
                  ;               ( I/O  , I/O  , I    )
                  ;               ( RAM  , RAM  , RAM  )
                  ;               ( C    , C    , NC   )
                  ;
                  ;PSW = NO CHANGE
                  ;
                  ;ENABLE METER
                  ;
                  CMDENB;                  ****ENTRY POINT FOR EXTERNAL ENABLES
05F3 F5             PUSH PSW               SAVE A, PSW
                  ;                        SET TO SET NORFLG.LATDSB = FALSE
05F4 3E FE          MVI  A,0FEH            A = LATMSK = HEXFE
05F6 C3 FC 05       JMP  ENABL1
                  ; >>JUMP AHEAD<<
                  ENABLE;                  ****ENTRY POINT FOR INTERNAL ENABLES
05F9 F5             PUSH PSW               SAVE A, PSW
                  ;                        SET TO PRESERVE NORFLG.LATDSB
05FA 3E FF          MVI  A,0FFH            A = LATMSK = HEXFF
                  ENABL1;                  >>TARGET OF JUMP AHEAD<<
05FC C5             PUSH B                 SAVE BC
05FD D5             PUSH D                 SAVE DE
05FE E5             PUSH H                 SAVE HL
05FF 21 26 74       LXI  H,NORFLG/2+X      HL = ADDRESS, NORFLG
```

```
                    ;                          UPDATE NORFLG.LATDSB
0602 A6              ANA  M                    NORFLG = NORFLG .AND. LATMSK
0603 77              MOV  M,A
0604 3A 33 74        LDA  NVMCTL/2+X           IF NVMCTL[0] .NE. HEXF
0607 B7              ORA  A
0608 FA 27 06        JM   ENABL4
                    ;                            A BLOCK IS OPEN
060B CD 4E 0F        CALL LSTATE                 LSTATE(FATMOD,NORMOD,SERMOD,PRVMOD)
                    ;                                    (PSW:S ,PSW:Z ,PSW:P ,PSW:CY)
                    ;                                    ( 0    , 0    , 0    , 0    )
060E C2 27 06        JNZ  ENABL3                 IF NORMOD .EQ. TRUE
0611 11 24 74        LXI  D,MRSTS1/2+X             DE = ADDRESS, MRSTS1
0614 1A              LDAX D
0615 E6 EC           ANI  0ECH
0617 47              MOV  B,A                      B = FLAGS = MRSTS1.UNKSEL,
                    ;                                          MRSTS1.DATDOR,
                    ;                                          MRSTS1.INSFND,
                    ;                                          MRSTS1.ENABLD
0618 7E              MOV  A,M
0619 E6 03           ANI  3
061B B0              ORA  B                        A = FLAGS = FLAGS .OR.
                    ;                                          NORFLG.UNVSEL,
                    ;                                          NORFLG.LATDSB
061C C2 27 06        JNZ  ENABL2                   IF FLAGS .EQ. FALSE
061F 7E              MOV  A,M                        NORFLG.QUESTS = TRUE
0620 F6 80           ORI  80H
0622 77              MOV  M,A
0623 1A              LDAX D                          MRSTS1.ENABLD = TRUE
0624 F6 04           ORI  4
0626 12              STAX D
                    ENABL2;                        ENDIF
                    ENABL3;                      ENDIF
                    ENABL4;                    ENDIF
0627 E1              POP  H                    RESTORE HL
0628 D1              POP  D                    RESTORE DE
0629 C1              POP  B                    RESTORE BC
062A F1              POP  PSW                  RESTORE A, PSW
062B C9              RET                       RETURN

CONFIG
                    ;CONFIG(ERRFLG)(MTRCHR,XMTBUF)
                    ;       (BIT   )(BYTE  ,BYTSTR)
                    ;       ( 0    )( I    , 0    )
                    ;       (PSW:S )( RAM  , RAM  )
                    ;       ( C    )( NC   , C    )
                    ;
                    ;REGISTERS DESTROYED
                    ;PSW DESTROYED
                    ;
                    ;PUT METER CONFIGURATION MESSAGE IN TRANSMIT BUFFER
                    ;
                    CONFIG;                    ****ENTRY POINT
062C 21 50 74        LXI  H,XMTBUF/2+X         HL = ADDRESS, XMTBUF[0]
                    ;                          DEFINE MESSAGE LENGTH
062F 36 02           MVI  M,2                  XMTBUF[0] = 2
                    ;                          DEFINE MESSAGE HEADER
0631 23              INX  H                    HL = ADDRESS, XMTBUF[1]
0632 36 AB           MVI  M,HCONFG             XMTBUF[1] = HCONFG
                    ;                          DEFINE ERROR FLAG
0634 2C              INR  L                    HL = ADDRESS, XMTBUF[2]
                    ;                          PSW:Z = ERRFLG = FALSE
                    ;                          DEFINE METER CHARACTERISTICS
0635 3A 23 74        LDA  MTRCHR/2+X           XMTBUF[2] = MTRCHR
0638 77              MOV  M,A
0639 C9              RET                       RETURN

CONSUM
                    ;CONSUM(ERRFLG)(CTLCRC)
                    ;       (BIT   )(BYTE  )
                    ;       ( 0    )( I    )
                    ;       (PSW:Z )( RAM  )
```

```
                ;    ( C    )( NC    )
                ;
                ;REGISTERS DESTROYED
                ;PSW DESTROYED
                ;
                ;CHECK CONTROL SUM CRC AGAINST EXPECTED CRC
                ;
                CONSUM;                 ****ENTRY POINT
                ;                       CALCULATE CONTROL SUM CRC
0635A CD 4E 06   CALL CTLSUM            CTLSUM(CSMCRC,ERRFLG)
                ;                              ( D     ,PSW:Z )
                ;                              ( 0     , 0    )
063D CA 47 06    JZ   CONSU1            IF ERRFLG .EQ. TRUE
                ; >>JUMP AHEAD<<           DECLARE DEAD METER. BAD CRC
                ;                          A = BADCRC
                ;                          NVMDED(BADCRC,ERRFLG)
                ;                                 ( A     ,PSW:Z )
                ;                                 ( I     , 0    )
                ;                       ELSE
0640 3A 08 74    LDA  CTLCRC/2+X        A = DIF = CTLCRC-CSMCRC
0643 92          SUB  D
0644 CA 4C 06    JZ   CONSU2            IF DIF .NE. 0
                CONSU1;                    >>TARGET OF JUMP AHEAD<<
                ;                          DECLARE DEAD METER. BAD CRC
0647 3E 00       MVI  A,BADCRC             A = BADCRC
0649 C3 85 10    JMP  NVMDED               NVMDED(BADCRC,ERRFLG)
                ;                                 ( A     ,PSW:Z )
                ;                                 ( I     , 0    )
                CONSU2;                 ELSE
064C 3C          INR  A                    PSW:Z = ERRFLG = FALSE
                ;                       ENDIF
064D C9          RET                    RETURN

CTLSUM
                ;CTLSUM(CSMCRC,ERRFLG)(ASCREG,DSCREG,WORK1 )
                ;      (BYTE  ,BIT   )(NIBSTR,NIBSTR,NIBSTR)
                ;      ( 0    , 0    )( I    , I    , 0    )
                ;      ( D    ,PSW:Z )( RAM  , RAM  , RAM  )
                ;      ( C    , C    )( NC   , NC   , C    )
                ;
                ;REGISTERS DESTROYED
                ;PSW DESTROYED
                ;
                ;CALCULATE CONTROL SUM AND ITS CRC FOR THE CURRENT VALUES
                ;OF THE ASCENDING AND DESCENDING REGISTERS
                ;
                CTLSUM;                 ****ENTRY POINT
                ;                       COPY ASCENDING REGISTER INTO WORK AREA
064E 01 C9 3F    LXI  B,(ASCREG+ASCSIZ-1)*100H+(WORK1+9)
                ;                       B = OFFSET, ASCREG[I=ASCSIZ-1]
                ;                       C = OFFSET, WORK1[J=10-1]
0651 3E 08       MVI  A,ASCSIZ          A = ASCSIZ
0653 CD C2 0F    CALL MVRNIB            MVRNIB(WORK1[J],ASCREG[I],ASCSIZ,
                ;                              ( @C      , @B      , A    ,
                ;                              ( 0       , I       , I    ,
                ;
                ;                              NONBCD,ZROFLG)
                ;                              PSW:S ,PSW:Z )
                ;                                0    , 0    )
0656 F2 5B 06    JP   CTLSU1            IF NONBCD .EQ. TRUE
0659 AF          XRA  A                    PSW:Z = ERRFLG = TRUE
065A C9          RET
                CTLSU1;                 ELSE
065B 3A 17 74    LDA  DSCREG/2+X        IF DSCREG[0..1] .EQ. HEXFF
065E FE FF       CPI  0FFH                 PSW:Z = ERRFLG = TRUE
0660 C8          RZ
                ;                       ELSE
                ;                          CALCULATE CONTROL SUM IN WORK AREA
0661 06 35       MVI  B,DSCREG+DSCSIZ-1
                ;                          B = OFFSET, DSCREG[K=DSCSIZ-1]
0663 11 08 07    LXI  D,DSCSIZ*100H+ASCSIZ
```

```
                  ;                     D = DSCSIZ
                  ;                     E = ASCSIZ
0666 CD F8 06      CALL DECADD          DECADD(WORK1[J],DSCREG[K],
                  ;                           ( O       , I       ,
                  ;                           ( @C      , @B      ,
                  ;
                  ;                           ASCSIZ,DSCSIZ,OVRFLO)
                  ;                            I     , I     , O     )
                  ;                            E     , D     ,PSW:CY)
                  ;                     CALCULATE CRC FOR CONTROL SUM
0669 01 C2 08      LXI  B,(ASCSIZ)*100H+(WORK1+10-ASCSIZ)
                  ;                     B = ASCSIZ
                  ;                     C = OFFSET, WORK1[L=10-ASCSIZ]
066C CD B1 0E      CALL CRC             CRC(WORK1[L],ASCSIZ,CSMCRC)
                  ;                        ( I       , I     , O     )
                  ;                        ( @C      , B     , D     )
066F 04            INR  B               PSW:Z = ERRFLG = FALSE
                  ;                    ENDIF
0670 C9            RET                 RETURN

DBLHDR
                  ;DBLHDR(HEADER,ERRFLG)(LOWWRN,SERNUM,ERRST ,SETLIM,ASCREG,
                  ;      (BYTE  ,BIT   )(NIBSTR,NIBSTR,NIBSTR,NIBSTR,NIBSTR,
                  ;      ( I    , O    )( I    , I    , I    , I    , I    ,
                  ;      ( A    ,PSW:Z )( RAM  , RAM  , RAM  , RAM  , RAM  ,
                  ;      ( NC   , C    )( NC   , NC   , NC   , NC   , NC   ,
                  ;
                  ;      DSCREG,WORK1 ,PCEREG,MRSTS1)
                  ;      NIBSTR,NIBSTR,NIBSTR,BITSTR)
                  ;       I    , I    , I    , O     )
                  ;       RAM  , RAM  , RAM  , RAM   )
                  ;       NC   , NC   , NC   , C     )
                  ;
                  ;REGISTERS DESTROYED
                  ;PSW DESTROYED
                  ;
                  ;PROCESS DOUBLY DEFINED HEADERS
                  ;
                  DBLHDR;               ****ENTRY POINT
0671 CD 4E 0F      CALL LSTATE          LSTATE(FATMOD,NORMOD,SERMOD,PRVMOD)
                  ;                           (PSW:S ,PSW:Z ,PSW:P ,PSW:CY)
                  ;                           ( O    , O    , O    , O     )
0674 21 E2 06      LXI  H,DBLH04        SET TO RETURN TO ENDCASE
0677 E5            PUSH H
0678 E2 A6 06      JPO  DBLH02          IF SERMOD .EQ. TRUE
                  ;                     --CASE (HEADER)
067B FE 52         CPI  HREQDL            **52: DOLLAR LOCK VALUE REQUEST
067D 11 E3 06      LXI  D,DBLH05+0
0680 CA 5B 0D      JZ   VALREQ            VALREQ(UNLOCK,LOKFMT,HDLOCK,ERRFLG)
                  ;                              (@@DE+0,@DE+1 ,@DE+2 ,PSW:Z )
                  ;                              ( I    , I    , I    , O     )
0683 FE 53         CPI  HREQLP            **53: LOW POSTAGE WARNING VALUE REQ
0685 01 8B 1C      LXI  B,LOWWRN*100H+HLOPOS
0688 CA 34 0D      JZ   SRVREQ            SRVREQ(LOWWRN,HLOPOS,ERRFLG)
                  ;                              ( @B   , C    ,PSW:Z )
                  ;                              ( I    , I    , O     )
068B FE 54         CPI  HREQMN            **54: METER SERIAL NUMBER REQUEST
                  DBLH01;                 ****ALTERNATE ENTRY POINT
068D 11 E6 06      LXI  D,DBLH05+3
0690 CA 5B 0D      JZ   VALREQ            VALREQ(SERNUM,MSNFMT,HMTRNO,ERRFLG)
                  ;                              (@@DE+0,@DE+1 ,@DE+2 ,PSW:Z )
                  ;                              ( I    , I    , I    , O     )
0693 FE 55         CPI  HREQDS            **55: DIAGNOSTIC REQUEST
0695 11 E9 06      LXI  D,DBLH05+6
0698 CA 5B 0D      JZ   VALREQ            VALREQ(ERRST ,DIAFMT,HDIAGS,ERRFLG)
                  ;                              (@@DE+0,@DE+1 ,@DE+2 ,PSW:Z )
                  ;                              ( I    , I    , I    , O     )
069B FE 56         CPI  HREQSL            **56: SETTING LIMIT VALUE REQUEST
069D 01 8E 1E      LXI  B,SETLIM*100H+HHSLIM
06A0 CA 34 0D      JZ   SRVREQ            SRVREQ(SETLIM,HHSLIM,ERRFLG)
                  ;                              ( @B   , C    ,PSW:Z )
```

```
                     ;                      ( I     , I     , 0      )
                     ;                    **ELSE: PROCESS ERROR
06A3 C3 A1 0B         JMP  PROERR         PROERR(ERRFLG)
                     ;                          (PSW:Z )
                     ;                          ( 0     )
                     ;                    --ENDCASE
                     DBLH02;              ELSE
                     ;                    --CASE (HEADER)
06A6 FE 52            CPI  HREQAR           **52: ASCENDING REGISTER REQUEST
06A8 11 EC 06         LXI D,DBLH05+9
06AB CA 5B 0D         JZ   VALREQ           VALREQ(ASCREG,ASCFMT,HAREG ,ERRFLG)
                     ;                          (@@DE+0,@DE+1 ,@DE+2 ,PSW:Z )
                     ;                          ( I     , I    , I     , 0     )
06AE FE 53            CPI  HREQDR           **53: DESCENDING REGISTER REQUEST
06B0 11 EF 06         LXI  D,DBLH05+12
06B3 CA 5B 0D         JZ   VALREQ           VALREQ(DSCREG,DSCFMT,HDREG ,ERRFLG)
                     ;                          (@@DE+0,@DE+1 ,@DE+2 ,PSW:Z )
                     ;                          ( I     , I    , I     , 0     )
06B6 FE 54            CPI  HREQCS           **54: CONTROL SUM REQUEST
06B8 C2 C5 06         JNZ  DBLH03
06BB CD 3A 06         CALL CONSUM           CONSUM(ERRFLG)
                     ;                          (PSW:Z )
                     ;                          ( 0     )
06BE 11 F2 06         LXI  D,DBLH05+15
                     ;                      IF ERRFLG .EQ. FALSE
                     ;                        I = 10-ASCSIZ
06C1 C4 5B 0D         CNZ  VALREQ             VALREQ(WORK1[I],CSMFMT,HCSUM,ERRFLG)
                     ;                            (@@DE+0  ,@DE+1 ,@DE+2,PSW:Z )
                     ;                            ( I       , I    , I    , 0     )
                     ;                      ENDIF
06C4 C9               RET
                     DBLH03;
06C5 FE 55            CPI  HREQPC           **55: PIECE COUNT REQUEST
06C7 11 F5 06         LXI  D,DBLH05+18
06CA CA 5B 0D         JZ   VALREQ           VALREQ(PCEREG,PCEFMT,HPCNT ,ERRFLG)
                     ;                          (@@DE+0,@DE+1 ,@DE+2 ,PSW:Z )
                     ;                          ( I     , I    , I     , 0     )
06CD FE 5B            CPI  HREQCF           **5B: CONFIGURATION DATA REQUEST
06CF CA 2C 06         JZ   CONFIG           CONFIG(ERRFLG)
                     ;                          (PSW:Z )
                     ;                          ( 0     )
06D2 FE C4            CPI  HSETDA           **C4: RESET DATER DOOR
06D4 C2 A1 0B         JNZ  PROERR
06D7 21 24 74         LXI  H,MRSTS1/2+X     HL = ADDRESS, MRSTS1
06DA 7E               MOV  A,M              MRSTS1.DATDOR = FALSE
06DB E6 BF            ANI  0BFH
06DD 77               MOV  M,A
06DE 24               INR  H                PSW:Z = ERRFLG = FALSE
06DF C3 48 0C         JMP  SELVAL           DISPLAY SELECTION VALUE
                     ;                    **ELSE: PROCESS ERROR
                     ;                    PROERR(ERRFLG)
                     ;                          (PSW:Z )
                     ;                          ( 0     )
                     DBLH04;              --ENDCASE
                     ;                    ENDIF
06E2 C9               RET                 RETURN
                     DBLH05;              ARGUMENTS FOR VALREQ
06E3 18 40 8A         DB   UNLOCK,LOKFMT,HDLOCK            ;+0
06E6 21 7F 8C         DB   SERNUM,MSNFMT,HMTRNO            ;+3
06E9 13 5F 8D         DB   ERRST,DIAFMT,HDIAGS             ;+6
06EC 38 80 82         DB   ASCREG,ASCFMT,HAREG             ;+9
06EF 2F 70 83         DB   DSCREG,DSCFMT,HDREG             ;+12
06F2 C2 80 84         DB   WORK1+10-ASCSIZ,CSMFMT,HCSUM    ;+15
06F5 28 7F 85         DB   PCEREG,PCEFMT,HPCNT             ;+18

DECADD
                 ;DECADD(V1[V1DGTS-1],V2[V2DGTS-1],V1DGTS,V2DGTS,OVRFLO)
                 ;      (NIBSTR        ,NIBSTR       ,BYTE  ,BYTE  , BIT  )
                 ;      ( I/O          , I           , I    , I    , 0    )
                 ;      ( @C           , @B          , E    , D    ,PSW:CY)
                 ;      ( C            , NC          , C    , C    , C    )
```

```
                ;
                ;PSW DESTROYED
                ;REGISTERS DESTROYED
                ;
                ;BCD ADDITION OF UNSIGNED BCD VALUE STRINGS
                ;V1[0..V1DGTS-1] = V1[0..V1DGTS-1] + V2[0..V2DGTS-1]
                ;WHERE V1DGTS .GE. V2DGTS
                ;
                DECADD;                 ****ENTRY POINT
                ;                       C  OFFSET, V1[I=V1DGTS-1]
                ;                       B  OFFSET, V2[J=V2DGTS-1]
06F8 7B          MOV  A,E               IF V1DGTS .LT. V2DGTS
06F9 BA          CMP  D
06FA DA 20 07    JC   DECERR              DECLARE BAD ARGUMENT
                ;                         ENTER FATAL ERROR MODE
                ;                       ENDIF
06FD AF          XRA  A                 PSW:CY = CARRY = FALSE
                DECAD1;                 DO WHILE V1DGTS .GE. 0
06FE 1D          DCR  E                   E = V1DGTS = V1DGTS-1
06FF F8          RM
0700 CD 0C 07    CALL DECCOM              DECCOM(V1[I],V2[J],V1DGTS,V2DGTS,
                ;                                ( @C  , @B  , E    , D    ,
                ;                                ( I   , I/O , -    , I/O  ,
                ;
                ;                                VAL1,VAL2)
                ;                                 L  , A  )
                ;                                 0  , 0  )
                ;                         L[0..1] = VAL1 = HEX90 .OR. V1[I]
                ;                         A[0..1] = VAL2 = V2[J]
                ;                         B = OFFSET, V2[J=J-1]
                ;                         D = V2DGTS = V2DGTS-1
0703 8D          ADC  L                   A[1] = VAL1 = VAL1+VAL2+CARRY
0704 27          DAA
                ;                         PSW:CY = CARRY
0705 CD EE 0F    CALL PUTNIB              PUTNIB(V1[I],VAL1)
                ;                                ( @C  ,A[1])
                ;                                ( 0   , I  )
0708 0D          DCR  C                   C = OFFSET, V1[I=I-1]
0709 C3 FE 06    JMP  DECAD1
                ;                       ENDDO
                ;                       RETURN

DECCOM
                ;DECCOM(V1[I] ,V2[J] ,V1DGTS,V2DGTS,VAL1,VAL2)
                ;      (NIBBLE,NIBBLE,BYTE  ,BYTE  ,BYTE,BYTE)
                ;      ( I    , I/O  , -    , I/O  , 0  , 0  )
                ;      ( @C   , @B   , E    , D    , L  , A  )
                ;      ( NC   , C    , NC   , C    , C  , C  )
                ;
                ;PSW:CY = NO CHANGE
                ;PSW:S, Z, P CHANGED
                ;REGISTERS DESTROYED
                ;
                ;COMMON ROUTINE CALLED BY DECADD AND DECSUB
                ;FETCHES NEXT PAIR OF OPERANDS
                ;VAL1 = HEX90 .OR. V1[I]
                ;VAL2 = V2[J]
                ;J AND V2DGTS WILL BE DECREMENTED
                ;
                DECCOM;                 ****ENTRY POINT
070C F5          PUSH PSW               SAVE PSW:CY
070D 60          MOV  H,B               H = OFFSET, V2[J]
070E 41          MOV  B,C               B = OFFSET, V1[I]
070F CD 35 0F    CALL GETNIB            GETNIB(VAL1,ZROFLG,V1[I])
                ;                              ( A  ,PSW:Z , @B  )
                ;                              ( 0  , 0    , I   )
0712 F6 90       ORI  90H               L[0..1] = VAL1 = HEX90 .OR. VAL1
0714 6F          MOV  L,A
0715 44          MOV  B,H               B = OFFSET, V2[J]
0716 F1          POP  PSW               RESTORE PSW:CY
0717 3E 00       MVI  A,0               A[0..1] = VAL2 = 0
```

```
0719 15         DCR  D                D = V2DGTS = V2DGTS-1
071A F8         RM                    IF V2DGTS .GE. 0
071B CD 35 0F   CALL GETNIB             GETNIB(VAL2    ,ZROFLG,V2[J])
               ;                              (A[0..1],PSW:Z , @B   )
               ;                              ( 0      , 0    , I    )
071E 05         DCR  B                  B = OFFSET, V2[J=J-1]
               ;                      ENDIF
071F C9         RET                   RETURN

DECERR
               ;DECERR()
               ;
               ;PSW DESTROYED
               ;ALL REGISTERS DESTROYED
               ;
               ;ERROR ROUTINE CALLED BY DECADD AND DECSUB
               ;
               DECERR;                ****ENTRY POINT
0720 3E 02      MVI  A,SFTWRE         A = SFTWRE
0722 CD 80 08   CALL FATERR           ENTER FATAL MODE. SOFTWARE ERROR
0725 CD 68 10   CALL NVMCHG           SAVE NONVOLATILE MEMORY
0728 C3 B6 01   JMP  PWRDN            FREEZE UNTIL NEXT POWER UP

DECSUB
               ;DECSUB(V1[V1DIGS-1],V2[V2DGTS-1],V1DGTS,V2DGTS)
               ;      (NIBSTR      ,NIBSTR      ,BYTE  ,BYTE  )
               ;      ( I/O        , I          , I    , I     )
               ;      ( @C         , @B         , E    , D     )
               ;      ( C          , NC         , C    , C     )
               ;
               ;PSW DESTROYED
               ;REGISTERS DESTROYED
               ;
               ;BCD SUBTRACTION OF UNSIGNED BCD VALUE STRINGS
               ;V1[0..V1DGTS-1] = V1[0..V1DGTS-1] - V2[0..V2DGTS-1]
               ;WHERE V1DGTS .GE. V2DGTS
               ;
               DECSUB;                ****ENTRY POINT
               ;                      C = OFFSET, V1[I=V1DGTS-1]
               ;                      B = OFFSET, V2[J=V2DGTS-1]
072B 7B         MOV  A,E              IF V1DGTS .LT. V2DGTS
072C BA         CMP  D
072D DA 20 07   JC   DECERR             DECLARE BAD ARGUEMENT
               ;                        ENTER FATAL ERROR MODE
               ;                      ENDIF
0730 AF         XRA  A                PSW:CY = BORROW = FALSE
               DECSU1;                DO WHILE V1DGTS .GE. 0
0731 1D         DCR  E                  E = V1DGTS = V1DGTS-1
0732 F8         RM
0733 CD 0C 07   CALL DECCOM             DECCOM(V1[I],V2[J],V1DGTS,V2DGTS,
               ;                              ( @C  , @B  , E    , D     ,
               ;                              ( I   , I/O , -    , I/O   ,
               ;
               ;                              VAL1,VAL2)
               ;                               L  , A  )
               ;                               0  , 0  )
               ;                        L[0..1] = VAL1 = HEX90 .OR. V1[I]
               ;                        A[0..1] = VAL2 = V2[J]
               ;                        B = OFFSET, V2[J=J-1]
               ;                        D = V2DGTS = V2DGTS-1
0736 CE F6      ACI  -10                A[1] = VAL1-VAL2-BORROW
0738 2F         CMA
0739 3C         INR  A
073A 85         ADD  L
073B 27         DAA
073C 3F         CMC                     PSW:CY = BORROW
073D CD EE 0F   CALL PUTNIB             PUTNIB(V1[I],VAL1)
               ;                             ( @C  , A   )
               ;                             ( 0   , I   )
0740 0D         DCR  C                  C = OFFSET, V1[I=I-1]
```

```
0741 C3 31 07  JMP  DECSU1
              ;                      ENDDO
              ;                      RETURN

DOACCT
              ;DOACCT()(POSREG,ASCCRC,ASCREG,DSCCRC,DSCREG,PCEREG,WORK1 )
              ;         (NIBSTR,BYTE  ,NIBSTR,BYTE  ,NIBSTR,NIBSTR,NIBSTR)
              ;         ( I    , O    , I/O  , O    , I/O  , I/O  , O     )
              ;         ( RAM  , RAM  , RAM  , RAM  , RAM  , RAM  , RAM   )
              ;         ( NC   , C    , C    , C    , C    , C    , C     )
              ;
              ;PSW DESTROYED
              ;REGISTERS DESTROYED
              ;
              ;DO ACCOUNTING FOR METER TRIP
              ;
              DOACCT;                ****ENTRY POINT
              ;                      ADD POSTAGE TO ASCENDING REGISTER
0744 11 08 04  LXI  D,NBANKS*100H+ASCSIZ
              ;                      D = NBANKS
              ;                      E = ASCSIZ
0747 01 3F 45  LXI  B,(POSREG+NBANKS-1)*100H+(ASCREG+ASCSIZ-1)
              ;                      B = OFFSET, POSREG[I=NBANKS-1]
              ;                      C = OFFSET, ASCREG[J=ASCSIZ-1]
074A CD F8 06  CALL DECADD           DECADD(ASCREG[J],POSREG[I],
              ;                            ( @C      , @B      ,
              ;                            ( I/O     , I       ,
              ;
              ;                            ASCSIZ,NBANKS)
              ;                             E    , D    )
              ;                             I    , I    )
              ;                      COMPUTE CRC FOR ASCENDING REGISTER
074D 01 38 08  LXI  B,ASCSIZ*100H+ASCREG
              ;                      B = ASCSIZ
              ;                      C = OFFSET, ASCREG
0750 CD B1 0E  CALL CRC              CRC(ASCREG,ASCSIZ,CRCVAL)
              ;                         ( @C   , B    , D    )
              ;                         ( I    , I    , O    )
0753 7A        MOV  A,D              ASCCRC = CRCVAL
0754 32 20 74  STA  ASCCRC/2+X
              ;                      SUBTRACT POSTAGE FROM DESCENDING REG
0757 11 07 04  LXI  D,NBANKS*100H+DSCSIZ
              ;                      D = NBANKS
              ;                      E = DSCSIZ
075A 01 35 45  LXI  B,(POSREG+NBANKS-1)*100H+(DSCREG+DSCSIZ-1)
              ;                      B = OFFSET, POSREG[I=NBANKS-1]
              ;                      C = OFFSET, DSCREG[J=DSCSIZ-1]
075D CD 2B 07  CALL DECSUB           DECSUB(DESCREG[J],POSREG[I],
              ;                            ( @C       , @B      ,
              ;                            ( I/O      , I       ,
              ;
              ;                            DSCSIZ,NBANKS)
              ;                             E    , D    )
              ;                             I    , I    )
              ;                      COMPUTE CRC FOR DESCENDING REGISTER
0760 01 2F 07  LXI  B,DSCSIZ*100H+DSCREG
              ;                      B = DSCSIZ
              ;                      C = OFFSET,DSCREG
0763 CD B1 0E  CALL CRC              CRC(DSCREG,DSCSIZ,CRCVAL)
              ;                         ( @C   , B    , D    )
              ;                         ( I    , I    , O    )
0766 7A        MOV  A,D              DSCCRC = CRCVAL
0767 32 1B 74  STA  DSCCRC/2+X
              ;                      INCREMENT THE PIECE COUNT
076A 3E 10     MVI  A,10H            WORK1[0] = 1
076C 32 60 74  STA  WORK1/2+X
076F 11 07 01  LXI  D,1*100H+PCESIZ
              ;                      D = ONESIZ = 1
              ;                      E = PCESIZ
0772 01 2E C0  LXI  B,(WORK1+1-1)*100H+(PCEREG+PCESIZ-1)
              ;                      B = OFFSET, WORK1[I=ONESIZ-1]
```

```
                   ;              C = OFFSET, PCEREG[J]=PCESIZ-1]
0775 C3 F8 06       JMP  DECADD   DECADD(PCEREG[J],WORK1[I],
                   ;                    ( @C       , @B      ,
                   ;                    ( I/O      , I       ,
                   ;
                   ;                    PCESIZ,ONESIZ)
                   ;                     E     , D     )
                   ;                     I     , I     )
                   ;              RETURN

DOSTAT
                   ;DOSTAT()(MRSTS1,MRSTS2,NORFLG)
                   ;         (BITSTR,BITSTR,BITSTR)
                   ;         ( I    , I/O  , I/O  )
                   ;         ( RAM  , RAM  , RAM  )
                   ;         ( NC   , C    , C    )
                   ;
                   ;REGISTERS DESTROYED
                   ;PSW DESTROYED
                   ;
                   ;UPDATE METER STATUS TO AGREE WITH SWITCHES AND SENSORS
                   ;
                   DOSTAT;             ****ENTRY POINT
                   ;                   FETCH PRESENT SWITCH VALUES
0778 CD 31 0C       CALL REDSTS        REDSTS(TRPSW,PRVSW)
                   ;                          ( B   , A   )
                   ;                          ( 0   , 0   )
077B E6 01          ANI  1             C = PRVSW = PRVSW .AND. HEX01
077D 4F             MOV  C,A
077E 78             MOV  A,B           B = TRPSW = TRPSW .AND. HEX08
077F E6 08          ANI  8
0781 47             MOV  B,A
0782 81             ADD  C             C = NEWSWS = PRVSW + TRPSW
0783 4F             MOV  C,A
0784 21 25 74       LXI  H,MRSTS2/2+X  HL = ADDRESS, MRSTS2
                   ;                   SAVE ENTRY STATUS
0787 7E             MOV  A,M           A = MRSTS2
0788 57             MOV  D,A           D = OLDST2 = MRSTS2
                   ;                   UPDATE STATUS
                   ;                   MRSTS2.TRPSW = TRPSW
                   ;                   MRSTS2.PRVMOD = PRVSW
0789 E6 F6          ANI  0F6H          MRSTS2 = MRSTS2.AND.HEXF6.OR.NEWSWS
078B B1             ORA  C
078C 77             MOV  M,A
                   ;                   CHECK METER STATUS
078D CD 4E 0F       CALL LSTATE        LSTATE(FATMOD,NORMOD,SERMOD,PRVMOD)
                   ;                         (PSW:S ,PSW:Z ,PSW:P ,PSW:CY)
                   ;                         ( 0    , 0    , 0    , 0    )
0790 F8             RM                 IF FATMOD .EQ. FALSE
                   ;                     READ CYCLE SWITCH
0791 CD AF 0B       CALL RDCYC           RDCYC(INCYC,INCYC,ADRESS,MRSTS1)
                   ;                          ( A    ,PSW:C, HL    , @HL  )
                   ;                          ( 0    , 0   , 0     , -    )
0794 3E 04          MVI  A,BADCYC        A = BADCYC
                   ;                     IF INCYC .EQ. TRUE
                   ;                       CYCLE SWITCH SAYS METER NOT HOME
                   ;                       DECLARE DEAD METER, BAD SWITCH
0796 DA 85 10       JC   NVMDED            NVMDED(BADCYC,ERRFLG)
                   ;                              ( A    ,PSW:Z )
                   ;                              ( I    , 0    )
                   ;                   ELSE
                   ;                     CALC SEQ SWITCH CLOSURE VALUE
0799 7A             MOV  A,D
079A A0             ANA  B
079B A8             XRA  B
079C 4F             MOV  C,A             C = CLOSUR = OLDST2.TRPSW .AND.
                   ;                                  TRPSW .XOR. TRPSW
                   ;                     DEFINE TRIP REQUEST VALUE
079D 7E             MOV  A,M             A=TRPREQ=MRSTS1.ENABLD.AND.CLOSUR
079E 17             RAL
079F A1             ANA  C
```

```
                    ;                   UPDATE TRIP REQUEST STATUS
                    ;                   NORFLG.TRPREQ = TRPREQ
07A0 23              INX  H             HL = ADDRESS, NORFLG
07A1 23              INX  H
07A2 B6              ORA  M             NORFLG = TRPREQ .OR. NORFLG
07A3 77              MOV  M,A
                    ;                 ENDIF
                    ;               ENDIF
07A4 C9              RET            RETURN

DOTRIP
                    ;DOTRIP()(MRSTS1,NORFLG,PORTA )
                    ;        (BITSTR,BITSTR,BITSTR)
                    ;        ( 0    , 0    , 0    )
                    ;        ( RAM  , RAM  , 7001 )
                    ;        ( C    , C    , C    )
                    ;
                    ;REGISTERS DESTROYED
                    ;PSW DESTROYED
                    ;
                    ;TRIP METER
                    ;
                    DOTRIP;             ****ENTRY POINT
07A5 CD DE 0E        CALL DBLANK        TURN OFF DISPLAY
                    ;                   CHECK CYCLE SWITCH WHILE METER HOME
07A8 CD AF 0B        CALL RDCYC         RDCYC(INCYC,INCYC,ADRESS,MRSTS1)
                    ;                        ( A    ,PSW:C, HL    , @HL  )
                    ;                        ( 0    , 0    , 0    , -    )
07AB 3E 04           MVI  A,BADCYC      A = BADCYC
                    ;                   IF INCYC .EQ. TRUE
                    ;                     CYCLE SWITCH SAYS METER NOT HOME
                    ;                     DECLARE DEAD METER, BAD SWITCH
07AD DA 85 10        JC   NVMDED          NVMDED(BADCYC,ERRFLG)
                    ;                            ( A    ,PSW:Z )
                    ;                            ( I    , 0    )
                    ;                   ELSE
                    ;                     CYCLE SWITCH SAYS METER IS HOME
                    ;                     INDICATE TRIP HAS STARTED
07B0 7E              MOV  A,M             A = MRSTS1
07B1 F6 81           ORI  81H             MRSTS1.UNKSEL = TRUE
                    ;                     MRSTS1.QUEREG = TRUE
07B3 77              MOV  M,A
07B4 23              INX  H               HL = ADDRESS, NORFLG
07B5 23              INX  H
07B6 7E              MOV  A,M             NORFLG.TRPREQ = FALSE
07B7 E6 F7           ANI  0F7H
07B9 F6 40           ORI  40H             NORFLG.QUEPOS = TRUE
07BB 77              MOV  M,A
                    ;                     TRIP METER
07BC CD 7C 18        CALL MVTRIP          MVTRIP(ERROR)
                    ;                            ( A    )
                    ;                            ( 0    )
07BF B7              ORA  A               IF ERROR .NE. 0
                    ;                       DECLARE TRIP ERROR
07C0 C2 80 08        JNZ  FATERR            FATERR(ERROR,ERRFLG)
                    ;                              ( A    ,PSW:Z )
                    ;                              ( I    , 0    )
                    ;                     ELSE
                    ;                       TRIP STARTED OK
                    ;                       START AC MOTOR TO CONTINUE CYCLE
07C3 21 01 70        LXI  H,PORTA           HL = ADDRESS, PORTA
07C6 7E              MOV  A,M               PORTA = PORTA .AND. HEXEF
07C7 E6 EF           ANI  0EFH
07C9 77              MOV  M,A
07CA F3              DI                     DISABLE INTERRUPT
07CB CD 44 07        CALL DOACCT            ACCOUNT FOR TRIP
                    ;                       PREVENT DOUBLE ACCOUNTING
07CE 21 24 74        LXI  H,MRSTS1/2+X      HL = ADDRESS, MRSTS1
07D1 7E              MOV  A,M               MRSTS1.INCYC = TRUE
07D2 F6 02           ORI  2
07D4 77              MOV  M,A
```

```
07D5 FB                EI                  ENABLE INTERRUPT
                    ;                      CHECK CYCLE SWITCH WHILE NOT HOME
07D6 01 B8 0B          LXI  B,3000         BC = N = 3000 ;FOR 300 MSEC LOOP
                    DOTR01;                LOOP
07D9 CD AF 0B          CALL RDCYC            RDCYC(INCYC,INCYC,ADRESS,MRSTS1)
                    ;                              ( A    ,PSW:C, HL    , @HL  )
                    ;                              ( 0    , 0   , 0     , -    )
                    ;                        IF INCYC .EQ. TRUE
07DC DA ED 07          JC   DOTR02              BREAK
                    ;                        ENDIF
07DF CD 19 0B          CALL NPAUSE           NPAUSE(N  ,ZROFLG)
                    ;                              (BC ,PSW:Z )
                    ;                              (I/O, 0    )
07E2 C2 D9 07          JNZ  DOTR01           IF N .EQ. 0
                    ;                          TIMEOUT
                    ;                          CYC SWT SAYS MOTOR STILL HOME
                    ;                          FATAL ERROR, NOT IN CYCLE
07E5 3E 18             MVI  A,NINCYC           A = NINCYC
07E7 CD 80 08          CALL FATERR             FATERR(NINCYC,ERRFLG)
                    ;                                 ( A     ,PSW:Z )
                    ;                                 ( I     , 0    )
07EA C3 A0 08          JMP  FINTRP             TRY TO DRIVE METER HOME
                    ;                          RETURN
                    ;                        ENDIF
                    DOTR02;                ENDLOOP
                    ;                      CYCLE SWITCH SAYS CYCLE STARTED
                    ;                      MOVE FROM TRIP TO LOCK
07ED CD 96 18          CALL MVLOCK         MVLOCK(ERROR)
                    ;                            ( A    )
                    ;                            ( 0    )
07F0 B7                ORA  A              IF ERROR .NE. 0
                    ;                        DECLARE LOCK ERROR
07F1 C4 80 08          CNZ  FATERR           FATERR(ERROR,ERRFLG)
                    ;                              ( A    ,PSW:Z )
                    ;                              ( I    , 0    )
                    ;                      ENDIF
                    ;                      CHECK CYCLE SWITCH WHEN HOME AGAIN
07F4 01 10 27          LXI  B,10000        BC = N = 10000 ;FOR 1 SEC LOOP
                    DOTR03;                LOOP
07F7 CD AF 0B          CALL RDCYC            RDCYC(INCYC,INCYC,ADRESS,MRSTS1)
                    ;                              ( A    ,PSW:C, HL    , @HL  )
                    ;                              ( 0    , 0   , 0     , -    )
                    ;                        IF INCYC .EQ. FALSE
07FA D2 0D 08          JNC  DOTR04              BREAK
                    ;                        ENDIF
07FD CD 19 0B          CALL NPAUSE           NPAUSE(N  ,ZROFLG)
                    ;                              (BC ,PSW:Z )
                    ;                              (I/O, 0    )
0800 C2 F7 07          JNZ  DOTR03           IF N .EQ. 0
                    ;                          TIMEOUT
                    ;                          CYC SWT SAYS MOTOR NOT HOME
0803 E5                PUSH H                  SAVE HL
0804 CD D0 08          CALL FINTR4             FATAL ERROR, SLOW TRIP
0807 E1                POP  H                  RESTORE HL
0808 3E FB             MVI  A,0FBH             A = MASK, WILL SET:
                    ;                          MRSTS1.ENABLD = FALSE
080A C3 0F 08          JMP  DOTR05             DISABLE METER
                    ; >>JUMP AHEAD<<           STOP AC MOTOR
                    ;                          RETURN
                    ;                        ENDIF
                    DOTR04;                ENDLOOP
                    ;                      CYCLE SWITCH SAYS METER CAME HOME
                    ;                      INDICATE TRIP COMPLETION
080D 3E 7B             MVI  A,7BH          A = MASK, WILL SET:
                    ;                      MRSTS1.ENABLD = FALSE
                    ;                      MRSTS1.UNKSEL = FALSE
                    DOTR05;                >>TARGET OF JUMP AHEAD<<
                    ;                      UPDATE MRSTS1 ACCORDING TO MASK
080F A6                ANA  M              MRSTS1 = MASK .AND. MRSTS1
0810 77                MOV  M,A
                    DOTR06;                ****ALTERNATE ENTRY POINT
```

```
                    ;                        STOP AC MOTOR
     0811 21 01 70   LXI  H,PORTA            HL = ADDRESS, PORTA
     0814 7E         MOV  A,M                PORTA = PORTA .OR. HEX10
     0815 F6 10      ORI  10H
     0817 77         MOV  M,A
                    ;                      ENDIF
                    ;                    ENDIF
     0818 C9         RET                 RETURN

ENDENT
                    ;ENDENT(ERRFLG)(NORFLG)
                    ;      (BIT   )(BITSTR)
                    ;      ( 0    )( I    )
                    ;      (PSW:Z )( RAM  )
                    ;      ( C    )( NC   )
                    ;
                    ;PSW DESTROYED
                    ;REGISTERS DESTROYED
                    ;
                    ;PROCESS END OF ENTRY HEADER
                    ;
                    ENDENT;                  ****ENTRY POINT
     0819 3A 26 74   LDA  NORFLG/2+X     IF(NORFLG.CMBIN .AND.
                    ;                       NORFLG.AMTIN) .NE. TRUE
     081C 2F         CMA
     081D E6 30      ANI  30H
                    ;                      PROCEEDURAL ERROR
     081F C2 A1 0B   JNZ  PROERR           PROERR(ERRFLG)
                    ;                            (PSW:Z )
                    ;                            ( 0    )
                    ;                    ELSE
     0822 CD 4E 0F   CALL LSTATE           LSTATE(FATMOD,NORMOD,SERMOD,PRVMOD)
                    ;                            (PSW:S ,PSW:Z ,PSW:P ,PSW:CY)
                    ;                            ( 0    , 0    , 0    , 0    )
                    ;                      IF SERMOD .EQ. TRUE
                    ;                        SERVICE MODE END OF ENTRY
     0825 EA 63 0C   JPE  SEREOE             SEREOE(ERRFLG)
                    ;                              (PSW:Z )
                    ;                              ( 0    )
                    ;                      ELSE
                    ;                      IF PRVMOD .EQ. TRUE
                    ;                        MANUAL RESET
     0828 DA E9 09   JC   MANRST             MANRST(ERRFLG)
                    ;                              (PSW:Z )
                    ;                              ( 0    )
                    ;                      ELSE
                    ;                        VARIABLE REMOTE RESET
     082B C3 BE 13   JMP  VRMRS              VRMRS(ERRFLG)
                    ;                             (PSW:Z )
                    ;                             ( 0    )
                    ;                      ENDIF
                    ;                    ENDIF

ENTAMT
                    ;ENTAMT/ENTCMB(MSGBUF)(AMTBUF,CMBBUF,NORFLG)
                    ;             (NIBSTR)(NIBSTR,NIBSTR,BITSTR)
                    ;             ( I    )( 0    , 0    , 0    )
                    ;             ( @B   )( RAM  , RAM  , RAM  )
                    ;             ( NC   )( C    , C    , C    )
                    ;REGISTERS DESTROYED
                    ;PSW DESTROYED
                    ;
                    ;MOVE FIELD, FORMAT AND VALUE
                    ;FROM MESSAGE BUFFER TO APPROPRIATE RESET BUFFER
                    ;
                    ENTAMT;                  ****ENTRY POINT FOR RESET AMOUNT
     082E 0E E0      MVI  C,AMTBUF       C = OFFSET, DEST = OFFSET, AMTBUF
                    ;                    SET TO SET NORFLG.AMTIN = TRUE
     0830 3E 10      MVI  A,10H          A = MASK = HEX10
     0832 C3 39 08   JMP  ENTCM1
```

```
                 ; >>JUMP AHEAD<<
                 ENTCMB;                  ****ENTRY POINT FOR RESET COMBINATION
0835 0E F0         MVI  C,CMBBUF          C = OFFSET, DEST = OFFSET, CMBBUF
                 ;                        SET TO SET NORFLG.CMBIN = TRUE
0837 3E 20         MVI  A,20H             A = MASK = HEX20
                 ENTCM1;                  >>TARGET OF JUMP AHEAD<<
0839 21 26 74      LXI  H,NORFLG/2+X      HL = ADDRESS, NORFLG
                 ;                        UPDATE FLAG
083C B6            ORA  M                 NORFLG = NORFLG .OR. MASK
083D 77            MOV  M,A
                 ;                        FETCH COUNT FROM MESSAGE FORMAT
083E CD 35 0F      CALL GETNIB            GETNIB(CNT,ZERO,MSGBUF)
                 ;                              ( A ,PSW:Z, @B  )
                 ;                              ( 0 , 0   , I   )
                 ;                        INCLUDE LEAD ZERO AND FORMAT IN COUNT
0841 C6 03         ADI  3                 CNT = (CNT+3) .AND. HEXFE
0843 E6 FE         ANI  0FEH
                 ;                        MOVE MESSAGE TO DESTINATION BUFFER
0845 C3 B3 0F      JMP  MVLNIB            MVLNIB(DEST,MSGBUF,CNT,PSW)
                 ;                              ( @C , @B   , A ,PSW)
                 ;                              ( 0  , I    , I , 0 )
                 ;                        RETURN

ENTSER
                 ;ENTSER()(MRSTS1)
                 ;         (BITSTR)
                 ;         ( 0    )
                 ;         ( RAM  )
                 ;         ( C    )
                 ;
                 ;PSW DESTROYED
                 ;REGISTERS DESTROYED
                 ;
                 ;ENTER SERVICE MODE
                 ;
                 ENTSER;                  ****ENTRY POINT
0848 21 24 74      LXI  H,MRSTS1/2+X      HL = ADDRESS, MRSTS1
084B 7E            MOV  A,M               MRSTS1.SERMOD = TRUE
084C F6 08         ORI  08H
084E E6 FB         ANI  0FBH              MRSTS1.ENABLD = FALSE
0850 77            MOV  M,A
0851 C9            RET                    RETURN

EXTSER
                 ;EXTSER()(MRSTS1,NORFLG)
                 ;         (BITSTR,BITSTR)
                 ;         ( 0    , 0     )
                 ;         ( RAM  , RAM   )
                 ;         ( C    , C     )
                 ;
                 ;PSW DESTROYED
                 ;REGISTERS DESTROYED
                 ;
                 ;EXIT SERVICE MODE
                 ;
                 EXTSER;                  ****ENTRY POINT
0852 21 24 74      LXI  H,MRSTS1/2+X      HL = ADDRESS, MRSTS1
0855 7E            MOV  A,M               MRSTS1.SERMOD = FALSE
0856 E6 F7         ANI  0F7H
0858 77            MOV  M,A
0859 23            INX  H                 HL = ADDRESS, NORFLG
085A 23            INX  H
085B 7E            MOV  A,M               NORFLG.COMDSB = FALSE
085C E6 FB         ANI  0FBH
085E 77            MOV  M,A
085F C9            RET                    RETURN

EXTTRP
                 ;EXTTRP()(KDCTRL,MRSTS1,MTRCHR,SERFLG)
                 ;         (BITSTR,BITSTR,BITSTR,BITSTR)
```

```
                 ;        ( I    , I    , I    , I    )
                 ;        ( RAM  , RAM  , RAM  , RAM  )
                 ;        ( NC   , NC   , NC   , NC   )
                 ;
                 ;REGISTERS DESTROYED
                 ;PSW DESTROYED
                 ;
                 ;INITIATE TRIP IN RESPONSE TO EXTERNAL MESSAGE
                 ;
                 EXTTRP;                 ****ENTRY POINT
                 ;                       SET TO REACH PROERR VIA RETURN
0860 21 A1 0B      LXI  H,PROERR
0863 E5            PUSH H
0864 3A 27 74      LDA KDCTRL/2+X        PSW:CY = KDCTRL.KBDDSB
0867 1F            RAR
                 ;                       IF KDCTRL.KBDDSB .EQ. FALSE
                 ;                         KEYBOARD HAS NOT BEEN DISABLED
0868 D0            RNC                     PROERR(ERRFLG)
                 ;                       ELSE
0869 21 24 74      LXI  H,MRSTS1/2+X     HL = ADDRESS, MRSTS1
086C 7E            MOV  A,M              PSW:Z =DISABL=MRSTS1.ENABLD .EQ. FALSE
086D E6 04         ANI  4
                 ;                       IF DISABL .EQ. TRUE
                 ;                         METER IS DISABLED
086F C8            RZ                      PROERR(ERRFLG)
                 ;                       ELSE
0870 2B            DCX  H                  HL = ADDRESS, MTRCHR
0871 3A 10 74      LDA  SERFLG/2+X         A.2 = (.NOT. SERFLG.SNOLCK) .OR.
                 ;                               MTRCHR.TRPCTL
0874 17            RAL
0875 2F            CMA
0876 B6            ORA  M
0877 E6 20         ANI  20H                 PSW:Z = TRPLCK = A.2 .EQ. FALSE
                 ;                          IF TRPLCK .EQ. TRUE
                 ;                            RESPONSE TO EXT TRIP IS FORBIDDEN
0879 C8            RZ                         PROERR(ERRFLG)
                 ;                          ELSE
                 ;                            EXTERNAL TRIPPING ALLOWED
087A E1            POP  H                     CLEAN UP STACK
087B C3 A5 07      JMP  DOTRIP                TRIP METER
                 ;                          ENDIF
                 ;                       ENDIF
                 ;                       RETURN

FATERR
                 ;FATERR(CODE,ERRFLG)(MRSTS2,ERRCOD,NORFLG,ERRCNT)
                 ;      (BYTE,BIT   )(BITSTR,BYTE  ,BITSTR,NIBSTR)
                 ;      ( I   , O   )( O    , O    , O    , O    )
                 ;      ( A   ,PSW:Z )( RAM  , RAM  , RAM  , RAM  )
                 ;      ( C   , C   )( C    , C    , C    , C    )
                 ;
                 ;PSW DESTROYED
                 ;REGISTERS DESTROYED
                 ;
                 ;PROCESS FATAL ERROR
                 ;
                 FATINT;                 ****ENTRY POINT FROM INTERRUPT VECTOR
                 ;                       INDICATE WATCHDOG INTERRUPT OR
                 ;                       INCORRECTLY ENABLED TEST INTERRUPT
087E 3E 17         MVI  A,BARF           A = BARF
                 FATERR;                 ****ENTRY POINT
0880 21 25 74      LXI  H,MRSTS2/2+X     HL = ADDRESS, MRSTS2
0883 46            MOV  B,M              IF MRSTS2.FATMOD .EQ. FALSE
0884 04            INR  B
0885 FA 9E 08      JM   FATE01
0888 32 0A 74      STA  ERRCOD/2+X         ERRCOD = CODE
088B 7E            MOV  A,M                MRSTS2.FATMOD = TRUE
088C F6 80         ORI  80H
088E 77            MOV  M,A
088F 23            INX  H                  HL = ADDRESS, NORFLG
0890 7E            MOV  A,M                NORFLG.QUESTS = TRUE
```

```
0891 F6 80          ORI  80H
0893 77             MOV  M,A
0894 21 0B 74       LXI  H,ERRCNT/2+X     HL = ADDRESS, ERRCNT
0897 7E             MOV  A,M              ERRCNT[0..1] = ERRCNT[0..1]+1
0898 3C             INR  A
0899 27             DAA
089A 77             MOV  M,A
089B CD 64 04       CALL PERDSP            MAKE ERROR DISPLAY
                   FATE01;                ENDIF
089E AF             XRA  A                PSW:Z = ERRFLG = TRUE
089F C9             RET                   RETURN

FINTRP
                   ;FINTRP()(MRSTS1,PORTA )
                   ;        (BITSTR,BITSTR)
                   ;        ( 0    , 0    )
                   ;        ( RAM  , 7001 )
                   ;        ( C    , C    )
                   ;
                   ;REGISTERS DESTROYED
                   ;PSW DESTROYED
                   ;
                   ;ATTEMPT TO DRIVE METER HOME
                   ;
                   FINTRP;                ****ENTRY POINT
                   ;                      START AC MOTOR
08A0 21 01 70       LXI  H,PORTA          HL = ADDRESS, PORTA
08A3 7E             MOV  A,M              PORTA = PORTA .AND. HEXEF
08A4 E6 EF          ANI  0EFH
08A6 77             MOV  M,A
                   ;                      DRIVE METER FOR 0.2 SEC. TO INSURE
                   ;                      THAT METER AT START OF TRIP CYCLE IS
                   ;                      DRIVEN FAR ENOUGH TO MAKE THE CYCLE
                   ;                      SWITCH AGREE WITH THE METER STATE.
08A7 01 D0 07       LXI  B,2000           BC = N = 2000; FOR 0.2 SEC. LOOP
                   FINTR1;                DO UNTIL N .EQ. 0
08AA CD 19 0B       CALL NPAUSE             NPAUSE(N  ,ZROFLG)
                   ;                               (BC ,PSW:Z )
                   ;                               (I/O, 0    )
08AD C2 AA 08       JNZ  FINTR1
                   ;                      ENDDO
                   ;                      NOW DRIVE METER HOME
08B0 01 40 1F       LXI  B,8000           BC = N = 8000; FOR 0.8 SEC. LOOP
                   FINTR2;                LOOP
                   ;                        READ CYCLE SWITCH
08B3 CD AF 0B       CALL RDCYC              RDCYC(INCYC,INCYC,ADRESS,MRSTS1)
                   ;                              ( A   ,PSW:C, HL   , @HL  )
                   ;                              ( 0   , 0   , 0    , -    )
                   ;                        IF INCYC .EQ. FALSE
08B6 D2 BF 08       JNC  FINTR3               BREAK
                   ;                        ENDIF
08B9 CD 19 0B       CALL NPAUSE             NPAUSE(N  ,ZROFLG)
                   ;                               (BC ,PSW:Z )
                   ;                               (I/O, 0    )
08BC C2 B3 08       JNZ  FINTR2             IF N .EQ. 0
                   ;                          BREAK
                   ;                        ENDIF
                   FINTR3;                ENDLOOP
08BF CD 11 08       CALL DOTR06           STOP AC MOTOR
                   ;                      READ CYCLE SWITCH
08C2 CD AF 0B       CALL RDCYC            RDCYC(INCYC,INCYC,ADRESS,MRSTS1)
                   ;                            ( A   ,PSW:C, HL   , @HL  )
                   ;                            ( 0   , 0   , 0    , -    )
08C5 F5             PUSH PSW              SAVE A, PSW
                   ;                      COPY INCYC INTO MRSTS1
08C6 E6 82          ANI  82H
08C8 57             MOV  D,A
08C9 7E             MOV  A,M
08CA E6 7D          ANI  7DH
08CC B2             ORA  D
```

```
08CD 77         MOV  M,A          MRSTS1.UNKSEL = INCYC
               ;                  MRSTS1.INCYC  = INCYC
08CE F1         POP  PSW          RESTORE A, PSW
08CF D0         RNC               IF INCYC .EQ. TRUE
               ;                    CYC SWT SAYS METER DIDN'T COME HOME
               FINTR4;              ****ALTERNATE ENTRY POINT
               ;                    FATAL ERROR, SLOW TRIP
08D0 3E 08      MVI  A,TRPTIM       A = TRPTIM
08D2 C3 80 08   JMP  FATERR         FATERR(TRPTIM,ERRFLG)
               ;                          ( A    ,PSW:Z )
               ;                          ( I    , 0    )
               ;                  ENDIF
               ;                  RETURN

HDRONY
               ;HDRONY(HEADER,ERRFLG)(NORFLG,XMTBUF)
               ;      (BYTE  ,BIT   )(BITSTR,NIBSTR)
               ;      ( I    , 0    )( 0    , I    )
               ;      ( A    ,PSW:Z )( RAM  , RAM  )
               ;      ( NC   , C    )( C    , NC   )
               ;
               ;REGISTERS DESTROYED
               ;PSW DESTROYED
               ;
               ;INITIATE PROCESSING  RELATED TO HEADERS WHICH CONSIST
               ;OF A HEADER NOT FOLLOWED BY DATA
               ;
               HDRONY;            ****ENTRY POINT
08D5 B7         ORA  A            PSW:Z = ERRFLG = HEADER .EQ. HEX00
08D6 F5         PUSH PSW          SAVE A, PSW
08D7 21 1F 09   LXI  H,HDR002     SET TO RETURN TO ENDCASE
08DA E5         PUSH H
               ;                  CASE (HEADER)
08DB FE 41      CPI  HENABL         **41: ENABLE METER
08DD CA F3 05   JZ   CMDENB
08E0 FE 42      CPI  HDISAB         **42: DISABLE METER
08E2 CA CD 05   JZ   CMDDSB
08E5 FE 46      CPI  HSETSV         **46: ENTER SERVICE MODE
08E7 CA 48 08   JZ   ENTSER
08EA FE 47      CPI  HCLRSV         **47: EXIT SERVICE MODE
08EC CA 52 08   JZ   EXTSER
08EF FE 4E      CPI  HEXTRP         **4E: EXTERNAL TRIP
08F1 CA 60 08   JZ   EXTTRP
08F4 FE 50      CPI  HREQST         **50: STATUS REQUEST
08F6 C8         RZ                        CONTINUE
08F7 FE 62      CPI  HENAKB         **62: ENABLE KEYBOARD
08F9 CA 14 0F   JZ   ENAKBD
08FC FE 63      CPI  HDISKB         **63: DISABLE KEYBOARD
08FE CA 02 0F   JZ   DSBKBD
0901 21 1C 09   LXI  H,HDR001       SET TO RETURN TO ALTERNATE ENDCASE
0904 E3         XTHL
0905 FE 40      CPI  HREQAC         **40: ACCESS CODE REQUEST
0907 CA EE 12   JZ   ACCODE               ACCODE(ERRFLG)
               ;                                 (PSW:Z )
               ;                                 ( 0    )
090A FE 43      CPI  HENDEN         **43: END OF ENTRY
090C CA 19 08   JZ   ENDENT               ENDENT(ERRFLG)
               ;                                 (PSW:Z )
               ;                                 ( 0    )
090F FE 51      CPI  HREQPO         **51: SELECTION VALUE REQUEST
0911 CA 48 0C   JZ   SELVAL               SELVAL(ERRFLG)
               ;                                 (PSW:Z )
               ;                                 ( 0    )
0914 FE 5C      CPI  HREQSN         **5C: SERIAL NUMBER REQUEST
0916 CA 8D 06   JZ   DBLH01               DBLH01(TRUE ,ERRFLG)
               ;                                 (PSW:Z,PSW:Z )
               ;                                 ( I   , 0    )
               ;                    **ELSE: DOUBLY DEFINED HEADER
0919 C3 71 06   JMP  DBLHDR               DBLHDR(HEADER,ERRFLG)
               ;                                 ( A    ,PSW:Z )
               ;                                 ( I    , 0    )
```

```
                 HDR001;                ALTERNATE ENDCASE, SAVES NEW ERRFLG
                 ;                      PSW:Z = ERRFLG
091C C1            POP  B               A = HEADER
091D 78            MOV  A,B
091E F5            PUSH PSW               SAVE A, PSW
                 HDR002;                ENDCASE
091F 21 26 74      LXI  H,NORFLG/2+X    HL = ADDRESS, NORFLG
0922 3A 50 74      LDA  XMTBUF/2+X      IF XMTBUF[0..1] .EQ. 0
0925 B7            ORA  A
0926 C2 2D 09      JNZ  HDR003
                 ;                        QUE DEFAULT STATUS MESSAGE
0929 7E            MOV  A,M               NORFLG.QUESTS = TRUE
092A F6 80         ORI  80H
092C 77            MOV  M,A
                 HDR003;                ENDIF
092D F1            POP  PSW             A = HEADER
092E F5            PUSH PSW
092F FE 42         CPI  HDISAB          IF HEADER .NE. HDISAB
0931 CA 3F 09      JZ   HDR005
0934 E6 F0         ANI  0F0H              IF (HEADER .AND. HEXF0) .NE. HEX50
0936 FE 50         CPI  50H
0938 CA 3F 09      JZ   HDR004
                 ;                          CANCEL ANY RESET IN PROGRESS
093B 7E            MOV  A,M
093C E6 CF         ANI  0CFH
093E 77            MOV  M,A                 NORFLG.CMBIN = FALSE
                 ;                          NORFLG.AMTIN = FALSE
                 HDR004;                  ENDIF
                 HDR005;                ENDIF
093F F1            POP  PSW             A = HEADER
                 ;                      PSW:Z = ERRFLG
0940 C9            RET                  RETURN

HDRPLS

                 ;HDRPLS(HEADER,MSGBUF,ERRFLG)(NORFLG)
                 ;      (BYTE  ,NIBSTR,BIT   )(BITSTR)
                 ;      ( I    , I    , O    )( O     )
                 ;      ( A    , @B   ,PSW:Z )( RAM   )
                 ;      ( NC   , NC   , C    )( C     )
                 ;
                 ;REGISTERS DESTROYED
                 ;PSW DESTROYED
                 ;
                 ;INITIATE PROCESSING RELATED TO HEADERS WHICH CONSIST
                 ;OF A HEADER ASSOCIATED WITH DATA
                 ;
                 HDRPLS;                ****ENTRY POINT
0941 B7            ORA  A               PSW:Z = ERRFLG = HEADER .EQ. HEX00
0942 F5            PUSH PSW             SAVE A, PSW
0943 21 26 74      LXI  H,NORFLG/2+X    HL = ADDRESS, NORFLG
                 ;                      CHECK FOR INTERRUPTED RESET SEQUENCE
0946 FE C5         CPI  HENTAM          IF HEADER .NE. HENTAM
0948 CA 54 09      JZ   HDRP02
094B FE C6         CPI  HENTCO            IF HEADER .NE. HENTCO
094D CA 54 09      JZ   HDRP01
0950 7E            MOV  A,M
0951 E6 CF         ANI  0CFH
0953 77            MOV  M,A                 NORFLG.CMBIN. = FALSE
                 ;                          NORFLG.AMTIN = FALSE
                 HDRP01;                  ENDIF
                 HDRP02;                ENDIF
                 ;                      QUE STATUS MESSAGE
0954 7E            MOV  A,M             NORFLG.QUESTS = TRUE
0955 F6 80         ORI  80H
0957 77            MOV  M,A
0958 F1            POP  PSW             A = HEADER
0959 F5            PUSH PSW
095A 21 7C 09      LXI  H,HDRP04        SET TO RETURN TO ENDCASE
095D E5            PUSH H
                 ;                      CASE (HEADER)
095E FE C5         CPI  HENTAM            **C5: ENTER AMOUNT
```

```
0960 CA 2E 08    JZ   ENTAMT              ENTAMT(MSGBUF)
                                                 ( @B   )
                 ;                               ( I    )
                 ;
0963 FE C6       CPI  HENTCO           **C6: ENTER COMBINATION
0965 CA 35 08    JZ   ENTCMB                 ENTCMB(MSGBUF)
                 ;                               ( @B   )
                 ;                               ( I    )
0968 21 79 09    LXI  H,HDRP03         SET TO RETURN TO ALTERNATE ENDCASE
096B E3          XTHL
096C FE C0       CPI  HSETMN           **C0: ENTER SERIAL NUMBER
096E CA 38 0A    JZ   MSERNO                 MSERNO(MSGBUF,ERRFLG)
                 ;                               ( @B   ,PSW:Z )
                 ;                               ( I    , 0    )
0971 FE C1       CPI  HSETPO           **C1: SET POSTAGE
0973 CA 9F 0C    JZ   SETPOS                 SETPOS(MSGBUF,ERRFLG)
                 ;                               ( @B   ,PSW:Z )
                 ;                               ( I    , 0    )
                 ;                     **ELSE: PROCESS ERROR
0976 C3 A1 0B    JMP  PROERR                 PROERR(ERRFLG)
                 ;                               (PSW:Z )
                 ;                               ( 0    )
                 HDRP03;               ALTERNATE ENDCASE, SAVES NEW ERRFLG
0979 C1          POP  B                A = HEADER
097A 78          MOV  A,B              PSW:Z = ERRFLG
097B F5          PUSH PSW              SAVE A, PSW
                 HDRP04;              ENDCASE
097C F1          POP  PSW             A = HEADER
                 ;                    PSW:Z = ERRFLG
097D C9          RET                  RETURN

IDLE
                 ;IDLE()(CTLBKT,KDCTRL,MRSTS1,NORFLG,RECBUF,XMTBUF)
                 ;      (BYTE  ,BITSTR,BITSTR,BITSTR,BYTSTR,BYTSTR)
                 ;      ( I    , I    , I/O  , I    , I    , I    )
                 ;      ( RAM  , RAM  , RAM  , RAM  , RAM  , RAM  )
                 ;      ( NC   , NC   , C    , NC   , NC   , NC   )
                 ;
                 ;MAINLINE IDLE LOOP
                 ;
                 IDLE;                LOOP
097E FB          EI                     ENABLE INTERRUPTS
                 ;                      SET TO RESTART LOOP
097F 21 7E 09    LXI  H,IDLE            HL = ADDRESS, IDLE
0982 E5          PUSH H                 PUSH HL, USED BY RETURN STATEMENTS
                 ;                      UPDATE METER STATUS:
0983 CD 78 07    CALL DOSTAT            WITH RESPECT TO SWITCHES/SENSORS
0986 CD 23 0B    CALL POSUPD            WITH RESPECT TO POSTAGE SETTING
0989 CD 68 10    CALL NVMCHG            WITH RESPECT TO NONVOLATILE MEMORY
098C 3A 50 74    LDA  XMTBUF/2+X        A = XMTBUF[0]
098F B7          ORA  A                 IF XMTBUF[0] .NE. 0
0990 C2 15 0E    JNZ  XMIT                TRANSMIT MESSAGE
                 ;                      ELSE
0993 3A 26 74    LDA  NORFLG/2+X        A = NORFLG
0996 4F          MOV  C,A               C = NORFLG
0997 17          RAL                    PSW:CY = NORFLG.QUESTS
                 ;                      IF NORFLG.QUESTS .EQ. TRUE
0998 DA F4 0A    JC   MTRSTS              TRANSMIT METER STATUS
                 ;                      ELSE
099B 17          RAL                    PSW:CY = NORFLG.QUEPOS
099C D2 A4 09    JNC  IDLE01            IF NORFLG.QUEPOS .EQ. TRUE
                 ;                        REQUEST POSTAGE SETTING
099F 3E 51       MVI  A,HREQPO            A = HREQPO
09A1 C3 C7 0D    JMP  XEQHDR              XEQHDR(HREQPO,ERRFLG)
                 ;                               ( A    ,PSW:Z )
                 ;                               ( I    , 0    )
                 IDLE01;
                 ;                      ELSE
09A4 CD 4E 0F    CALL LSTATE            LSTATE(FATMOD,NORMOD,SERMOD,PRVMOD)
                 ;                          (PSW:S ,PSW:Z ,PSW:P ,PSW:CY)
                 ;                          ( 0    , 0    , 0    , 0    )
09A7 C2 D1 09    JNZ  IDLE03            IF NORMOD .EQ. TRUE
```

```
09AA 21 24 74   LXI  H,MRSTS1/2+X      HL = ADDRESS, MRSTS1
09AD 7E         MOV  A,M               PSW:CY = MRSTS1.QUEREG
09AE 1F         RAR
09AF D2 D1 09   JNC  IDLE02            IF MRSTS1.QUEREG .EQ. TRUE
               ;                         TRIP HAS COMPLETED NORMALLY
09B2 B7         ORA  A                   MRSTS1.QUEREG = FALSE
09B3 17         RAL
09B4 77         MOV  M,A
09B5 21 2B 74   LXI  H,CTLBKT/2+X        HL = ADDRESS, CTLBKT
09B8 3E 41      MVI  A,41H               PSW:Z = CTLBKT .EQ. HEX41
09BA AE         XRA  M
09BB 3E 52      MVI  A,HREQAR            A = HREQAR
               ;                         IF CTLBKT .EQ. HEX41
               ;                           REQUEST ASCENDING REGISTER
09BD CA C7 0D   JZ   XEQHDR                XEQHDR(HREQAR,ERRFLG)
               ;                                 ( A    ,PSW:Z )
               ;                                 ( I    , 0    )
               ;                         ELSE
09C0 3E 31      MVI  A,31H               PSW:Z = CTLBKT .EQ. HEX31
09C2 AE         XRA  M
09C3 3E 53      MVI  A,HREQDR            A = HREQDR
               ;                         IF CTLBKT .EQ. HEX31
               ;                           REQUEST DESCENDING REGISTER
09C5 CA C7 0D   JZ   XEQHDR                XEQHDR(HREQDR,ERRFLG)
               ;                                 ( A    ,PSW:Z )
               ;                                 ( I    , 0    )
               ;                         ELSE
09C8 3E 21      MVI  A,21H               PSW:Z = CTLBKT .EQ. HEX21
09CA AE         XRA  M
09CB 3E 55      MVI  A,HREQPC            A = HREQPC
               ;                         IF CTLBKT .EQ. HEX21
               ;                           REQUEST PIECE COUNT
09CD CA C7 0D   JZ   XEQHDR                XEQHDR(HREQPC,ERRFLG)
               ;                                 ( A    ,PSW:Z )
               ;                                 ( I    , 0    )
               ;                         ENDIF
09D0 C9         RET
               IDLE02;                 ENDIF
               IDLE03;               ELSE
09D1 3A 48 74   LDA  RECBUF/2+X      A = RECBUF[0]
09D4 B7         ORA  A               IF RECBUF[0] .NE. 0
09D5 C2 EE 09   JNZ  MESAGE            PROCESS MESSAGE
               ;                     ELSE
09D8 3E 08      MVI  A,08H           PSW:Z = NORFLG.TRPREQ .EQ. FALSE
09DA A1         ANA  C
09DB CA E6 09   JZ   IDLE04          IF NORFLG.TRPREQ .EQ. TRUE
09DE 3A 27 74   LDA  KDCTRL/2+X        PSW:CY = KDCTRL.KBDDSB
09E1 1F         RAR
               ;                       IF KDCTRL.KBDDSB .EQ. FALSE
09E2 D2 A5 07   JNC  DOTRIP              PROCESS TRIP REQUEST
               ;                       ENDIF
09E5 C9         RET
               IDLE04;               ELSE
09E6 C3 2E 03   JMP  KEYBRD            PROCESS KEYBOARD
               ;                     ENDIF
               ;                   ENDLOOP

MANRST
               ;MANRST
               ;
               ;REGISTERS DESTROYED
               ;PSW DESTROYED
               ;
               ;MANUAL METER RESET
               ;
               MANRST;             ****ENTRY POINT
               ;                   DECLARE SOFTWARE ERROR
09E9 3E 02      MVI  A,SFTWRE      A = SFTWRE
09EB C3 80 08   JMP  FATERR        FATERR(SFTWRE,ERRFLG)
               ;                         ( A    ,PSW:Z )
               ;                         ( I    , 0    )
               ;                   RETURN
```

```
MESAGE
                  ;MESAGE()(RECBUF,XMTBUF,DBUF   )
                  ;        (NIBSTR,NIBSTR,NIBSTR)
                  ;        ( I/O   , I     , O    )
                  ;        ( RAM   , RAM   , RAM  )
                  ;        ( C     , NC    , C    )
                  ;
                  ;PSW DESTROYED
                  ;REGISTERS DESTROYED
                  ;
                  ;PROCESS MESSAGE RECEIVED FROM EXTERNAL DEVICE
                  ;
                  MESAGE;                   ****ENTRY POINT
                  ;                         REMEMBER IF XMTBUF CLEAR ON ENTRY
09EE 3A 50 74       LDA  XMTBUF/2+X         PSW:Z = XMTCLR = XMTBUF[0..1] .EQ. 0
09F1 B7             ORA  A
09F2 F5             PUSH PSW                SAVE A, PSW
09F3 21 48 74       LXI  H,RECBUF/2+X       HL = ADDRESS, RECBUF[0..1]
                  ;                         FETCH MESSAGE SIZE, IN BYTES
09F6 4E             MOV  C,M                C = SIZE = RECBUF[0..1]
                  ;                         FLAG MESSAGE AS PROCESSED
09F7 36 00          MVI  M,0                RECBUF[0..1] = 0
09F9 23             INX  H                  HL = ADDRESS, RECBUF[2..3]
09FA 0D             DCR  C                  C = SIZE-1
09FB C2 1A 0A       JNZ  MESAG3             IF (SIZE-1) .EQ. 0
09FE 7E             MOV  A,M                  A = HEADER = RECBUF[2..3]
                  ;                           PROCESS MESSAGE WITHOUT DATA
09FF CD D5 08       CALL HDRONY               HDRONY(HEADER,ERRFLG)
                  ;                                 ( A     ,PSW:Z )
                  ;                                 ( I     , O    )
0A02 CA 17 0A       JZ   MESAG2               IF ERRFLG .EQ. FALSE
0A05 FE 51          CPI  HREQPO                 IF HEADER .EQ. HREQPO
0A07 C2 17 0A       JNZ  MESAG1
                  ;                               REVERT TO SETTING DISPLAY
0A0A 01 80 A2       LXI  B,(XMTBUF+2)*100H+DBUF+0
                  ;                               B = OFFSET, XMTBUF[2]
                  ;                               C = OFFSET, DBUF[0]
0A0D 3A 50 74       LDA  XMTBUF/2+X               A = NIBCNT = XMTBUF[0..1]*2
0A10 87             ADD  A
0A11 CD B3 0F       CALL MVLNIB                   MVLNIB(DBUF[0],XMTBUF[2],NIBCNT,
                  ;                                      ( @C     , @B       , A    ,
                  ;                                      ( O      , I        , I    ,
                  ;
                  ;                                      NONBCD,ZERO )
                  ;                                      PSW:S ,PSW:Z)
                  ;                                       O    , O    )
0A14 CD 5A 05       CALL VALDSP                   DISPLAY CONTENTS OF DBUF
                  MESAG1;                       ENDIF
                  MESAG2;                     ENDIF
0A17 C3 31 0A       JMP  MESAG6
                  MESAG3;                   ELSE
                  ;                           CHECK FORMAT AGAINST MESSAGE SIZE
0A1A 06 94          MVI  B,RECBUF+4           B = OFFSET, RECBUF[4]
0A1C CD 35 0F       CALL GETNIB               GETNIB(NIBCNT,ZERO ,RECBUF[4])
                  ;                                 ( A     ,PSW:Z, @B       )
                  ;                                 ( O     , O   , I        )
0A1F 3C             INR  A                    A = BYTCNT = (NIBCNT+1)/2
0A20 B7             ORA  A
0A21 1F             RAR
0A22 0D             DCR  C                    C = SIZE-2
0A23 B9             CMP  C                    IF BYTCNT .EQ. (SIZE-2)
0A24 C2 2E 0A       JNZ  MESAG4
                  ;                             PROCESS MESSAGE WITH DATA
0A27 7E             MOV  A,M                    A = HEADER = RECBUF[2..3]
0A28 CD 41 09       CALL HDRPLS                 HDRPLS(HEADER,RECBUF[4],ERRFLG)
                  ;                                   ( A     , @B       ,PSW:Z )
                  ;                                   ( I     , I        , O    )
0A2B C3 31 0A       JMP  MESAG5
                  MESAG4;                     ELSE
                  ;                             BAD MESSAGE, PROCEEDURAL ERROR
0A2E CD A1 0B       CALL PROERR                 PROERR(ERRFLG)
```

```
                       ;                          (PSW:Z )
                       ;                          ( 0    )
                       MESAG5;              ENDIF
                       MESAG6;            ENDIF
                       ;                  CHECK FOR OVERLAY OF TRANSMIT BUFFER
     0A31 F1             POP  PSW         PSW:Z = XMTCLR
     0A32 3E 12          MVI  A,BUFOVR    A = BUFOVR
                       ;                  IF XMTCLR .EQ. FALSE
                       ;                    BUFFER OVERLAY, FATAL ERROR
     0A34 C4 80 08       CNZ  FATERR        FATERR(BUFOVR,ERRFLG)
                       ;                          ( A     ,PSW:Z )
                       ;                          ( I     , 0    )
                       ;                  ENDIF
     0A37 C9             RET              RETURN

MSERNO
                       ;MSERNO(MSGBUF,ERRFLG)(ASCCRC,ASCREG,CTLCRC,DSCCRC,DSCREG,
                       ;       (NIBSTR,BIT   )(BYTE  ,NIBSTR,BYTE  ,BYTE  ,NIBSTR,
                       ;       ( I    , 0    )( 0    , 0    , 0    , 0    , 0    ,
                       ;       ( @B   ,PSW:Z )( RAM  , RAM  , RAM  , RAM  , RAM  ,
                       ;       ( NC   , C    )( C    , C    , C    , C    , C    ,
                       ;
                       ;        ERRCNT,ERRCOD,PCEREG,SERFLG,SERNUM)
                       ;        NIBSTR,BYTE  ,NIBSTR,BITSTR,NIBSTR)
                       ;         0    , 0    , 0    , I/0  , I/0  )
                       ;         RAM  , RAM  , RAM  , RAM  , RAM  )
                       ;         C    , C    , C    , C    , C    )
                       ;
                       ;PSW DESTROYED
                       ;REGISTERS DESTROYED
                       ;
                       ;REDEFINE UNLOCKED SERIAL NUMBER OR
                       ;LOCK SERIAL NUMBER TO PREVENT FURTHER REDEFINITION
                       ;
                       MSERNO;                 ****ENTRY POINT
                       ;                       SET TO REACH PROERR VIA RETURN
     0A38 21 A1 0B       LXI  H,PROERR
     0A3B E5             PUSH H
                       ;                       CONVERT OFFSET INTO ADDRESS
     0A3C 16 74          MVI  D,X/100H         DE = ADDRESS, MSGBUF[0..1]
     0A3E AF             XRA  A
     0A3F 78             MOV  A,B
     0A40 1F             RAR
     0A41 5F             MOV  E,A
                       ;                       ADJUST OFFSET
     0A42 04             INR  B                B = OFFSET, MSGBUF[3]
     0A43 04             INR  B
     0A44 04             INR  B
                       ;                       CHECK FOR VARIOUS ERROR CONDITIONS
     0A45 CD 4E 0F       CALL LSTATE           LSTATE(FATMOD,NORMOD,SERMOD,PRVMOD)
                       ;                             (PSW:S ,PSW:Z ,PSW:P ,PSW:CY)
                       ;                             ( 0    , 0    , 0    , 0    )
                       ;                       IF FATMOD .EQ. TRUE
                       ;                         METER HAS FATALED
     0A48 F8             RM                      PROERR(ERRFLG)
                       ;                         RETURN
                       ;                       ELSE
                       ;                       IF SERMOD .EQ. FALSE
                       ;                         METER NOT IN SERVICE MODE
     0A49 E0             RPO                     PROERR(ERRFLG)
                       ;                         RETURN
                       ;                       ELSE
     0A4A 3A 10 74       LDA  SERFLG/2+X       PSW:Z = OPEN = SERFLG.SNOLCK .EQ. TRUE
     0A4D E6 10          ANI  10H
                       ;                       IF OPEN .EQ. FALSE
                       ;                         METER NUMBER ALREADY LOCKED
     0A4F C0             RNZ                     PROERR(ERRFLG)
                       ;                         RETURN
                       ;                       ELSE
     0A50 1A             LDAX D                PSW:Z = FMTOK = MSGBUF[0..1].EQ.HEX8F
     0A51 FE 8F          CPI  8FH
```

```
                       ;           IF FMTOK .EQ. FALSE
                       ;             NOT 8 CHARACTERS WITHOUT DECIMAL
     0A53 C0            RNZ          PROERR(ERRFLG)
                       ;             RETURN
                       ;           ELSE
     0A54 13            INX  D     DE = ADDRESS, MSGBUF[2..3]
     0A55 1A            LDAX D     A = MSGBUF[2..3]
     0A56 FE 20         CPI  20H   PSW:CY = CODEOK = MSGBUF[2..3].LT.HEX20
                       ;           IF CODEOK .EQ. FALSE
                       ;             CODE IS NOT 0 OR 1
     0A58 D0            RNC          PROERR(ERRFLG)
                       ;             RETURN
                       ;           ENDIF
                       ;           PROCESS ACCORDING TO CODE IN MSGBUF[2]
     0A59 FE 10         CPI  10H   PSW:CY = CODE0 = MSGBUF[2..3].LT.HEX10
     0A5B 3E 07         MVI  A,7   A = NIBCNT = 7
     0A5D D2 6D 0A      JNC MSERN1 IF CODE0 .EQ. TRUE
                       ;             SERIAL NUMBER IS BEING ENTERED
                       ;             CHECK INPUT DATA
     0A60 48            MOV  C,B     C = OFFSET, MSGBUF[3]
     0A61 CD B3 0F      CALL MVLNIB  MVLNIB(MSGBUF[3],MSGBUF[3],NIBCNT,
                       ;                   ( @C       , @B       , A     ,
                       ;                   ( O        , I        , I     ,
                       ;
                       ;                   NONBCD,ZROFLG)
                       ;                   PSW:S ,PSW:Z )
                       ;                    O     , O     )
                       ;             IF NONBCD .EQ. TRUE
                       ;               BAD INPUT
     0A64 F8            RM             PROERR(ERRFLG)
                       ;             ELSE
                       ;               STORE NEW SERIAL NUMBER
     0A65 0E 21         MVI  C,SERNUM  C = OFFSET, SERNUM
     0A67 CD B3 0F      CALL MVLNIB    MVLNIB(SERNUM[0],MSGBUF[3],NIBCNT,
                       ;                     ( @C       , @B       , A     ,
                       ;                     ( O        , I        , I     ,
                       ;
                       ;                     NONBCD,ZROFLG)
                       ;                     PSW:S ,PSW:Z )
                       ;                      O     , O     )
                       ;             ENDIF
     0A6A E1            POP  H       CLEAN UP STACK
     0A6B 0C            INR  C       PSW:Z = ERRFLG = (C+1).EQ.0 = FALSE
     0A6C C9            RET
                      MSERN1;      ELSE
                       ;             SERIAL NUMBER IS BEING LOCKED
                       ;             CHECK INPUT DATA
     0A6D 50            MOV  D,B     D = OFFSET, MSGBUF[3]
     0A6E 1E 21         MVI  E,SERNUM  E = OFFSET, SERNUM[0]
     0A70 CD 8E 0E      CALL CMPARE  CMPARE(MSGBUF[3],SERNUM[0],NIBCNT,
                       ;                   ( @D       , @E       , A     ,
                       ;                   ( I        , I        , I     ,
                       ;
                       ;                   NEGFLG,ZROFLG)
                       ;                   PSW:S ,PSW:Z )
                       ;                    O     , O     )
                       ;             IF ZROFLG .EQ. FALSE
                       ;               INPUT DOESN'T MATCH SERIAL NUMBER
     0A73 C0            RNZ            PROERR(ERRFLG)
                       ;             ELSE
     0A74 CD 9E 12      CALL NVMWR     WRITE NEW ACTIVE SERVICE BLOCK
                       ;               NO BLOCK IS NOW OPEN
                       ;               LOCK SERIAL NUMBER
     0A77 21 10 74      LXI  H,SERFLG/2+X  HL = ADDRESS, SERFLG
     0A7A 7E            MOV  A,M       SERFLG.SNOLCK = TRUE
     0A7B F6 10         ORI  10H
     0A7D 77            MOV  M,A
                       ;               UPDATE DATA FOR NORMAL BLOCK
                       ;               CLEAR PIECE COUNT REGISTER
                       ;               CLEAR ASCENDING REGISTER
                       ;               CLEAR DESCENDING REGISTER
```

```
0A7E AF          XRA A                        A = NULL = 0
0A7F 01 28 1A    LXI  B,(4+PCESIZ+DSCSIZ+ASCSIZ)*100H+PCEREG
               ;                              B = NIBCNT = 4+PCESIZ+DSCSIZ+ASCSIZ
               ;                              C = OFFSET, PCEREG
0A82 CD 24 0F    CALL FILNIB                  FILNIB(PCEREG,NULL,NIBCNT)
               ;                                     ( @C    , A   , B     )
               ;                                     ( 0     , I   , I     )
               ;                              CLEAR ERROR CODE
0A85 32 0A 74    STA  ERRCOD/2+X              ERRCOD = 0
               ;                              CLEAR ERROR COUNT
0A88 32 0B 74    STA  ERRCNT/2+X              ERRCNT = 0
               ;                              STORE NEW CONTROL SUM CRC
0A8B CD 4E 06    CALL CTLSUM                  CTLSUM(CSMCRC,ERRFLG)
               ;                                    ( D     ,PSW:Z )
               ;                                    ( 0     , 0     )
0A8E 7A          MOV  A,D                     CTLCRC = CSMCRC
0A8F 32 09 74    STA  CTLCRC/2+X
               ;                              STORE NEW ASCENDING REGISTER CRC
0A92 01 38 08    LXI  B,ASCSIZ*100H+ASCREG
               ;                              B = NIBCNT = ASCSIZ
               ;                              C = OFFSET, ASCREG
0A95 CD B1 0E    CALL CRC                     CRC(ASCREG,NIBCNT,CRCVAL)
               ;                                 ( @C    , B     , D     )
0A98 7A          MOV  A,D                     ASCCRC = CRCVAL
0A99 32 20 74    STA  ASCCRC/2+X
               ;                              STORE NEW DESCENDING REGISTER CRC
0A9C 01 2F 07    LXI  B,DSCSIZ*100H+DSCREG
               ;                              B = NIBCNT = DSCSIZ
               ;                              C = OFFSET, DSCREG
0A9F CD B1 0E    CALL CRC                     CRC(DSCREG,NIBCNT,CRCVAL)
               ;                                 ( @C    , B     , D     )
               ;                                 ( I     , I     , 0     )
0AA2 7A          MOV  A,D                     DSCCRC = CRCVAL
0AA3 32 1B 74    STA  DSCCRC/2+X
0AA6 E1          POP  H                       CLEAN UP STACK
               ;                              WRITE NORMAL BLOCK AND
               ;                              OPEN ERASED SERVICE BLOCK
0AA7 C3 19 12    JMP  NVMSTO                  NVMSTO(ERRFLG)
               ;                                    (PSW:Z )
               ;                                    ( 0     )
               ;                            ENDIF
               ;                          ENDIF
               ;                          RETURN

MSG2MU
               ;MSG2MU(FMTNIB,DSTSIZ,ERRFLG)(WORK1 ,DEFDCM,DIEDCM)
               ;      (NIBSTR,UBYTE ,BIT    )(NIBSTR,BYTE  ,BYTE  )
               ;      ( I     , I    , 0     )( 0     , I    , I     )
               ;      ( @B    , D    ,PSW:Z )( RAM   , RAM  , RAM   )
               ;      ( NC    , NC   , C     )( C     , NC   , NC    )
               ;
               ;PSW DESTROYED
               ;REGISTERS DESTROYED
               ;
               ;TRANSFORM FORMAT AND DATA IN MESSAGE FORMAT INTO A  METER
               ;UNIT FORMAT BCD STRING RIGHT JUSTIFIED IN WORK1.
               ;
               MSG2MU;                  ****ENTRY POINT
               ;                        CLEAR OUTPUT BLOCK
0AAA 3E C0       MVI  A,WORK1           A = OFFSET, WORK1[J=0]
0AAC CD 85 0E    CALL CLRBLK            CLRBLK(WORK1)
               ;                              ( @A   )
               ;                              ( 0    )
0AAF 2E 01       MVI  L,1               L = FLAGV = 1; WHICH DECREMENTS TO 0
               ;                        PRODUCING:
               ;                        PSW:Z = ERRFLG = TRUE
               ;                        CALCULATE TOTAL CHARACTER COUNT
               ;                        INCLUDING POSSIBLE LEADING ZERO
               ;                        B = OFFSET, FMTNIB[I=0]
0AB1 CD 35 0F    CALL GETNIB            GETNIB(NTOTAL,ZERO ,FMTNIB[I])
               ;                              ( A     ,PSW:Z, @B      )
```

```
                  ;                           ( 0    , 0    , I         )
0AB4 3C              INR  A           H = NTOTAL = (NTOTAL+1) .AND. HEXFE
0AB5 E6 FE           ANI  0FEH
0AB7 67              MOV  H,A
                  ;                   CALCULATE COUNT OF CHARACTERS TO RIGHT
                  ;                   OF DECIMAL POINT
0AB8 04              INR  B           B = OFFSET, FMTNIB[I=1]
0AB9 CD 35 0F        CALL GETNIB      GETNIB(NFRAC,ZERO ,FMTNIB[I])
                  ;                         ( A    ,PSW:Z, @B        )
                  ;                         ( 0    , 0    , I         )
                  ;                   CHECK FOR UNSPECIFIED DECIMAL POSITION
0ABC FE 0F           CPI  0FH         IF NFRAC .EQ. HEX0F
0ABE C2 C4 0A        JNZ  MSG2M1
                  ;                     USE DEFAULT DECIMAL POSITION
0AC1 3A 36 74        LDA  DEFDCM/2+X    A = NFRAC = DEFDCM
                  MSG2M1;             ENDIF
                  ;                   CHECK FOR TOO MANY FRACTIONAL DIGITS
0AC4 4F              MOV  C,A         C = NFRAC
0AC5 3A 35 74        LDA  DIEDCM/2+X  A = DIEDCM
0AC8 B9              CMP  C           IF DIEDCM .GE. NFRAC
0AC9 DA F2 0A        JC   MSG2M5
                  ;                     THERE IS ROOM FOR FRACTIONAL DIGITS
                  ;                     CALCULATE INDEX FOR LOW ORDER DIGIT
0ACC 2F              CMA                A = J = 15-DIEDCM+NFRAC
0ACD C6 10           ADI  16
0ACF 81              ADD  C
                  ;                     CHECK DATA LENGTH AND ALIGNMENT WITH
                  ;                     RESPECT TO WORK AREA
0AD0 BC              CMP  H             IF DINDEX .GE. NTOTAL
0AD1 DA F2 0A        JC   MSG2M4
                  ;                       DATA FITS IN WORK AREA
                  ;                       MOVE DATA INTO WORK AREA
0AD4 C6 C0           ADI  WORK1           C = OFFSET, WORK1[J]
0AD6 4F              MOV  C,A
0AD7 78              MOV  A,B             B = OFFSET, FMTNIB[I=NTOTAL+1]
0AD8 84              ADD  H
0AD9 47              MOV  B,A
0ADA 7C              MOV  A,H             A = NTOTAL
0ADB CD C2 0F        CALL MVRNIB          MVRNIB(WORK1[J],FMTNIB[I],NTOTAL,
                  ;                              ( @C      , @B      , A     ,
                  ;                              ( 0       , I       , I     ,
                  ;
                  ;
                  ;                       NONBCD,ZROFLG)
                  ;                       PSW:S ,PSW:Z )
                  ;                        0     , 0     )
                  ;                       CHECK CHARACTERS MOVED
0ADE FA F2 0A        JM   MSG2M3          IF NONBCD .EQ. FALSE
                  ;                         ONLY NUMERIC CHARS WERE MOVED.
                  ;                         CHECK DATA LENGTH WITH RESPECT TO
                  ;                         DECLARED SIZE OF DESTINATION.
                  ;                         SET INDEX TO LEFT OF DECLARED
                  ;                         HIGH ORDER DIGIT POSITION.
0AE1 7A              MOV  A,D               A = I = 15-DSTSIZ
0AE2 2F              CMA
0AE3 C6 10           ADI  16
                  ;                         CALCULATE NUMBER OF DIGIT
                  ;                         POSITIONS ABOVE HIGH ORDER
                  ;                         DIGIT POSITION
0AE5 67              MOV  H,A               H = NTOTAL = 16-DSTSIZ
0AE6 24              INR  H
                  ;                         SCAN POSITIONS ABOVE HIGH ORDER
                  ;                         DIGIT POSITION
0AE7 C6 C0           ADI  WORK1             B = OFFSET, WORK1[I]
0AE9 47              MOV  B,A
0AEA 7C              MOV  A,H               A = NTOTAL
0AEB CD 0F 10        CALL RSCAN             RSCAN(WORK1[I],NTOTAL,
                  ;                               ( @B      , A     ,
                  ;                               ( I       , I     ,
                  ;
                  ;                               NONBCD,ZROFLG)
```

```
                 ;                  PSW:S ,PSW:Z )
                 ;                   0    , 0    )
                 ;                  CHECK CHARACTERS SCANNED
0AEE C2 F2 0A     JNZ  MSG2M2       IF ZROFLG .EQ. FALSE
                 ;                    DECLARED DATA LENGTH EXCEEDED
0AF1 2C           INR  L              L = FLAGV = 2; DECREMENTS TO 1
                 ;                    PRODUCING:
                 ;                    PSW:Z = ERRFLG = FALSE
                 MSG2M2;            ENDIF
                 MSG2M3;          ENDIF
                 MSG2M4;        ENDIF
                 MSG2M5;      ENDIF
0AF2 2D           DCR  L      PSW:Z = ERRFLG
0AF3 C9           RET         RETURN

MTRSTS
                 ;MTRSTS()(XMTBUF,KDCTRL,MRSTS1,MRSTS2,NORFLG)
                 ;        (BYTSTR,BITSTR,BITSTR,BITSTR,BITSTR)
                 ;        ( 0    , I    , I    , I    , 0    )
                 ;        ( RAM  , RAM  , RAM  , RAM  , RAM  )
                 ;        ( C    , NC   , NC   , NC   , C    )
                 ;
                 ;ALL REGISTERS DESTROYED
                 ;PSW DESTROYED
                 ;
                 ;PUT CURRENT STATUS MESSAGE INTO TRANSMIT BUFFER
                 ;
                 MTRSTS;              ****ENTRY POINT
0AF4 21 03 80     LXI  H,HSTAT*100H+3
                 ;                    L = BYTCNT = 3
                 ;                    H = HSTAT
0AF7 22 50 74     SHLD XMTBUF/2+X+0   XMTBUF[0] = BYTCNT
                 ;                    XMTBUF[1] = HSTAT
0AFA 11 52 74     LXI  D,XMTBUF/2+X+2
                 ;                    DE = ADDRESS, XMTBUF[2]
0AFD 21 24 74     LXI  H,MRSTS1/2+X   HL = ADDRESS, MRSTS1
                 ;                    XMTBUF[2].0 = 0
                 ;                    XMTBUF[2].1 = MRSTS1.DATDOR
                 ;                    XMTBUF[2].2 = MRSTS1.INSFND
                 ;                    XMTBUF[2].3 = MRSTS1.LOWPOS
                 ;                    XMTBUF[2].4 = MRSTS1.SERMOD
                 ;                    XMTBUF[2].5 = MRSTS1.ENABLD
                 ;                    XMTBUF[2].6 = 0
                 ;                    XMTBUF[2].7 = MRSTS1.QUEREG
0B00 7E           MOV  A,M
0B01 E6 7D        ANI  7DH
0B03 12           STAX D
0B04 23           INX  H              HL = ADDRESS, MRSTS2
0B05 13           INX  D              DE = ADDRESS, XMTBUF[3]
                 ;                    XMTBUF[3].0 = MRSTS2.FATMOD
                 ;                    XMTBUF[3].1 = KDCTRL.KBDDSB
                 ;                    XMTBUF[3].2..7 = 0
0B06 7E           MOV  A,M
0B07 E6 80        ANI  80H
0B09 47           MOV  B,A
0B0A 3A 27 74     LDA  KDCTRL/2+X
0B0D 0F           RRC
0B0E 0F           RRC
0B0F E6 40        ANI  40H
0B11 B0           ORA  B
0B12 12           STAX D
0B13 23           INX  H              HL = ADDRESS, NORFLG
0B14 7E           MOV  A,M            NORFLG.QUESTS = FALSE
0B15 E6 7F        ANI  7FH
0B17 77           MOV  M,A
0B18 C9           RET                 RETURN

NPAUSE
                 ;NPAUSE(N    ,ZROFLG)
                 ;      (WORD,BIT   )
                 ;      (I/O ,0     )
```

```
                ;       (BC  ,PSW:Z )
                ;       ( C  , C    )
                ;
                ;REGISTERS DESTROYED
                ;PSW DESTROYED
                ;
                ;PAUSE FOR ABOUT 100 USEC, AND DECREMENT N
                ;
                NPAUSE;                 ****ENTRY POINT
                ;                       PAUSE
0B19 3E 0A        MVI  A,10             A = 10
                NPAUS1;                 DO UNTIL A = 0
0B1B 3D           DCR  A                  A = A-1
0B1C C2 1B 0B     JNZ  NPAUS1
                ;                       ENDDO
                ;                       DECREMENT N
0B1F 0B           DCX  B                BC = N = N-1
                ;                       DEFINE STATUS OF N
0B20 78           MOV  A,B              PSW:Z = ZROFLG = N .EQ. 0
0B21 B1           ORA  C
0B22 C9           RET                   RETURN

POSUPD
                ;POSUPD()(WORK1 ,LOWWRN,POSREG,ASCREG,DSCREG,
                ;        (NIBSTR,NIBSTR,NIBSTR,NIBSTR,NIBSTR,
                ;        ( I/O  , I    , I    , I    , I    ,
                ;        ( RAM  , RAM  , RAM  , RAM  , RAM  ,
                ;        ( C    , NC   , NC   , C    , C    ,
                ;
                ;         ASCCRC,DSCCRC,UNLOCK,MRSTS1,MRSTS2)
                ;         BYTE  ,BYTE  ,NIBSTR,BITSTR,BITSTR)
                ;          I    , I    , I    , I/O  , I    )
                ;          RAM  , RAM  , RAM  , RAM  , RAM  )
                ;          NC   , NC   , NC   , C    , NC   )
                ;
                ;PSW DESTROYED
                ;REGISTERS DESTROYED
                ;
                ;UPDATE METER STATUS FOR CURRENT POSTAGE SETTING
                ;
                POSUPD;                 ****ENTRY POINT
                ;-----------------------------------------------------
                ;                       BUILD WARNING VALUE SAME LENGTH AS
                ;                       DESCENDING REGISTER STARTING AT
                ;                       WORK1[0]
                ;                       CLEAR WORK AREA
0B23 3E C0        MVI  A,WORK1          A = OFFSET, WORK1
0B25 CD 85 0E     CALL CLRBLK           CLRBLK(WORK1)
                ;                              ( @A  )
                ;                              ( 0   )
0B28 06 1D        MVI  B,LOWWRN+1       B = OFFSET, LOWWRN[1]
0B2A CD 35 0F     CALL GETNIB           GETNIB(EXPONT,ZROFLG,LOWWRN[1])
                ;                              ( A    ,PSW:Z , @B      )
                ;                              ( 0    , 0    , I       )
0B2D 2F           CMA                   A = -EXPONT-1
0B2E C6 C7        ADI  WORK1+DSCSIZ     C = OFFSET, WORK1[DSCSIZ-1-EXPONT]
0B30 4F           MOV  C,A
0B31 05           DCR  B                B = OFFSET, LOWWRN[0]
0B32 3E 01        MVI  A,1              A = NIBCNT = 1
0B34 CD B3 0F     CALL MVLNIB           MVLNIB(WORK1[DSCSIZ-1-EXPONT],
                ;                              ( @C                    ,
                ;                              ( 0                     ,
                ;
                ;                              LOWWRN[0],NIBCNT,NONBCD,ZROFLG)
                ;                               @B      , A    ,PSW:S ,PSW:Z )
                ;                               I       , I    , 0    , 0    )
                ;-----------------------------------------------------
                ;                       INITIALIZE FOR CALLS TO POSUP1
0B37 21 24 74     LXI  H,MRSTS1/2+X     HL = ADDRESS, MRSTS1
0B3A 7E           MOV  A,M
```

```
0B3B E6 CF      ANI  0CFH
0B3D 77         MOV  M,A           MRSTS1.INSFND = FALSE
               ;                   MRSTS1.LOWPOS = FALSE
               ;-------------------------------------------------------
               ;                   COMPARE DESCENDING REGISTER WITH
               ;                   WARNING VALUE
0B3E 06 10      MVI  B,10H         B.LOWPOS = TRUE
0B40 CD 85 0B   CALL POSUP1        IF DSCREG .LT. WORK1[0]
               ;                     MRSTS1.LOWPOS = B.LOWPOS = TRUE
               ;                   ENDIF
               ;-------------------------------------------------------
               ;                   BUILD POSTAGE SETTING REGISTER SAME
               ;                   LENGTH AS DESCENDING REGISTER
               ;                   STARTING AT WORK1[0]
               ;                   CLEAR WORK AREA
0B43 3E C0      MVI  A,WORK1       A = OFFSET, WORK1
0B45 CD 85 0E   CALL CLRBLK        CLRBLK(WORK1)
               ;                         ( @A  )
               ;                         ( 0   )
0B48 01 C3 42   LXI  B,POSREG*100H+WORK1+0+DSCSIZ-NBANKS
               ;                   B = OFFSET, POSREG
               ;                   C = OFFSET, WORK1[0+DSCSIZ-NBANKS]
0B4B 3E 04      MVI  A,NBANKS      A = NBANKS
0B4D CD B3 0F   CALL MVLNIB        MVLNIB(WORK1[0+DSCSIZ-NBANKS],
               ;                         ( @C                        ,
               ;                         ( 0                         ,
               ;
               ;                         POSREG,NBANKS,NONBCD,ZROFLG)
               ;                          @B    , A    ,PSW:S ,PSW:Z )
               ;                          I     , I    , 0    , 0    )
               ;-------------------------------------------------------
               ;                   COMPARE DESCENDING REGISTER WITH
               ;                   POSTAGE SETTING
0B50 06 20      MVI  B,20H         B.INSFND = TRUE
0B52 CD 85 0B   CALL POSUP1        IF DSCREG .LT. WORK1[0]
               ;                     MRSTS1.INSFND = B.INSFND = TRUE
               ;                   ENDIF
               ;-------------------------------------------------------
               ;                   CHECK ASCENDING REGISTER CRC
0B55 01 38 08   LXI  B,ASCSIZ*100H+ASCREG
               ;                   B = ASCSIZ
               ;                   C = OFFSET, ASCREG[0]
0B58 3A 20 74   LDA  ASCCRC/2+X    A = ASCCRC
0B5B CD 92 0B   CALL POSUP2        IF ASCCRC INCORRECT
               ;                     FILL ASCREG WITH HEXOF
               ;                     DECLARE DEAD METER. BAD CRC
               ;                   ENDIF
               ;-------------------------------------------------------
               ;                   CHECK DESCENDING REGISTER CRC
0B5E 01 2F 07   LXI  B,DSCSIZ*100H+DSCREG
               ;                   B = DSCSIZ
               ;                   C = OFFSET, DSCREG[0]
0B61 3A 1B 74   LDA  DSCCRC/2+X    A = DSCCRC
0B64 CD 92 0B   CALL POSUP2        IF DSCCRC INCORRECT
               ;                     FILL DSCREG WITH HEXOF
               ;                     DECLARE DEAD METER. BAD CRC
               ;                   ENDIF
               ;-------------------------------------------------------
               ;                   CHECK CONTROL SUM CRC
               ;                   MRSTS2.FATMOD WILL BE USED VS ERRFLG
0B67 CD 3A 06   CALL CONSUM        CONSUM(ERRFLG)
               ;                        (PSW:Z )
               ;                        ( 0    )
               ;-------------------------------------------------------
               ;                   ENABLE OR DISABLE METER
0B6A 01 24 74   LXI  B,MRSTS1/2+X  BC = ADDRESS, MRSTS1
0B6D 0A         LDAX B
0B6E E6 68      ANI  68H
0B70 67         MOV  H,A           H = FLAGS = MRSTS1.DATDOR,
               ;                               MRSTS1.INSFND,
               ;                               MRSTS1.SERMOD
```

```
0B71 03          INX  B            BC = ADDRESS, MRSTS2
0B72 0A          LDAX B
0B73 E6 81       ANI  81H
0B75 B4          ORA  H            A = FLAGS = FLAGS .OR.
                 ;                               MRSTS2.FATMOD,
                 ;                               MRSTS2.PRVMOD
                 ;                  IF FLAGS .NE. 0
0B76 C2 D3 05    JNZ  DISABL          DISABLE
                 ;                  ELSE
                 ;                    COMPARE $ UNLOCK VALUE WITH SETTING
0B79 11 18 42    LXI  D,POSREG*100H+UNLOCK
                 ;                    D = OFFSET, POSREG
                 ;                    E = OFFSET, UNLOCK
0B7C 3E 04       MVI  A,NBANKS        A = NBANKS
0B7E CD 8E 0E    CALL CMPARE          CMPARE(POSREG,UNLOCK,NBANKS,
                 ;                           ( @D    , @E    , A     ,
                 ;                           ( I     , I     , I     ,
                 ;
                 ;                            NEGFLG,ZROFLG)
                 ;                            PSW:S ,PSW:Z )
                 ;                             0     , 0     )
0B81 FC F9 05    CM   ENABLE          IF NEGFLG .EQ. TRUE
                 ;                      ENABLE
                 ;                    ENDIF
                 ;                  ENDIF
                 ;-------------------------------------------------------
0B84 C9          RET                RETURN
                 ;-------------------------------------------------------
                 ;-------------------------------------------------------
                 ;-------------------------------------------------------
                 POSUP1;            ****LOCAL ENTRY POINT
0B85 11 C0 2F    LXI  D,DSCREG*100H+WORK1+0
                 ;                  D = OFFSET, DSCREG[0]
                 ;                  E = OFFSET, WORK1[0]
0B88 3E 07       MVI  A,DSCSIZ      A = DSCSIZ
0B8A CD 8E 0E    CALL CMPARE        CMPARE(DSCREG[0],WORK1[0],DSCSIZ,
                 ;                         ( @D        , @E      , A     ,
                 ;                         ( I         , I       , I     ,
                 ;
                 ;                          NEGFLG,ZROFLG)
                 ;                          PSW:S ,PSW:Z )
                 ;                           0     , 0     )
0B8D F0          RP                 IF NEGFLG .EQ. TRUE
0B8E 7E          MOV  A,M             MRSTS1.FLAG = B.FLAG = TRUE
0B8F B0          ORA  B
0B90 77          MOV  M,A
                 ;                  ENDIF
0B91 C9          RET                RETURN
                 ;-------------------------------------------------------
                 ;-------------------------------------------------------
                 ;-------------------------------------------------------
                 POSUP2;            ****LOCAL ENTRY POINT
0B92 CD B1 0E    CALL CRC           CRC(REGSTR[0],REGSIZ,CRCVAL)
                 ;                     ( @C       , B     , D     )
                 ;                     ( I        , I     , 0     )
0B95 BA          CMP  D             PSW:Z = NOERR = REGCRC .EQ. CRCVAL
0B96 C8          RZ                 IF NOERR .EQ. FALSE
                 ;                    FILL BAD REGISTER WITH HEXOF
0B97 3E 0F       MVI  A,0FH           A = HEXOF
0B99 C3 24 0F    JMP  FILNIB          FILNIB(REGSTR[0],HEXOF,REGSIZ)
                 ;                           ( @C       , A    , B     )
                 ;                           ( 0        , I    , I     )
                 ;                    DECLARE DEAD METER. BAD CRC
0B9C 3E 00       MVI  A,BADCRC        A = CODE = BADCRC
0B9E C3 85 10    JMP  NVMDED          NVMDED(CODE,ERRFLG)
                 ;                           ( A   ,PSW:Z )
                 ;                           ( I   , 0     )
                 ;                  ENDIF
                 ;                  RETURN
                 ;-------------------------------------------------------
                 ;-------------------------------------------------------
                 ;-------------------------------------------------------
```

```
PROERR
                   ;PROERR(ERRFLG)(XMTBUF)
                   ;      (BIT    )(BYTSTR)
                   ;      ( 0     )( 0     )
                   ;      (PSW:Z  )( RAM   )
                   ;      ( C     )( C     )
                   ;
                   ;REGISTERS DESTROYED
                   ;PSW DESTROYED
                   ;
                   ;PROCESS PROCEDURAL ERROR
                   ;
                   PROERR;              ****ENTRY POINT
0BA1 CD F4 0A        CALL MTRSTS        PUT STATUS MESSAGE IN TRANSMIT BUFFER
0BA4 11 53 74        LXI  D,XMTBUF/2+X+3
                   ;                    DE =  ADDRESS, XMTBUF[3]
                   ;                    DECLARE PROCEDURAL ERROR
0BA7 1A              LDAX D             XMTBUF[3].PROERR = TRUE
0BA8 F6 02           ORI  2
0BAA 12              STAX D
0BAB AF              XRA  A             PSW:Z = ERRFLG = TRUE
0BAC C3 64 04        JMP  PERDSP        MAKE PROCEDURAL ERROR DISPLAY
                   ;                    RETURN

RDCYC
                   ;RDCYC(INCYC ,INCYC,ADRESS,MRSTS1)(DATA1 )
                   ;     (BITSTR,BIT  ,ADRESS,BITSTR)(BITSTR)
                   ;     ( 0    , 0   , 0    , -    )( I     )
                   ;     ( A    ,PSW:C, HL   , @HL  )( 6800  )
                   ;     ( C    , C   , C    , NC   )( NC    )
                   ;
                   ;REGISTERS NOT CHANGED
                   ;PSW DESTROYED
                   ;
                   ;RETURN STATUS OF METER CYCLE SWITCH
                   ;
                   RDCYC;               ****ENTRY POINT
                   ;                    DEFINE ADDRESS FOR CALLING ROUTINES
0BAF 21 24 74        LXI  H,MRSTS1/2+X  HL = ADDRESS, MRSTS1
                   ;                    READ CYCLE SWITCH
0BB2 3A 00 68        LDA  DATA1         A = INCYC,INCYCN = DATA1.2,DATA1.3
0BB5 E6 30           ANI  30H
0BB7 C2 C2 0B        JNZ  RDCYC1        IF BOTH SIDES OF SWITCH CLOSED
                   ;                      DECLARE DEAD METER; BAD CYCLE SWITCH
0BBA 3E 04           MVI  A,BADCYC        A = BADCYC
0BBC CD 85 10        CALL NVMDED          NVMDED(BADCYC,ERRFLG)
                   ;                            ( A     ,PSW:Z )
                   ;                            ( I     , 0    )
0BBF C3 B6 01        JMP PWRDN            ABORT
                   RDCYC1;              ELSE
0BC2 17              RAL                  PSW:C = INCYC = DATA1.2
0BC3 17              RAL
0BC4 17              RAL
0BC5 9F              SBB  A               A.0..7 = INCYC
0BC6 C9              RET                  RETURN
                   ;                    ENDIF

RECEVE
                   ;RECEVE()(SID,SOD,SOE,RECBUF,NORFLG)
                   ;        (BIT,BIT,BIT,BYTSTR,BITSTR)
                   ;        ( I , 0 , 0 , 0    , I    )
                   ;        (RIM,SIM,SIM, RAM  , RAM  )
                   ;        ( NC, C , C , C    , NC   )
                   ;
                   ;REGISTERS DESTROYED
                   ;PSW DESTROYED
                   ;
                   ;RECEIVE INCOMING MESSAGE IF EXTERNAL RTS IS PRESENT.
                   ;RECBUF[0], THE MESSAGE BYTE COUNT, IS CLEARED IF A
                   ;REQUEST TO SEND IS DETECTED.
                   ;
```

```
                    RECEVE;                 ****ENTRY POINT
0BC7 3A 26 74        LDA  NORFLG/2+X        IF NORFLG.COMDSB .EQ. TRUE
0BCA E6 04           ANI  4
                    ;                         COMMUNICATIONS ARE DISABLED
0BCC C0              RNZ                      RETURN
                    ;                       END IF
0BCD 20              RIM                    INPUT BIT
                    ;                       A.0 = BIT = RIM.SID ;RTS OR IDLE
0BCE B7              ORA A                  IF RIM.SID .NE. RTS
                    ;                         NO INCOMING REQUEST TO SEND PRESENT
0BCF F0              RP                       RETURN
                    ;                       ENDIF
                    ;                       STOP TIMER
0BD0 CD 34 01        CALL STPTMR            STPTMR(WASOFF)
                    ;                              (PSW:Z )
                    ;                              ( 0    )
0BD3 21 27 0C        LXI  H,RECE06          SET TO REACH QUIT ROUTINE VIA RETURN
0BD6 E5              PUSH H
0BD7 21 48 74        LXI  H,RECBUF/2<X      HL = ADDRESS, RECBUF[N=0]
                    ;                       (2 MVI VS 1 LXI FOR T3 = 100.012 USEC)
0BDA 06 00           MVI  B,0               B = BYTCNT = 0
0BDC 0E 80           MVI  C,80H             C = SIM*2 .AND. HEXFF, WHERE
                    ;                           SIM.SOE = ENABLD = 1
0BDE 70              MOV  M,B               RECBUF[0] = 0

                    RECE01;                 DO UNTIL BIT .EQ. EOM
0BDF 3E C0           MVI  A,0C0H              SIM.SOD = ONEBIT=1 ;CTS,OR EOB ECHO
                    ;                         SIM.SOE = ENABLD = 1
0BE1 30              SIM                      OUTPUT ONEBIT
0BE2 11 FB FE        LXI  D,-261              DE = COUNT ;FOR T13 = 3.494 MSEC
                    RECE02;                   DO UNTIL (BIT .EQ. START) .OR.
                    ;                           (COUNT .GE. 0)
0BE5 20              RIM                        INPUT BIT
                    ;                           A.0 = BIT = RIM.SID ;START,RTS,EOB
0BE6 13              INX  D                     DE = COUNT = COUNT+1
0BE7 A2              ANA  D                     A.0 = BIT .AND. COUNT.0
0BE8 FA E5 0B        JM   RECE02
                    ;                         ENDDO
                    ;
0BEB B2              ORA  D                   IF COUNT .GE. 0
                    ;                           T13 TIMEOUT OCCURRED
                    ;                           START NOT RECEIVED AFTER RTS
0BEC F0              RP                         QUIT
                    ;                         ENDIF
                    ;                         THE FIRST BYTE'S START BIT HAS BEEN
                    ;                         READ. IT WILL BE READ AGAIN AND
                    ;                         ECHOED LATER.
                    ;                         POINT AT NEXT BYTE IN RECBUF.
0BED 23              INX  H                   HL = ADDRESS, RECBUF[N=N+1]
                    ;                         CHECK FOR BUFFER OVERFLOW
0BEE 04              INR  B                   B = BYTCNT = BYTCNT+1
0BEF 3E 07           MVI  A,7                 IF 7 .LT. BYTCNT
0BF1 B8              CMP  B
                    ;                           TRYING TO RECEIVE 8TH BYTE
0BF2 D8              RC                         QUIT
                    ;                         ENDIF
                    ;                         SET TO INPUT 10 BITS
                    ;                         1 START, 8 DATA, AND 1 EOB OR EOM
0BF3 16 0A           MVI  D,10                D = BITCNT = 10

                    RECE03;                   LOOP ;BREAK ON BITCNT .EQ. 0
0BF5 20              RIM                        INPUT BIT
                    ;                           A.0 = BIT = RIM.SID
0BF6 17              RAL                        PSW:CY  = BIT
0BF7 79              MOV  A,C                   PSW:CY,A = SIM*2
0BF8 1F              RAR                        A = SIM
                    ;                           SIM.SOD = ECHO = BIT
                    ;                           SIM.SOE = ENABLD = 1
0BF9 30              SIM                        OUTPUT 10 ECHO BITS
0BFA 15              DCR  D                     D = BITCNT = BITCNT-1
                    ;                           IF BITCNT .EQ. 0
```

```
0BFB CA 0C 0C   JZ   RECE04               BREAK
              ;                         ENDIF
0BFE 17         RAL                     PSW:CY = BIT
              ;                         SHIFT 9 BITS INTO BUFFER
              ;                         1 START,(LOST); 8 DATA,(KEPT)
0BFF 7E         MOV  A,M                PSW:CY,A = RECBUF[N]*2
0C00 1F         RAR                     RECBUF[N] = (PSW:CY,A)/2
0C01 77         MOV  M,A
0C02 77         MOV  M,A                DELAY ;BIT PERIOD = 103.923 USEC
0C03 3E 07      MVI  A,7
0C05 3D         DCR  A
0C06 F2 05 0C   JP   $-1
0C09 C3 F5 0B   JMP  RECE03
              RECE04;                 ENDLOOP
0C0C B7         ORA  A                CHECK FOR EOM
0C0D FA DF 0B   JM   RECE01
              ;                      ENDDO
0C10 3E 21      MVI  A,33            DELAY ;T8 = 1264.965 USEC
0C12 3D         DCR  A
0C13 F2 12 0C   JP   $-1
              ;                      CHECK FOR NO-ERROR PULSE
0C16 20         RIM                  INPUT BIT
              ;                      A.0 = BIT = RIM.SID
0C17 B7         ORA  A               IF BIT .EQ. ACK
0C18 F2 1F 0C   JP   RECE05
              ;                        MESSAGE RECEIVED WITHOUT ERROR
              ;                        PUT NONZERO BYTE COUNT IN BUFFER
0C1B 78         MOV  A,B               RECBUF[0] = BYTCNT
0C1C 32 48 74   STA  RECBUF/2+X
              RECE05;                ENDIF
0C1F F1         POP  PSW             CLEAN UP STACK
0C20 16 22      MVI  D,34            DELAY ;T15 = 1560.533 USEC
0C22 15         DCR  D
0C23 F2 22 0C   JP   $-1
0C26 C9         RET                  RETURN
              ;
              RECE06;                QUIT RECEIVE ROUTINE
0C27 3E 40      MVI  A,40H           SIM.SOD = IDLE = 0
              ;                      SIM.SOE = ENABLD = 1
0C29 30         SIM                  OUTPUT IDLE
0C2A 16 C2      MVI  D,194           DELAY ;T15 = 1558.298 USEC
0C2C 15         DCR  D
0C2D F2 2C 0C   JP   $-1
0C30 C9         RET                  RETURN

REDSTS
              ;REDSTS(TRPSW,PRVSW)(PORTA ,PORTC )
              ;      (BYTE ,BYTE )(BITSTR,BITSTR)
              ;      ( O   , O   )( I/O  , I     )
              ;      ( B   , A   )( 7001 , 7003  )
              ;      ( C   , C   )( C    , NC    )
              ;
              ;REGISTERS DESTROYED
              ;PSW DESTROYED
              ;
              ;RETURNS VALUES FOR TRIP SWITCH AND PRIVELEGED SWITCH
              ;OFF = HEX00
              ;ON  = HEXFF
              ;
              REDSTS;                ****ENTRY POINT
              ;                      FETCH PORTA IMAGE
              ;                      SENSOR LEDS ASSUMED TO BE OFF
0C31 21 01 70   LXI  H,PORTA         HL = ADDRESS, PORTA
0C34 56         MOV  D,M             D = LEDOFF = PORTA
              ;                      TURN SENSOR LEDS ON
0C35 7A         MOV  A,D             PORTA = PORTA .AND. HEXDF
0C36 E6 DF      ANI  0DFH
0C38 77         MOV  M,A
              ;                      READ SENSORS
0C39 3A 03 70   LDA  PORTC
```

```
0C3C 07          RLC
0C3D 07          RLC
0C3E 07          RLC                   PSW:CY = TRPBIT = PORTC.2
0C3F 4F          MOV  C,A              C.0    = PRVBIT = PORTC.3
0C40 9F          SBB  A                B = TRPSW = TRPBIT*HEXFF
0C41 47          MOV  B,A
0C42 79          MOV  A,C              A = PRVSW = (.NOT. PRVBIT)*HEXFF
0C43 07          RLC
0C44 3F          CMC
0C45 9F          SBB  A
                ;                      TURN SENSOR LEDS OFF
0C46 72          MOV  M,D              PORTA = LEDOFF
0C47 C9          RET                   RETURN

SELVAL
                ;SELVAL(ERRFLG)(NORFLG,MRSTS1,POSREG)
                ;      (BIT   )(BITSTR,BITSTR,NIBSTR)
                ;      ( 0    )( 0    , I    , I    )
                ;      (PSW:Z )( RAM  , RAM  , RAM  )
                ;      ( C    )( C    , NC   , NC   )
                ;
                ;REGISTERS DESTROYED
                ;PSW DESTROYED
                ;
                ;PROCESS SELECTION VALUE REQUEST
                ;
                SELVAL;                ****ENTRY POINT
0C48 21 26 74     LXI  H,NORFLG/2+X    HL = ADDRESS, NORFLG
0C4B 7E           MOV  A,M             NORFLG.QUEPOS = FALSE
0C4C E6 BF        ANI  0BFH
0C4E 77           MOV  M,A
0C4F 3A 24 74     LDA  MRSTS1/2+X      IF MRSTS1.UNKSEL .EQ. TRUE
0C52 B7           ORA  A
                ;                        SELECTION VALUE IS UNKNOWN
0C53 FA A1 0B     JM   PROERR            PROERR(ERRFLG)
                ;                               (PSW:Z )
                ;                               ( 0    )
                ;                        RETURN
                ;                      ELSE
                ;                        FLAG VERIFICATION OF SELECTION VALUE
0C56 7E           MOV  A,M               NORFLG.UNVSEL = FALSE
0C57 E6 FD        ANI  0FDH
0C59 77           MOV  M,A
0C5A 11 60 0C     LXI  D,SELV01          DE = ADDRESS, SELV01
                ;                        PUT REPLY IN TRANSMIT BUFFER
0C5D C3 5B 0D     JMP  VALREQ            VALREQ(POSREG,POSFMT,HPSET,ERRFLG)
                ;                               (@@DE+0,@DE+1 ,@DE+2,PSW:Z )
                ;                               ( I    , I    , I    , 0    )
                ;                        RETURN
                ;                      ENDIF
                SELV01;                ARGUMENT LIST FOR VALREQ
0C60 42 40 81     DB   POSREG,POSFMT,HPSET

SEREOE
                ;SEREOE(ERRFLG)(CMBBUF,LOWWRN,SETLIM,AMTBUF,WORK1 ,UNLOCK)
                ;      (BIT   )(NIBSTR,NIBSTR,NIBSTR,NIBSTR,NIBSTR,NIBSTR)
                ;      ( 0    )( I    , 0    , 0    , I    , I/0  , 0    )
                ;      (PSW:Z )( RAM  , RAM  , RAM  , RAM  , RAM  , RAM  )
                ;      ( C    )( C    , C    , C    , NC   , C    , C    )
                ;
                ;PSW DESTROYED
                ;REGISTERS DESTROYED
                ;
                ;PERFORM SERVICE FUNCTIONS WHICH ARE INITIATED BY THE
                ;ENTRY OF AN AMOUNT AND COMBINATION
                ;
                SEREOE;                ****ENTRY POINT
                ;                      CHECK METER STATUS
0C63 CD 4E 0F     CALL LSTATE          LSTATE(FATMOD,NORMOD,SERMOD,PRVMOD)
                ;                             (PSW:S ,PSW:Z ,PSW:P ,PSW:C )
                ;                             ( 0    , 0    , 0    , 0    )
```

```
                        ;            IF FATMOD .EQ. TRUE
                        ;              PROCESS ERROR
0C66 FA A1 0B    JM   PROERR           PROERR(ERRFLG)
                        ;                    (PSW:Z )
                        ;                    ( 0    )
                        ;            ELSE
                        ;              CHECK FORMAT BYTE IN CMBBUF
0C69 21 78 74    LXI  H,CMBBUF/2+X     HL = ADDRESS, CMBBUF[0..1]
0C6C 7E          MOV  A,M              IF CMBBUF[0..1] .NE. HEX1F
0C6D FE 1F       CPI  1FH
                        ;                BAD FORMAT, PROCEEDURAL ERROR
0C6F C2 A1 0B    JNZ  PROERR             PROERR(ERRFLG)
                        ;                      (PSW:Z )
                        ;                      ( 0    )
                        ;              ELSE
                        ;              CHECK FOR OUT OF RANGE COMBINATION
0C72 23          INX  H                HL = ADDRESS, CMBBUF[2..3]
0C73 7E          MOV  A,M              A = CMBBUF[2..3]
0C74 FE 04       CPI  4                IF CMBBUF[2..3] .GE. 4
                        ;                BAD COMBINATION, PROCEEDURAL ERROR
0C76 D2 A1 0B    JNC  PROERR             PROERR(ERRFLG)
                        ;                      (PSW:Z )
                        ;                      ( 0    )
                        ;              ELSE
                        ;              --CASE (CMBBUF[2..3])
0C79 11 1C 07    LXI  D,DSCSIZ*100H+LOWWRN
0C7C FE 01       CPI  1                  **01:
                        ;                  CHANGE LOW POSTAGE WARN LIMIT
0C7E CA FB 0C    JZ   SRVCNV               SRVCNV(LOWWRN,DSCSIZ,ERRFLG)
                        ;                        ( @E   , D    ,PSW:Z )
                        ;                        ( 0    , I    , 0    )
0C81 11 1E 05    LXI  D,(NBANKS+1)*100H+SETLIM
0C84 FE 02       CPI  2                  **02:
                        ;                  CHANGE SETTING LIMIT
0C86 CA FB 0C    JZ   SRVCNV               SRVCNV(SETLIM,NBANKS+1,ERRFLG)
                        ;                        ( @E   , D       ,PSW:Z )
                        ;                        ( 0    , I       , 0    )
0C89 06 E0       MVI  B,AMTBUF
                        ;                **03:
                        ;                  CHANGE SERIAL NUMBER
0C8B F2 38 0A    JP   MSERNO               MSERNO(AMTBUF,ERRFLG)
                        ;                        ( @B   ,PSW:Z )
                        ;                        ( I    , 0    )
                        ;                **00:
0C8E 15          DCR  D                    D = NBANKS
                        ;                  CHANGE DOLLAR UNLOCK VALUE
0C8F CD AA 0A    CALL MSG2MU               MSG2MU(AMTBUF,NBANKS,ERRFLG)
                        ;                        ( @B   , D    ,PSW:Z )
                        ;                        ( I    , I    , 0    )
                        ;                  IF ERRFLG .EQ. TRUE
                        ;                    BAD AMOUNT, PROCEEDURAL ERROR
0C92 CA A1 0B    JZ   PROERR                 PROERR(ERRFLG)
                        ;                          (PSW:Z )
                        ;                          ( 0    )
                        ;                  ELSE
                        ;                    REDEFINE $ UNLOCK VALUE
0C95 3E 04       MVI  A,NBANKS               A = NBANKS
0C97 01 18 CC    LXI  B,(WORK1+16-NBANKS)*100H+UNLOCK
                        ;                    B = OFFSET, WORK1[16-NBANKS]
                        ;                    C = OFFSET, UNLOCK
0C9A CD B3 0F    CALL MVLNIB                 MVLNIB(UNLOCK,WORK1[16-NBANKS],
                        ;                          ( @C   , @B              ,
                        ;                          ( 0    , I               ,
                        ;
                        ;                    NBANKS,NONBCD,ZERO )
                        ;                     A     ,PSW:S ,PSW:Z)
                        ;                     I     , 0    , 0    )
0C9D 0C          INR  C                      PSW:Z = ERRFLG = FALSE
                        ;                  ENDIF
                        ;              --ENDCASE
                        ;              ENDIF
                        ;            ENDIF
0C9E C9          RET               RETURN
```

SETPOS

```
                ;SETPOS(MSGBUF,ERRFLG)(SETLIM,WORK1 ,WORK2 ,MRSTS1,
                ;      (NIBSTR,BIT   )(NIBSTR,NIBSTR,NIBSTR,BITSTR,
                ;      ( I    , 0    )( I     , 0     , 0     , 0     ,
                ;      ( @B   ,PSW:Z )( RAM   , RAM   , RAM   , RAM   ,
                ;      ( NC   , C    )( NC    , C     , C     , C     ,
                ;
                ;      NORFLG,POSREG)
                ;      BITSTR,NIBSTR)
                ;       0     , 0     )
                ;       RAM   , RAM   )
                ;       C     , C     )
                ;
                ;REGISTERS DESTROYED
                ;PSW DESTROYED
                ;
                ;PROCESS SET POSTAGE COMMAND
                ;
                SETPOS:                   ****ENTRY POINT
                ;                         SET TO REACH PROERR VIA RETURN
0C9F 21 A1 0B    LXI  H,PROERR
0CA2 E5          PUSH H
0CA3 CD 4E 0F    CALL LSTATE              LSTATE(FATMOD,NORMOD,SERMOD,PRVMOD)
                ;                               (PSW:S ,PSW:Z ,PSW:P ,PSW:CY)
                ;                               ( 0     , 0     , 0     , 0     )
                ;                         IF NORMOD .EQ. FALSE
                ;                           METER NOT IN NORMAL MODE
0CA6 C0          RNZ                        PROERR(ERRFLG)
                ;                         ELSE
                ;                           PUT NEW SETTING VALUE INTO WORK1
0CA7 16 04       MVI  D,NBANKS              D = NIBCNT = NBANKS
0CA9 CD AA 0A    CALL MSG2MU                MSG2MU(MSGBUF,NIBCNT,ERRFLG)
                ;                                 ( @B    , D     ,PSW:Z )
                ;                                 ( I     , I     , 0     )
0CAC F5          PUSH PSW                   SAVE A,PSW
0CAD 21 24 74    LXI  H,MRSTS1/2+X          HL = ADDRESS, MRSTS1
0CB0 7E          MOV  A,M                   MRSTS1.ENABLD = FALSE
0CB1 E6 FB       ANI  0FBH
0CB3 77          MOV  M,A
0CB4 F1          POP  PSW                   RESTORE A,PSW
                ;                           IF ERRFLG .EQ. TRUE
                ;                             NEW SETTING VALUE IS IMPROPER
0CB5 C8          RZ                           PROERR(ERRFLG)
                ;                           ELSE
                ;                             FETCH SETTING LIMIT EXPONENT
0CB6 06 1F       MVI  B,SETLIM+1              B = OFFSET, SETLIM[1]
0CB8 CD 35 0F    CALL GETNIB                  GETNIB(EXPONT,ZROFLG,SETLIM[1])
                ;                                   ( A     ,PSW:Z , @B      )
                ;                                   ( 0     , 0     , I       )
                ;                             CALCULATE WORK2 INDEX FOR MANTISSA
0CBB 2F          CMA                          A = -EXPONT-1
0CBC C6 10       ADI  16                      C = I = 15-EXPONT
0CBE 4F          MOV  C,A
                ;                             CLEAR WORK2
0CBF 3E D0       MVI  A,WORK2                 A = OFFSET, WORK2
0CC1 CD 85 0E    CALL CLRBLK                  CLRBLK(WORK2)
                ;                                   ( @A   )
                ;                                   ( 0    )
                ;                             PUT SET LIMIT MANTISSA INTO WORK2
0CC4 81          ADD  C                       C = OFFSET, WORK2[I]
0CC5 4F          MOV  C,A
0CC6 05          DCR  B                       B = OFFSET, SETLIM[0]
0CC7 CD 35 0F    CALL GETNIB                  GETNIB(MANTIS,ZROFLG,SETLIM[0])
                ;                                   ( A     ,PSW:Z , @B      )
                ;                                   ( 0     , 0     , I       )
0CCA CD EE 0F    CALL PUTNIB                  PUTNIB(WORK2[I],MANTIS)
                ;                                   ( @C       , A     )
                ;                                   ( 0        , I     )
                ;                             COMPARE NEW SETTING VS SETTING LIM
0CCD 11 DB CB    LXI  D,(WORK1+15-NBANKS)*100H+(WORK2+15-NBANKS)
                ;                             D = OFFSET, WORK1[N=15-NBANKS]
```

```
                     ;                       E = OFFSET, WORK2[N]
      0CD0 3E 05       MVI  A,NBANKS+1       A = NIBCNT = NBANKS+1
      0CD2 CD 8E 0E    CALL CMPARE           CMPARE(WORK1[N],WORK2[N],NIBCNT,
                     ;                              ( @D      , @E      , A     ,
                     ;                              ( I       , I       , I     ,
                     ;
                     ;                              NEGFLG,ZROFLG)
                     ;                              PSW:S ,PSW:Z )
                     ;                               0    , 0     )
                     ;                       IF NEGFLG .EQ. FALSE
                     ;                         NEW SETTING EXCEEDS LIMIT
      0CD5 F0          RP                      PROERR(ERRFLG)
                     ;                       ELSE
      0CD6 F1          POP  PSW                CLEAN UP STACK
                     ;                         SET POSTAGE
      0CD7 11 26 74    LXI  D,NORFLG/2+X       DE = ADDRESS, NORFLG
      0CDA 1A          LDAX D                  NORFLG.LATDSB = FALSE
      0CDB E6 FE       ANI  0FEH
      0CDD F6 02       ORI  2                  NORFLG.UNVSEL = TRUE
      0CDF 12          STAX D
      0CE0 7E          MOV  A,M                MRSTS1.UNKSEL = TRUE
      0CE1 F6 80       ORI  80H
      0CE3 77          MOV  M,A
      0CE4 E5          PUSH H                  SAVE HL
      0CE5 CD 25 1A    CALL MVPOST             MVPOST(ERROR)
                     ;                                ( A    )
                     ;                                ( 0    )
      0CE8 E1          POP  H                  RESTORE HL
      0CE9 B7          ORA  A                  PSW:Z = NOERR = ERROR .EQ. 0
                     ;                         IF NOERR .EQ. FALSE
                     ;                           METER DID NOT SET
      0CEA C2 80 08    JNZ  FATERR               FATERR(ERROR,ERRFLG)
                     ;                                  ( A    ,PSW:Z )
                     ;                                  ( I    , 0     )
                     ;                         ELSE
                     ;                           REPORT SUCCESSFUL SETTING
      0CED 01 42 CC    LXI  B,(WORK1+16-NBANKS)*100H+POSREG
                     ;                           B = OFFSET, WORK1[N]
                     ;                           C = OFFSET, POSREG
      0CF0 3E 04       MVI  A,NBANKS             A = NIBCNT = NBANKS
      0CF2 CD B3 0F    CALL MVLNIB               MVLNIB(POSREG,WORK1[N],NBANKS,
                     ;                                  ( @C   , @B      , A     ,
                     ;                                  ( 0    , I       , I     ,
                     ;
                     ;                                  NONBCD,ZROFLG)
                     ;                                  PSW:S ,PSW:Z )
                     ;                                   0    , 0     )
      0CF5 7E          MOV  A,M                  MRSTS1.UNKSEL = FALSE
      0CF6 E6 7F       ANI  7FH
      0CF8 77          MOV  M,A
                     ;                           CLEAR ERROR FLAG
      0CF9 0C          INR  C                    C = OFFSET, POSREG[1]
                     ;                           PSW:Z = ERRFLG = C.EQ.0=FALSE
                     ;                         ENDIF
                     ;                       ENDIF
                     ;                     ENDIF
                     ;                   ENDIF
      0CFA C9          RET               RETURN

SRVCNV
                     ;SRVCNV(SRVREG,MAXCNT,ERRFLG)(AMTBUF,DIEDCM)
                     ;      (NIBSTR,BYTE  ,BIT   )(NIBSTR,BYTE  )
                     ;      ( 0    , I    , 0    )( I    , I     )
                     ;      ( @E   , D    ,PSW:Z )( RAM  , RAM   )
                     ;      ( C    , C    , C    )( NC   , NC    )
                     ;
                     ;PSW DESTROYED
                     ;REGISTERS DESTROYED
                     ;
                     ;CONVERT MESSAGE FORMATTED VALUE IN AMTBUF INTO A
                     ;SPECIAL SERVICE REGISTER FORMAT IN THE FORM:
```

```
                   ;MANTISSA*10**EXPONENT, IN WHICH
                   ;SRVREG[0] = MANTISSA
                   ;SRVREG[1] = EXPONENT
                   ;
                   SRVCNV;                 ****ENTRY POINT
                   ;                       SET TO REACH PROERR VIA RETURN
0CFB 21 A1 0B       LXI  H,PROERR
0CFE E5             PUSH H
                   ;                       FETCH VALUES FROM MESSAGE FORMAT
0CFF 06 E1          MVI  B,AMTBUF+1        B = OFFSET, AMTBUF[1]
0D01 CD 35 0F       CALL GETNIB            GETNIB(DECPOS,ZROFLG,AMTBUF[1])
                   ;                             ( A     ,PSW:Z , @B      )
                   ;                             ( O     , O    , I       )
0D04 6F             MOV  L,A               L = DECPOS
0D05 05             DCR  B                 B = OFFSET, AMTBUF[0]
0D06 CD 35 0F       CALL GETNIB            GETNIB(MSGCNT,ZROFLG,AMTBUF[0])
                   ;                             ( A     ,PSW:Z , @B      )
                   ;                             ( O     , O    , I       )
0D09 67             MOV  H,A               H = MSGCNT
                   ;                       IF ZROFLG .EQ. TRUE
                   ;                         NO VALUE WAS ENTERED
0D0A C8             RZ                       PROERR(ERRFLG)
                   ;                       ELSE
                   ;                       POINT TO RIGHT OF H/O MESSAGE DIGIT
0D0B E6 01          ANI  1                 B = OFFSET, AMTBUF[I=
                   ;                                   (MSGCNT .AND. HEX01)+3]
0D0D C6 E3          ADI  AMTBUF+3
0D0F 47             MOV  B,A
0D10 4F             MOV  C,A               C = OFFSET, AMTBUF[I]
                   ;                       SCAN DIGITS TO RIGHT OF H/O MSG DIGIT
0D11 7C             MOV  A,H               A = NIBCNT = MSGCNT-1
0D12 3D             DCR  A
0D13 CD B3 0F       CALL MVLNIB            MVLNIB(AMTBUF[I],AMTBUF[I],NIBCNT,
                   ;                             ( @C       , @B       , A    ,
                   ;                             ( O        , I        , I    ,
                   ;
                   ;                             NONBCD,ZROFLG)
                   ;                             PSW:S ,PSW:Z )
                   ;                              O    , O    )
                   ;                       IF ZROFLG .EQ. FALSE
                   ;                         NOT ALL DIGITS SCANNED WERE ZEROES
0D16 C0             RNZ                      PROERR(ERRFLG)
                   ;                       ELSE
0D17 3A 35 74       LDA  DIEDCM/2+X        A = DIEDCM-DECPOS
0D1A 95             SUB  L
                   ;                       IF (DIEDCM-DECPOS) .LT. 0
                   ;                         BAD DECIMAL IN MESSAGE FORMAT
0D1B D8             RC                       PROERR(ERRFLG)
                   ;                       ELSE
                   ;                       CALCULATE EXPONENT
0D1C 84             ADD  H                 L = EXPONT = MSGCNT-1+DIEDCM-DECPOS
0D1D 3D             DCR  A
0D1E 6F             MOV  L,A
0D1F BA             CMP  D                 IF EXPONT .GE. MAXCNT
                   ;                         MESSAGE IS TOO LONG
0D20 D0             RNC                      PROERR(ERRFLG)
                   ;                       ELSE
                   ;                       FETCH H/O MESSAGE DIGIT AS MANTISSA
0D21 05             DCR  B                 B = OFFSET, AMTBUF[I=I-1]
0D22 CD 35 0F       CALL GETNIB            GETNIB(MANTIS,ZROFLG,AMTBUF[I])
                   ;                             ( A     ,PSW:Z , @B      )
0D25 FE 0A          CPI  10                IF MANTIS .GE. 10
                   ;                         NON BCD CHAR IN MESSAGE
0D27 D0             RNC                      PROERR(ERRFLG)
                   ;                       ELSE
0D28 C1             POP  B                   CLEAN UP STACK
                   ;                         PUT MANTISSA IN SERVICE REGISTER
0D29 4B             MOV  C,E                 C = OFFSET, SRVREG[0]
0D2A CD EE 0F       CALL PUTNIB              PUTNIB(SRVREG[0],MANTIS)
                   ;                               ( @C       , A     )
                   ;                               ( O        . I     )
```

```
                ;                    PUT EXPONENT IN SERVICE REGISTER
0D2D 0C           INR  C             C = OFFSET, SRVREG[1]
0D2E 7D           MOV  A,L           A = EXPONT
0D2F CD EE 0F     CALL PUTNIB        PUTNIB(SRVREG[1],EXPONT)
                ;                         ( @C      , A     )
                ;                         ( 0       , I     )
0D32 0C           INR  C             PSW:Z = ERRFLG = FALSE
                ;                    ENDIF
0D33 C9           RET                RETURN

SRVREQ
                ;SRVREQ(SRVVAL,SRVHDR,ERRFLG)(WORK1 ,WORK2 ,DIEDCM)
                ;      (NIBSTR,BYTE  ,BIT   )(NIBSTR,NIBSTR,BYTE  )
                ;      ( I    , I    , O    )( O    , O    , I    )
                ;      ( @B   , C    ,PSW:Z )( RAM  , RAM  , RAM  )
                ;      ( NC   , C    , C    )( C    , C    , NC   )
                ;
                ;PSW DESTROYED
                ;REGISTERS DESTROYED
                ;
                ;EXPAND COMPRESSED SERVICE REGISTER TO WORK BUFFER.
                ;CALL VALREQ TO BUILD MESSAGE IN XMTBUF.
                ;
                SRVREQ;              ****ENTRY POINT
                ;                    CLEAR WORK AREA
0D34 3E C0        MVI A,WORK1        A = OFFSET, WORK1
0D36 CD 85 0E     CALL CLRBLK        CLRBLK(WORK1)
                ;                         ( @A  )
                ;                         ( O   )
0D39 21 6A 74     LXI  H,(WORK2+4)/2+X
                ;                    HL = ADDRESS, WORK2[4..5]
0D3C 71           MOV  M,C           WORK2[4..5] = SRVHDR
0D3D 0E C4        MVI  C,WORK1+4     C = OFFSET, WORK1[4]
                ;                    MOVE MANTISSA INTO WORK AREA
0D3F 3E 01        MVI  A,1           A = NIBCNT = 1
0D41 CD B3 0F     CALL MVLNIB        MVLNIB(WORK1[4],SRVVAL[0],NIBCNT,PSW)
                ;                         ( @C     , @B       , A     ,PSW)
                ;                         ( O      , I        , I     , O )
0D44 04           INR  B             B = OFFSET, SRVVAL[1]
                ;                    FETCH EXPONENT
0D45 CD 35 0F     CALL GETNIB        GETNIB(EXPONT,PSW,SRVVAL[1])
                ;                         ( A    ,PSW, @B       )
                ;                         ( O    , O , I        )
0D48 3C           INR  A             A = NIBCNT = EXPONT+1
0D49 07           RLC                B = FORMAT = HEX10*NIBCNT
0D4A 07           RLC
0D4B 07           RLC
0D4C 07           RLC
0D4D 47           MOV  B,A
0D4E 3A 35 74     LDA  DIEDCM/2+X    A = FORMAT = FORMAT+DIEDCM
0D51 80           ADD  B
0D52 2B           DCX  H             HL = ADDRESS, WORK2[2..3]
0D53 77           MOV  M,A           WORK2[2..3] = FORMAT
0D54 2B           DCX  H             HL = ADDRESS, WORK2[0..1]
0D55 36 C4        MVI  M,WORK1+4     WORK2[0..1] = OFFSET, WORK1[4]
0D57 EB           XCHG               DE = ADDRESS, WORK2[0..1]
                  ;                  PUT REPLY INTO TRANSMIT BUFFER
0D58 C3 5B 0D     JMP  VALREQ        VALREQ(WORK1[4],WORK2[2],WORK2[4],
                ;                         (@@DE+0 ,@DE+1   ,@DE+2    ,
                ;                         ( I     , I      , I       ,
                ;
                ;                         ERRFLG)
                ;                         PSW:Z )
                ;                          O    )
                ;                    RETURN

VALREQ
                ;VALREQ(SOURCE,VALFMT,ANSHDR,ERRFLG)(DIEDCM,DEFDCM,XMTBUF)
                ;      (NIBSTR,BYTE  ,BYTE  ,BYTE  )(BYTE  ,BYTE  ,NIBSTR)
                ;      ( I    , I    , I    , O    )( I    , I    , O    )
                ;      (@@DE+0, @DE+1, @DE+2,PSW:Z )( RAM  , RAM  , RAM  )
```

```
                  ;       ( NC    , NC    , NC    , C     )( NC    , NC    , C     )
                  ;
                  ;PSW DESTROYED
                  ;ALL REGISTERS DESTROYED
                  ;
                  ;BUILD VALUE REPLY MESSAGE IN TRANSMIT BUFFER
                  ;
                  VALREQ;                  ****ENTRY POINT
                  ;                        FETCH OFFSET OF SOURCE
0D5B EB             XCHG                   HL = ADDRESS, (OFFSET, SOURCE[L=0])
0D5C 46             MOV  B,M               B = OFFSET, SOURCE[L=0]
                  ;                        FETCH FORMAT TEMPLATE FOR MESSAGE
0D5D 23             INX  H                 HL = ADDRESS, VALFMT
0D5E 7E             MOV  A,M               E = DECPOS = VALFMT[1]
0D5F E6 0F          ANI  0FH
0D61 5F             MOV  E,A
0D62 7E             MOV  A,M               D = NDIGIT = VALFMT[0]
0D63 AB             XRA  E
0D64 0F             RRC
0D65 0F             RRC
0D66 0F             RRC
0D67 0F             RRC
0D68 57             MOV  D,A
                  ;                        FETCH HEADER FOR REPLY
0D69 23             INX  H                 HL = ADDRESS, ANSHDR
0D6A 4E             MOV  C,M               C = ANSHDR
                  ;                        SCAN FOR MOST SIGNIFICANT DIGIT
                  VALR01;                  DO WHILE SOURCE[L] .EQ. 0
0D6B CD 35 0F       CALL GETNIB              GETNIB(LDIGIT,ZROFLG,SOURCE[L])
                  ;                                ( A     , PSW:Z, @B       )
                  ;                                ( O     , O    , I        )
0D6E C2 78 0D       JNZ  VALR02
0D71 04             INR  B                   B = OFFSET, SOURCE[L=L+1]
0D72 15             DCR  D                   D = NDIGIT = NDIGIT-1
0D73 C2 6B 0D       JNZ  VALR01              IF NDIGIT .EQ. 0
0D76 14             INR  D                     D = NDIGIT = 1
0D77 05             DCR  B                     B = OFFSET, SOURCE[L=L-1]
                  ;                            BREAK
                  ;                          ENDIF
                  VALR02;                  ENDDO
0D78 1C             INR  E                 IF DECPOS .EQ. 0
0D79 1D             DCR  E
0D7A C2 9E 0D       JNZ  VALR05
                  ;                          METER CHARACTERISTCS WILL
                  ;                          DETERMINE FORMAT.
                  ;                          ADJUST VALUES SO THAT AT LEAST ONE
                  ;                          DIGIT WILL BE TO LEFT OF DECIMAL.
0D7D 2A 35 74       LHLD DIEDCM/2+X          L = DIEDCM
                  ;                          H = DEFDCM
0D80 5D             MOV  E,L                 E = DECPOS = DIEDCM
0D81 7D             MOV  A,L                 A = ADJUST = DIEDCM+1-NDIGIT
0D82 3C             INR  A
0D83 92             SUB  D
0D84 FA 8D 0D       JM   VALR03              IF ADJUST .GE. 0
0D87 6F             MOV  L,A                   L = ADJUST
0D88 82             ADD  D                     D = NDIGIT = NDIGIT+ADJUST
0D89 57             MOV  D,A
0D8A 78             MOV  A,B                   B = OFFSET, SOURCE[L=L-ADJUST]
0D8B 95             SUB  L
0D8C 47             MOV  B,A
                  VALR03;                    ENDIF
                  ;                          SUPPRESS TRAILING ZERO IN THE
                  ;                          EVENT DIEDCM .GT. DEFDCM
0D8D C5             PUSH B                   SAVE BC
0D8E 78             MOV  A,B                 B = OFFSET, SOURCE[R=L+NDIGIT-1]
0D8F 82             ADD  D
0D90 3D             DCR  A
0D91 47             MOV  B,A
0D92 CD 35 0F       CALL GETNIB              GETNIB(RDIGIT,ZROFLG,SOURCE[R])
                  ;                                ( A     , PSW:Z, @B       )
                  ;                                ( O     , O    , I        )
```

```
0D95 C1           POP  B              B = SOURCE[L]
                 ;                    C = ANSHDR
0D96 C2 9E 0D     JNZ  VALR04         IF NDIGIT .EQ. 0
                 ;                      TRAILING ZERO IS PRESENT
0D99 7A           MOV  A,D              D = NDIGIT = NDIGIT+DEFDCM-DECPOS
0D9A 93           SUB  E
0D9B 84           ADD  H
0D9C 57           MOV  D,A
0D9D 5C           MOV  E,H              E = DECPOS = DEFDCM
                 VALR04;              ENDIF
                 VALR05;            ENDIF
                 ;                  CLEAR TRANSMIT BUFFER
0D9E 3E A0        MVI  A,XMTBUF     A = OFFSET, XMTBUF
0DA0 CD 85 0E     CALL CLRBLK       CLRBLK(XMTBUF)
                 ;                        ( @A    )
                 ;                        ( 0     )
                 ;                  BUILD MESSAGE IN TRANSMIT BUFFER
0DA3 7A           MOV  A,D          L = MSGSIZ = 2+(NDIGIT+1)/2
0DA4 B7           ORA  A
0DA5 1F           RAR
0DA6 CE 02        ACI  2
0DA8 6F           MOV  L,A
0DA9 61           MOV  H,C          H = ANSHDR
0DAA 22 50 74     SHLD XMTBUF/2+X   XMTBUF[0..1] = MSGSIZ
                 ;                  XMTBUF[2..3] = ANSHDR
0DAD 0E A4        MVI  C,XMTBUF+4   C = OFFSET, XMTBUF[4]
0DAF 7A           MOV  A,D          A = NDIGIT
0DB0 CD EE 0F     CALL PUTNIB       PUTNIB(XMTBUF[4],NDIGIT)
                 ;                        ( @C       , A    )
                 ;                        ( 0        , I    )
0DB3 0C           INR  C            C = OFFSET, XMTBUF[5]
0DB4 7B           MOV  A,E          A = DECPOS
0DB5 CD EE 0F     CALL PUTNIB       PUTNIB(XMTBUF[5],DECPOS)
                 ;                        ( @C       , A    )
                 ;                        ( 0        , I    )
0DB8 0C           INR  C            C = OFFSET, XMTBUF[I=6+(NDIGIT.MOD.2)]
0DB9 7A           MOV  A,D
0DBA E6 01        ANI  1
0DBC 81           ADD  C
0DBD 4F           MOV  C,A
0DBE 7A           MOV  A,D          A = NDIGIT
0DBF CD B3 0F     CALL MVLNIB       MVLNIB(XMTBUF[I],SOURCE[L],NDIGIT,
                 ;                        ( @C       , @B       , A     ,
                 ;                        ( 0        , I        , I     ,
                 ;
                 ;                         NONBCD,ZROFLG)
                 ;                         PSW:S ,PSW:Z )
                 ;                          0    , 0    )
0DC2 FA A1 0B     JM   PROERR       IF NONBCD .EQ. TRUE
                 ;                    PROCESS ERROR
                 ;                    PROERR(ERRFLG)
                 ;                         ( A     )
                 ;                         ( 0     )
                 ;                    RETURN
                 ;                  ELSE
0DC5 0C           INR  C              PSW:Z = ERRFLG = FALSE
0DC6 C9           RET                 RETURN
                 ;                  ENDIF

XEQHDR

                 ;XEQHDR(HEADER,ERRFLG)(DBUF  ,XMTBUF,NORFLG)
                 ;      (BYTE  ,BIT   )(NIBSTR,NIBSTR,BITSTR)
                 ;      ( I    , 0    )( I/0  , I    , 0    )
                 ;      ( A    ,PSW:Z )( RAM  , RAM  , RAM  )
                 ;      ( NC   , C    )( C    , NC   , C    )
                 ;
                 ;PSW = DESTROYED
                 ;
                 ;SUPERVISES THE EXECUTION OF INTERNALLY GENERATED HEADERS
                 ;
```

```
                XEQHDR;                 ****ENTRY POINT
0DC7 E5           PUSH H                SAVE HL
0DC8 D5           PUSH D                SAVE DE
0DC9 C5           PUSH B                SAVE BC
0DCA 47           MOV  B,A              B = HEADER
                ;                       STOP TIMER
0DCB CD 34 01     CALL STPTMR           STPTMR(WASOFF)
                ;                             (PSW:Z )
                ;                             ( 0    )
0DCE 3A 40 74     LDA  DBUF/2+X         A = DBUF[0..1]
0DD1 B7           ORA  A                PSW:Z = DBUF[0..1] .EQ. 0
0DD2 78           MOV  A,B              A = HEADER
0DD3 C2 E7 0D     JNZ  XEQH02           IF DBUF[0..1] .EQ. 0
                ;                         DISPLAY HAS KEYENTERED DATA
0DD6 FE C4        CPI  HSETDA             IF(HEADER .LT .0) .AND.
                ;                           (HEADER .NE. HSETDA)
0DD8 CA E7 0D     JZ   XEQH01
0DDB B7           ORA  A
0DDC F2 E7 0D     JP   XEQH01
                ;                           PROCESS HEADER WITH DATA IN DBUF
0DDF 06 82        MVI  B,DBUF+2             B = OFFSET, DBUF[2]
0DE1 CD 41 09     CALL HDRPLS               HDRPLS(HEADER,DBUF[2],ERRFLG)
                ;                                  ( A    , @B    ,PSW:Z)
                ;                                  ( I    , I     , 0   )
0DE4 C3 EA 0D     JMP  XEQH03
                XEQH01;                   ELSE
                ;                           PROCESS HEADER WITHOUT DATA
                ;                           HDRONY(HEADER,ERRFLG)
                ;                                  ( A    ,PSW:Z)
                ;                                  ( I    , 0   )
                ;                         ENDIF
                XEQH02;                 ELSE
                ;                         PROCESS HEADER WITHOUT DATA
0DE7 CD D5 08     CALL HDRONY             HDRONY(HEADER,ERRFLG)
                ;                                ( A    ,PSW:Z)
                ;                                ( I    , 0   )
                XEQH03;                 ENDIF
0DEA CA 11 0E     JZ   XEQH07           IF ERRFLG .EQ. FALSE
0DED F5           PUSH PSW                SAVE A, PSW
0DEE 3A 50 74     LDA  XMTBUF/2+X         A = BYTCNT = XMTBUF[0..1]
0DF1 B7           ORA  A                  PSW:Z = BYTCNT .EQ. 0
                ;                         PSW:CY = 0
0DF2 CA 02 0E     JZ   XEQH04             IF BYTCNT .NE. 0
                ;                           CONVERT BYTE COUNT TO NIBBLE COUNT
0DF5 17           RAL                       A = NIBCNT = 2*BYTCNT
0DF6 01 80 A2     LXI  B,(XMTBUF+2)*100H+DBUF
                ;                           B = OFFSET, XMTBUF[2]
                ;                           C = OFFSET, DBUF[0]
                ;                           MOVE DATA INTO DBUF
0DF9 CD B3 0F     CALL MVLNIB               MVLNIB(DBUF[0],XMTBUF[2],NIBCNT)
                ;                                  ( @C    , @B      , A    )
                ;                                  ( 0     , I       , I    )
0DFC CD 5A 05     CALL VALDSP               MOVE DBUF INTO DISPLAY
0DFF C3 10 0E     JMP  XEQH06
                XEQH04;                   ELSE
                ;                           BYTCNT .EQ. 0
                ;                           COMMAND AFFECTED STATUS ONLY
0E02 3A 40 74     LDA  DBUF/2+X             IF DBUF[0..1] = HEX00
0E05 B7           ORA  A
0E06 C2 10 0E     JNZ  XEQH05
                ;                             KEYENTERED DISPLAY UNCHANGED
                ;                             QUE POSTAGE REQUEST
0E09 21 26 74     LXI  H,NORFLG/2+X           HL = ADDRESS, NORFLG
0E0C 7E           MOV  A,M                    NORFLG.QUEPOS = TRUE
0E0D F6 40        ORI  40H
0E0F 77           MOV  M,A
                XEQH05;                     ENDIF
                XEQH06;                   ENDIF
0E10 F1           POP  PSW                A = HEADER
                ;                         PSW:Z = ERRFLG
                XEQH07;                 ENDIF
```

```
0E11 C1            POP  B              RESTORE BC
0E12 D1            POP  D              RESTORE DE
0E13 E1            POP  H              RESTORE HL
0E14 C9            RET                 RETURN

XMIT
                  ;XMIT()(SID,SOD,SOE,XMTBUF,NORFLG)
                  ;      (BIT,BIT,BIT,BYTSTR,BYTSTR)
                  ;      ( I , O , O , I/O  , I    )
                  ;      (RIM,SIM,SIM, RAM  , RAM  )
                  ;      ( NC, C , C , C    , NC   )
                  ;
                  ;REGISTERS DESTROYED
                  ;PSW DESTROYED
                  ;
                  ;ATTEMPT TO TRANSMIT MESSAGE IN XMTBUF.
                  ;ONE ATTEMPT ONLY.  XMTBUF[0], THE MESSAGE BYTE COUNT,
                  ;IS CLEARED WHETHER OR NOT THE MESSAGE IS ACTUALLY SENT.
                  ;XMTBUF[0] IS ASSUMED .GT. 0, AND .LE. 7 ON ENTRY.
                  ;
                  XMIT;                 ****ENTRY POINT
                  ;                     FETCH BYTE COUNT OF OUTBOUND MESSAGE
0E15 21 50 74      LXI  H,XMTBUF/2+X   HL =  ADDRESS, XMTBUF[N=0]
0E18 4E            MOV  C,M            C = BYTCNT = XMTBUF[N]
                  ;                     CANCEL MSG BY CLEARING XMTBUF[0]
0E19 36 00         MVI  M,0            XMTBUF[N] = 0
0E1B 3A 26 74      LDA  NORFLG/2+X     IF NORFLG.COMDSB .EQ. TRUE
0E1E E6 04         ANI  4
                  ;                       COMMUNICATIONS ARE DISABLED
0E20 C0            RNZ                    RETURN
                  ;                     ENDIF
                  ;                     STOP TIMER
0E21 CD 34 01      CALL STPTMR         STPTMR(WASOFF)
                  ;                           (PSW:Z )
                  ;                           ( 0    )
0E24 E5            PUSH H              SAVE HL
0E25 C5            PUSH B              SAVE BC
0E26 CD C7 0B      CALL RECEVE         IF INCOMING RTS IS PRESENT
                  ;                       RECEIVE MESSAGE
                  ;                     ENDIF
0E29 3E C0         MVI  A,0C0H         SIM.SOD = RTS = 1
                  ;                     SIM.SOE = ENABLD = 1
0E2B 30            SIM                 OUTPUT RTS
0E2C C1            POP  B              RESTORE BC
0E2D E1            POP  H              RESTORE HL
0E2E 16 D9         MVI  D,217          D = COUNT ;FOR T13 = 3.509 MSEC
                  XMIT01;               DO UNTIL BIT .EQ. CTS
0E30 15            DCR  D                COUNT = COUNT-1
0E31 CA 7B 0E      JZ   XMIT06           IF COUNT+1 .EQ. 0
                  ; >>JUMP AHEAD<<           TIMEOUT HAS OCCURRED
                  ;                          QUIT
                  ;                        ENDIF
0E34 20            RIM                   INPUT BIT
                  ;                        A.0 = BIT = RIM.SID ;CTS OR IDLE
0E35 B7            ORA  A                CHECK BIT
0E36 F2 30 0E      JP   XMIT01
                  ;                     ENDDO

                  XMIT03;               DO UNTIL BYTCNT .EQ. 0
                  ;                       DEFINE STOP BIT
0E39 3E 01         MVI  A,1              IF 1 .LT. BYTCNT
0E3B B9            CMP  C
                  ;
                  ;                         THIS IS NOT LAST BYTE
                  ;                         PSW:CY = STOP = EOB = 1
                  ;                       ELSE
                  ;                         THIS IS THE LAST BYTE
                  ;                         PSW:CY = STOP = EOM = 0
                  ;                       ENDIF
0E3C 23            INX  H                HL = ADDRESS, XMTBUF[N=N+1]
0E3D 3E 12         MVI  A,18             DELAY ;FOR T4 = 178.234 USEC
0E3F 3D            DCR  A
```

```
0E40 F2 3F 0E    JP   $-1
                 ;                     SET TO OUTPUT 9 BITS FROM LOOP
                 ;                     8 DATA, AND 1 EOB OR EOM
0E43 06 0A       MVI  B,9+1            BITCNT = 10 = 9+1
0E45 3E 40       MVI  A,40H            SIM.SOD = START = 0
                 ;                     SIM.SOE = ENABLD = 1
0E47 57          MOV  D,A              D.0 = OUTBIT = START
0E48 30          SIM                   OUTPUT = START
                 ;                     LOAD 8 DATA BITS
0E49 7E          MOV A,M               A = XMTBUF[N]
                 ;                     SAVE 8 DATA BITS AND 1 STOP BIT
0E4A F5          PUSH PSW

                 XMIT04;               LOOP ;BREAK IF BITCNT .EQ. 0
0E4B 3E 06       MVI  A,6                DELAY ;BIT PERIOD = 103.923 USEC
0E4D 3D          DCR  A
0E4E F2 4D 0E    JP   $-1
0E51 F0          RP
0E52 F1          POP  PSW                SET NEXT BIT
0E53 1F          RAR                     PSW.CY = OUTBIT
0E54 F5          PUSH PSW
0E55 3E 80       MVI  A,80H              PSW:CY,A = SIM*2
0E57 1F          RAR                     A = SIM
                 ;                       SIM.SOD = OUTBIT
                 ;                       SIM.SOE = ENABLD = 1
0E58 5A          MOV  E,D                E.0 = PRVBIT = OUTBIT
0E59 57          MOV  D,A                D.0 = OUTBIT
0E5A 05          DCR  B                  BITCNT = BITCNT-1
                 ;                       IF BITCNT .EQ. 0
0E5B CA 68 0E    JZ   XMIT05               BREAK
                 ;                       ENDIF
0E5E 30          SIM                     OUTPUT OUTBIT
0E5F 20          RIM                     READ ECHO
                 ;                       A.0 = ECHO = RIM.SID
0E60 AB          XRA  E                  IF ECHO .NE. PRVBIT
0E61 F2 4B 0E    JP   XMIT04
0E64 F1          POP  PSW                  CLEAN UP STACK
0E65 C3 7B 0E    JMP  XMIT06               QUIT
                 ; >>JUMP AHEAD<<
                 ;                       ENDIF
                 XMIT05;               ENDLOOP
0E68 F1          POP  PSW              CLEAN UP STACK
0E69 20          RIM                   READ ECHO
                 ;                     A.0 = ECHO = RIM.SID
0E6A AB          XRA  E                IF ECHO .NE. STOP
0E6B FA 7B 0E    JM   XMIT06             QUIT
                 ; >>JUMP AHEAD<<
                 ;                     ENDIF
0E6E 0D          DCR  C                C = BYTCNT = BYTCNT-1
0E6F C2 39 0E    JNZ  XMIT03
                 ;                   ENDDO

0E72 3E C0       MVI  A,0C0H         SIM.SOD = ACK = 1
                 ;                   SIM.SOE = ENABLD = 1
0E74 30          SIM                 OUTPUT ACK
0E75 16 29       MVI  D,41           DELAY ;T7 = 336.914 USEC
0E77 15          DCR  D
0E78 F2 77 0E    JP   $-1
                 XMIT06;             >>TARGET OF JUMP AHEAD<<
                 ;                   QUIT XMIT ROUTINE
0E7B 3E 40       MVI  A,40H          SIM.SOD = IDLE = 0
                 ;                   SIM.SOE = ENABLD = 1
0E7D 30          SIM                 OUTPUT IDLE
0E7E 16 C8       MVI  D,200          DELAY ;T14 = 1606.908 USEC
0E80 15          DCR  D
0E81 F2 80 0E    JP   $-1
0E84 C9          RET                 RETURN

CLRBLK

                 ;CLRBLK(BLOCK )
                 ;      (NIBSTR)
```

```
                     ;       ( 0     )
                     ;       ( @A    )
                     ;       ( C     )
                     ;
                     ;PSW:S, Z, P, CY = NO CHANGE
                     ;
                     ;CLEAR A 16 NIBBLE BLOCK TO ZEROS
                     ;BLOCK[0..15] = 0
                     ;
                     CLRBLK;               ****ENTRY POINT
0E85 F5                PUSH PSW            SAVE A, PSW
0E86 C5                PUSH B              SAVE BC
0E87 4F                MOV  C,A            C = OFFSET, BLOCK
0E88 AF                XRA  A              A = NIBVAL = 0
0E89 06 10             MVI  B,16           B = NIBCNT = 16
0E8B C3 26 0F          JMP  FILN01         FILNIB(BLOCK,NIBVAL,NIBCNT)
                     ;                            ( @C   , A    , B     )
                     ;                            ( 0    , I    , I     )
                     ;                     RESTORE BC
                     ;                     RESTORE A, PSW
                     ;                     RETURN
```

CMPARE

```
                     ;CMPARE(MINUEN,SUBTRA,NNIB ,SGNFLG,ZROFLG)
                     ;      (NIBSTR,NIBSTR,BYTE ,BIT   ,BIT   )
                     ;      ( I    , I    , I   , 0    , 0    )
                     ;      ( @D   , @E   , A   ,PSW:S ,PSW:Z )
                     ;      ( NC   , NC   , NC  , C    , C    )
                     ;
                     ;PSW:CY = NO CHANGE
                     ;PSW:S, Z, P CHANGED
                     ;
                     ;COMPARE EQUAL LENGTH BCD NIBBLE STRINGS
                     ;
                     CMPARE;               ****ENTRY POINT
0E8E E5                PUSH H              SAVE HL
0E8F F5                PUSH PSW            SAVE A, PSW
0E90 C5                PUSH B              SAVE BC
0E91 D5                PUSH D              SAVE DE
0E92 67                MOV  H,A            H = COUNT = NNIB
                     CMPAR1;               DO WHILE COUNT .GT. 0
0E93 25                DCR  H                H = COUNT-1
0E94 FA A9 0E          JM   CMPAR2
0E97 43                MOV  B,E              B = OFFSET,
                     ;                           SUBTRA[SINDEX = NNIB-COUNT]
0E98 CD 35 0F          CALL GETNIB           GETNIB(SDIGIT,ZERO ,SUBTRA[SINDEX])
                     ;                              ( A    ,PSW:Z, @B            )
                     ;                              ( 0    , 0   , I             )
0E9B 4F                MOV  C,A              C = SDIGIT
0E9C 42                MOV  B,D              B = OFFSET,
                     ;                           MINUEN[MINDEX = NNIB-COUNT]
0E9D CD 35 0F          CALL GETNIB           GETNIB(MDIGIT,ZERO ,MINUEN[MINDEX])
                     ;                              ( A    ,PSW:Z, @B            )
                     ;                              ( 0    , 0   , I             )
0EA0 91                SUB  C                A = DIFRNC = MDIGIT-SDIGIT
0EA1 C2 A9 0E          JNZ  CMPAR2           IF DIFRNC .NE. 0
                     ;                         BREAK
                     ;                       ENDIF
0EA4 1C                INR  E                E = OFFSET,
                     ;                           SUBTRA[SINDEX = NNIB-(COUNT-1)]
0EA5 14                INR  D                D = OFFSET,
                     ;                           MINUEN[MINDEX = NNIB-(COUNT-1)]
                     ;                       H = COUNT = COUNT-1
0EA6 C3 93 0E          JMP  CMPAR1
                     CMPAR2;               ENDDO
0EA9 D1                POP  D              RESTORE DE
0EAA C1                POP  B              RESTORE BC
                     ;                     IF NNIB .EQ. 0
0EAB 67                MOV  H,A              H = DIFRNC = NNIB = 0
                     ;                     ELSE
```

```
                    ;                        H = DIFRNC
                    ;                       ENDIF
0EAC F1               POP  PSW              RESTORE A, PSW:CY
                    ;                       OUTPUT PSW:S = SGNFLG
                    ;                       OUTPUT PSW:Z = ZROFLG
0EAD 24               INR  H
0EAE 25               DCR  H
0EAF E1               POP  H                RESTORE HL
0EB0 C9               RET                   RETURN

CRC
                    ;CRC(BLOCK ,NIBCNT,CRCVAL)
                    ;   (NIBSTR,UBYTE ,UBYTE )
                    ;   ( I     , I     , O     )
                    ;   ( @C    , B     , D     )
                    ;   ( NC    , NC    , C     )
                    ;
                    ;PSW = NO CHANGE
                    ;
                    ;COMPUTE CRC FOR BLOCK OF NIBCNT NIBBLES
                    ;
                    CRC;                    ****ENTRY POINT
0EB1 C5               PUSH B                SAVE BC
0EB2 F5               PUSH PSW              SAVE A, PSW
0EB3 78               MOV  A,B              A = NIBCNT
0EB4 41               MOV  B,C              B = OFFSET, BLOCK[N = 0]
0EB5 4F               MOV  C,A              C = NIBCNT
0EB6 16 FF            MVI  D,0FFH           D = CRCVAL = HEXFF
                    CRC1;                   DO UNTIL NIBCNT = 0
0EB8 CD 35 0F         CALL GETNIB             GETNIB(NIBVAL,ZERO ,BLOCK[N])
                    ;                                ( A     ,PSW:Z, @B     )
                    ;                                ( O     , O    , I     )
0EBB CD C6 0E         CALL CRCNIB             CRCNIB(NIBVAL,CRCVAL)
                    ;                                ( A     , D     )
                    ;                                ( I     , I/O   )
0EBE 04               INR  B                  B = OFFSET, BLOCK[N = N+1]
0EBF 0D               DCR  C                  NIBCNT = NIBCNT-1
0EC0 C2 B8 0E         JNZ  CRC1
                    ;                       ENDDO
0EC3 F1               POP  PSW              RESTORE A, PSW
0EC4 C1               POP  B                RESTORE BC
0EC5 C9               RET

CRCNIB
                    ;CRCNIB(NIBVAL,CRCVAL)
                    ;       (BYTE  ,BYTE  )
                    ;       ( I    , I/O  )
                    ;       ( A    , D    )
                    ;       ( NC   , C    )
                    ;
                    ;PSW DESTROYED
                    ;
                    ;INCLUDE NIBBLE INTO DEVELOPING VALUE OF CRC
                    ;
                    CRCNIB;                 ****ENTRY POINT
0EC6 C5               PUSH B                SAVE BC
0EC7 06 04            MVI  B,4              B = BITCNT = 4
                    ;                       SHIFT BITS TO HIGH ORDER OF NIBVAL
0EC9 07               RLC                   A = NIBVAL = NIBVAL*HEX10
0ECA 07               RLC
0ECB 07               RLC
0ECC 07               RLC
                    ;                       ROTATE NIBVAL ONE BIT AT A TIME
                    ;                       BACK INTO ITS ORIGINAL FORM WHILE
                    ;                       MODIFYING CRCVAL TO REFLECT
                    ;                       THE BIT'S VALUE
                    CRCNI1;                 DO UNTIL BITCNT .EQ. 0
0ECD 07               RLC                     CY = NIBBIT
                    ;                         A = NIBVAL = ((NIBVAL*2) .AND.
                    ;                               HEXFF)+NIBBIT
```

```
0ECE 4F         MOV  C,A            C = NIBVAL
0ECF 7A         MOV  A,D            A = CRCVAL
0ED0 17         RAL                 CY = CRCBIT
               ;                    A = CRCVAL = ((CRCVAL*2) .AND.
               ;                             HEXFF)+NIBBIT
0ED1 D2 D6 0E   JNC  CRCNI2         IF CRCBIT = 1
0ED4 EE 9B      XRI  9BH              A = CRCVAL = CRCVAL .XOR. HEX9B
               CRCNI2;              ENDIF
0ED6 57         MOV  D,A            D = CRCVAL
0ED7 79         MOV  A,C            A = NIBVAL
0ED8 05         DCR  B              B = BITCNT = BITCNT-1
0ED9 C2 CD 0E   JNZ  CRCNI1
               ;                   ENDDO
0EDC C1         POP  B             RESTORE BC
0EDD C9         RET                RETURN

DBLANK
               ;DBLANK()(PORTA )
               ;        (BITSTR)
               ;        ( I/O  )
               ;        ( 7001 )
               ;        ( C    )
               ;
               ;REGISTERS DESTROYED
               ;PSW DESTROYED
               ;
               ;DISPLAY BLANKING ROUTINE
               ;
               DBLANK;             ****ENTRY POINT
               ;                   PREVENT INTERRUPT DISPLAY REFRESH
0EDE CD 34 01   CALL STPTMR        STPTMR(WASOFF)
               ;                         (PSW:Z )
               ;                         ( 0    )
               ;                   FLUSH POSSIBLE NOISE OUT OF DISPLAY
0EE1 CD F6 0E   CALL DFLUSH        DFLUSH(ADDRESS,PORTA)
               ;                         ( HL     , @HL )
               ;                         ( 0        -   )
               ;                   (PORTA .AND HEX0F) .EQ. HEX0F, FOR
               ;                   3 DARK BITS AND IDLE DISPLAY CLOCK
0EE4 7E         MOV  A,M
0EE5 E6 F1      ANI  0F1H
0EE7 77         MOV  M,A           PORTA = PORTA .AND. HEXF1, FOR
               ;                   3 START BITS AND IDLE DISPLAY CLOCK
0EE8 35         DCR  M             PULSE DISPLAY CLOCK
0EE9 34         INR  M
               ;                   SET TO OUTPUT 35*3 DARK BITS
0EEA F6 0F      ORI  0FH
0EEC 77         MOV  M,A           PORTA = PORTA .OR. HEX0F, FOR
               ;                   3 DARK BITS AND IDLE DISPLAY CLOCK
0EED 3E 22      MVI  A,34          A = COUNT = 34
               DBLAN1;             ****ALTERNATE ENTRY POINT
               DBLAN2;             DO UNTIL COUNT .LT. 0
0EEF 35         DCR  M               PULSE DISPLAY CLOCK
0EF0 34         INR  M
0EF1 3D         DCR  A               A = COUNT = COUNT-1
0EF2 F2 EF 0E   JP   DBLAN2
               ;                   ENDDO
0EF5 C9         RET

DFLUSH
               ;DFLUSH(ADDRES)(PORTA )
               ;      (ADDRES)(BITSTR)
               ;      ( 0     )( I/O  )
               ;      ( HL    )( 7001 )
               ;      ( C     )( C    )
               ;
               ;REGISTERS DESTROYED
               ;PSW DESTROYED
               ;
               ;FLUSH POSSIBLE NOISE OUT OF DISPLAY SHIFT REGISTER
```

```
                      ;
                      DFLUSH;                   ****ENTRY POINT
     0EF6 21 01 70      LXI  H,PORTA            HL = ADDRESS, PORTA
     0EF9 7E            MOV  A,M
     0EFA F6 0F         ORI  0FH
     0EFC 77            MOV  M,A                PORTA = PORTA .OR. HEXOF. FOR
                      ;                         3 DARK BITS AND IDLE DISPLAY CLOCK
                      ;                         CLOCK 36*3 DARK BITS INTO DISPLAY
     0EFD 3E 23         MVI  A,35               A = COUNT = 35
     0EFF C3 EF 0E      JMP  DBLAN1
                      ;                         RETURN
```

DSBKBD

```
                      ;DSBKBD()(KDCTRL,CHRBKT,CTLBKT)
                      ;        (BITSTR,BYTE  ,BYTE  )
                      ;        ( 0    , 0    , 0    )
                      ;        ( RAM  , RAM  , RAM  )
                      ;        ( C    , C    , C    )
                      ;
                      ;PSW:S, Z, P, CY = NO CHANGE
                      ;
                      ;DISABLE KEYBOARD
                      ;
                      DSBKBD;                   ****ENTRY POINT
     0F02 F5            PUSH PSW                SAVE A, PSW
                      ;                         PREVENT KDIO FROM SCANNING KEYBOARD
     0F03 3A 27 74      LDA  KDCTRL/2+X         KDCTRL.KBDDSB = TRUE
     0F06 F6 01         ORI  01H
     0F08 32 27 74      STA  KDCTRL/2+X
                      ;                         CLEAR OUTPUT OF DBOUNCE ROUTINE
     0F0B AF            XRA  A                  CHRBKT = HEX00
     0F0C 32 2C 74      STA  CHRBKT/2+X
     0F0F 32 2B 74      STA  CTLBKT/2+X         CTLBKT = HEX00
     0F12 F1            POP  PSW                RESTORE A, PSW
     0F13 C9            RET                     RETURN
```

ENAKBD

```
                      ;ENAKBD()(KEYBKT,KDCTRL)
                      ;        (BYTE  ,BITSTR)
                      ;        ( 0    , 0    )
                      ;        ( RAM  , RAM  )
                      ;        ( C    , C    )
                      ;
                      ;PSW:S, Z, P, CY = NO CHANGE
                      ;
                      ;ENABLE KEYBOARD
                      ;
                      ENAKBD;                   ****ENTRY POINT
     0F14 F5            PUSH PSW                SAVE A, PSW
                      ;                         FORCE KDIO TO RESYNC KEYBOARD SCAN
     0F15 3E 80         MVI  A,MULKEY           KEYBKT = MULKEY
     0F17 32 2A 74      STA  KEYBKT/2+X
                      ;                         ALLOW KDIO TO SCAN KEYBOARD
     0F1A 3A 27 74      LDA  KDCTRL/2+X         KDCTRL.KDBDSB = FALSE
     0F1D E6 FE         ANI  0FEH
     0F1F 32 27 74      STA  KDCTRL/2+X
     0F22 F1            POP  PSW                RESTORE A, PSW
     0F23 C9            RET                     RETURN
```

FILNIB

```
                      ;FILNIB(DEST  ,NIBVAL,NIBCNT)
                      ;      (NIBSTR,BYTE  ,UBYTE )
                      ;      ( 0    , I    , I    )
                      ;      ( @C   , A    , B    )
                      ;      ( C    , NC   , NC   )
                      ;
                      ;PSW:S, Z, P, CY = NO CHANGE
                      ;
                      ;FILL A NIBBLE STRING WITH A VALUE
                      ;DEST[0..NIBCNT-1] = NIBVAL
```

```
                    ;
                    FILNIB;              ****ENTRY POINT
0F24 F5               PUSH PSW           SAVE A, PSW
0F25 C5               PUSH B             SAVE BC
                    FILN01;              ****SPECIAL JUMP ENTRY
                    ;                    C = OFFSET, DEST[N = 0]
                    ;                    FILL NIBCNT NIBBLES IN DEST WITH NIBVAL
0F26 04               INR  B             CONDITION NIBCNT FOR DO WHILE
                    FILN02;              DO WHILE NIBCNT .NE. 0
0F27 05               DCR  B               B = NIBCNT-1
0F28 CA 32 0F         JZ   FILN03
                    ;                      PUT NIBVAL INTO DEST
0F2B CD EE 0F         CALL PUTNIB          PUTNIB(DEST[N],NIBVAL)
                    ;                            ( @C    , A    )
                    ;                            ( 0     , I    )
                    ;                      POINT AT NEXT NIBBLE TO RIGHT
0F2E 0C               INR  C               C = OFFSET, DEST[N+1]
                    ;                      B = NIBCNT = NIBCNT-1
0F2F C3 27 0F         JMP  FILN02
                    FILN03;              ENDDO
0F32 C1               POP  B             RESTORE BC
0F33 F1               POP  PSW           RESTORE A, PSW
0F34 C9               RET                RETURN
```

GETNIB

```
                    ;GETNIB(NIBVAL,ZERO ,SOURCE)
                    ;      (BYTE  ,BIT  ,NIB   )
                    ;      ( 0    , 0   , I    )
                    ;      ( A    ,PSW:Z, @B   )
                    ;      ( C    , C   , NC   )
                    ;
                    ;PSW:CY = NO CHANGE
                    ;PSW:S, Z, P CHANGED; CORRESPOND TO VALUE OF NIBVAL
                    ;
                    ;FETCH HIGH ORDER 4 BIT VALUE FROM SOURCE[N=EVEN]
                    ;OR LOW ORDER 4 BIT VALUE FROM SOURCE[N=ODD],
                    ;AND PLACE IT IN LOW ORDER OF NIBVAL.
                    ;CLEAR HIGH ORDER OF NIBVAL.
                    ;NIBVAL = SOURCE[N],   ZERO = NIBVAL .EQ. 0
                    ;
                    GETNIB;              ****ENTRY POINT
0F35 E5               PUSH H             SAVE HL
0F36 F5               PUSH PSW           SAVE A, PSW
                    ;                    FLAG WHETHER L/O NIBBLE OF BYTE WANTED
0F37 AF               XRA  A             A = OFFSET, SOURCE[N]/2
0F38 78               MOV  A,B
0F39 1F               RAR
                    ;                    PSW:CY = ODD = TRUE, IF N = ODD
                    ;                    CALCULATE ADDRESS OF SOURCE
0F3A 26 74            MVI  H,X/100H      HL = ADDRESS, SOURCE[N]
0F3C 6F               MOV  L,A
                    GETN01;              ****SPECIAL JUMP ENTRY
                    ;                    FETCH BYTE CONTAINING DESIRED NIBBLE
0F3D 7E               MOV  A,M           A = SOURCE[N]
                    ;                    CHECK WHETHER NIBBLE IN HIGH ORDER
0F3E DA 45 0F         JC   GETN02        IF ODD .EQ. FALSE
                    ;                      MOVE H/O NIBBLE TO L/O
0F41 0F               RRC                  A = SOURCE[N] = SOURCE[N]/HEX10
0F42 0F               RRC
0F43 0F               RRC
0F44 0F               RRC
                    GETN02;              ENDIF
                    ;                    CLEAR HIGH ORDER NIBBLE
0F45 E6 0F            ANI  0FH           H = NIBVAL = SOURCE[N] .AND. HEX0F
0F47 67               MOV  H,A
0F48 F1               POP  PSW           RESTORE PSW:CY
0F49 7C               MOV  A,H           A = NIBVAL
                    ;                    INDICATE NIBVAL STATUS
0F4A 3C               INR  A             PSW:Z = ZERO = NIBVAL .EQ. 0
0F4B 3D               DCR  A
0F4C E1               POP  H             RESTORE HL
0F4D C9               RET                RETURN
```

LSTATE

```
                  ;LSTATE(FATMOD,NORMOD,SERMOD,PRVMOD)(MRSTS1,MRSTS2)
                  ;      (BIT   ,BIT   ,BIT   ,BIT   )(BITSTR,BITSTR)
                  ;      ( O    , O    , O    , O    )( I    , I    )
                  ;      (PSW:S ,PSW:Z ,PSW:P ,PSW:CY)(RAM   ,RAM   )
                  ;      ( C    , C    , C    , C    )( NC   , NC   )
                  ;
                  ;PSW:S = MINUS STATUS IF FATAL MODE
                  ;PSW:Z = ZERO STATUS IF NORMAL MODE
                  ;PSW:P = EVEN PARITY STATUS IF SERVICE MODE
                  ;PSW:CY= 1 IF PRIVILEGED MODE
                  ;
                  ;COPIES METER STATE FLAGS INTO PSW FOR EASY TESTING
                  ;
                  LSTATE;                ****ENTRY POINT
0F4E E5             PUSH H               SAVE HL
0F4F F5             PUSH PSW             H = A, SAVED FOR RETURN
0F50 E1             POP  H
0F51 3A 25 74       LDA  MRSTS2/2+X      L = MRSTS2.FATMOD + MRSTS2.PRVMOD
0F54 E6 81          ANI  81H                 (PSW:S POS  ) , (PSW:CY POS )
0F56 6F             MOV  L,A
0F57 3A 24 74       LDA  MRSTS1/2+X      A = MRSTS1.SERMOD
0F5A E6 08          ANI  08H                 (           )
0F5C 0F             RRC                      (PSW:P POS  )
0F5D B5             ORA  L               A = FATMOD, PRVMOD, SERMOD
                  ;                          (PSW:S, PSW:CY, PSW:P)
0F5E C2 63 0F       JNZ  LSTAT1          IF NO STATUS BITS ARE SET
0F61 3E 40          MVI  A,40H             A = NORMOD
                  ;                            (PSW:Z)
                  LSTAT1;                ENDIF
0F63 6F             MOV  L,A             L = A = STATUS
0F64 E5             PUSH H               RESTORE A; PSW = STATUS
0F65 F1             POP  PSW
0F66 E1             POP  H               RESTORE HL
0F67 C9             RET                  RETURN
```

MOVBIT

```
                  ;MOVBIT(SOURCE,SBIT ,DEST  ,DBIT ,VALUE)
                  ;      (BITSTR,UBYTE,BITSTR,UBYTE,BIT   )
                  ;      ( I    , I   , O    , I   , O    )
                  ;      ( @H   , L   , @D   , E   ,PSW:Z)
                  ;      ( NC   , NC  , C    , NC  , C    )
                  ;
                  ;PSW:CY = NO CHANGE
                  ;PSW:S, Z, P CHANGED; CORRESPOND TO VALUE OF BIT
                  ;
                  ;MOVE BIT FROM BIT POSITION SBIT IN SOURCE TO BIT POSITION
                  ;DBIT IN DEST.  VALUE INDICATES WHETHER BIT IS 0 OR 1.
                  ;BIT 0 IS HIGH ORDER BIT OF STRING.
                  ;DEST[DBIT] = SOURCE[SBIT]
                  ;
                  MOVBIT;                ****ENTRY POINT
0F68 E5             PUSH H               SAVE HL
0F69 C5             PUSH B               SAVE BC
0F6A F5             PUSH PSW             SAVE A, PSW
0F6B D5             PUSH D               SAVE DE
                  ;                      H = SRCOFS = OFFSET, SOURCE
                  ;                      BUILD SOURCE ADDRESS AND MASK
0F6C CD 8A 0F       CALL MOVB01          MOVB01(SRCOFS,SBIT,SRCADR,SMASK)
                  ;                             ( H    , L  , HL   , A   )
                  ;                             ( I    , I  , O    , O   )
                  ;                      HL = SRCADR = ADDRESS, SOURCE.SBIT
0F6F 47             MOV  B,A             B = SMASK
0F70 7E             MOV  A,M             PSW:CY = SOURCE.SBIT
0F71 A0             ANA  B
0F72 C6 FF          ADI  0FFH
                  ;                      IF SOURCE.SBIT .NE. 0
0F74 9F             SBB  A                 B = SRCBIT = HEXFF
0F75 47             MOV  B,A
                  ;                      ELSE
                  ;                        B = SRCBIT = HEX00
```

```
                    ;               ENDIF
0F76 E1               POP  H        H = DSTOFS = OFFSET, DEST
                    ;               L = DBIT
0F77 E5               PUSH H        RESAVE HL
                    ;               BUILD DESTINATION ADDRESS AND MASK
0F78 CD 8A 0F         CALL MOVB01   MOVB01(DSTOFS,DBIT,DSTADR,DMASK)
                    ;                     ( H     , L  , HL   , A   )
                    ;                     ( I     , I  , O    , O   )
                    ;               HL = DSTADR = ADDRESS, DEST.DBIT
0F7B 4F               MOV  C,A      C = DMASK
0F7C A0               ANA  B        B = DSTBIT = DMASK .AND. SRCBIT
0F7D 47               MOV  B,A
0F7E 79               MOV  A,C      A = DEST.DBIT = 0
0F7F 2F               CMA
0F80 A6               ANA  M
0F81 B0               ORA  B        DEST.DBIT = DEST.DBIT .OR. DSTBIT
0F82 77               MOV  M,A
0F83 D1               POP  D        RESTORE DE
0F84 F1               POP  PSW      RESTORE A, PSW:CY
0F85 04               INR  B        PSW:Z = DSTBIT .EQ. 0
0F86 05               DCR  B
0F87 C1               POP  B        RESTORE BC
0F88 E1               POP  H        RESTORE HL

MOVBIT

0F89 C9               RET           RETURN


MOVBIT
                    ;MOVB01(NIBOFS,BITNO,BYTADR,MASK)
                    ;      (OFFSET,UBYTE,ADDR  ,BYTE)
                    ;       ( I    , I   , O    , O  )
                    ;       ( H    , L   , HL   , A  )
                    ;       ( C    , C   , C    , C  )
                    ;
                    ;PSW:S, Z, P, CY DESTROYED
                    ;REGISTER DE DESTROYED
                    ;
                    ;CONVERT NIBBLE OFFSET AND BIT NUMBER INTO ADDRESS OF
                    ;BYTE CONTAINING BIT.  A BIT SELECTION MASK IS ALSO
                    ;PRODUCED
                    ;
                    MOVB01;             ****ENTRY POINT FOR MOVBIT ONLY
0F8A 7D               MOV  A,L      E = ((BITNO/4)+NIBOFS)/2
0F8B 1F               RAR
0F8C 1F               RAR
0F8D E6 3F            ANI  3FH
0F8F 84               ADD  H
0F90 1F               RAR
0F91 5F               MOV  E,A
0F92 7C               MOV  A,H      PSW:CY = NIBOFS .MOD. 2
0F93 1F               RAR
0F94 7D               MOV  A,L      A = BITNO
0F95 D2 9A 0F         JNC  MOVB02   IF PSW:CY .EQ. 1
                    ;                 NIBOFS NOT ON BYTE BOUNDARY
0F98 DE 04            SBI  4          MAKE CORRECTION TO BITNO
                    MOVB02;         ENDIF
0F9A E6 07            ANI  07H      A = BITNUM, WITHIN BYTE
0F9C 16 00            MVI  D,0      DE = ((BITNO/4)+NIBOFS)/2
0F9E 21 00 74         LXI  H,X      HL = BYTADR
0FA1 19               DAD  D
0FA2 E5               PUSH H        SAVE BYTADR
0FA3 5F               MOV  E,A      DE = BITNUM
0FA4 21 AB 0F         LXI  H,MOVB03 HL = ADDRESS, MASK
0FA7 19               DAD  D
0FA8 7E               MOV  A,M      A = MASK
0FA9 E1               POP  H        HL = BYTADR
0FAA C9               RET           RETURN
                    ;
                    MOVB03;         MASK TABLE
0FAB 80               DB   80H      0 BIT MASK; HIGH ORDER
```

```
0FAC 40           DB   40H          1
0FAD 20           DB   20H          2
0FAE 10           DB   10H          3
0FAF 08           DB   08H          4
0FB0 04           DB   04H          5
0FB1 02           DB   02H          6
0FB2 01           DB   01H          7 BIT MASK; LOW ORDER


MVLNIB
                 ;MVLNIB(DEST  ,SOURCE,NIBCNT,NONBCD,ZERO  )
                 ;      (NIBSTR,NIBSTR,BYTE  ,BIT   ,BIT   )
                 ;      ( O    , I    , I    , O    , O    )
                 ;      ( @C   , @B   , A    ,PSW:S ,PSW:Z )
                 ;      ( C    , NC   , NC   , C    , C    )
                 ;
                 ;PSW:CY = NO CHANGE
                 ;PSW:S, Z, P CHANGED
                 ;
                 ;FOR A STRING ADDRESSED AT THE LEFT SIDE,
                 ;FROM RIGHT TO LEFT MOVE NIBCNT NIBBLES FROM SOURCE TO
                 ;DEST.  THE NONBCD AND ZERO FLAGS REFER TO THE LARGEST
                 ;NIBBLE VALUE MOVED.
                 ;DEST[0..NIBCNT-1] = SOURCE[0..NIBCNT-1]
                 ;
                 MVLNIB;              ****ENTRY POINT
0FB3 C5            PUSH B             SAVE  BC
                 MVLN01;              ****SPECIAL JUMP ENTRY
0FB4 F5            PUSH PSW           SAVE A, PSW
0FB5 D5            PUSH D             SAVE DE
0FB6 3D            DCR  A             D = NIBCNT-1
0FB7 57            MOV  D,A
0FB8 80            ADD  B             B = OFFSET, SOURCE[N=NIBCNT-1]
0FB9 47            MOV  B,A
0FBA 7A            MOV  A,D           A = NIBCNT-1
0FBB 81            ADD  C             C = OFFSET, DEST[N=NIBCNT-1]
0FBC 4F            MOV  C,A
0FBD D1            POP  D             RESTORE DE
0FBE F1            POP  PSW           RESTORE A, PSW
0FBF C3 C3 0F      JMP  MVRN01        MVRNIB(DEST[N],SOURCE[N],NIBCNT,
                 ;                           ( @C     , @B       , A     ,
                 ;                           ( O      , I        , I     ,
                 ;
                 ;                           NONBCD,ZERO )
                 ;                           PSW:S ,PSW:Z)
                 ;                            O    , O    )
                 ;                    RESTORE BC
                 ;                    RETURN

MVRNIB
                 ;MVRNIB(DEST  ,SOURCE,NIBCNT,NONBCD,ZERO )
                 ;      (NIBSTR,NIBSTR,BYTE  ,BIT   ,BIT  )
                 ;      ( O    , I    , I    , O    , O   )
                 ;      ( @C   , @B   , A    ,PSW:S ,PSW:Z)
                 ;      ( C    , NC   , NC   , C    , C   )
                 ;
                 ;PSW:CY = NO CHANGE
                 ;PSW:S, Z, P CHANGED
                 ;
                 ;FOR A STRING ADDRESSED AT THE RIGHT SIDE,
                 ;FROM RIGHT TO LEFT MOVE NIBCNT NIBBLES FROM SOURCE TO
                 ;DEST.  THE NONBCD AND ZERO FLAGS REFER TO THE LARGEST
                 ;NIBBLE VALUE MOVED.
                 ;DEST[1-NIBCNT..0] = SOURCE[1-NIBCNT..0]
                 ;
                 MVRNIB;              ****ENTRY POINT
0FC2 C5            PUSH B             SAVE BC
                 MVRN01;              ****SPECIAL JUMP ENTRY
0FC3 F5            PUSH PSW           SAVE A, PSW
0FC4 E5            PUSH H             SAVE HL
0FC5 67            MOV  H,A           H = NIBCNT
```

```
                 ;                  B = OFFSET, SOURCE[N=0]
                 ;                  C = OFFSET, DEST[N=0]
                 ;                  SET FLAGS FOR RETURN IF NIBCNT .LE. 0
OFC6 2E 00         MVI  L,0         L = FLAGV = 0; WHICH WILL PRODUCE:
                 ;                  PSW:Z = ZERO = TRUE
                 ;                  PSW:S = NONBCD = FALSE
                 ;                  MOVE NIBCNT NIBBLES
                 MVRNO2;            DO WHILE NIBCNT .GT. 0
OFC8 25            DCR  H             H = NIBCNT-1
OFC9 FA E7 OF      JM   MVRNO6
                 ;                    MOVE ONE NIBBLE
OFCC CD 35 OF      CALL GETNIB        GETNIB(NIBVAL,ZERO ,SOURCE[N])
                 ;                          ( A    ,PSW:Z, @B       )
                 ;                          ( O    , O   , I        )
OFCF CD EE OF      CALL PUTNIB        PUTNIB(DEST[N],NIBVAL)
                 ;                          ( @C    , A     )
                 ;                          ( O     , I     )
                 ;                    CHECK FOR NONZERO NIBBLE
OFD2 CA DB OF      JZ   MVRNO4        IF ZERO .EQ. FALSE
                 ;                      CHECK FOR NO PREVIOUS FLAGS
OFD5 2C            INR  L               IF FLAGV .EQ. 0
OFD6 2D            DCR  L
OFD7 C2 DB OF      JNZ  MVRNO3
OFDA 2C            INR  L                 L = FLAGV = 1
                 ;                        WHICH WILL PRODUCE:
                 ;                        PSW:Z = ZERO = FALSE
                 ;                        PSW:S = NONBCD = FALSE
                 MVRNO3;                ENDIF
                 MVRNO4;              ENDIF
                 ;                    CHECK FOR NONBCD NIBBLE
OFDB FE 0A         CPI  10            IF NIBVAL .GE. 10
OFDD DA E2 OF      JC   MVRNO5
OFE0 2E 80         MVI  L,80H           L = FLAGV = HEX80
                 ;                      WHICH WILL PRODUCE:
                 ;                      PSW:Z = ZERO = FALSE
                 ;                      PSW:S = NONBCD = TRUE
                 MVRNO5;              ENDIF
                 ;                    MOVE INDICES FROM RIGHT TO LEFT
OFE2 05            DCR  B             B = OFFSET, SOURCE[N=N-1]
OFE3 0D            DCR  C             C = OFFSET.DEST[N=N-1]
                 ;                    H = NIBCNT = NIBCNT-1
OFE4 C3 C8 OF      JMP  MVRNO2
                 MVRNO6;            ENDDO
OFE7 4D            MOV  C,L         C = FLAGV
OFE8 E1            POP  H           RESTORE HL
OFE9 F1            POP  PSW         RESTORE A, PSW:CY
OFEA 0C            INR  C           PSW = STATUS, FLAGV
OFEB 0D            DCR  C
OFEC C1            POP  B           RESTORE BC
OFED C9            RET              RETURN

PUTNIB
                 ;PUTNIB(DEST  ,NIBVAL)
                 ;      (NIBBLE,BYTE  )
                 ;      ( O    , I    )
                 ;      ( @C   , A    )
                 ;      ( C    , NC   )
                 ;
                 ;PSW:S, Z, P, CY = NO CHANGE
                 ;
                 ;INSERT LOW ORDER 4 BITS OF NIBVAL INTO DEST
                 ;DEST = NIBVAL .AND. HEXOF
                 ;
                 PUTNIB;            ****ENTRY POINT
OFEE E5            PUSH H           SAVE HL
OFEF C5            PUSH B           SAVE BC
OFF0 F5            PUSH PSW         SAVE A, PSW
                 ;                  CLEAR H/O NIBBLE OF NIBVAL
OFF1 E6 0F         ANI  0FH         B = NIBVAL = NIBVAL .AND. HEXOF
OFF3 47            MOV  B,A
                 ;                  FLAG WHETHER NIBBLE GOES INTO L/O
```

```
                   ;                  OF BYTE CONTAINING DEST
0FF4 AF              XRA  A           PSW:CY = OFFSET, DEST .MOD. 2
0FF5 79              MOV  A,C
0FF6 1F              RAR
                   ;                  A = (OFFSET, DEST)/2
0FF7 26 74           MVI  H,X/100H    HL = ADDRESS, DEST
0FF9 6F              MOV  L,A
                   ;                  MAKE MASK TO CLEAR L/O OF BYTE
0FFA 0E F0           MVI  C,0F0H      C = MASK = HEXF0
                   ;                  CHECK WHETHER NIBBLE GOES IN H/O
0FFC DA 07 10        JC   PUTN01      IF PSW:CY .EQ. 0
                   ;                    MAKE MASK TO CLEAR H/O OF BYTE
0FFF 0E 0F           MVI  C,0FH         C = MASK = HEX0F
                   ;                    SHIFT L/O NIBBLE OF NIBVAL TO H/O
1001 78              MOV  A,B           B = NIBVAL = NIBVAL * HEX10
1002 07              RLC
1003 07              RLC
1004 07              RLC
1005 07              RLC
1006 47              MOV  B,A
                   PUTN01;            ENDIF
                   ;                  FETCH BYTE CONTAINING DEST
1007 7E              MOV  A,M         A = DEST
                   ;                  MAKE HOLE IN BYTE FOR NIBBLE
1008 A1              ANA  C           A = DEST = 0
                   ;                  PUT NIBBLE IN HOLE
1009 B0              ORA  B           DEST = NIBVAL
100A 77              MOV  M,A
100B F1              POP  PSW         RESTORE A, PSW
100C C1              POP  B           RESTORE BC
100D E1              POP  H           RESTORE HL
100E C9              RET              RETURN

RSCAN

                   ;RSCAN(SOURCE,NIBCNT,NONBCD,ZERO  )
                   ;     (NIBSTR,BYTE  ,BIT   ,BIT   )
                   ;     ( I    , I    , O    , O    )
                   ;     ( @B   , A    ,PSW:S ,PSW:Z )
                   ;     ( NC   , NC   , C    , C    )
                   ;
                   ;PSW:CY= NO CHANGE
                   ;PSW:S, Z, P CHANGED
                   ;
                   ;FOR A STRING ADDRESSED AT THE RIGHT SIDE,
                   ;FROM RIGHT TO LEFT SCAN NIBCNT NIBBLES.
                   ;THE NONBCD AND ZERO FLAGS REFER TO THE LARGEST
                   ;NIBBLE SCANNED.
                   ;SCAN SOURCE[1-NIBCNT..0]
                   ;
                   RSCAN;             ****ENTRY POINT
100F C5              PUSH B           SAVE BC
                   ;                  SCAN BY MOVING SOURCE INTO ITSELF
1010 48              MOV  C,B         C = OFFSET, SOURCE
1011 C3 C3 0F        JMP  MVRN01      MVRNIB(SOURCE,SOURCE,NIBCNT,
                   ;                        ( @C    , @B    , A    ,
                   ;                        ( O     , I     , I    ,
                   ;
                   ;                        NONBCD,ZERO  )
                   ;                        PSW:S ,PSW:Z )
                   ;                         O    , O    )
                   ;                  RESTORE BC
                   ;                  RETURN

TDBITM

                   ;TDBITM(SOURCE,BITCNT,DEST  ,DBIT  ,SBIT  )
                   ;      (BITSTR,UBYTE ,BITSTR,UBYTE ,BYTSTR)
                   ;      ( I    , I    , O    , I    , I    )
                   ;      ( @H   , L    , @D   , E    , @BC  )
                   ;      ( NC   , C    , C    , C    , NC   )
                   ;
```

```
                    ;REGISTERS DESTROYED
                    ;PSW DESTROYED
                    ;
                    ;TABLE DRIVEN BIT MOVE ROUTINE.
                    ;MOVES BITCNT BITS INTO DEST STARTING AT DEST.DBIT;
                    ;THE SOURCE BITS ARE SOURCE.SBIT[0] THROUGH
                    ;SOURCE.SBIT[BITCNT-1]
                    ;
                    TDBITM;              ****ENTRY POINT
1014 7D               MOV  A,L           A = BITCNT = BITCNT+1
1015 3C               INR  A
                    ;                    BC = ADDRESS, SBIT[N=0]
                    TDBIT1;              DO WHILE BITCNT .NE. 0
1016 3D               DCR  A               A =  BITCNT = BITCNT-1
1017 C8               RZ
1018 F5               PUSH PSW             SAVE A, PSW
1019 0A               LDAX B               L = SBIT[N]
101A 6F               MOV  L,A
                    ;                      MOVE BIT
101B CD 68 0F         CALL MOVBIT          MOVBIT(SOURCE,SBIT[N],DEST,DBIT,VALUE)
                    ;                             ( @H   , L     , @D , E  ,PSW:Z)
                    ;                             ( I    , I     , O  , I  , O   )
101E F1               POP  PSW             A = BITCNT
101F 03               INX B                BC = ADDRESS, SBIT[N=N+1]
1020 1C               INR  E               E = DBIT = DBIT+1
1021 C3 16 10         JMP  TDBIT1
                    ;                    ENDDO
                    ;                    RETURN

VCALL
                    ;VCALL(RTNADR)
                    ;     (ADDR  )
                    ;     ( I    )
                    ;     ( HL   )
                    ;
                    ;REGISTER AND STATUS CHANGES DEPEND ON ROUTINE @HL
                    ;
                    ;VECTOR CALL TO ROUTINE WHOSE ADDRESS IS IN HL
                    ;
                    VCALL;               ****ENTRY POINT
1024 E9               PCHL               GO TO ROUTINE @HL
                    ;                    RETURN VIA RTS IN THAT ROUTINE

VCALLS
                    ;VCALLS(RTNADR)
                    ;      (ADDR  )
                    ;      ( I    )
                    ;      ( HL   )
                    ;      ( NC   )
                    ;
                    ;PSW:S, Z, P, CY = NO CHANGE
                    ;
                    ;VECTOR CALL TO ROUTINE @HL
                    ;
                    VCALLS;              ****ENTRY POINT
1025 C5               PUSH B             SAVE ALL REGISTERS
1026 D5               PUSH D
1027 E5               PUSH H
1028 F5               PUSH PSW
                    ;                    VECTOR CALL TO ROUTINE @HL
1029 CD 24 10         CALL VCALL         VCALL(RTNADR)
                    ;                         ( HL    )
                    ;                         ( I     )
                    ;                    RESTORE ALL REGISTERS
102C F1               POP  PSW
102D E1               POP  H
102E D1               POP  D
102F C1               POP  B
1030 C9               RET
```

```
NVM30F
                    ;NVM30F()(PORTA )
                    ;        (BITSTR)
                    ;        ( I/O  )
                    ;        ( 7001 )
                    ;        ( C    )
                    ;
                    ;REGISTERS NOT CHANGED
                    ;PSW NOT CHANGED
                    ;
                    ;REMOVE 30 VOLTS FROM NONVOLATILE MEMORY TO DISABLE
                    ;WRITING AND ERASING.
                    ;
                    NVM30F;                 ****ENTRY POINT
1031 F5               PUSH PSW              SAVE A,PSW
1032 C5               PUSH B                SAVE BC
                    ;                       REMOVE 30 VOLTS FROM NVM
1033 3A 01 70         LDA  PORTA            PORTA = PORTA .OR. HEX40
1036 F6 40            ORI  40H
1038 32 01 70         STA  PORTA
                    ;                       PAUSE FOR 10 MSEC TO ALLOW NVM
                    ;                       VOLTAGE TO TRANSITION FROM
                    ;                       -30 TO +5
103B 01 64 00         LXI  B,100            BC = LOOPCT = 100
                    NVM30G;                 DO UNTIL LOOPCT .EQ. 0
103E CD 19 0B         CALL NPAUSE             NPAUSE(LOOPCT,ZROFLG)
                    ;                                ( BC    ,PSW:Z )
                    ;                                ( I/O   , O    )
1041 C2 3E 10         JNZ  NVM30G
                    ;                       ENDDO
1044 C1               POP  B                RESTORE BC
1045 F1               POP  PSW              RESTORE A,PSW
1046 C9               RET                   RETURN

NVM30T
                    ;NVM30T()(PORTA )
                    ;        (BITSTR)
                    ;        ( I/O  )
                    ;        ( 7001 )
                    ;        ( C    )
                    ;
                    ;REGISTERS NOT CHANGED
                    ;PSW NOT CHANGED
                    ;
                    ;APPLY 30 VOLTS TO NONVOLATILE MEMORY TO ENABLE
                    ;WRITING AND ERASING.
                    ;
                    NVM30T;                 ****ENTRY POINT
1047 F5               PUSH PSW              SAVE A,PSW
                    ;                       SUPPLY 30 VOLTS TO NVM
1048 3A 01 70         LDA  PORTA            PORTA = PORTA .AND. HEXBF
104B E6 BF            ANI  0BFH
104D 32 01 70         STA  PORTA
                    ;                       DELAY ABOUT 100 USEC BEFORE RETURNING
1050 3E 0B            MVI  A,11
1052 3D               DCR  A
1053 C2 52 10         JNZ  $-1
1056 F1               POP  PSW              RESTORE A,PSW
1057 C9               RET                   RETURN

NVMBYT
                    ;NVMBYT(ADRESS,NVMRED[J],BYTE)
                    ;      (ADRESS,NIBSTR   ,BYTE)
                    ;      ( I/O  , I       , O  )
                    ;      ( HL   , @HL     , A  )
                    ;      ( C    , NC      , C  )
                    ;
                    ;PSW DESTROYED
                    ;REGISTERS NOT CHANGED
                    ;
```

```
                  ;ASSEMBLE 2 NIBBLES FROM NVM INTO A SINGLE BYTE
                  ;
                  NVMBYT;                ****ENTRY POINT
1058 C5             PUSH B               SAVE BC
1059 7E             MOV  A,M             B = HINIB = NVMRED[J]*HEX10
105A 87             ADD  A
105B 87             ADD  A
105C 87             ADD  A
105D 87             ADD  A
105E 47             MOV  B,A
                  ;                      POINT AT NEXT NIBBLE
105F CD BB 11       CALL NVMNXT          NVMNXT(ADRESS,NVMRED[J=J+?])
                  ;                         ( HL    , @HL         )
                  ;                         ( I/O   , -           )
1062 7E             MOV  A,M             A = LOWNIB = NVMRED[J] .AND. HEXOF
1063 E6 OF          ANI  OFH
1065 B0             ORA  B               A = BYTE = LOWNIB .OR. HINIB
1066 C1             POP  B               RESTORE BC
1067 C9             RET                  RETURN

NVMCHG
                  ;NVMCHG()(NVMCTL)
                  ;        (NIBSTR)
                  ;        ( I    )
                  ;        ( RAM  )
                  ;        ( NC   )
                  ;
                  ;A,PSW DESTROYED
                  ;REGISTERS DESTROYED
                  ;
                  ;PROVIDES NVM NORMAL BLOCK IF METER IN NORMAL MODE.
                  ;PROVIDES NVM SERVICE BLOCK IF METER NOT IN NORMAL MODE.
                  ;
                  ;NVMCTL[0] = F IF NO BLOCK IS OPEN
                  ;          = 0 IF NORMAL BLOCK IS OPEN
                  ;          = 1 IF SERVICE BLOCK IS OPEN
                  ;NVMCTL[1] = NUMBER OF OPEN BLOCK
                  ;
                  NVMCHG;                ****ENTRY POINT
                  ;                      FETCH BLOCK TYPE
1068 06 66          MVI  B,NVMCTL        B = OFFSET, NVMCTL[0]
106A CD 35 OF       CALL GETNIB          GETNIB(BLKTYP,ZROFLG,NVMCTL[0])
                  ;                         ( A     ,PSW:Z , @B      )
                  ;                         ( 0     , 0    , I       )
106D FE 02          CPI  2               IF BLKTYP .LT. 2
106F D0             RNC
                  ;                        A BLOCK IS OPEN
                  ;                        DETERMINE METER STATUS
1070 CD 4E OF       CALL LSTATE            LSTATE(FATMOD,NORMOD,SERMOD,PRVMOD)
                  ;                              (PSW:S ,PSW:Z ,PSW:P ,PSW:C )
                  ;                              ( 0    , 0    , 0    , 0    )
1073 CA 77 10       JZ   NVMCH1            IF NORMOD .EQ. FALSE
                  ;                          A SERVICE BLOCK IS REQUIRED
1076 3D             DCR  A                   A = DIFRNC = BLKTYP-(SRVTYP=1)
                  NVMCH1;                  ELSE
                  ;                          A NORMAL BLOCK IS REQUIRED
                  ;                          A = DIFRNC = BLKTYP-(NORHDR=0)
                  ;                        ENDIF
1077 B7             ORA  A                 IF DIFRNC .NE. 0
1078 C8             RZ
                  ;                          CURRENT BLOCK NOT REQUIRED
1079 CD DE OE       CALL DBLANK              STOP CLOCK. BLANK DISPLAY
                  ;                          CLOSE CURRENT BLOCK
107C F3             DI                       DISABLE INTERRUPTS
107D CD 9E 12       CALL NVMWR               NVMWR(ERRFLG)
                  ;                               (PSW:Z )
                  ;                               ( 0    )
1080 FB             EI                       ENABLE INTERRUPTS
                  ;                          IF ERRFLG .EQ. FALSE
                  ;                            OPEN REQUIRED BLOCK
1081 C2 C4 11       JNZ  NVMOPN                NVMOPN(ERRFLG)
```

```
                   ;                         (PSW:Z )
                   ;                         ( 0    )
                   ;                     ENDIF
                   ;                   ENDIF
                   ;                 ENDIF
1084 C9              RET             RETURN

NVMDED
                   ;NVMDED(CODE,ERRFLG)(SERFLG,NVMRED)
                   ;      (BYTE,BIT   )(BIT   ,NIBSTR)
                   ;      ( I   , 0   )( 0    , I    )
                   ;      ( A   ,PSW:Z )( RAM  , NVM  )
                   ;      ( C   , C   )( C    , NC   )
                   ;
                   ;A,PSW DESTROYED
                   ;REGISTERS DESTROYED
                   ;
                   ;FLAG METER DEAD AND INDICATE ERROR
                   ;
                   NVMDED;                ****ENTRY POINT
1085 47              MOV  B,A             B = CODE
                   ;                      TEST SPECIAL NVM LOCATION
1086 3A BE 46        LDA  NVMRED+KILCOD IF NVMRED[KILCOD] .EQ. HEXOF
1089 3C              INR  A
108A E6 0F           ANI  0FH
108C C2 A0 10        JNZ NVMDE2
                   ;                        LOCATION STILL CLEAR
                   ;                        WRITE ERROR CODE TO LOCATION
108F 78              MOV  A,B               A[1] = CODE
1090 21 BE 02        LXI  H,KILCOD          H = BASE = KILCOD
1093 CD 47 10        CALL NVM30T            TURN ON -30 V TO NVM
1096 CD 61 12        CALL NVMWN             NVMWN(CODE,BASE,ERRFLG)
                   ;                             (A[1], HL ,PSW:Z )
                   ;                             ( I  , I  , 0    )
                   NVMDE1;                  ****ENTRY POINT
                   ;                            NVMDE1(CODE,ERRFLG)
                   ;                                  ( B   ,PSW:Z )
                   ;                                  ( I   , 0    )
                   ;                        FLAG METER DEAD
1099 21 10 74        LXI  H.SERFLG/2+X      HL = ADDRESS, SERFLG
109C 7E              MOV  A,M               SERFLG.DEAD = TRUE
109D F6 80           ORI  80H
109F 77              MOV  M,A
                   NVMDE2;                ENDIF
10A0 CD 31 10        CALL NVM30F          TURN OFF -30 V TO NVM
                   ;                      DECLARE FATAL ERROR
10A3 78              MOV  A,B             A = DEDCOD = HEX20+CODE
10A4 F6 20           ORI  20H
10A6 C3 80 08        JMP  FATERR          FATERR(DEDCOD,ERRFLG)
                   ;                            ( A     ,PSW:Z )
                   ;                            ( I     , 0    )
                   ;                      RETURN

NVMDXB
                   ;NVMDXB(ERRFLG,BLKCTL)
                   ;      (BIT   ,NIBSTR)
                   ;      ( 0    , I    )
                   ;      (PSW:Z , B    )
                   ;      ( C    , NC   )
                   ;
                   ;A,PSW DESTROYED
                   ;REGISTERS DESTROYED
                   ;
                   ;DEACTIVATES NVM BLOCK
                   ;
                   NVMDXB;                ****ENTRY POINT
                   ;                      MOVE NVM CONTROL BYTE TO ACCUMULATOR
10A9 78              MOV  A,B             A = BLKCTL
                   ;                      FORM BASE VALUE FOR BLOCK
10AA CD 91 11        CALL NVMMAP          NVMMAP(BLKCTL,BASE,BLKTYP)
```

```
                     ;                    ( A    , HL , A[1] )
                     ;                    ( I    , 0  , 0    )
                     ;             WRITE NUL HEADER TO DEACTIVATE BLOCK
     10AD AF          XRA  A       A[1] = NULHDR = 0
     10AE C3 61 12    JMP  NVMWN   NVMWN(NULHDR,BASE,ERRFLG)
                     ;                  ( A[1] , HL ,PSW:Z )
                     ;                  ( I    , I  , 0    )
                     ;             RETURN

NVMER

                     ;NVMER(ERRFLG)(NVMCTL,NVMERS,NVMRED,SERFLG)
                     ;     (BIT   )(NIBSTR,NIBSTR,NIBSTR,BITSTR)
                     ;     ( 0    )( I    , 0    , I    , I    )
                     ;     (PSW:Z )( RAM  , NVM  , NVM  , RAM  )
                     ;     ( C    )( NC   , C    , NC   , C    )
                     ;
                     ;A,PSW DESTROYED
                     ;REGISTERS DESTROYED
                     ;
                     ;ERASE A BLOCK OF NONVOLATILE MEMORY
                     ;
                     NVMER;                ****ENTRY POINT
                     ;                     GET CONTROL BYTE TO ERASE NEXT BLOCK
     10B1 CD 9F 11    CALL NVMNBK          NVMNBK(ERRFLG,OLDCTL,NXTCTL,
                     ;                           (PSW:Z , B    , C    ,
                     ;                           ( 0    , 0    , 0    ,
                     ;
                     ;                            ADRESS,NVMCTL)
                     ;                             HL    , @HL  )
                     ;                             0     , -    )
     10B4 C8          RZ                   IF ERRFLG .EQ. FALSE
                     ;                       SET TO CHECK AND ERASE NEXT BLOCK
     10B5 79          MOV  A,C               NVMCTL = NXTCTL .OR. HEXF0
     10B6 F6 F0       ORI  0F0H
     10B8 77          MOV  M,A
                     ;                       FETCH BLOCK LENGTH
     10B9 CD DF 11    CALL NVMPRP            NVMPRP(NIBCNT,OFFSET,RAM[I])
                     ;                             ( B    , C    , @C   )
                     ;                             ( 0    , 0    , -    )
     10BC C5          PUSH B                 SAVE BC
                     ;                       FETCH BASE ADDRESS OF CURRENT BLOCK
     10BD 7E          MOV  A,M               A = NVMCTL
     10BE CD 91 11    CALL NVMMAP            NVMMAP(NVMCTL,BASE,BLKTYP)
                     ;                             ( A    , HL , A[1] )
                     ;                             ( I    , 0  , 0    )
     10C1 E5          PUSH H                 SAVE HL
                     ;                       FORM NVM READ ADDRESS
     10C2 11 00 44    LXI  D,NVMRED          HL = ADDRESS, NVMRED[J=BASE]
     10C5 19          DAD  D
     10C6 E5          PUSH H                 SAVE HL
                     ;                       INITIALIZE CRC VALUE
     10C7 16 FF       MVI  D,0FFH            D = CRCVAL = HEXFF
                     ;                       CHECK BLOCK HEADER
     10C9 7E          MOV  A,M               A = BLKHDR[0] = NVMRED[J]
     10CA E6 0F       ANI  0FH               IF BLKHDR[0] .EQ. 0
     10CC C2 EB 10    JNZ  NVMER4
                     ;                         BLOCK IS INACTIVE AND NOT ERASED
                     ;                         POINT AT START OF BLOCK'S DATA
     10CF 23          INX  H                   HL = ADDRESS, NVMRED[J=J+2]
     10D0 23          INX  H
                     ;                         CHECK BLOCK CHECKSUM
                     NVMER1;                   LOOP - WITH 1 BREAK
     10D1 05          DCR  B                     B = NIBCNT = NIBCNT-1
     10D2 FA DF 10    JM   NVMER2                IF NIBCNT .LT. 0
                     ;                             BREAK
                     ;                           ENDIF
                     ;                           DEVELOP CRC
     10D5 7E          MOV  A,M                   A = DATA = NVMRED[J]
     10D6 CD C6 0E    CALL CRCNIB                CRCNIB(DATA,CRCVAL)
                     ;                                 ( A  , D   )
                     ;                                 ( I  , 0   )
```

```
                         ;               POINT AT NEXT DATA
10D9 CD BB 11      CALL NVMNXT           NVMNXT(ADRESS,NVMREDCJ=J+?])
                         ;                     ( HL   , @HL          )
                         ;                     ( I/O  , -            )
10DC C3 D1 10      JMP  NVMER1
                   NVMER2;             ENDLOOP
                         ;             FETCH CRC FROM NVM
10DF CD 58 10      CALL NVMBYT         NVMBYT(ADRESS,NVMREDCJ],NVMCRC)
                         ;                   ( HL   , @HL     , A     )
                         ;                   ( I/O  , I       , O     )
10E2 BA            CMP  D              IF NVMCRC .NE. CRCVAL
10E3 CA EB 10      JZ   NVMER3
                         ;               DECLARE DEAD METER. WEAK NVM
10E6 3E 02         MVI  A,NVMRET         A = NVMRET
10E8 CD 85 10      CALL NVMDED           NVMDED(NVMRET,ERRFLG)
                         ;                     ( A    ,PSW:Z )
                         ;                     ( I    , O    )
                   NVMER3;             ENDIF
                   NVMER4;           ENDIF
10EB D1            POP  D            DE = ADDRESS, NVMREDCJ=BASE]
10EC E1            POP  H            HL = BASE
10ED 01 00 40      LXI  B,NVMERS     HL = ADDRESS, NVMERSCI=BASE]
10F0 09            DAD  B
10F1 F1            POP  PSW          B = NIBCNT = NIBCNT+4
10F2 C6 04         ADI  4
10F4 47            MOV  B,A
10F5 3A 10 74      LDA  SERFLG/2+X   IF SERFLG.DEAD .EQ. TRUE
10F8 B7            ORA  A
10F9 F2 FE 10      JP   NVMER5
10FC AF            XRA  A              PSW:Z = ERRFLG = TRUE
10FD C9            RET
                   NVMER5;           ELSE
10FE CD 47 10      CALL NVM30T         SUPPLY 30 VOLTS TO NVM
                   NVMER6;             LOOP - WITH 2 BREAKS
1101 05            DCR  B                B = NIBCNT = NIBCNT-1
                         ;               IF NIBCNT .LT. 0
                         ;                 PSW:Z = ERRFLG = FALSE
1102 FA 31 10      JM   NVM30F             REMOVE 30 VOLTS FROM NVM
                         ;                 BREAK
                         ;               ENDIF
1105 F3            DI                    DISABLE INTERRUPTS
                         ;               START ERASE FUNCTION
1106 77            MOV  M,A              NVMERSCJ] = DUMMY
                         ;               PAUSE FOR 10 MSEC
1107 C5            PUSH B                SAVE BC
1108 01 64 00      LXI  B,100            BC = LOOPCT = 100
                   NVMER7;               DO UNTIL LOOPCT .EQ. 0
110B CD 19 0B      CALL NPAUSE             NPAUSE(LOOPCT,ZROFLG)
                         ;                       ( BC   ,PSW:Z )
                         ;                       ( I/O  , O    )
110E C2 0B 11      JNZ  NVMER7
                         ;               ENDDO
1111 C1            POP  B                RESTORE BC
                         ;               STOP ERASE FUNCTION
1112 1A            LDAX D                A = GARBAGE = NVMREDCJ]
1113 7B            MOV  A,E              A=(ADDRESS,NVMREDCJ]).AND.HEX3F
1114 E6 3F         ANI  3FH
1116 CA 1A 11      JZ   NVMER8           IF A .EQ. 0
                         ;                 HEADERCO] NOT JUST ERASED
1119 FB            EI                      ENABLE INTERRUPTS
                   NVMER8;               ENDIF
                         ;               ADVANCE ERASE ADDRESS
111A CD BB 11      CALL NVMNXT           NVMNXT(ADRESS,NVMERSCI=I+?])
                         ;                     ( HL   , @HL          )
                         ;                     ( I/O  , -            )
                         ;               READ ERASED NIBBLE
111D 1A            LDAX D                C = DATA = NVMREDCJ] .AND. HEXF0
111E F6 F0         ORI  0F0H
1120 4F            MOV  C,A
                         ;               ADVANCE READ ADDRESS
1121 EB            XCHG
```

```
1122 CD BB 11   CALL NVMNXT              NVMNXT(ADRESS,NVMRED[J=J+?])
               ;                               ( HL    , @HL          )
               ;                               ( I/O   , -            )
1125 EB         XCHG
               ;                         CHECK FOR PROPER ERASURE
1126 0C         INR  C                   IF DATA+1 .NE. 0
1127 CA 01 11   JZ   NVMER6
               ;                           BAD ERASURE
               ;                           DECLARE DEAD METER. BAD NVM
112A 3E 01      MVI  A,NVMBAD              A = NVMBAD
112C C3 85 10   JMP  NVMDED                NVMDED(NVMBAD,ERRFLG)
               ;                                 ( A     ,PSW:Z )
               ;                                 ( I     , 0    )
               ;                           BREAK
               ;                         ENDIF
               ;                       ENDLOOP
               ;                     ENDIF
               ;                   ENDIF
               ;                   RETURN

NVMFND

               ;NVMFND(ERRFLG)(NVMCTL,NVMRED)
               ;      (BIT   )(NIBSTR,NIBSTR)
               ;      ( 0    )( I/O  , I    )
               ;      (PSW:Z )( RAM  , NVM  )
               ;      ( C    )( C    , NC   )
               ;
               ;A,PSW DESTROYED
               ;REGISTERS DESTROYED
               ;
               ;FIND CURRENT BLOCK CORRESPONDING TO METER MODE
               ;
               NVMFND;              ****ENTRY POINT
112F 11 33 74   LXI  D,NVMCTL/2+X  DE = ADDRESS, NVMCTL[0..1]
1132 1A         LDAX D             PSW:CY = OPEN = NVMCTL[0] .LT. 2
1133 FE 20      CPI  20H
1135 3E 02      MVI  A,SFTWRE      A = SFTWRE
               ;                   IF OPEN .EQ. TRUE
               ;                     LOOKING FOR BLOCK IS INAPPROPRIATE
               ;                     DECLARE DEAD METER. SOFTWARE ERROR
1137 DA 85 10   JC   NVMDED          NVMDED(SFTWRE,ERRFLG)
               ;                           ( A     ,PSW:Z )
               ;                           ( I     , 0    )
               ;                   ELSE
               ;                     SET TO LOCATE ACTIVE SERVICE HEADER
113A 06 F1      MVI  B,0F1H          B = TEST = HEXF1
               ;                     SET TO INCREMENT TO BLOCK 0
113C 1A         LDAX D               NVMCTL[1] = HEXOF
113D F6 0F      ORI  0FH
113F 12         STAX D

               ;                     THERE ARE 2 SERVICE BLOCKS
1140 0E 02      MVI  C,2             C = BLKCTR = 2
               ;                     DETERMINE METER MODE
1142 CD 4E 0F   CALL LSTATE          LSTATE(FATMOD,NORMOD,SERMOD,PRVMOD)
               ;                           (PSW:S ,PSW:Z ,PSW:P ,PSW:C )
               ;                           ( 0    , 0    , 0    , 0    )
1145 C2 4E 11   JNZ  NVMFN1          IF NORMOD .EQ. TRUE
               ;                       SET TO INCREMENT TO BLOCK 2
1148 1A         LDAX D                 NVMCTL[1] = HEX01
1149 A0         ANA  B
114A 12         STAX D

               ;                       SET TO LOCATE ACTIVE NORMAL HEADER
114B 05         DCR  B                 B = TEST = HEXF0
               ;                       THERE ARE 14 NORMAL BLOCKS
114C 0E 0E      MVI  C,14              C = BLKCTR = 14
               NVMFN1;               ENDIF
               NVMFN2;               LOOP - WITH 2 BREAKS
               ;                       INCREMENT BLOCK NUMBER
114E 1A         LDAX D                 NVMCTL[1] = NVMCTL[1]+1
114F 3C         INR  A
```

```
1150 F6 F0      ORI  0F0H
1152 12         STAX D
               ;                       FETCH CORRESPONDING BASE ADDRESS
1153 CD 91 11   CALL NVMMAP            NVMMAP(NVMCTL,BASE,BLKTYP)
               ;                             ( A    , HL , A[1] )
               ;                             ( I    , O  , O    )
               ;                       CONVERT TO READ ADDRESS
1156 C5         PUSH B                 SAVE BC
1157 01 00 44   LXI  B,NVMRED          HL = ADDRESS, NVMRED[J=BASE]
115A 09         DAD  B
115B C1         POP  B                 RESTORE BC
115C 0D         DCR  C                 C = BLKCTR = BLKCTR-1
               ;                       PSW:S = DONE = BLKCTR .LT. 0
115D 3E 01      MVI  A,NVMBAD          A = NVMBAD
               ;                       IF DONE .EQ. TRUE
               ;                         DECLARE DEAD METER. BAD NVM
115F FA 85 10   JM   NVMDED              NVMDED(NVMBAD,ERRFLG)
               ;                               ( A    ,PSW:Z )
               ;                               ( I    , O    )
               ;                         BREAK
               ;                       ENDIF
               ;                       FETCH BLOCK HEADER
1162 CD 58 10   CALL NVMBYT            NVMBYT(ADRESS,NVMRED[J],HEADER)
               ;                             ( HL   , @HL      , A    )
               ;                             ( I/O  , I        , O    )
1165 B8         CMP  B                 IF HEADER .EQ. TEST
1166 C2 4E 11   JNZ  NVMFN2
1169 04         INR  B                   PSW:Z = ERRFLG = FALSE
116A C9         RET                      BREAK
               ;                       ENDIF
               ;                     ENDLOOP
               ;                   ENDIF
               ;                   RETURN


NVMLOD
               ;NVMLOD()(NORFLG,NVMCTL,MRSTS1)
               ;        (BITSTR,NIBSTR,BITSTR)
               ;        ( O    , O    , O    )
               ;        ( RAM  , RAM  , RAM  )
               ;        ( C    , C    , C    )
               ;
               ;A,PSW DESTROYED
               ;REGISTERS DESTROYED
               ;
               ;INITIALIZATION. LOAD NONVOLATILE MEMORY
               ;
               NVMLOD;                 ****ENTRY POINT
116B 21 26 74   LXI  H,NORFLG/2+X      HL = ADDRESS, NORFLG
               ;                       SENT STATUS AND POSTAGE AFTER POWERUP
116E 7E         MOV  A,M               NORFLG.QUESTS = NORFLG.QUEPOS = TRUE
116F F6 C0      ORI  0C0H
1171 77         MOV  M,A
               ;                       DECLARE THAT NO BLOCK IS OPEN
1172 3E F0      MVI  A,0F0H            NVMCTL = HEXF0
1174 32 33 74   STA  NVMCTL/2+X
               ;                       METER GUARANTEED TO BE IN NORMAL MODE
               ;                       SEARCH FOR NORMAL BLOCK
1177 CD 2F 11   CALL NVMFND            NVMFND(ERRFLG)
               ;                             (PSW:Z )
               ;                             ( O    )
               ;                       IF ERRFLG .EQ. FALSE
117A C4 EE 11   CNZ  NVMRD               LOAD NORMAL BLOCK
               ;                       ENDIF
117D 21 24 74   LXI  H,MRSTS1/2+X      HL = ADDRESS, MRSTS1
               ;                       SET TO LOAD SERVICE BLOCK
               ;                       INITIALIZE CHECK DATE STATUS
1180 7E         MOV  A,M               MRSTS1.DATDOR = MRSTS1.SERMOD = TRUE
1181 F6 48      ORI  48H
1183 77         MOV  M,A
1184 E5         PUSH H                 SAVE HL
```

```
                    ;                   SEARCH FOR SERVICE BLOCK
1185 CD 2F 11        CALL NVMFND        NVMFND(ERRFLG)
                    ;                         (PSW:Z )
                    ;                         ( 0    )
                    ;                   IF ERRFLG .EQ. FALSE
1188 C4 EE 11        CNZ  NVMRD           LOAD SERVICE BLOCK
                    ;                   ENDIF
118B E1              POP  H             RESTORE HL
                    ;                   RETURN TO NORMAL MODE
                    ;                   DISABLE METER
118C 7E              MOV  A,M           MRSTS1.SERMOD = MRSTS1.ENABLD = FALSE
118D E6 F3           ANI  0F3H
118F 77              MOV  M,A
1190 C9              RET                RETURN

NVMMAP
                    ;NVMMAP(NVMCTL,BASE  ,BLKTYP)
                    ;      (NIBSTR,ADRESS,NIBSTR)
                    ;      ( I    , 0    , 0    )
                    ;      ( A    , HL   , A[1] )
                    ;      ( C    , C    , C    )
                    ;
                    ;PSW DESTROYED
                    ;REGISTERS NOT CHANGED
                    ;
                    ;MAPS BLOCK NUMBER IN L/O NIBBLE OF ACCUMULATOR INTO
                    ;CORRESPONDING NONVOLATILE MEMORY ADDRESS
                    ;
                    NVMMAP;             ****ENTRY POINT
1191 0F              RRC                A = NVMCTL[1]*HEX10+NVMCTL[0]
1192 0F              RRC
1193 0F              RRC
1194 0F              RRC
1195 F5              PUSH PSW           SAVE A,PSW
1196 E6 F0           ANI  0F0H          HL = BASE = NVMCTL[1]*HEX40
1198 6F              MOV  L,A
1199 26 00           MVI  H,0
119B 29              DAD  H
119C 29              DAD  H
119D F1              POP  PSW           RESTORE A,PSW
                    ;                   A[1] = BLKTYP = NVMCTL[0]
119E C9              RET                RETURN

NVMNBK
                    ;NVMNBK(ERRFLG,OLDCTL,NXTCTL,ADRESS,NVMCTL)(NVMCTL)
                    ;      (BIT   ,NIBSTR,NIBSTR,ADRESS,NIBSTR)(NIBSTR)
                    ;      ( 0    , 0    , 0    , 0    , -    )( I    )
                    ;      (PSW:Z , B    , C    , HL   , @HL  )( RAM  )
                    ;      ( C    , C    , C    , C    , -    )( NC   )
                    ;
                    ;A,PSW DESTROYED
                    ;REGISTERS DESTROYED
                    ;
                    ;DEVELOP CONTROL BYTE VALUES FOR DEACTIVATING BLOCK OF
                    ;CURRENT TYPE, AND FOR OPENING NEXT BLOCK.
                    ;
                    NVMNBK;             ****ENTRY POINT
                    ;                   SET NVMCTL TO INDICATE ACTIVE CLOSED
                    ;                   BLOCK CORRESPONDING TO CURRENT STATUS
119F CD 2F 11        CALL NVMFND        NVMFND(ERRFLG)
                    ;                         (PSW:Z )
                    ;                         ( 0    )
11A2 C8              RZ                 IF ERRFLG .EQ. FALSE
                    ;                     NVMCTL[0] = HEXF, NO FILES OPEN
                    ;                     NVMCTL[1] = ACTIVE BLOCK NUMBER
11A3 21 33 74        LXI  H,NVMCTL/2+X    HL = ADDRESS, NVMCTL
11A6 46              MOV  B,M             B = OLDCTL = NVMCTL
11A7 0E 02           MVI  C,2             C = NVMCTL = HEX02
11A9 78              MOV  A,B             A = OLDCTL+1
11AA 3C              INR  A
```

```
11AB CA B9 11   JZ   NVMNB1         IF OLDCTL+1 .EQ. 0
               ; >>JUMP AHEAD<<       OLD BLOCK WAS 15
               ;                      NEWCTL SET FOR BLOCK 2, NORMAL
               ;                      PSW:Z = ERRFLG = FALSE
               ;                    ELSE
               ;                      OLD BLOCK WAS NOT 15
11AE E6 0F      ANI  0FH              A=OLDBLK+1=(OLDCTL+1).AND.HEX0F
11B0 4F         MOV  C,A              C = OLDBLK+1
11B1 DE 03      SBI  3                A = OLDBLK-2
11B3 F2 B9 11   JP   NVMNB1           IF OLDBLK-2 .GE. 0
               ; >>JUMP AHEAD<<         OLD BLOCK WAS 2 TO 14
               ;                        NEWCTL SET FOR BLK 3 TO 15, NORM
               ;                        PSW:Z = ERRFLG = FALSE
               ;                      ELSE
               ;                        OLD BLOCK WAS 0 OR 1
               ;                        SET NEWCTL FOR BLK 0 OR 1, SERVC
11B6 EE EF      XRI  0EFH               C=NEWCTL=(OLDBLK-2).XOR.HEXEF
11B8 4F         MOV  C,A
               ;                      ENDIF
               ;                    ENDIF
               NVMNB1;              >>TARGET OF JUMP AHEAD<<
11B9 B1         ORA  C              PSW:Z = ERRFLG = FALSE
11BA C9         RET
               ;                  ENDIF
               ;                  RETURN

NVMNXT
               ;NVMNXT(ADRESS)
               ;      (ADRESS)
               ;      ( I/O  )
               ;      ( HL   )
               ;      ( C    )
               ;
               ;A,PSW DESTROYED
               ;REGISTERS NOT CHANGED
               ;
               ;ADVANCE ADDRESS TO NEXT HIGHER LOCATION SKIPPING XXXF
               ;
               NVMNXT;            ****ENTRY POINT
11BB 23         INX  H            HL = ADRESS = ADRESS+1
11BC 7D         MOV  A,L          IF ADRESS[3] .EQ. HEX0F
11BD E6 0F      ANI  0FH
11BF FE 0F      CPI  0FH
11C1 C0         RNZ
11C2 23         INX  H              HL = ADRESS = ADRESS+1
               ;                  ENDIF
11C3 C9         RET               RETURN

NVMOPN
               ;NVMOPN(ERRFLG)(NVMCTL,SERFLG)
               ;      (BIT    )(NIBSTR,BITSTR)
               ;      ( O     )( O    , I    )
               ;      (PSW:Z  )( RAM  , RAM  )
               ;      ( C     )( C    , C    )
               ;
               ;A,PSW DESTROYED
               ;REGISTERS DESTROYED
               ;
               ;OPENS NVM BLOCK
               ;
               NVMOPN;            ****ENTRY POINT
11C4 3A 10 74   LDA  SERFLG/2+X   IF SERFLG.DEAD .EQ. TRUE
11C7 F6 7F      ORI  7FH            PSW:Z = ERRFLG = TRUE
11C9 2F         CMA
               ;                  ELSE
               ;                    PSW:Z = ERRFLG = FALSE
               ;                  ENDIF
11CA C8         RZ                IF ERRFLG .EQ. FALSE
               ;                    ERASE NEXT BLOCK
11CB CD B1 10   CALL NVMER          NVMER(ERRFLG)
```

```
                     ;                         (PSW:Z )
                     ;                         ( 0    )
     11CE C8          RZ                    IF ERRFLG .EQ. FALSE
     11CF CD 47 10    CALL NVM30T             TURN ON -30V TO NVM
                     ;                        DEVELOP CONTROL BYTES FOR OPENING
                     ;                        NEXT BLOCK AND DEACTIVATING
                     ;                        OLD BLOCK
     11D2 CD 9F 11    CALL NVMNBK             NVMNBK(ERRFLG,OLDCTL,NXTCTL,
                     ;                               (PSW:Z , B     , C     ,
                     ;                               ( 0    , 0     , 0     ,
                     ;
                     ;                               ADRESS,NVMCTL)
                     ;                                HL   , @HL  )
                     ;                                0    , -    )
     11D5 F3          DI                      DISABLE INTERRUPTS
                     ;                        OPEN NEXT BLOCK
     11D6 71          MOV  M,C                NVMCTL = NXTCTL
                     ;                        DEACTIVATE OLD BLOCK
     11D7 CD A9 10    CALL NVMDXB             NVMDXB(ERRFLG,OLDCTL)
                     ;                               (PSW:Z , B     )
                     ;                               ( 0    , I     )
     11DA FB          EI                      ENABLE INTERRUPTS
     11DB CD 31 10    CALL NVM30F             TURN OFF -30V TO NVM
                     ;                      ENDIF
                     ;                    ENDIF
     11DE C9          RET                 RETURN

NVMPRP
                     ;NVMPRP(NIBCNT,OFFSET,RAM[I])(NVMCTL)
                     ;      (BYTE  ,OFFSET,NIBSTR)(NIBSTR)
                     ;      ( 0    , 0    , -    )( I     )
                     ;      ( B    , C    , @C   )( RAM   )
                     ;      ( C    , C    , NC   )( NC    )
                     ;
                     ;A,PSW DESTROYED
                     ;REGISTERS NOT CHANGED
                     ;
                     ;RETURN RAM PARAMETERS CORRESPONDING TO NVM BLOCK TYPE
                     ;
                     NVMPRP;              ****ENTRY POINT
     11DF 06 22       MVI  B,NORSIZ       B = NIBCNT = NORSIZ
     11E1 0E 28       MVI  C,NORSTR       C = OFFSET = NORSTR
     11E3 3A 33 74    LDA  NVMCTL/2+X     IF NVMCTL[1] .LT. 2
     11E6 E6 0E       ANI  0EH
     11E8 C0          RNZ
     11E9 06 28       MVI  B,SRVSIZ         B = NIBCNT = SRVSIZ
     11EB 0E 00       MVI  C,SRVSTR         C = OFFSET = SRVSTR
                     ;                    ENDIF
     11ED C9          RET                 RETURN

NVMRD
                     ;NVMRD()(NVMCTL,RAM[I],NVMRED)
                     ;       (NIBSTR,NIBSTR,NIBSTR)
                     ;       ( I    , 0    , I    )
                     ;       ( RAM  , RAM  , NVM  )
                     ;       ( NC   , C    , NC   )
                     ;
                     ;A,PSW DESTROYED
                     ;REGISTERS DESTROYED
                     ;
                     ;READ NONVOLATILE MEMORY INTO RAM
                     ;
                     NVMRD;               ****ENTRY POINT
                     ;                    GET RAM DESTINATION PARAMETERS
     11EE CD DF 11    CALL NVMPRP         NVMPRP(NIBCNT,OFFSET,RAM[I])
                     ;                          ( B    , C    , @C    )
                     ;                          ( 0    , 0    , -     )
                     ;                    DEFINE NVM SOURCE BASE
     11F1 3A 33 74    LDA  NVMCTL/2+X     A = NVMCTL
     11F4 CD 91 11    CALL NVMMAP         NVMMAP(NMVCTL,BASE,BLKTYP)
```

```
                ;                          ( A     , HL , A[1] )
                ;                          ( I     , O  , O    )
                ;                          FORM NVM READ ADDRESS OF SOURCE DATA
11F7 11 02 44    LXI  D,NVMRED+2           HL = ADDRESS, NVMRED[J]=BASE+2]
11FA 19          DAD  D
                ;                          INITIALIZE CRC VALUE
11FB 16 FF       MVI  D,0FFH               D = CRCVAL = HEXFF
                NVMRD1;                    LOOP - WITH 1 BREAK
11FD 05          DCR  B                      B = NIBCNT = NIBCNT-1
11FE FA 0F 12    JM   NVMRD2                 IF NIBCNT .LT. 0
                ;                              BREAK
                ;                            ENDIF
                ;                            COPY NVM TO RAM
1201 7E          MOV  A,M                    A = NVMRED[J]
1202 CD EE 0F    CALL PUTNIB                 PUTNIB(RAM[I],NVMRED[J])
                ;                                  ( @C    , A        )
                ;                                  ( O     , I        )
                ;                            UPDATE CRC
1205 CD C6 0E    CALL CRCNIB                 CRCNIB(NVMRED[J],CRCVAL)
                ;                                  ( A         , D    )
                ;                                  ( I         , I/O  )
1208 0C          INR  C                      C = OFFSET, RAM[I=I+1]
                ;                            CALCULATE NEXT NVM SOURCE ADDRESS
1209 CD BB 11    CALL NVMNXT                 NVMNXT(ADRESS,NVMRED[J=J+?])
                ;                                  ( HL    , @HL          )
                ;                                  ( I/O   , -            )
120C C3 FD 11    JMP  NVMRD1
                NVMRD2;                    ENDDO
                ;                          CHECK CRC VALUES
120F CD 58 10    CALL NVMBYT               NVMBYT(ADRESS,NVMRED[J],NVMCRC)
                ;                               ( HL    , @HL      , A    )
                ;                               ( I/O   , I        , O    )
1212 BA          CMP  D                    IF NVMCRC .NE. CRCVAL
1213 C8          RZ
                ;                            DECLARE DEAD METER. BAD CRC
1214 3E 00       MVI  A,BADCRC               A = BADCRC
1216 C3 85 10    JMP  NVMDED                 NVMDED(BADCRC,ERRFLG)
                ;                                  ( A     ,PSW:Z )
                ;                                  ( I     , O    )
                ;                          ENDIF
                ;                          RETURN

NVMSTO
                ;NVMSTO(ERRFLG)(MRSTS1,MRSTS2,NVMCTL)
                ;      ( BIT  )(BITSTR,BITSTR,NIBSTR)
                ;      (  O   )( I/O  , I/O  , O     )
                ;      (PSW:Z )( RAM  , RAM  , RAM   )
                ;      (  C   )( C    , C    , C     )
                ;
                ;A,PSW DESTROYED
                ;REGISTERS DESTROYED
                ;
                ;STARTING WITH NO NVM BLOCKS OPEN:
                ;WRITE NEW ACTIVE NVM BLOCK NOT CORRESPONDING TO CURRENT
                ;METER MODE.
                ;OPEN AN ERASED BLOCK CORRESPONDING TO CURRENT METER MODE.
                ;
                NVMSTO;                    ****ENTRY POINT
1219 CD 4E 0F    CALL LSTATE               LSTATE(FATMOD,NORMOD,SERMOD,PRVMOD)
                ;                                (PSW:S ,PSW:Z ,PSW:P ,PSW:C )
                ;                                ( O    , O    , O    , O    )
121C F2 21 12    JP   NVMST1               IF FATMOD .EQ. TRUE
121F AF          XRA  A                      ERRFLG = PSW:Z = TRUE
1220 C9          RET
                NVMST1;                    ELSE
                ;                            ERASE BLOCK FOR UNTOGGLED NORMOD
1221 CD B1 10    CALL NVMER                  NVMER(ERRFLG)
                ;                                  (PSW:Z )
                ;                                  ( O    )
                ;                            IF ERRFLG .EQ. TRUE
```

```
1224 CA B6 01     JZ   PWRDN             REINITIALIZE METER
                ;                      ELSE
                ;                        SET TO TOGGLE NORMOD INDIRECTLY BY
                ;                        TOGGLING THE SERVICE OR PRIVILEGED
                ;                        MODE FLAGS
1227 21 34 74     LXI  H,MRSTS1/2+X      HL=ADDRESS,MRSTS?=ADDRESS,MRSTS1
122A 1E 08        MVI  E,08H             E.M = E.SERMOD = TRUE
122C EA 32 12     JPE  NVMST2            IF LSTATE(SERMOD) .EQ. FALSE
122F 23           INX  H                   HL=ADDRESS,MRSTS?=ADDRESS,MRSTS2
1230 1E 01        MVI  E,01H               E.M = E.PRVMOD = TRUE
                NVMST2;                  ENDIF
                ;                        TOGGLE NORMOD
1232 7B           MOV  A,E               MRSTS?.M = MRSTS?.M .XOR. E.M
1233 AE           XRA  M
1234 77           MOV  M,A
1235 E5           PUSH H                 SAVE HL
1236 D5           PUSH D                 SAVE DE
                ;                        ERASE BLOCK FOR TOGGLED NORMOD
1237 CD B1 10     CALL NVMER             NVMER(ERRFLG)
                ;                             (PSW:Z )
                ;                             ( 0    )
                ;                        IF ERRFLG .EQ. TRUE
123A CA B6 01     JZ   PWRDN               REINITIALIZE METER
                ;                        ELSE
123D F3           DI                       DISABLE INTERRUPTS
                ;                          SET TO STORE BLK FOR TOG NORMOD
123E CD 9F 11     CALL NVMNBK              NVMNBK(ERRFLG,OLD,NXT,ADR,NVMCTL)
                ;                                (PSW:Z , B , C , HL, @HL  )
                ;                                ( 0    , 0 , 0 , 0 , -    )
                ;                          IF ERRFLG .EQ. TRUE
1241 CA B6 01     JZ   PWRDN                 REINITIALIZE METER
                ;                          ELSE
1244 CD 47 10     CALL NVM30T                TURN ON -30 V TO NVM
1247 E5           PUSH H                     SAVE HL
                ;                            DEACTIVATE BLK FOR TOG NORMOD
1248 CD A9 10     CALL NVMDXB                NVMDXB(ERRFLG,OLD)
                ;                                  (PSW:Z , B )
                ;                                  ( 0    , I )
                ;                            OPEN BLK FOR TOG NORMOD
124B E1           POP  H                     RESTORE HL
124C 71           MOV  M,C                   NVMCTL = NXT
                ;                            STORE BLK FOR TOGLED NORMOD
124D CD 9E 12     CALL NVMWR                 NVMWR(ERRFLG)
                ;                                 (PSW:Z )
                ;                                 ( 0    )
                ;                            RETURN TO UNTOGGLED NORMOD
1250 D1           POP  D                     RESTORE DE
1251 E1           POP  H                     RESTORE HL
1252 7B           MOV  A,E                   MRSTS?.M =
1253 AE           XRA  M                           MRSTS?.M .XOR. E.M
1254 77           MOV  M,A
                ;                            GET CONTROL BYTES
1255 CD 9F 11     CALL NVMNBK                NVMNBK(ERRFLG,OLD,NXT,
                ;                                  (PSW:Z , B , C ,
                ;                                  ( 0    , 0 , 0 ,
                ;
                ;                                  ADRESS,NVMCTL)
                ;                                   HL    , @HL  )
                ;                                   0     , -    )
                ;                            OPEN ERASED BLOCK
1258 71           MOV  M,C                   NVMCTL = NXT
1259 CD 47 10     CALL NVM30T                TURN ON -30 V TO NVM
                ;                            DEACTIVATE OLD BLOCK
125C CD A9 10     CALL NVMDXB                NVMDXB(ERRFLG,OLD)
                ;                                  (PSW:Z , B )
                ;                                  ( 0    , I )
125F FB           EI                         ENABLE INTERRUPTS
1260 C9           RET
                ;                          ENDIF
                ;                        ENDIF
                ;                      ENDIF
                ;                    ENDIF
                ;                    RETURN
```

```
                ;NVMWN(DATA  ,BASE   ,ERRFLG)(NVMRED,NVMWRT)
                ;     (NIBBLE,ADRESS,BIT   )(NIBSTR,NIBSTR)
                ;     ( I    , I    , O    )( I    , O     )
                ;     ( A[1] , HL   ,PSW:Z )( NVM  , NVM   )
                ;     ( C    , NC   , C    )( NC   , C     )
                ;
                ;A,PSW DESTROYED
                ;REGISTERS NOT CHANGED
                ;
                ;WRITE NIBBLE TO NONVOLATILE MEMORY
                ;
                NVMWN;                   ****ENTRY POINT
1261 C5           PUSH B                 SAVE REGISTERS
1262 D5           PUSH D
1263 E5           PUSH H
1264 E5           PUSH H
1265 01 00 48     LXI  B,NVMWRT          DE = ADDRESS, NVMWRT[BASE]
1268 09           DAD  B
1269 EB           XCHG
126A E1           POP  H                 HL = ADDRESS, NVMRED[BASE]
126B 01 00 44     LXI  B,NVMRED
126E 09           DAD  B
126F F5           PUSH PSW               SAVE A,PSW
                ;                        START WRITING DATA
1270 12           STAX D                 NVMWRT[BASE] = DATA
                ;                        DELAY FOR 1 MSEC
1271 01 0A 00     LXI  B,10              BC = LOOPCT = 10
                NVMWN1;                  DO UNTIL LOOPCT .EQ. 0
1274 CD 19 0B     CALL NPAUSE              NPAUSE(LOOPCT,ZROFLG)
                ;                                 ( BC   ,PSW:Z )
                ;                                 ( I/O  , O    )
1277 C2 74 12     JNZ NVMWN1
                ;                        ENDDO
                ;                        STOP WRITE FUNCTION
127A 7E           MOV  A,M               A = GARBAGE = NVMRED[BASE]
127B C1           POP  B                 B = DATA
                ;                        C = GARBAGE
127C 7E           MOV  A,M               A = SAVDAT = NVMRED[BASE]
127D 90           SUB  B                 A = TEST = (SAVDAT-DATA) .AND. HEXOF
127E E6 0F        ANI  0FH
1280 C2 87 12     JNZ  NVMWN2            IF TEST .EQ. 0
                ;                          SAVDAT .EQ. DATA
1283 3C           INR  A                   PSW:Z = ERRFLG = FALSE
1284 C3 9A 12     JMP NVMWN4
                NVMWN2;                  ELSE
                ;                          SAVDAT .NE. DATA
1287 01 9A 12     LXI  B,NVMWN3            SET TO RETURN TO ENDIF
128A C5           PUSH B
128B 01 42 B9     LXI  B,-(NVMRED+KILCOD)
                ;                          BC = -(ADDRESS, NVMRED[KILCOD])
128E 09           DAD  B                   HL = BASE-KILCOD
128F 7C           MOV  A,H                 PSW:Z = (BASE-KILCOD).EQ.0
1290 B5           ORA  L
1291 3E 01        MVI  A,NVMBAD            A = NVMBAD
1293 47           MOV  B,A                 B = NVMBAD
                ;                          IF (BASE-KILCOD).EQ.0
                ;                            DECLARE DEAD METER. BAD NVM
                ;                            DO NOT WRITE NVMBAD INTO NVM
1294 CA 99 10     JZ   NVMDE1                NVMDE1(NVMBAD,ERRFLG)
                ;                                   ( B    ,PSW:Z )
                ;                                   ( I    , O    )
                ;                          ELSE
                ;                            DECLARE DEAD METER. BAD NVM
                ;                            WRITE NVMBAD INTO NVM
1297 C2 85 10     JNZ  NVMDED                NVMDED(NVMBAD,ERRFLG)
                ;                                   ( A    ,PSW:Z )
                ;                                   ( I    , O    )
                NVMWN3;                    ENDIF
                NVMWN4;                  ENDIF
129A E1           POP  H                 RESTORE REGISTERS
```

```
129B D1        POP  D
129C C1        POP  B
129D C9        RET

NVMWR

               ;NVMWR(ERRFLG)(NVMCTL,RAM[I],SERFLG)
               ;     (BIT   )(NIBSTR,NIBSTR,BITSTR)
               ;     ( 0    )( I/O  , I     , I     )
               ;     (PSW:Z )( RAM  , RAM   , RAM   )
               ;     ( C    )( C    , NC    , NC    )
               ;
               ;A,PSW DESTROYED
               ;REGISTERS DESTROYED
               ;
               ;WRITE BLOCK FROM RAM TO NONVOLATILE MEMORY
               ;
               NVMWR;                 ****ENTRY POINT
               ;                      FETCH RAM SOURCE PARAMETERS
129E CD DF 11   CALL NVMPRP           NVMPRP(NIBCNT,OFFSET,RAM[I])
               ;                             ( B     , C     , @C    )
               ;                             ( 0     , 0     , -     )
12A1 79         MOV  A,C              C = NIBCNT
12A2 48         MOV  C,B
12A3 47         MOV  B,A              B = OFFSET, RAM[I]
               ;                      INITIALIZE CRC VALUE
12A4 16 FF      MVI  D,0FFH           D = CRCVAL = HEXFF
12A6 3A 33 74   LDA NVMCTL/2+X        A = NVMCTL
12A9 FE 20      CPI  20H              IF NVMCTL[0] .LT. 2
12AB D2 E6 12   JNC  NVMWR3
12AE CD 47 10   CALL NVM30T             TURN ON -30 V TO NVM
               ;                        FETCH NVM DESTINATION BASE
12B1 CD 91 11   CALL NVMMAP             NVMMAP(NVMCTL,BASE,BLKTYP)
               ;                               ( A     , HL , A[1] )
               ;                               ( I     , 0  , 0    )
               ;                        STORE BLOCK TYPE IN NVM HEADER
12B4 23         INX  H                  HL = BASE +1
12B5 CD 61 12   CALL NVMWN              NVMWN(BLKTYP,BASE+1,ERRFLG)
               ;                              ( A[1] , HL    ,PSW:Z )
               ;                              ( I    , I     , 0    )
               ;                        POINT AT START OF DATA IN NVM
12B8 23         INX  H                  HL = BASE+2
               NVMWR1;                  LOOP - WITH 1 BREAK
12B9 0D         DCR  C                    C = NIBCNT = NIBCNT-1
12BA FA CD 12   JM   NVMWR2               IF NIBCNT .LT. 0
               ;                            BREAK
               ;                          ENDIF
               ;                          FETCH DATA FROM RAM
12BD CD 35 0F   CALL GETNIB               GETNIB(DATA ,ZROFLG,RAM[I])
               ;                                ( A[1],PSW:Z , @B    )
               ;                                ( 0    , 0    , I     )
               ;                          UPDATE CRC VALUE
12C0 CD C6 0E   CALL CRCNIB               CRCNIB(DATA ,CRCVAL)
               ;                                ( A[1], D     )
               ;                                ( I    , 0     )
               ;                          WRITE DATA TO NVM
12C3 CD 61 12   CALL NVMWN                NVMWN(DATA ,BASE+?,ERRFLG)
               ;                               ( A[1], HL    ,PSW:Z )
               ;                               ( I    , I     , 0    )
               ;                          POINT AT NEXT DATA LOCATIONS
12C6 04         INR  B                    B = OFFSET, RAM[I=I+1]
12C7 CD BB 11   CALL NVMNXT               NVMNXT(ADRESS,BASE+?)
               ;                                ( HL    , @HL   )
               ;                                ( I/O   , -     )
12CA C3 B9 12   JMP NVMWR1
               NVMWR2;                  ENDDO
               ;                        STORE CRC IN NVM
12CD 7A         MOV  A,D                A[1] = CRCVAL[0]
12CE 0F         RRC
12CF 0F         RRC
12D0 0F         RRC
12D1 0F         RRC
```

```
12D2 CD 61 12   CALL NVMWN          NVMWN(CRCVAL[0],BASE+?,ERRFLG)
                ;                        ( A[1]    , HL    ,PSW:Z )
                ;                        ( I       , I     , 0    )
12D5 CD BB 11   CALL NVMNXT         NVMNXT(ADRESS,BASE+?)
                ;                         ( HL   , @HL  )
                ;                         ( I/O  , -    )
12D8 7A         MOV  A,D            A[1] = CRCVAL[1]
12D9 CD 61 12   CALL NVMWN          NVMWN(CRCVAL[1],BASE+?,ERRFLG)
                ;                        ( A[1]    , HL    ,PSW:Z )
                ;                        ( I       , I     , 0    )
                ;                   INDICATE BLOCK NOT OPEN
12DC 21 33 74   LXI  H,NVMCTL/2+X   HL = ADDRESS, NVMCTL
12DF 3E F0      MVI  A,0F0H         NVMCTL[0] = HEX0F
12E1 B6         ORA  M
12E2 77         MOV  M,A
12E3 CD 31 10   CALL NVM30F         TURN OFF -30V TO NVM
               NVMWR3;             ENDIF
12E6 3A 10 74   LDA  SERFLG/2+X    IF SERFLG.DEAD .EQ. TRUE
12E9 E6 80      ANI  80H             PSW:Z = ERRFLG = TRUE
12EB EE 80      XRI  80H
                ;                  ELSE
                ;                    PSW:Z = ERRFLG = FALSE
                ;                  ENDIF
12ED C9         RET                RETURN

ACCODE

               ;ACCODE(ERRFLG)(WORK1 ,DSCREG,RSTCNT,SERFLG)
               ;      (BIT   )(NIBCTR,NIBSTR,NIBBLE,BITSTR)
               ;      ( 0    )( 0    , I    , I    , I    )
               ;      (PSW:Z )( RAM  , RAM  , RAM  , RAM  )
               ;      ( C    )( C    , NC   , NC   , NC   )
               ;
               ;A,PSW DESTROYED
               ;REGISTERS DESTROYED
               ;
               ;BUILD ACCESS CODE MESSAGE IN TRANSMIT BUFFER
               ;
               ACCODE:              ****ENTRY POINT
               ;                    CLEAR WORK AREA
12EE 3E C0      MVI  A,WORK1        A = OFFSET, WORK1
12F0 CD 85 0E   CALL CLRBLK         CLRBLK(WORK1)
               ;                          ( @A  )
               ;                          ( 0   )
               ;                    PUT 10 DGT CONTROL SUM IN WORK1[0..9]
12F3 CD 3A 06   CALL CONSUM         CONSUM(ERRFLG)
               ;                          (PSW:Z )
               ;                          ( 0    )
               ;                    IF ERRFLG .EQ. TRUE
               ;                      PROCESS ERROR
12F6 CA A1 0B   JZ   PROERR           PROERR(ERRFLG)
               ;                            (PSW:Z )
               ;                            ( 0    )
               ;                    ELSE
               ;                      MOVE CONTROL SUM TO WORK1[6..15]
12F9 01 C6 C0   LXI  B,(WORK1+0)*100H+(WORK1+6)
               ;                      B = OFFSET, WORK1[0]
               ;                      C = OFFSET, WORK1[6]
12FC 3E 0A      MVI  A.10             A = NIBCNT = 10
12FE CD B3 0F   CALL MVLNIB           MVLNIB(WORK1[6],WORK1[0],NIBCNT,
               ;                            ( @C       , @B      , A    ,
               ;                            ( 0        , I       , I    ,
               ;
               ;                            NONBCD,ZROFLG)
               ;                            PSW:S ,PSW:Z )
               ;                             0    , 0    )
               ;                      PUT DESC REGISTER IN WORK1[0..4]
1301 01 C0 27   LXI  B,DSCREG*100H+WORK1
               ;                      B = OFFSET, DSCREG[0]
               ;                      C = OFFSET, WORK1[0]
1304 3E 05      MVI  A,5              A = NIBCNT = 5
```

```
1306 CD B3 0F   CALL MVLNIB      MVLNIB(WORK1[0],DSCRES[0],NIBCNT,
                ;                        ( @C      , @B      , A    ,
                ;                        ( O       , I       , I    ,
                ;
                ;                        NONBCD,ZROFLG)
                ;                        PSW:S ,PSW:Z )
                ;                         O    , O    )
                ;                PARSE RSTCNT INTO RESET NUMBER AND
                ;                RESET BIT
1309 01 C5 12   LXI  B,RSTCNT*100H+(WORK1+5)
                ;                B = OFFSET, RSTCNT
                ;                C = OFFSET, WORK1[5]
130C CD 35 0F   CALL GETNIB      GETNIB(RSTCNT,ZROFLG,RSTCNT)
                ;                       ( A    ,PSW:Z , @B   )
                ;                       ( O    , O    , I    )
130F 0F         RRC
1310 57         MOV  D,A         D[1] = RSTCNT/2
                ;                D[0].0 = RSTBIT = RSTCNT .MOD. 2
1311 07         RLC              A = RSTBIT
1312 E6 01      ANI 01H
                ;                PUT RSTBIT INTO WORK1[5]
1314 CD EE 0F   CALL PUTNIB      PUTNIB(WORK1[5],RSTBIT)
                ;                       ( @C      , A     )
                ;                       ( O       , I     )
                ;                EXTRACT RESET NUMBER FROM RIGHTMOST
                ;                DIGIT OF WORK1[0..4] WHICH WILL NOT
                ;                BE TRANSFORMED INTO A NON BCD DIGIT.
1317 0D         DCR  C           C = OFFSET, WORK1[I=4]
1318 41         MOV  B,C         B = OFFSET, WORK1[I=4]
1319 1E 05      MVI  E,5         E = NIBCNT = 5
               ACCOD1;           DO UNTIL NIBCNT .EQ. 0; WITH 1 BREAK
131B CD 35 0F   CALL GETNIB        GETNIB(BCDDGT,ZROFLG,WORK1[I])
                ;                         ( A     ,PSW:Z , @B      )
                ;                         ( O     , O    , I       )
131E FE 08      CPI  8             IF BCDDGT .LT. 8
1320 D2 2A 13   JNC  ACCOD2
1323 AA         XRA  D                BCDDGT = BCDDGT .XOR. RSTNO
1324 CD EE 0F   CALL PUTNIB           PUTNIB(WORK1[I],BCDDGT)
                ;                            ( @C      , A     )
                ;                            ( O       , I     )
1327 C3 30 13   JMP  ACCOD3           BREAK
               ACCOD2;             ENDIF
132A 05         DCR  B             B = OFFSET, WORK1[I=I-1]
132B 0D         DCR  C             C = OFFSET, WORK1[I=I-1]
132C 1D         DCR  E             E = NIBCNT = NIBCNT-1
132D C2 1B 13   JNZ  ACCOD1
               ACCOD3;           ENDDO
                ;                CALCULATE CRC OF WORK AREA
1330 01 C0 10   LXI  B,16*100H+WORK1
                ;                B = NIBCNT = 16
                ;                C = OFFSET, WORK1[0]
1333 CD B1 0E   CALL CRC         CRC(WORK1[0],NIBCNT,CRCVAL)
                ;                   ( @C      , B     , D     )
                ;                   ( I       , I     , O     )
1336 3A 10 74   LDA  SERFLG/2+X  PSW:Z=NVMOK=SERFLG.WEKNVM .EQ. FALSE
1339 E6 20      ANI  20H
133B 7A         MOV  A,D         A = CRCVAL
133C CA 40 13   JZ   ACCOD4      IF NVMOK .EQ. FALSE
133F 2F         CMA                A = CRCVAL = .NOT. CRCVAL
               ACCOD4;           ENDIF
                ;                COMPLETE ACCESS CODE IN WORK[0..7]
                ;                AS FOLLOWS:
                ;                WORK1[4].0..3 = WORK1[4].0..3
                ;                WORK1[5].1..2 = WORK1[5].1..2 .OR.
                ;                                CRCVAL.0..1
                ;                WORK1[6].0 = 0
                ;                WORK1[6].1..3 = CRCVAL.2..4
                ;                WORK1[7].0 = 0
                ;                WORK1[7].1..3 = CRCVAL.5..7
1340 57         MOV  D,A         D = CRCVAL
```

```
1341 E6 F8      ANI  0F8H             D = FCRC2
1343 82         ADD  D
1344 57         MOV  D,A
1345 17         RAL                   A = FCRC1
1346 17         RAL
1347 17         RAL
1348 E6 06      ANI  6
134A 21 62 74   LXI  H,(WORK1+4)/2+X HL = ADDRESS, WORK1[4..5]
134D B6         ORA  M                WORK1[4..5] = WORK1[4..5] .OR. FCRC1
134E 77         MOV  M,A
134F 7A         MOV  A,D              A = FCRC3 = FCRC2 .AND. HEX77
1350 E6 77      ANI  77H
1352 23         INX  H                HL = ADDRESS, WORK1[6..7]
1353 77         MOV  M,A              WORK1[6..7] = FCRC3
               ;                      BUILD ACCESS CODE MSG IN XMIT BUFFER
1354 11 5A 13   LXI  D,ACCOD5         DE = ADDRESS, ACCOD5
1357 C3 5B 0D   JMP  VALREQ           VALREQ(WORK1 ,ACCFMT,HACODE,ERRFLG)
               ;                            (@@DE+0,@DE+1 ,@DE+2 ,PSW:Z )
               ;                            ( I    , I    , I    , O    )
               ;                     ENDIF
               ;                     RETURN
               ACCOD5;               ARGUEMENTS FOR VALREQ
135A C0 8F 90   DB   WORK1,ACCFMT,HACODE

BINOCT
               ;BINOCT(BINARY,OCTAL ,DIGCNT)
               ;      (BITSTR,NIBSTR,BYTE  )
               ;      ( I    , O    , I    )
               ;      ( @H   , @D   , B    )
               ;      ( NC   , C    , C    )
               ;
               ;A,PSW DESTROYED
               ;REGISTERS DESTROYED
               ;
               ;INSERT BITS FROM BIT STRING 3 AT A TIME INTO A PREVIOUSLY
               ;CLEARED NIBBLE STRING.
               ;DIGCNT ASSUMED .NE. 0.
               ;
               BINOCT;               ****ENTRY POINT
135D 78         MOV  A,B              E = DBIT = DIGCNT*4-1
135E 07         RLC
135F 07         RLC
1360 3D         DCR  A
1361 5F         MOV  E,A
1362 90         SUB  B                L = SBIT = DBIT-DIGCNT
1363 6F         MOV  L,A
               BINOC1;               DO UNTIL DBIT .LT. 0
               ;                       SET TO MOVE 3 BITS INTO OCTAL NIBBLE
1364 0E 03      MVI  C,3                C = BITCNT = 3
               BINOC2;                 DO UNTIL BITCNT .EQ. 0
               ;                         MOVE 3 L/O BITS INTO NIBBLE
1366 CD 68 0F   CALL MOVBIT               MOVBIT(BINARY,SBIT,OCTAL,DBIT,ZRO)
               ;                               ( @H   , L  , @D  , E  ,P:Z)
               ;                               ( I    , I  , O   , I  , O )
1369 2D         DCR  L                    L = SBIT = SBIT-1
136A 1D         DCR  E                    E = DBIT = DBIT-1
136B 0D         DCR  C                    C = BITCNT = BITCNT-1
136C C2 66 13   JNZ  BINOC2
               ;                       ENDDO
               ;                       SKIP OVER H/O BIT IN NIBBLE
136F 1D         DCR  E                  E = DBIT = DBIT-1
1370 F2 64 13   JP   BINOC1
               ;                     ENDDO
1373 C9         RET                  RETURN

VRCDR
               ;VRCDR(ERRFLG)(DSCREG,DSCCRC)
               ;      (BIT   )(NIBSTR,BYTE  )
               ;      ( O    )( O    , O    )
               ;      (PSW:Z )( RAM  , RAM  )
               ;      ( C    )( C    , C    )
```

```
                 ;
                 ;A,PSW DESTROYED
                 ;REGISTERS DESTROYED
                 ;
                 ;CLEAR VARIABLE RMRS DESCENDING REGISTER
                 ;
                 VRCDR;               ****ENTRY POINT
                 ;                    PERFORM RULE CHECKING AND REFORMATTING
1374 CD 03 14     CALL VRPREP         VRPREP(ERRFLG)
                 ;                          (PSW:Z )
                 ;                          ( 0    )
1377 C8           RZ                  IF ERRFLG .EQ. FALSE
                 ;                      CLEAR DESCENDING REGISTER
1378 AF           XRA  A                A = NIBVAL = 0
1379 06 07        MVI  B,DSCSIZ         B = DSCSIZ
137B 0E 2F        MVI  C,DSCREG         C = OFFSET, DSCREG
137D CD 24 0F     CALL FILNIB           FILNIB(DSCREG,NIBVAL,DSCSIZ)
                 ;                             ( @C   , A    , B    )
                 ;                             ( 0    , I    , I    )
                 ;                      UPDATE DESCENDING REGISTER CRC
1380 CD B1 0D     CALL CRC              CRC(DSCREG,DSCSIZ,CRCVAL)
                 ;                         ( @C   , B    , D    )
                 ;                         ( I    , I    , 0    )
1383 7A           MOV  A,D              DSCCRC = CRCVAL
1384 32 1D 74     STA  DSCCRC/2+X
                 ;                      CHECK METER STATUS
1387 CD 4E 0F     CALL LSTATE           LSTATE(FATMOD,NORMOD,SERMOD,PRVMOD)
                 ;                             (PSW:S ,PSW:Z ,PSW:P ,PSW:C )
                 ;                             ( 0    , 0    , 0    , 0    )
                 ;                      IF FATMOD .EQ. FALSE
                 ;                        EXECUTE RESET
138A F2 03 14     JP   VRXEQ              VRXEQ(ERRFLG)
                 ;                              (PSW:Z )
                 ;                              ( 0    )
                 ;                      ELSE
                 ;                        DECLARE DEAD METER. FATAL RESET
138D 3E 03        MVI  A,FATRST           A = FATRST
138F C3 85 10     JMP  NUMDED             NUMDED(FATRST,ERRFLG)
                 ;                               ( A    ,PSW:Z )
                 ;                               ( I    , 0    )
                 ;                      ENDIF
                 ;                    ENDIF
                 ;                    RETURN

VRCLR
                 ;VRCLR(ERRFLG)(AMTBUF)
                 ;     (BIT   )(NIBSTR)
                 ;     ( 0    )( I    )
                 ;     (PSW:Z )( RAM  )
                 ;     ( C    )( NC   )
                 ;
                 ;A,PSW DESTROYED
                 ;REGISTERS DESTROYED
                 ;
                 ;SELECT VARIABLE RMRS CLEAR REGISTER FUNCTION
                 ;
                 VRCLR;               ****ENTRY POINT
                 ;                    SELECT FUNCTION VIA AMOUNT FORMAT
1392 21 70 74     LXI  H,AMTBUF/2+X   HL = ADDRESS, AMTBUF[0..1]
1395 7E           MOV  A,M            A = AMTBUF[0..1]
                 ;                    CASE (AMTBUF[0..1])
1396 FE 1F        CPI  1FH              **1F: CLEAR RESET ERROR COUNTER
1398 CA A3 13     JZ   VRCREC                 VRCREC(ERRFLG,ADRESS,AMTBUF)
                 ;                                   (PSW:Z , HL   , @HL  )
                 ;                                   ( 0    , I    , -    )
139B FE 22        CPI  22H              **22: CLEAR DESCENDING REGISTER
139D CA 74 13     JZ   VRCDR                  VRCDR(ERRFLG)
                 ;                                 (PSW:Z )
                 ;                                 ( 0    )
                 ;                      **ELSE:
                 ;                            PROCESS ERROR
```

```
 13A0 C3 A1 0B   JMP  PROERR              PROERR(ERRFLG)
                ;                                (PSW:Z )
                ;                                ( 0    )
                ;                      ENDCASE
                ;                      RETURN

VRCREC
                ;VRCREC(ERRFLG,ADRESS,AMTBUF)(AMTBUF)
                ;      (BIT   ,ADRESS,NIBSTR)(NIBSTR)
                ;      ( 0    , I     , -    )( 0    )
                ;      (PSW:Z , HL    , @HL  )( RAM  )
                ;      ( C    , C     , -    )( C    )
                ;
                ;A,PSW DESTROYED
                ;REGISTERS DESTROYED
                ;
                ;CLEAR VARIABLE RMRS RESET ERROR COUNTER
                ;
                VRCREC;                ****ENTRY POINT
                ;                      CHECK AMOUNT BUFFER
 13A3 23         INX  H                HL = ADDRESS, AMTBUF[2..3]
 13A4 7E         MOV  A,M              IF AMTBUF[2..3] .EQ. HEX00
 13A5 B7         ORA  A
                ;                        DON'T CLEAR DES REG BY MISTAKE
 13A6 CA A1 0B   JZ   PROERR             PROERR(ERRFLG)
                ;                              (PSW:Z )
                ;                              ( 0    )
                ;                      ELSE
                ;                        CHECK METER STATUS
 13A9 CD 4D 0F   CALL LSTATE             LSTATE(FATMOD,NORMOD,SERMOD,PRVMOD)
                ;                              (PSW:S ,PSW:Z ,PSW:P ,PSW:C )
                ;                              ( 0    , 0    , 0    , 0    )
                ;                        IF FATMOD .EQ. TRUE
                ;                          PROCESS ERROR
 13AC FA A1 0B   JM   PROERR               PROERR(ERRFLG)
                ;                                (PSW:Z )
                ;                                ( 0    )
                ;                        ELSE
                ;                          ALTER AMOUNT FORMAT
 13AF 3A 35 74   LDA  DIEDCM/2+X           A = DIEDCM
 13B2 0E E1      MVI  C,AMTBUF+1           C = OFFSET, AMTBUF[1]
 13B4 CD EE 0F   CALL PUTNIB               PUTNIB(AMTBUF[1],DIEDCM)
                ;                                ( @C       , A     )
                ;                                ( 0        , I     )
                ;                          PERFORM RULE CHECK AND REFORMATTING
 13B7 CD 03 14   CALL VRPRE1               VRPRE1(ERRFLG)
                ;                                (PSW:Z )
                ;                                ( 0    )
                ;                          IF ERRFLG .EQ. FALSE
                ;                            EXECUTE RESET
 13BA C2 03 14   JNZ  VRXEQ                  VRXEQ(ERRFLG)
                ;                                  (PSW:Z )
                ;                                  ( 0    )
                ;                          ENDIF
                ;                        ENDIF
                ;                      ENDIF
 13BD C9         RET                   RETURN

VRMRS
                ;VRMRS(ERRFLG)(CMBBUF)
                ;     (BIT   )(NIBSTR)
                ;     ( 0    )( I    )
                ;     (PSW:Z )( RAM  )
                ;     ( C    )( NC   )
                ;
                ;A,PSW DESTROYED
                ;REGISTERS DESTROYED
                ;
                ;SELECT VARIABLE RMRS FUNCTION
                ;
                VRMRS;                 ****ENTRY POINT
```

```
                        ;               SELECT FUNCTION VIA COMBINATION FORMAT
13BE 3A 78 74    LDA  CMBBUF/2+X    A = CMBBUF[0..1]
                 ;                  CASE (CMBBUF[0..1])
13C1 FE 4F        CPI  4FH            **4F: CLEAR REGISTERS
13C3 CA 92 13     JZ   VRCLR                 VRCLR(ERRFLG)
                 ;                                (PSW:Z )
                 ;                                ( 0    )
13C6 FE 6F        CPI  6FH            **6F: RESET POSTAGE
13C8 CA CE 13     JZ   VRSET                 VRSET(ERRFLG)
                 ;                                (PSW:Z )
                 ;                                ( 0    )
                 ;                    **ELSE:
                 ;                           PROCESS ERROR
13CB C3 A1 0B     JMP  PROERR                PROERR(ERRFLG)
                 ;                                 (PSW:Z )
                 ;                                 ( 0    )
                 ;                  ENDCASE
                 ;                  RETURN

VRSET

                 ;VRSET(ERRFLG)(AMTBUF,DSCREG,DSCCRC)
                 ;     (BIT   )(NIBSTR,NIBSTR,BYTE  )
                 ;     ( 0    )( I    , 0    , 0    )
                 ;     (PSW:Z )( RAM  , RAM  , RAM  )
                 ;     ( C    )( NC   , C    , C    )
                 ;
                 ;A,PSW DESTROYED
                 ;REGISTERS DESTROYED
                 ;
                 ;RESET VARIABLE RMRS DESCENDING REGISTER
                 ;
                 VRSET;             ****ENTRY POINT
                 ;                  CHECK METER STATUS
13CE CD 4E 0F     CALL LSTATE       LSTATE(PATMOD,NORMOD,SERMOD,PRVMOD)
                 ;                        (PSW:S ,PSW:Z ,PSW:P ,PSW:C )
                 ;                        ( 0    , 0    , 0    , 0    )
                 ;                  IF NORMOD .EQ. FALSE
                 ;                    PROCESS ERROR
13D1 C2 A1 0B     JNZ  PROERR         PROERR(ERRFLG)
                 ;                           (PSW:Z )
                 ;                           ( 0    )
                 ;                  ELSE
                 ;                    CHECK AMOUNT FORMAT
13D4 3A 70 74     LDA  AMTBUF/2+X     IF AMTBUF[1] .EQ. HEXOF
13D7 E6 0F        ANI  0FH
13D9 FE 0F        CPI  0FH
                 ;                      PROCESS ERROR. NO DECIMAL ENTERED
13DB CA A1 0B     JZ   PROERR           PROERR(ERRFLG)
                 ;                             (PSW:Z )
                 ;                             ( 0    )
                 ;                    ELSE
                 ;                      PERFORM RULE CHECK AND REFORMATTING
13DE CD 03 14     CALL VRPREP           VRPREP(ERRFLG)
                 ;                             (PSW:Z )
                 ;                             ( 0    )
13E1 C8           RZ                    IF ERRFLG .EQ. FALSE
                 ;                        CALC NEW DESC REGISTER VALUE
13E2 0E E7        MVI  C,AMTBUF+8-1       C = OFFSET, AMTBUF[7]
13E4 06 35        MVI  B,DSCREG+DSCSIZ-1  B = OFFSET, DSCREG[I=DSCSIZ-1]
13E6 11 07 07     LXI  D,DSCSIZ*100H+DSCSIZ
                 ;                        D = DSCSIZ
                 ;                        E = DSCSIZ
13E9 CD F8 06     CALL DECADD             DECADD(AMTBUF[7],DSCREG[I],
                 ;                               ( @C       , @B       ,
                 ;                               ( I/O      , I        ;
                 ;
                 ;                                DSCSIZ,DSCSIZ,OVRFLO)
                 ;                                 D     , E    ,PSW:C )
                 ;                                 I     , I    , 0    )
                 ;                        IF OVRFLO .EQ. TRUE
```

```
                   ;                             PROCESS ERROR. OVERFLOW
13EC DA A1 0E       JC   PROERR                  PROERR(ERRFLG)
                   ;                                   (PSW:Z )
                   ;                                   ( 0    )
                   ;                           ELSE
                   ;                             UPDATE DESCENDING REGISTER
13EF 0E 2F          MVI  C,DSCREG                C = OFFSET, DSCREG
13F1 06 E1          MVI  B,AMTBUF+8-DSCSIZ       B = OFFSET, AMTBUF[I=8-DSCSIZ]
13F3 3E 07          MVI  A,DSCSIZ                A = DSCSIZ
13F5 CD B3 0F       CALL MVLNIB                  MVLNIB(DSCREG,AMTBUF[I],DSCSIZ,
                   ;                                   ( @C   , @B      , A    ,
                   ;                                   ( 0    , I       , I    ,
                   ;
                   ;                                   NONBCD,NONZRO)
                   ;                                   PSW:S ,PSW:Z )
                   ;                                    0    , 0    )
                   ;                             UPDATE DESC REGISTER CRC
13F8 47             MOV  B,A                     B = DSCSIZ
13F9 CD B1 0E       CALL CRC                     CRC(DSCREG,DSCSIZ,CRCVAL)
                   ;                                ( @C   , B    , D    )
                   ;                                ( I    , I    , 0    )
13FC 7A             MOV  A,D                     DSCCRC = CRCVAL
13FD 32 1B 74       STA  DSCCRC/2+X
                   ;                             EXECUTE RESET
1400 C3 03 14       JMP  VRXEQ                   VRXEQ(ERRFLG)
                   ;                                  (PSW:Z )
                   ;                                  ( 0    )
                   ;                           ENDIF
                   ;                         ENDIF
                   ;                       ENDIF
                   ;                     ENDIF
                   ;                     RETURN
                   ;   Recharging programs have been deleted.
                   VRPREP;
                   VRPRE1; and
                   VRXEQ;  are two (2) of the modules which have been removed for security
                   ;   purposes.  One suitable system for the deleted set of modules
                   ;   is disclosed in U. S. Patent No. 4,097,923 for REMOTE POSTAGE
                   ;   METER CHARGING SYSTEM USING AN ADVANCED MICROCOMPUTERIZED
                   ;   POSTAGE METER issued on June 27,1978 to Alton B. Eckert, Howell
                   ;   A. Jones, Jr. and Frank T. Check, Jr.  This patent is hereby
                   ;   incorporated by reference into the subject patent application.
                   ; (***********************************************************)
                   ;
                   ;THIS IS THE DEMO PROGRAM FOR 6 STEPS/DIGIT MECHANISM
                   ;   USED FOR 45 DEG ENCODER  & 30 DEG SENSOR MOUNTING
                   ;Objective
                   ;   Position the stepper motor through specified number of steps.
                   ;   Flag the errors if
                   ;                     1. the move fails
                   ;                     2. if the sensors are not in home position
                   ;                        after the completion of a move
                   ;Level:
                   ;   Calls RENC , BKLASH routines
                   ;   utilizes look up table setup for determining the step count
                   ;   requirements for retries.
                   ;   Exits with the power held on to both motors.  It is the duty of the
                   ;   invoking routine to judiciously hold the appropriate home phase.
                   ;Procedure MOVCLS(MOTOR,RETRIES,MCOUNT,SPEED:ERROR)
                   ;ERROR := 0
                   ;Input (PORT.SENSOR,SENSPTN)
                   ;SENSPTN := SENSPTN and MSNMASK
                   ;If SENSPTN = (BCDO or BODC or BCDO or BCDC) then PASSFLAG := 0
                   ;                                              go to Loop1
                   ;                                         else ERROR := 5
                   ;                                              End MOVCLS
                   ;Loop1:      Do while (RETRIES > 0 and MCOUNT <> 0 and ERROR > 0 )
                   ;             If PASSFLAG = 0 then  ECOUNT := MCOUNT * 2
                   ;                                   MSTEP := MCOUNT * 6
                   ;             Input (PORT.SENSOR,SENSPTN)
```

```
                ;           If MOTOR = BANK then
                ;                       SENSPTN := (SENSPTN / 4) and MASKDSENSR
                ;           If SENSPTN = 11 then MOTPTN := PHASE1    (....  11H..)
                ;                       else MOTPTN := PHASE2          44H
                ;           If MCOUNT > 0 then MOTPTN := MOTPTN * 4
                ;           Input (PORTB,MOTHPTN)
                ;           IF MOTOR = BANK then MOTPTN := MOTPTN and MASKMSN
                ;                           MOTHPTN := MOTHPTN and MASKLSN
                ;                           MOTHPTN := MOTHPTN or MOTPTN
                ;                       else MOTPTN := MOTPTN and MASKLSN
                ;                           MOTHPTN := MOTHPTN and MASKMSN
                ;                           MOTHPTN := MOTHPTN or MOTPTN
                ;           Output ( PORTB,MOTHPTN)
                ;           If MCOUNT > 0 then  MSTEP := MSTEP-1
                ;                               MOTPTN := MOTPTN * 2
                ;                         else  MSTEP := MSTEP + 1
                ;                               MOTPTN := MOTPTN / 2
                ;           For X = 1 to SPEED by 1
                ;                 Procedure RENC (MOTOR,SPEED,OLDPTN :ERROR,ADJCOUNT)
                ;           End For
                ;           If MSTEP <> 0 then
                ;                 If ERROR = 0 then Continue Do
                ;           else For Y =1 to 60 by 1
                ;                     Procedure RENC (MOTOR,OLDPTN: ERRORT,ADJCOUNT)
                ;               End For
                ;           MSTEP := MSTEP (look-up)
                ;           PASSFLAG := PASSFLAG + 1
                ;           Continue Do
                ;   End Do
                ;   If RETRIES = 0 or MCOUNT = 0 then
                ;                               Procedure BKLASH
                ;If ERROR > 0 THEN End
                ;If BNKPAT = 01 then ERROR := 5; End
                ;           else if BNKPAT = 10 then ERROR :5; End
                ;                               else if MCOUNT = 0 THEN    End
                ;                                                   else ERROR := 6;End
                ;If DGTPAT = 01 then ERROR := 5; End
                ;          else if DGTPAT = 10 then ERROR := 5 ; End
                ;                              else if MCOUNT = 0 then End
                ;                                                   else ERROR := 6
                ;End movcls
                ;
                ;
                ; PARAM     (*C-REG*) COUNT : BYTE; (*- FOR CW, + FOR CCW*)
                ;   (*E-REG*) MOTOR : MOTORS; (*1 FOR BANK, 0 FOR DIGIT*)
                ;   (*H-REG*) SPEED : BYTE  ;Stepping speed of motor
                ;   (*L-REG*) TRIES : BYTE;
                ;
                ; VAR       (*B-REG*) ENC_COUNT : BYTE;
                ;   (*C-REG*) MOT_COUNT : BYTE;
                ;   (*D-REG*) PATTERN : BYTE;
                ;
0000            BODO        EQU     0000B
0003            BODC        EQU     0011B
000C            BCDO        EQU     1100B
000F            BCDC        EQU     1111B
0000            PFLAGO      EQU     00
0003            DGTMSK      EQU     03H
000C            BNKMSK      EQU     0CH
000F            LSNMSK      EQU     0FH
00F0            MSNMSK      EQU     0F0H
0011            PHASE1      EQU     11H
0044            PHASE2      EQU     44H
0003            SENSCL      EQU     03H
0005            ERROR5      EQU     05H
0006            ERROR6      EQU     06H
                MOVCLS:                                          ; BEGIN
1403 AF            XRA      A       ; ERROR := NO_ERRORS;
1404 32 38 74      STA      ERROR
                ;
                ;
```

```
1407 3A 00 68 MOVC4:     LDA     PORT2A  ;Combination sensor check
140A E6 0F               ANI     LSNMSK
140C FE 00               CPI     BODO
140E CA 23 14            JZ      MOVC7
1411 FE 03               CPI     BODC
1413 CA 23 14            JZ      MOVC7
1416 FE 0C               CPI     BCDO
1418 CA 23 14            JZ      MOVC7
141B FE 0F               CPI     BCDC
141D CA 23 14            JZ      MOVC7
1420 C3 F9 14            JMP     MOVC60
               ;
               ;
1423 3E 00     MOVC7:    MVI     A,PFLAG0  ;Passflag:=0
1425 F5                  PUSH    PSW
1426 7D        MOVC05:   MOV     A,L     ; WHILE (TRIES > 0) AND (COUNT <> 0)
1427 B7                  ORA     A       ;       AND (ERROR = NO_ERRORS) DO
1428 CA DB 14            JZ      MOVC50  ;branch here to movc70 for backlash correction
142B 79                  MOV     A,C
142C B7                  ORA     A
142D CA DB 14            JZ      MOVC50  ;branch here to movc70 for backlash correction
1430 3A 38 74            LDA     ERROR
1433 B7                  ORA     A
1434 C2 DB 14            JNZ     MOVC50
                                 ;     BEGIN
1437 F1                  POP     PSW     ;Passflag check.
1438 B7                  ORA     A
1439 F5                  PUSH    PSW     ;
143A C2 56 14            JNZ     MOVC8
143D 79        MOVC1:    MOV     A,C              ;
143E 87                  ADD     A
143F 47                  MOV     B,A          ;ENC COUNT=2*COUNT
1440 87                  ADD     A
1441 80                  ADD     B            ;STEP = 6*COUNT
1442 4F                  MOV     C,A
               ;
               ;
1443 7B                  MOV     A,E
1444 B7                  ORA     A
1445 3A 00 68            LDA     PORT2A
1448 CA 4D 14            JZ      MOVC6
               ;
               ;
144B 0F                  RRC                  ;BANK MOTOR
144C 0F                  RRC                  ;
                                 ;     CASE SIGN (MOT_COUNT) OF
144D E6 03     MOVC6:    ANI     DGTMSK           ;
144F 16 44               MVI     D,PHASE2         ;
1451 CA 56 14            JZ      MOVC8            ;
1454 16 11               MVI     D,PHASE1
               MOVC8:                         ;
1456 79                  MOV     A,C              ;
1457 B7                  ORA     A                ;
1458 7A                  MOV     A,D              ;
                                 ;
1459 FA 5F 14            JM      MOVC15       ;
145C 07                  RLC
145D 07                  RLC                                   ;
                                 ;                   AND PHASED AND PHASEA;
145E 57        MOVC10:   MOV     D,A     ;     END;
               MOVC15:                   ;     REPEAT
145F 7B                  MOV     A,E     ;       CASE MOTOR OF
1460 B7                  ORA     A
1461 7A                  MOV     A,D
1462 CA 73 14            JZ      MOVC20
1465 E6 F0               ANI     MSNMSK
1467 C5                  PUSH    B
1468 47                  MOV     B,A
1469 3A 02 70            LDA     PORTB
146C E6 0F               ANI     LSNMSK
146E B0                  ORA     B
```

```
146F C1              POP     B
1470 C3 7E 14        JMP     MOVC25
1473 E6 0F   MOVC20: ANI     LSNMSK  ;            DIGIT: PORTB := (PATTERN OR PHASESOFF R
1475 C5              PUSH    B
1476 47              MOV     B,A
1477 3A 02 70        LDA     PORTB                ;
147A E6 F0           ANI     MSNMSK               ;
147C B0              ORA     B                    ;
147D C1              POP     B                    ;
                             ;                    IS BEING MOVED
147E 32 02 70 MOVC25: STA    PORTB   ;              END;
1481 79              MOV     A,C     ;        CASE SIGN (MOT_COUNT) OF
1482 B7              ORA     A
1483 7A              MOV     A,D
1484 FA 8C 14        JM      MOVC30
                             ;               +1: BEGIN
1487 0D              DCR     C       ;              MOT_COUNT := MOT_COUNT - 1;
1488 07              RLC             ;              PATTERN := PATTERN ROL 1
1489 C3 8E 14        JMP     MOVC35  ;              END;
             MOVC30:                 ;                  -1: BEGIN
148C 0C              INR     C       ;              MOT_COUNT := MOT_COUNT - 1;
148D 0F              RRC             ;              PATTERN := PATTERN ROR 1
                                     ;              END;
148E 57      MOVC35: MOV     D,A     ;              END;
148F C5              PUSH    B       ;        READ_ENCODERS (10, MOTOR, ENC_COUNT)
1490 48              MOV     C,B
1491 D5              PUSH    D
1492 E5              PUSH    H
1493 6C              MOV     L,H
1494 CD 99 19        CALL    RENC
1497 E1              POP     H
1498 D1              POP     D
1499 79              MOV     A,C
149A C1              POP     B
149B 47              MOV     B,A
149C 79              MOV     A,C     ;    UNTIL (MOT_COUNT = 0) OR (ERROR <> NO_ERRORS);
149D B7              ORA     A
149E CA A8 14        JZ      MOVC40
14A1 3A 38 74        LDA     ERROR
14A4 B7              ORA     A
14A5 CA 5F 14        JZ      MOVC15
14A8 C5      MOVC40: PUSH    B       ;     READ_ENCODERS (60, MOTOR, ENC_COUNT);
14A9 48              MOV     C,B
14AA D5              PUSH    D
14AB E5              PUSH    H
14AC 2E 3C           MVI     L,60.
14AE CD 99 19        CALL    RENC
14B1 E1              POP     H
14B2 D1              POP     D
14B3 79              MOV     A,C
14B4 C1              POP     B
14B5 47              MOV     B,A
14B6 B7              ORA     A       ;    COUNT := ENC_COUNT / 2;
14B7 F2 BC 14        JP      MOVC45
14BA 2F              CMA
14BB 3C              INR     A
14BC E5      MOVC45: PUSH    H
14BD D5              PUSH    D
14BE 16 00           MVI     D,00H   ;Step error computation/lookup
14C0 5F              MOV     E,A
14C1 21 08 15        LXI     H,TABBASE
14C4 19              DAD     D
14C5 4E              MOV     C,M
14C6 78              MOV     A,B
14C7 B7              ORA     A
14C8 F2 CF 14        JP      MOVC42
14CB 79              MOV     A,C
14CC 2F              CMA
14CD 3C              INR     A
14CE 4F              MOV     C,A
14CF D1      MOVC42: POP     D
```

```
14D0 E1          POP    H
14D1 2D          DCR    L
14D2 F1          POP    PSW
14D3 3C          INR    A                       ;PASSFLAG:=PASSFLAG+1
14D4 F5          PUSH   PSW
14D5 C3 26 14    JMP    MOVC05
                 ;
                 ;
                 ;
14D8 CD 1B 15 MOVC70:   CALL   BKLASH
14DB F1       MOVC50:   POP    PSW              ;retrieve passflag;
14DC 3A 38 74    LDA    ERROR
14DF B7          ORA    A
14E0 C0          RNZ
                 ;
                 ;
                 ;
14E1 3A 39 74    LDA    BNKPAT  ; IF BANK_PAT NOT IN [00H, 03H]
14E4 B7          ORA    A       ;    OR DIGIT_PAT NOT IN [00H,03H] THEN
14E5 CA ED 14    JZ     MOVC55
14E8 FE 03       CPI    SENSCL
14EA C2 F9 14    JNZ    MOVC60
14ED 3A 3A 74 MOVC55:   LDA    DGTPAT
14F0 B7          ORA    A
14F1 CA FF 14    JZ     MOVC65
14F4 FE 03       CPI    SENSCL
14F6 CA FF 14    JZ     MOVC65
                        ;      BEGIN
14F9 3E 05    MOVC60:   MVI    A,ERROR5         ;      ERROR := NOT_HOME;
14FB 32 38 74    STA    ERROR
14FE C9          RET           ;      RETURN
                               ;      END;
14FF 79       MOVC65:   MOV    A,C      ; IF COUNT <> 0 THEN ERROR := MOVE_FAILED
1500 B7          ORA    A
1501 C8          RZ
1502 3E 06       MVI    A,ERROR6
1504 32 38 74    STA    ERROR
1507 C9          RET
                               ; END;
                 ;
                 ;
1508 00       TABBASE:DB  0
1509 04          DB     4H
150A 06          DB     6D
150B 08          DB     8D
150C 0C          DB     12D
150D 10          DB     16D
150E 12          DB     18D
150F 14          DB     20D
1510 18          DB     24D
1511 1C          DB     28D
1512 1E          DB     30D
1513 22          DB     34D
1514 24          DB     36D
1515 28          DB     40D
1516 2A          DB     42D
1517 2C          DB     44D
1518 30          DB     48D
1519 34          DB     52D
151A 36          DB     54D
                 ;
                 ;
                 ;BACKLASH CORRECTION ROUTINE
                 ;This routine advances the digit stepper motor by one step
                 ;beyond the expected settling point and then drives one
                 ;step backwards  to the final settling point
                 ;None of the registers are affected.
                 ;This routine will be invoked only if all retries are exhausted or if al
                 ;motor phases are applied.
                 ;This routine will not be invoked in case of an error condition arises
```

```
                   ;in RENC routine before the specified number of pulses are applied
                   ;
151B F5            BKLASH:    PUSH    PSW
151C C5                PUSH    B
151D 7B                MOV     A,E              ;motor type check
151E B7                ORA     A
151F C2 3C 15          JNZ     BKL50
1522 3A 02 70          LDA     PORTB
1525 F5                PUSH    PSW
1526 E6 F0             ANI     MSNMSK
1528 F5                PUSH    PSW
1529 7A                MOV     A,D              ;D register has the next pattern output
152A E6 0F             ANI     LSNMSK
152C 47                MOV     B,A
152D F1                POP     PSW
152E B0                ORA     B
152F 32 02 70          STA     PORTB
1532 CD A9 17          CALL    DEL30M           ;forward pulse
1535 F1                POP     PSW
1536 32 02 70          STA     PORTB
1539 CD A9 17          CALL    DEL30M           ;backward pulse to final settling point
153C C1            BKL50:     POP     B
153D F1                POP     PSW
153E C9                RET
                   ;
                   ;
                   ;   LEDON ROUTINE
                   ;   TURNS ON THE STROBE FOR LEDS
                   ;
                   ;
153F F5            LEDON:     PUSH    PSW           ;SAVE CONTENTS
1540 3A 01 70          LDA     PORTA            ;LOADS THE CURRENT STATUS
1543 E6 DF             ANI     0DFH             ;BIT RESET
1545 32 01 70          STA     PORTA            ;PORT RESET
1548 F1                POP     PSW
1549 C9                RET                      ;
                   ;
                   ;
                   ;   LEDOFF ROUTINE
                   ;   TURNS THE STROBE OFF
                   ;
                   ;
154A F5            LEDOFF:    PUSH    PSW                   ;
154B 3A 01 70          LDA     PORTA                ;
154E F6 20             ORI     20H                  ;
1550 32 01 70          STA     PORTA                ;
1553 F1                POP     PSW          ;
1554 C9                RET                          ;
                   ;
                   ;
                   ;
                   ;
                   ;
                   ;
                   ;   DELAY ROUTINES
                   ;
                   ;
1555 00            DEL300:    NOP
1556 00                NOP             ;ADJUST TIME
1557 CD 64 15          CALL    DEL75   ;75 MICRO SECS
155A CD 64 15          CALL    DEL75   ;
155D CD 64 15          CALL    DEL75           ;
1560 CD 64 15          CALL    DEL75           ;
1563 C9                RET                     ;
                   ;
                   ;
                   ;
1564 F5            DEL75:     PUSH    PSW                   ;
1565 3E 0A             MVI     A,0AH                ;
1567 3D            DEL1:      DCR     A                     ;
```

```
1568 C2 67 15      JNZ     DEL1                      ;
156B F1            POP     PSW                       ;
156C C9            RET                               ;
                ;
                ;
                ;  SENSOR INITIALISATION ROUTINE
                ;
                ;
156D            INITSM:
156D CD 3F 15 SENSR:      CALL    LEDON                      ;LED STROBE ON
1570 CD 64 15      CALL    DEL75                     ;SETTLING TIME
1573 3A 00 68      LDA     PORT2AD
1576 47            MOV     B,A                       ;
1577 E6 03         ANI     DGTMSK
1579 CA 9E 15      JZ      SENS35
157C FE 03         CPI     DGTMSK
157E C2 A3 15      JNZ     SENS40
1581 3E 02         MVI     A,02H
1583 32 00 70 SENS25:     STA     PORTB
1586 CD A9 17      CALL    DEL30M
1589 3A 00 68      LDA     PORT2AD
158C 47            MOV     B,A
158D E6 03         ANI     DGTMSK                    ;
158F 32 3A 74      STA     DGTPAT                    ;DIGIT PATTERN
1592 78            MOV     A,B                       ;
1593 0F            RRC                               ;
1594 0F            RRC                               ;
1595 E6 03         ANI     DGTMSK                    ;
1597 32 39 74      STA     BNKPAT                    ;BANK PATTERN
159A CD 4A 15      CALL    LEDOFF
159D C9            RET                               ;
                ;
                ;
159E 3E 08      SENS35:     MVI     A,08H
15A0 C3 83 15      JMP     SENS25
                ;
                ;
15A3 3E 0F      SENS40:     MVI     A,15D
15A5 32 38 74      STA     ERROR
15A8 C3 9E 15      JMP     SENS35
                ;
                ; (*************************************************************)
                ;Objective: To compare present encoder status to previous encoder value
                ;           and determine the deviation as no change, clockwise movement
                ;           of one step, counterclockwise movement of one step or as an
                ;           error, which corresponds to a two step jump in the status.
                ;
                ;           Does not call any subroutines
                ;
                ;
                ; FUNCTION (*A-REG*) ENCODER_MOVE : BYTE;
                ;
                ; PARAM     (*C-REG*) PATTERN : ENCODER_PATTERNS;
                ;   (*E-REG*) NEW_PATTERN : ENCODER_PATTERNS;
                ;
                ENCMOV:                        ; BEGIN
15AB 79            MOV     A,C      ; CASE PATTERN ROL 2 OR NEW_PATTERN OF
15AC 07            RLC
15AD 07            RLC
15AE B3            ORA     E
15AF 5F            MOV     E,A
15B0 AF            XRA     A
15B1 57            MOV     D,A
15B2 21 B8 15      LXI     H,ENCT
15B5 19            DAD     D
15B6 7E            MOV     A,M
15B7 C9            RET
15B8 00         ENCT:       DB      0       ;     00H: ENCODER_MOVE := 0;
15B9 01            DB       1      ;     01H: ENCODER_MOVE := +1;
15BA FF            DB      -1      ;     02H: ENCODER_MOVE := -1;
```

```
15BB 02           DB      +2       ;      03H: ENCODER_MOVE := +2;
15BC FF           DB      -1       ;      04H: ENCODER-MOVE := -1;
15BD 00           DB      0        ;      05H: ENCODER_MOVE := 0;
15BE 02           DB      +2       ;      06H: ENCODER_MOVE := +2;
15BF 01           DB      +1       ;      07H: ENCODER_MOVE := +1;
15C0 01           DB      +1       ;      08H: ENCODER_MOVE := +1;
15C1 02           DB      +2       ;      09H: ENCODER_MOVE := +2;
15C2 00           DB      0        ;      0AH: ENCODER_MOVE := 0;
15C3 FF           DB      -1       ;      0BH: ENCODER_MOVE := -1;
15C4 02           DB      +2       ;      0CH: ENCODER_MOVE := +2;
15C5 FF           DB      -1       ;      0DH: ENCODER_MOVE := -1;
15C6 01           DB      +1       ;      0EH: ENCODER_MOVE := +1;
15C7 00           DB      0        ;      0FH: ENCODER_MOVE := 0;
                                   ; END
                                   ; END;
                 ; (****************************************************************)
                 ;THIS SEGMENT IS USED TO MOVE THE BANK & DIGIT IN TO HOME
                 ;POSITION UPON DETECTION OF AN ERROR IN ATTEMPT TO
                 ;POSITION THE RACKS TO 00.00
                 ;
                 ; PROCEDURE ENDMOV_CLOSED;
                 ;
                 ; PARAM     (*C-REG*) COUNT : BYTE; (*- FOR CW, + FOR CCW*)
                 ;    (*E-REG*) MOTOR : MOTORS; (*1 FOR BANK, 0 FOR DIGIT*)
                 ;
                 ; VAR       (*B-REG*) ENC_COUNT : BYTE;
                 ;    (*C-REG*) MOT_COUNT : BYTE;
                 ;    (*D-REG*) PATTERN : BYTE;
                 ;
                 ;
                 ;
00F0             MSNMASK     EQU     0F0H
000F             LSNMASK     EQU     0FH
0014             NUMRD1      EQU     20D
003C             SETLTIM     EQU     60D
                 ;
                 ;
                 ;
                 ;
                 ;
15C8 AF          ENDMOV:     XRA     A                         ;     REPEAT
15C9 32 38 74       STA      ERROR
15CC 7B          ENDM05:     MOV     A,E     ;         CASE MOTOR OF
15CD B7             ORA      A
15CE 7A             MOV      A,D
15CF CA E0 15       JZ       ENDM20          ;MOTOR(BANK,DIGIT)
                 ;
                 ;
15D2 E6 F0          ANI      MSNMASK
15D4 C5             PUSH     B
15D5 47             MOV      B,A
15D6 3A 02 70       LDA      PORTB
15D9 E6 0F          ANI      LSNMASK
15DB B0             ORA      B
15DC C1             POP      B
15DD C3 EB 15       JMP      ENDM25
                 ;
                 ;
15E0 E6 0F       ENDM20:     ANI     LSNMASK    ;   DIGIT: PORTB := (PATTERN OR PHASESOFF ROL 4)
15E2 C5             PUSH     B
15E3 47             MOV      B,A
15E4 3A 02 70       LDA      PORTB                  ;
15E7 E6 F0          ANI      MSNMASK                ;
15E9 B0             ORA      B                      ;
15EA C1             POP      B                      ;
                                     ;              IS BEING MOVED
15EB 32 02 70 ENDM25:        STA     PORTB   ;       END;
15EE 79             MOV      A,C     ;       CASE SIGN (MOT_COUNT) OF
15EF B7             ORA      A
15F0 7A             MOV      A,D
15F1 FA F9 15       JM       ENDM30
```

```
                                  ;            +1: BEGIN
15F4 0D         DCR    C          ;               MOT_COUNT := MOT_COUNT - 1;
15F5 07         RLC               ;               PATTERN := PATTERN ROL 1
15F6 C3 FB 15   JMP    ENDM35     ;               END;
               ;
               ;
               ENDM30:                  ;              -1: BEGIN
15F9 0C         INR    C          ;               MOT_COUNT := MOT_COUNT - 1;
15FA 0F         RRC               ;               PATTERN := PATTERN ROR 1
                                  ;               END;
15FB 57        ENDM35: MOV    D,A       ;         END;
15FC C5         PUSH   B          ;         READ_ENCODERS (10, MOTOR, ENC_COUNT)
15FD 48         MOV    C,B
15FE D5         PUSH   D
15FF E5         PUSH   H
1600 2E 14      MVI    L,NUMRD1
1602 CD 99 19   CALL   RENC
1605 E1         POP    H
1606 D1         POP    D
1607 79         MOV    A,C
1608 C1         POP    B
1609 47         MOV    B,A
160A 79         MOV    A,C        ;     UNTIL (MOT_COUNT = 0) OR (ERROR <> NO_ERRORS);
160B B7         ORA    A
160C C2 CC 15   JNZ    ENDM05
               ;
               ;
160F C5        ENDM40: PUSH   B         ;     READ_ENCODERS (60, MOTOR, ENC_COUNT);
1610 48         MOV    C,B
1611 D5         PUSH   D
1612 E5         PUSH   H
1613 2E 3C      MVI    L,SETLTIM
1615 CD 99 19   CALL   RENC
1618 E1         POP    H
1619 D1         POP    D
161A 79         MOV    A,C
161B C1         POP    B
161C 47         MOV    B,A
161D B7         ORA    A          ;     COUNT := ENC_COUNT / 2;
161E 3E 07      MVI    A,07H                  ;ERROR 7
1620 C8         RZ                            ;NORMAL EXIT
               ;
               ;
1621 32 38 74   STA    ERROR
1624 C9         RET                           ;ERROR EXIT
               ;
0044           HPHAM1  EQU    044H
0088           HPHASE  EQU    88H
0000           SENS00  EQU    00H
0001           SENS01  EQU    01H
0002           SENS02  EQU    02H
0003           SENS03  EQU    03H
0004           SENS04  EQU    04H
0005           SENS05  EQU    05H
0006           SENS06  EQU    06H
0007           SENS07  EQU    07H
0008           SENS08  EQU    08H
0009           SENS09  EQU    09H
000A           SENS10  EQU    0AH
000B           SENS11  EQU    0BH
000C           SENS12  EQU    0CH
000D           SENS13  EQU    0DH
000E           SENS14  EQU    0EH
000F           SENS15  EQU    0FH
0003           SENMSK  EQU    03H
               ;
               ;
1625 CD 6D 15  SEKPOS: CALL   SENSR
1628 CD 3F 15   CALL   LEDON
162B CD 3B 16   CALL   HDSEEK
162E CD 4A 15   CALL   LEDOFF
```

```
1631 CD BC 18      CALL    MODLN
1634 CD B0 18      CALL    ERRHDR
1637 C4 B5 18      CNZ     EXTERR
163A C9            RET
                  ;
                  ;
                  ;
                  ;
                  ;
                  ;Procedure HDSEEK
                  ;Objective
                  ;    This segment initialises the print wheels to 00.00 position.
                  ;    Prior to the movement of the racks this segment aligns the
                  ;    bank and digit motors to legitimate home positions. The 00.00
                  ;    location is attained by hitting against the mechanical blocks.
                  ;    Three retries will be provided before coming to the conclusion
                  ;    that an error in movement is detected.
                  ;Level
                  ;;
                  ;
                  ;   RCOUNTERB := 4
                  ;   RCOUNTERC := 8                  ;RETRY COUNTERS
                  ;SEKP00:RCOUNTERB:= RCOUNTERB-1
                  ;   If RCOUNTERB = 0 then ERROR := 12 ;     End.
                  ;   MOTPATN := HOMEPHASE-1
                  ;   Output(PORTB,MOTPATN)
                  ;   Procedure TIMEDELAY(30msec)
                  ;   MOTPATN := HOMEPHASE
                  ;   Output (PORTB,MOTPATN)
                  ;   Procedure TIMEDELAY(30msec)
                  ;   RCOUNTERC := RCOUNTERC - 1
                  ;   If RCOUNTERC = 0 then ERROR := 12 ;              End.
                  ;   Input (PORT.SENSOR,SENSRPTN)
                  ;   SENSRPTN := SENSRPTN.LSNMASK
                  ;   Case SENSRPTN   00,03,12,15     SEKP85
                  ;                   01,02,13,14     SEKP01
                  ;                   04,07,08,11     SEKP02
                  ;                   05,06,09,10     SEKP03
                  ;
                  ;   SEKP01: Procedure DALIGN(,TYPE 2 ERROR)
                  ;           If TYPE2ERROR = FALSE then go to STEP0
                  ;           else MOTPTN:= NOPHASEON
                  ;                Output (PORTB,MOTPTN)
                  ;                Procedure TIMEDELAY (30msec)
                  ;                Go to SEEKP00
                  ;   SEKP02: Procedure BALIGN(TYPE2ERROR)
                  ;           If TYPE2ERROR = FALSE then go to STEP0
                  ;           else MOTPTN := NOPHASEON
                  ;                Procedure TIMEDELAY(30msec)
                  ;                Go to SEEKP00
                  ;   SEKP03: Procedure DALIGN(TYPE2 ERROR)
                  ;           If TYPE2ERROR = FALSE then go to STEP0
                  ;           else  Procedure BALIGN(TYPE2ERROR)
                  ;           If TYPE2ERROR = FALSE then go to STEP0
                  ;           else Input (PORTB,MOTPTN)
                  ;                MOTPTN := MOTPTN.LSNMSK
                  ;                Output (PORTB,MOTPTN)
                  ;                Procedure TIMEDELAY(30msec)
                  ;                Procedure DALIGN(TYPE2ERROR)
                  ;                If TYPE2ERROR = TRUE then Input (PORTB,MOTPTN)
                  ;                                          MOTPTN := NOPHASEON
                  ;                                          Output(PORTB,MOTPTN)
                  ;                                          Procedure TIMEDELAY(30msec)
                  ;                                          Go to SEEKP00
                  ;               else        Input (PORTB,MOTPTN)
                  ;                           MOTPTN:=(( MOTPTN.LSNMSK)+HOMEPHASEBANK))
                  ;                           Output (PORTB,MOTPTN)
                  ;                           Procedure TIMEDELAY(30msec)
                  ;                           Go to STEP0
                  ;   SEKP85:
                  ;           Procedure PINCHK(DIGIT:PTNFLAG)
```

```
                   ;            If PTNFLAG <> 0 then go to SEKP00
                   ;            Procedure PTNCHK(BANK,PTNFLAG)
                   ;            If PTNFLAG <> 0 then go to SEKP00
                   ;end case
                   ;
                   ;   SEKP05: Procedure MOVE(DIGIT,CCW,1,SPD8:ERROR)
                   ;            Do while ERROR = 0
                   ;                    Procedure MOVE(DIGIT,CCW,1,SPD8:ERROR)
                   ;            End do.
                   ;            Procedure SELDRN(:DRN)
                   ;            Procedure POHOME(DRN:ERROR)
                   ;            If ERROR <>0 then End hdseek.
                   ;
                   ;            Procedure MOVE(BANK,CCW,1,SPD8:ERROR)
                   ;            Do while ERROR = 0
                   ;                    Procedure MOVE (BANK,CCW,1,SPD8:ERROR)
                   ;            end do.
                   ;            If BNKPAT = 01 then DRN:=CW else DRN:=CCW
                   ;            Procedure POHOME(DRN,ERROR)
                   ;            If ERROR <> 0 then End Hdseek.
                   ;            Procedure MOVE(BANK,CW,4,SPD8:ERROR)
                   ;            If ERROR <> 0 then End Hdseek.
                   ;            For BANK:=0 TO 4 by 1 Do
                   ;                    Procedure MOVE(DIGIT,CCW,1,SPD8:ERROR)
                   ;                    Do while ERROR =FALSE
                   ;                            Procedure MOVE(DIGIT,CCW,1,SPD8:ERROR)
                   ;                    end do
                   ;                    Procedure SELDRN(:DRN)
                   ;                    Procedure POHOME(DRN:ERROR)
                   ;                    If ERROR = TRUE then End hdseek.
                   ;                    Procedure MOVE(DIGIT,CW,9,SPD8:ERROR)
                   ;                    If ERROR = TRUE then End Hdseek.
                   ;                    BANK:= BANK+1
                   ;                    If BANK = 2 then
                   ;                                   Procedure MOVE(BANK,CCW,1,SPD8:ERROR)
                   ;                                   If ERROR = TRUE then end Hdseek.
                   ;                    end do
                   ;            end for.
                   ;            Procedure MOVE (BANK,CW,2,SPD8:ERROR)
                   ;            If ERROR = TRUE then end hdseek.
                   ;            Procedure MOVE (DIGIT,CW,2,SPD8:ERROR)
                   ;            If ERROR = TRUE then end hdseek.
                   ;            Input (PORTB.MOTPTN)
                   ;            MOTPTN:=MOTPTN.MSNMSK
                   ;            Output(PORTB,MOTPTN)
                   ;END.
                   ;
                   ;
163B 01 08 04 HDSEEK:      LXI     B,408H                  ;RETRY COUNT
163E C5              PUSH    B
163F C1       SEKP00:      POP     B
1640 05              DCR     B
1641 CA 5A 16        JZ      EREXIT
                   ;
                   ;
1644 C5              PUSH    B
1645 3E 44           MVI     A,HPHAM1
1647 32 02 70        STA     PORTB
164A CD A9 17        CALL    DEL30M
164D 3E 88           MVI     A,HPHASE
164F 32 02 70        STA     PORTB
1652 CD A9 17        CALL    DEL30M
1655 C1       STEP0:       POP     B
1656 0D              DCR     C
1657 C2 60 16        JNZ     CSTEP0
165A 3E 0C    EREXIT:      MVI     A,12D
165C 32 38 74        STA     ERROR
165F C9              RET
                   ;
                   ;
1660 C5       CSTEP0:      PUSH    B
```

```
1661 3A 00 68      LDA     PORT2A                ;
1664 E6 0F         ANI     LSNMSK
                  ;
                  ;
1666 21 73 16      LXI     H,BASE5
1669 16 00         MVI     D,00H
166B 87            ADD     A
166C 5F            MOV     E,A
166D 19            DAD     D
166E 5E            MOV     E,M
166F 23            INX     H
1670 56            MOV     D,M
1671 EB            XCHG
1672 E9            PCHL
                  ;
                  ;
1673 D2 16        BASE5:   DW      SEKP85
1675 93 16         DW      SEKP01
1677 93 16         DW      SEKP01
1679 D2 16         DW      SEKP85
167B A5 16         DW      SEKP02
167D AF 16         DW      SEKP03
167F AF 16         DW      SEKP03
1681 A5 16         DW      SEKP02
1683 A5 16         DW      SEKP02
1685 AF 16         DW      SEKP03
1687 AF 16         DW      SEKP03
1689 A5 16         DW      SEKP02
168B D2 16         DW      SEKP85
168D 93 16         DW      SEKP01
168F 93 16         DW      SEKP01
1691 D2 16         DW      SEKP85
                  ;
                  ;
                  ;  JZ      SEKP90
                  ;                    ;CHECKING DIGIT POSITION
                  ;  CPI     SENS01
                  ;  JZ      SEKP01
                  ;
                  ;  CPI     SENS02
                  ;  JZ      SEKP01
                  ;;
                  ;  CPI     SENS13
                  ;  JZ      SEKP01
                  ;;
                  ;  CPI     SENS14
                  ;  JZ      SEKP01
                  ;;
                  ;  CPI     SENS04
                  ;  JZ      SEKP02
                  ;;
                  ;  CPI     SENS07
                  ;  JZ      SEKP02
                  ;;
                  ;  CPI     SENS08
                  ;; JZ      SEKP02
                  ;;
                  ;  CPI     SENS11
                  ;  JZ      SEKP02
                  ;;;
                  ;  CPI     SENS05
                  ;  JZ      SEKP03
                  ;;
                  ;  CPI     SENS06
                  ;  JZ      SEKP03
                  ;;
                  ;  CPI     SENS09
                  ;  JZ      SEKP03
                  ;;
                  ;  CPI     SENS10
                  ;  JZ      SEKP03
```

```
                ;;
                ;  CPI     SENS03
                ;  JZ      SEKP90
                ;;
                ;  JMP     SEKP05
                ;
                ;
                ;                  DIGIT NOT IN HOME
1693 CD E7 17 SEKP01:    CALL    DALIGN
1696 B7                  ORA     A
1697 CA 55 16            JZ      STEP0          ;No Error condition
                                                ;Digit aligned and phased
                                                ;Bank aligned and phased
169A
                                                ;Type 1 error
                                                ;Digit aligned and phased
                                                ;Bank not aligned and/or phased
                                                ;
169A 3E 00    SEKP04:    MVI     A,00H                  ;Type 2 error
                                                ;Digit not aligned and/or phased
                                                ;Bank don't care
169C 32 02 70 SEP11:     STA     PORTB
169F CD A9 17            CALL    DEL30M
16A2 C3 3F 16            JMP     SEKP00
16A5 CD 12 18 SEKP02:    CALL    BALIGN
16A8 B7                  ORA     A
16A9 CA 55 16            JZ      STEP0          ;No Error condition
                                                ;Digit aligned and phased
                                                ;Bank aligned and phased
                                                ;
                                                ;Type 1 Error
                                                ;Bank aligned and phased
                                                ;Digit not aligned and/or phased
16AC C3 9A 16            JMP     SEKP04
16AF CD E7 17 SEKP03:    CALL    DALIGN
16B2 B7                  ORA     A
16B3 CA 55 16            JZ      STEP0          ;NO error condition
                ;
                ;
16B6
                                                ;Type 2 error
16B6 CD 12 18            CALL    BALIGN
16B9 B7                  ORA     A
16BA CA 55 16            JZ      STEP0          ;No error condition
                ;
                ;
                                                ;Type 1 Error condition
                ;
                ;
16BD 3A 02 70            LDA     PORTB
16C0 E6 0F               ANI     LSNMSK
16C2 32 02 70            STA     PORTB
16C5 CD A9 17            CALL    DEL30M
                ;
                ;
                ;
                ;
16C8 CD E7 17            CALL    DALIGN
16CB B7                  ORA     A
16CC C2 9A 16            JNZ     SEKP04
                ;
                ;
                ;
                ;        LDA     PORTB
                ;        ANI     LSNMSK
                ;        ORI     80H
                ;        STA     PORTB
                ;        CALL    DEL30M
16CF C3 55 16            JMP     STEP0
                ;;
                ;
```

```
                    ;
                    ;
16D2 1E 00          SEKP85:     MVI     E,00
16D4 CD 2A 19           CALL        PTNCHK
16D7 C2 3F 16           JNZ         SEKP00
16DA 1C                 INR         E
16DB CD 2A 19           CALL        PTNCHK
16DE C2 3F 16           JNZ         SEKP00
                    ;;
                    ;
16E1 C1             SEKP05:     POP     B
16E2 3A 3A 74       SEKP06:     LDA     DGTPAT
16E5 F5                 PUSH        PSW
16E6 0E 01              MVI         C,1                         ;
16E8 1E 00              MVI         E,00                        ;DIGIT MOTOR
16EA 21 03 08           LXI         H,803H                      ;RE TRIES
16ED CD 03 14           CALL        MOVCLS                      ;EXIT FROM LOCK TRY
16F0 3A 38 74           LDA         ERROR                       ;
16F3 B7                 ORA         A                           ;
16F4 C2 FB 16           JNZ         SEKP07
16F7 F1                 POP         PSW
16F8 C3 E2 16           JMP         SEKP06                      ;
                    ;
                    ;
                    ;
16FB F1             SEKP07:     POP     PSW
16FC CD 40 18           CALL        SELDRN
                    ;
16FF CD C5 18       SEKP19:     CALL    POHOME
                    ;
1702 C0                 RNZ
1703                SEKP10:
1703 0E 01              MVI         C,01                        ;CLOCKWISE 1STEP
1705 1E 01              MVI         E,01
1707 21 03 08           LXI         H,803H                      ;BANK MOTOR
170A CD 03 14           CALL        MOVCLS                      ;BANK POSITION IDENTIFICATION
170D 3A 38 74           LDA         ERROR                       ;
1710 B7                 ORA         A                           ;
1711 CA 03 17           JZ          SEKP10                      ;
                    ;
                    ;
1714 3A 39 74           LDA         BNKPAT
1717 2E 00              MVI         L,00H
1719 FE 01              CPI         01
171B CA 1F 17           JZ          SEKP12
171E 2C                 INR         L
                    ;
                    ;
171F CD C5 18       SEKP12:     CALL    POHOME
1722 C0                 RNZ
                    ;
                    ;
                    ;
1723 1E 01              MVI         E,01                        ;
1725 0E FC              MVI         C,-4H                       ;
1727 21 03 08           LXI         H,803H                      ;BANK IS BEING POSITIONED TO EXTREME
172A CD 03 14           CALL        MOVCLS                      ;
172D CD B0 18           CALL        ERRHDR                      ;
1730 C0                 RNZ                                     ;EXITS ON FATAL ERROR
                    ;
                    ;
1731 0E 05              MVI         C,5H                        ;
1733 C5             SEKP15:     PUSH    B                               ;INDEX STORAGE
1734 3A 3A 74       SEKP20:     LDA     DGTPAT
1737 F5                 PUSH        PSW
1738 0E 01              MVI         C,1                         ;CLOCKWISE 1 STEP
173A 1E 00              MVI         E,00                        ;DIGIT MOTOR
173C 21 03 08           LXI         H,803H                      ;RETRIES
173F CD 03 14           CALL        MOVCLS                      ;MOVE DIGIT TO EXTREME..9
1742 3A 38 74           LDA         ERROR                       ;
1745 B7                 ORA         A                           ;
```

```
1746 C2 4D 17       JNZ     SEKP21                          ;
1749 F1             POP     PSW
174A C3 34 17       JMP     SEKP20
                ;
                ;
                ;
174D F1         SEKP21:     POP     PSW
174E CD 40 18       CALL    SELDRN
1751 CD C5 18 SEKP23:      CALL    POHOME                  ;
                ;
1754 C2 B3 17       JNZ     SEEK26
1757 0E F7          MVI     C,-9H                           ;CLOCKWISE 9STEPS
1759 1E 00          MVI     E,00                            ;
175B 21 03 08       LXI     H,803H                          ;RE TRIES
175E CD 03 14       CALL    MOVCLS                          ;POSITION TO 0
1761 CD B0 18       CALL    ERRHDR                          ;
1764 C1             POP     B                               ;RESTORE STACK
1765 C0             RNZ                                     ;FATAL ERROR  EXIT
1766 00             NOP
1767 00             NOP
1768 00             NOP
1769 00             NOP
                ;
                ;
                ;
                ;
176A 0D         SEKP22:     DCR     C                       ;
176B CA 87 17       JZ      SEKP30                          ;
176E C5         SEKP25:     PUSH    B                       ;INDEX RESTORE
176F 0E 01          MVI     C,1                             ;CLOCWISE 1 STEP
1771 1E 01          MVI     E,01                            ;BANK MOTOR
1773 21 03 08       LXI     H,803H                          ;RETRIES
1776 CD 03 14       CALL    MOVCLS                          ;GO  TO NEXT BANK
1779 CD B0 18       CALL    ERRHDR                          ;
177C C1             POP     B                               ;
177D C0             RNZ                                     ;FATAL ERROR EXIT
                ;
177E 79             MOV     A,C                             ;
177F FE 03          CPI     03                              ;HOME?
1781 C2 33 17       JNZ     SEKP15                          ;
1784 C3 6A 17       JMP     SEKP22                          ;
                ;
                ;
                ;
1787 0E FE      SEKP30:     MVI     C,-2H                   ;COUNTER CLOCKWISE 2 STEPS
1789 1E 01          MVI     E,01                            ;BANK MOTOR
178B 21 03 08       LXI     H,803H                          ;
178E CD 03 14       CALL    MOVCLS                          ;MOVE BANK TO HOME
1791 CD B0 18       CALL    ERRHDR                          ;
1794 C0             RNZ                                     ;FATAL ERROR EXIT
                ;
                ;
1795 0E FE          MVI     C,-2H                           ;COUNTER CLOCKWISE 1 STEP
1797 1E 00          MVI     E,00                            ;DIGIT MOTOR
1799 21 03 08       LXI     H,803H                          ;
179C CD 03 14       CALL    MOVCLS                          ;SET DIGIT IN TO LOCK
179F CD B0 18       CALL    ERRHDR                          ;
17A2 C9             RET
                ;
                ;
17A3 C5         DEL6M:      PUSH    B
17A4 06 14          MVI     B,20D
17A6 C3 AC 17       JMP     DELM1
                ;
                ;
                ;
17A9 C5         DEL30M:     PUSH    B
17AA 06 64          MVI     B,100D
17AC CD 55 15 DELM1:       CALL    DEL300
17AF 05             DCR     B
17B0 C2 AC 17       JNZ     DELM1
17B3 C1         SEEK26:     POP     B
```

```
17B4 C9           RET
                ;
                ;
                ;
                ;
17B5 01 DC 17 DPTSP:     LXI     B,BASEAD
17B8 21 02 70     LXI     H,PORTB
17BB 7B           MOV     A,E
17BC B7           ORA     A
17BD 7E           MOV     A,M
17BE CA D4 17     JZ      DPTS05
                ;
                ;
17C1 7E           MOV     A,M
17C2 E6 E0        ANI     0E0H
17C4 07           RLC
17C5 07           RLC
17C6 07           RLC
17C7 E5       DPTS10:    PUSH    H
17C8 26 00        MVI     H,00H
17CA 6F           MOV     L,A
17CB 09           DAD     B
17CC 7E           MOV     A,M
17CD E1           POP     H
17CE A6           ANA     M
17CF 77           MOV     M,A
                ; STA     PORTB
17D0 CD A9 17     CALL    DEL30M
17D3 C9           RET
                ;
                ;
                ;
17D4 E6 03    DPTS05:    ANI     03H
17D6 0F           RRC
17D7 C6 04        ADI     04
17D9 C3 C7 17     JMP     DPTS10
                ;
                ;
                ;
                ;
                ;
17DC FF       BASEAD:    DB      0FFH
17DD DF           DB      0DFH
17DE FF           DB      0FFH
17DF BF           DB      0BFH
17E0 EF           DB      0EFH
17E1 FD           DB      0FDH
17E2 7F           DB      7FH
17E3 FB           DB      0FBH
17E4 FE           DB      0FEH
17E5 FF           DB      0FFH
17E6 F7           DB      0F7H
                ;
                ;
                ;
                ;Procedure DALIGN
                ;Objective:      this segment makes an attempt to align the digit motors to
                ;                a legitimate home position.
                ;
                ;Level.
                ;
                ;DALIGN:
                ;   MOTOR := DIGIT
                ;   PHASE := DPHASE1
                ;   DIRECTION := CW
                ;   Procedure DPHOME(:ERROR)
                ;   If ERROR = TRUE then
                ;                       MOTOR := DIGIT
                ;                       PHASE := DPHASE1
                ;                       DIRECTION := CCW
                ;                       Procedure DPHOME(:ERROR)
```

```
                ;                                If ERROR <>0 then ERROR := TYPE2ERROR
                ;                                         Procedure DPTSP(DIGIT)
                ;                                         end.
                ;                                else MOTOR := BANK
                ;                                   Procedure PTNCHK(:ERROR)
                ;                                   Procedure DPTSP(DIGIT)
                ;                                   If ERROR <> 0 then ERROR := TYPE2ERROR
                ;                                   end
                ;End.
                ;
                ;
                ;
17E7 2E 00      DALIGN:    MVI     L,00
17E9 16 33          MVI    D,33H
17EB 1E 00          MVI    E,00H
17ED CD 86 19       CALL   DPHOME
17F0 CA FF 17       JZ     SEKP11
                ;
                ;
                ;
                ;
                ;
17F3 2E 01      SEKP09:    MVI     L,01
17F5 16 33          MVI    D,33H
17F7 1E 00          MVI    E,00H
17F9 CD 86 19       CALL   DPHOME
17FC C2 0C 18       JNZ    ERSET
                ;
                ;
17FF 1E 01      SEKP11:    MVI     E,01H
1801 CD 2A 19       CALL   PTNCHK
1804 F5             PUSH   PSW
1805 1E 00          MVI    E,00
1807 CD B5 17       CALL   DPTSP
180A F1             POP    PSW
180B C8             RZ                     ;No Error condition
                ;   MVI    A,01
                ;   RET                    ;Type 1 Error set
180C CD B5 17   ERSET:     CALL    DPTSP
180F 3E 02          MVI    A,02            ;Type 2 error set
1811 C9             RET
                ;
                ;
                ;;
                ;Procedure BALIGN
                ;Objective:        this segment makes an attempt to align the bank motors to
                ;            a legitimate home position.
                ;
                ;Level.
                ;
                ;DALIGN:
                ;   MOTOR := BANK
                ;   PHASE := DPHASE1
                ;   DIRECTION := CW
                ;   Procedure DPHOME(:ERROR)
                ;   If ERROR = TRUE then
                ;                            MOTOR := BANK
                ;                            PHASE := DPHASE1
                ;                            DIRECTION := CCW
                ;                            Procedure DPHOME(:ERROR)
                ;                            If ERROR <>0 then ERROR := TYPE2ERROR
                ;                                     Procedure DPTSP(BANK)
                ;                                     end.
                ;                            else MOTOR := DIGIT
                ;                               Procedure PTNCHK(:ERROR)
                ;                               Procedure DPTSP(BANK)
                ;                               If ERROR <> 0 then ERROR := TYPE2ERROR
                ;                               end
                ;End.
```

VRSET

```
                    ;
                    ;
                    ;
                    ;
1812                BALIGN:
1812 2E 00              MVI     L,00
1814 16 33          SEKP17:     MVI     D,33H
1816 1E 01              MVI     E,01H
1818 CD 86 19           CALL    DPHOME
181B C2 31 18           JNZ     SEKP14
181E 1E 00          SEKP13:     MVI     E,00
1820 CD 2A 19           CALL    PTNCHK
1823 F5                 PUSH    PSW
1824 1E 01              MVI     E,01
1826 CD B5 17           CALL    DPTSP
1829 F1                 POP     PSW
182A C8                 RZ                      ;No error condition
                    ;   MVI     A,01
                    ;   RET                     ;Type 1 error set
                    ;
                    ;
182B CD B5 17       BERSET:     CALL    DPTSP
182E 3E 02              MVI     A,02            ;       type 2 error set
1830 C9                 RET
                    ;
                    ;
                    ;
                    ;
1831 2E 01          SEKP14:     MVI     L,01
1833 16 33              MVI     D,33H
1835 1E 01              MVI     E,01H
1837 CD 86 19           CALL    DPHOME
183A C2 2B 18           JNZ     BERSET
                    ;
                    ;
183D C3 1E 18           JMP     SEKP13
                    ;
                    ;
                    ;
                    ;
                    ;
                    ;
                    ;
                    ; Accumulator contains the last sucessfully attained
                    ;digit sensor readings
                    ;this sensor reading is compared with the new sensor readings to
                    ;determine the direction of POHOME
                    ;drive
                    ;
                    ;
1840 47             SELDRN:     MOV     B,A
1841 3A 00 68           LDA     PORT2A
1844 E6 03              ANI     DGTMSK
1846 2E 00              MVI     L,00
1848 A8                 XRA     B               ;CLEARS CARRY
1849 1F                 RAR
184A D2 4E 18           JNC     SEKP08
184D 2C                 INR     L
184E C9             SEKP08:     RET
184F 16 88          MOPEN:      MVI     D,088H
1851 79             MOP05:      MOV     A,C
1852 B7                 ORA     A
1853 7A                 MOV     A,D
1854 FA 68 18           JM      MOP01
1857 07                 RLC
1858 0D                 DCR     C
1859 CA 6D 18           JZ      MOP10
185C 57             MOP02:      MOV     D,A
185D E6 0F              ANI     0FH
```

```
185F 32 02 7C       STA      PORTB
1862 CD A3 17       CALL     DEL6M
1865 C3 51 18       JMP      MOP05
1868 0F        MOP01:        RRC
1869 0C             INR      C
186A C2 5C 18       JNZ      MOP02
186D CD A9 17 MOP10:         CALL     DEL30M
1870 C9             RET
               ;
               ;
               ;
               ;
1871 0E F4     SEKTRP:       MVI      C,-12D
1873 CD 4F 18       CALL     MOPEN
1876 0E 0C          MVI      C,12D
1878 CD 4F 18       CALL     MOPEN
187B C9             RET
               ;
187C
               ;             THIS SEGMENT CONTAINS THE PROCEDURES USED IN STEPPER MOTOR
               ;             CONTROL OF THE SELECTION AND TRIP MECHANISMS.
               ;
               ;
               ;             PROCEDURE MVTRIP
               ;
               ;
               ;             THIS PROCEDURE MOVES THE DIGIT MOTOR FROM THE LOCKED POSITION
               ;             TO THE TRIP POSITION OF THE TRIP SHAFT.
               ;             ON DETECTION OF AN ERROR IN THE PROCEDURE, A FATAL ERROR
               ;             ROUTINE IS INVOKED . UPON EXIT  FROM THE FATAL ERROR ROUTINE
               ;             THE ZERO FLAG OF THE PROCESSOR STATUS WORD IS RESET TO ZERO
               ;             IF A FATAL ERROR HAS OCCURED.THE ACCUMULATOR WILL HAVE THE ERRO;
               ;
               ;
187C CD 3F 15 MVTRIP:        CALL     LEDON
187F 21 03 10 MVTR05:        LXI      H,1003H             :# OF RE TRIES
1882 1E 00          MVI      E,00             ;DIGIT MOTOR SELECTED
1884 0E FE          MVI      C,-2             ;COUNTER CLOCKWISE 2 STEPS
1886 CD 03 14       CALL     MOVCLS
1889 CD 4A 15       CALL     LEDOFF           ;
188C CD BC 18       CALL     MODLN            ;
188F CD B0 18       CALL     ERRHDR
1892 C4 B5 18       CNZ      EXTERR
1895 C9             RET                       ;
               ;
               ;
               ;
               ;
               ;**********************************************************************
               ;
               ;
               ;   PROCEDURE MVLOCK
               ;
               ;
               ;   THIS PROCEDURE MOVES THE DIGIT MOTOR FROM THE TRIP POSITION TO THE
               ;   LOCK POSITION OF THE TRIP SHAFT. ON DETECTION OF AN ERROR ,THE FATAL E
               ;
1896 CD 3F 15 MVLOCK:        CALL     LEDON
1899 21 03 08 MVL005:        LXI      H,803H           ;RE TRIES
189C 1E 00          MVI      E,00             ;DIGIT MOTOR
189E 0E 02          MVI      C,2H             ;CLOCKWISE 2 STEP
18A0 CD 03 14       CALL     MOVCLS           ;
18A3 CD 4A 15       CALL     LEDOFF
18A6 CD BC 18       CALL     MODLN            ;
18A9 CD B0 18       CALL     ERRHDR
18AC C4 B5 18       CNZ      EXTERR           ;
18AF C9             RET
                                     ;
               ;
```

```
                        ;
                        ;
                        ;*********************************************************************
                        ;
                                                    ;THIS PROCEDURE ASSUMES THAT THE
                        ;
                        ;
                        ;
                        ;*********************************************************************
                        ;
                        ;
                        ;         ERRHDR  ROUTINE
                        ;         THIS ROUTINE IS CALLED ON DETECTION OF AN ERROR IN
                        ;         THE MOTOR MOVE ROUTINES.THE ZERO FLAG AND THE
                        ;         ACCUMULATOR RETURN THE FLAG INDICATION AND ERROR CODE
                        ;
                        ;
18B0                    ERRHDR:
18B0 3A 38 74           ERRH05:     LDA     ERROR                   ;
18B3 B7                     ORA     A                       ;SETTING FLAGS
18B4 C9                     RET                             ;
                        ;
                        ;
                        ;*********************************************************************
                        ;
                        ;
                        ;EXTERR ROUTINE
                        ;   This segment creates  a BCD coded error code from the
                        ;   error storage location .  Before converting to the BCD pattern
                        ;   30D is added to the error value from motor move routines.
                        ;   this routine is called upon only when an Error is detected by
                        ;   the errhdr routine.
18B5                    EXTERR:
18B5 3A 38 74               LDA     ERROR   ;
18B8 C6 1E                  ADI     30D
18BA 27                     DAA             ;
18BB C9                     RET             ;
                        ;
                        ;
                        ;
                        ;*********************************************************************
                        ;MODLN routine
                        ;
                        ;
                        ;   This routine masks off the bank home position hold and provides
                        ;the digit motor hold pattern to the interface for modulation purpose.
                        ;
18BC                    MODLN:
18BC 3A 02 70               LDA     PORTB
18BF E6 0F                  ANI     0FH
18C1 32 02 70               STA     PORTB
18C4 C9                     RET
                        ;
                        ;
                        ;
                        ;
                        ;THIS ROUTINE PLACES THE MOTOR IN TO THE APPROPRIATE HOME
                        ;POSITION WHEN AN ERROR OCCURS ON SEEK
                        ;THIS ROUTINE MOVES THE MOTORS TWO STEPS AT A TIME
                        ;DEPENDING ON THE SENSOR READINGS THE MOTOR MOVEMENT DIRECTION IS DETERM
                        ;THIS ROUTINE TRANSFORMS THE THE LAST PATTERN OUTPUT FROM DMOVE ROUTINE
                        ;BREGISTER WILL BE LOADED BY THE EXPECTED ENCODER COUNT
                        ;C REGISTER WILL BE LOADED BY THE MOTOR STEP COUNT
                        ;MOTOR STEP COUNT WILL BE DETERMINED BY THE ENCODER READINGS
                        ;BEFORE REACHING THE ERROR CONDITION THE MOTOR WAS BEING DRIVEN IN
                        ;THE CW DIRECTION
                        ;
                        ;
18C5                    POHOME:
18C5 CD 79 19           PLHOME:     CALL    SENSIN
```

```
18C8 CA D4 18        JZ       PLH12             ;SENSOR (00)
18CB FE 03           CPI      03H
18CD CA D9 18        JZ       PLH14             ;SENSOR (00,11)
18D0 CD FD 18        CALL     PH0110            ;SENSOR (01,10)
18D3 C9              RET
                  ;
                  ;
18D4 16 11        PLH12:     MVI     D,11H
18D6 C3 DB 18        JMP      PLH10             ;check phases/
                  ;
18D9 16 44        PLH14:     MVI     D,44H
18DB CD DF 18 PLH10:         CALL    PH0011          ;
18DE C9              RET                        ;
                  ;
                  ;
                  ;Procedure PH0011
                  ;Objective: This segments positions the motors to a legitimate home posi
                  ;           when the sensor patterns are , to start with , at 00 or 11, (the
                  ;           sensors are either both pen or closed)
                  ;PH0011:DIRECTION := CW
                  ;   MSTEP:=-4
                  ;   ECOUNT := -1
                  ;   Procedure ENDMOV(NEXTPTN,MOTOR,DIRECTION,MSTEP,ECOUNT:ERROR)
                  ;   If ERROR <> 0  then NEXTPTN := RRC(NEXTPTN)
                  ;                       NEXTPTN := RRC(NEXTPTN)
                  ;                       DIRECTION := CCW
                  ;                       MSTEP      :=2
                  ;                       ECOUNT:=    1
                  ;                       Procedure ENDMOV(NEXTPTN,MOTOR,DIRECTION,MSTEP,ECOUNT:ERROR)
                  ;   Procedure PTNCHK(MOTOR:ERROR)
                  ;   end
                  ;End.
                  ;
                  ;
                  ;
18DF              PH0011:
18DF 0E FC           MVI      C,-4H             ;4STEPS CW
18E1 06 FF           MVI      B,-1H
18E3 CD C8 15        CALL     ENDMOV            ;POSITION TO 2STEPS BEFORE HOME
                                                ;1ENCODER STEP AWAY FROM HOME
18E6 3A 38 74        LDA      ERROR
18E9 FE 07           CPI      07H
18EB CA F9 18        JZ       PH05              ;EXIT 1. ERROR FROM TRYING TO MOVE
                                                ;TO MOVE CW (TOWARDS LOCK FROM A
                                                ;SENSOR (00,11) AFTER IDENTIFYING
                                                ;A BLOCK
18EE 7A              MOV      A,D
18EF 0F              RRC
18F0 0F              RRC                        ;MOTOR PATTERN FOR
18F1 57              MOV      D,A
18F2 0E 02           MVI      C,02H
18F4 06 01           MVI      B,01
18F6 CD C8 15        CALL     ENDMOV
                                                ;TWO MSTEPS TOWARDS SENSORS (00,11)
                                                ;IN CCW DIRECTION
18F9 CD 2A 19 PH05:           CALL    PTNCHK
18FC C9              RET
                  ;
                  ;
                  ;
                  ;Procedure PH0110
                  ;Objective :        This segment positions the motors to a legitimate home
                  ;          position wherein there is agreement between the phase applied
                  ;          to the motor and the sensor readings observed.  Four single
                  ;          step attempts will be made to position the motor to the
                  ;          home position.  If a home position is reached before all
                  ;          four attempts are completed, an exit will be done from this
                  ;          segment.  The error will be flagged by the pattern check segment.
                  ;
                  ;PH0110:    If DIRECTION = CW then
                  ;                            NEXTPTN := RLC (NEXTPTN)
```

```
                       ;                          NEXTPTN := RLC (NEXTPTN)
                       ;                          MSTEP:= -1
                       ;                          ECOUNT := -1
                       ;           else MSTEP:= 1
                       ;               ECOUNT := 1
                       ;           For TRIES = 4 to 0 by 1 do
                       ;                  Procedure ENDMOV(NEXTPTN,MOTOR,DIRECTION,MSTEP,ECOUNT:ERROR)
                       ;                  Procedure PTNCHK(MOTOR:ERROR)
                       ;                  If ERROR = TRUE then TRIRES:= TRIES-1
                       ;                  else end
                       ;           End
                       ;End.
                       ;
                       ;
                       ;
                       ;
     18FD              PH0110:
                       ;
                       ;
     18FD 7D              MOV      A,L              ;SENSOR (01)
     18FE FE 01           CPI      01H
     1900 C2 0D 19        JNZ      PLH57            ;DIRECTION(CW,CCW)
                       ;
                       ;
     1903 7A           PLH52:      MOV      A,D             ;DIGIT SEEKING 00----------
     1904 07              RLC
     1905 07              RLC
     1906 0E FF           MVI      C,-1H
     1908 06 FF           MVI      B,-1H
     190A C3 12 19        JMP      PLH65
                       ;
                       ;
     190D 7A           PLH57:      MOV      A,D
     190E 0E 01           MVI      C,01H
     1910 06 01           MVI      B,01H
     1912 57           PLH65:      MOV      D,A             ;PATTERN IN D REGISTER
     1913 2E 04           MVI      L,04H
     1915 C5           PLH66:      PUSH     B
     1916 CD C8 15     PLH67:      CALL     ENDMOV
     1919 C1           PLH68:      POP      B
     191A CD 2A 19        CALL     PTNCHK
     191D C8              RZ                        ;EXIT 4 .NORMAL EXIT
                                                    ;STILL ERRORS COULD EXIST
                                                    ;DUE TO PTNCHK RESULTS
     191E 7A           PLH70:      MOV      A,D
     191F 2D              DCR      L
     1920 C2 15 19        JNZ      PLH66            ;2 + 2 MSTEPS OVER?
                                                    ;AGAINST A STOP
     1923 3E 09        PLHB3:      MVI      A,09H
     1925 32 38 74        STA      ERROR
     1928 B7              ORA      A
     1929 C9              RET                       ;EXIT 6. THERE IS NO 00/11
                                                    ; IN THIE DIRECTION OF MOVEMENT
                       ;
                       ;
                       ;
                       ;
                       ;
                       ;
                       ;
                       ;
                       ;**********************************************************************
                       ;
                       ;
                       ;
                       ;PROCEDURE  PTNCHK( MOTOR:ERROR)
                       ;
                       ;Input (PORTB,MOTPTN)
                       ;   IF MOTOR = BANK then MOTPTN:=MOTPTN.MSNMSK
                       ;                        MOTPIN:= 4*RRC(MOTPTN)
                       ;
                       ;                            IF BNKPAT =( 01,02) THEN ERROR:=8; END.
```

```
                    ;                        IF BNKPAT = 00 AND MOTPIN = (08,05) THEN ERROR :=0
                    ;                                                                      END.
                    ;                        IF MOTPTN (02,06) THEN ERROR := 0
                    ;                                             ELSE ERROR:=8
                    ;                                                 END.
                    ;
                    ;
                    ;                        ENDIF
                    ;        ELSE        MOTPTN:= MOTPTN.LSNMSK
                    ;             IF DGTPAT =(01,02)THEN ERROR:=8;    END.
                    ;         IF DGTPAT = 0 AND MOTPTN = (08,09) THEN ERROR := 0
                    ;                                             END.
                    ;         IF MOTPATN =(02,06) THEN ERROR:=0       ;END.
                    ;END                                              ELSE ERROR := 8
                    ;                                             END
                    ;;
                    ;
                    ;
                    ;   E REGISTER  ......      MOTOR(BANK,DIGIT)
                    ;   ERROR   CODE.....       8       FAILURE TO  ARRIVE AT HOME
                    ;
192A 7B             PTNCHK:     MOV     A,E                     ;MOTOR (BANK,DIGIT)
192B B7                 ORA     A                               ;MOTOR
192C 3A 02 70           LDA     PORTB
192F CA 68 19           JZ      PTNC10
                    ;
                    ;
1932 E6 F0              ANI     0F0H
1934 0F                 RRC
1935 0F                 RRC
1936 0F                 RRC
1937 0F                 RRC
1938 F5                 PUSH    PSW
1939 3A 39 74           LDA     BNKPAT
193C FE 01          PTNC15:     CPI     01
193E CA 71 19           JZ      PTNC20
                    ;
                    ;
                    ;
1941 FE 02              CPI     02H
1943 CA 71 19           JZ      PTNC20
1946 B7                 ORA     A
1947 CA 5A 19           JZ      PTNC30
                    ;
                    ;
                    ;
194A F1                 POP     PSW
194B FE 02              CPI     02H
194D CA 55 19           JZ      PTNC40
1950 FE 06              CPI     06H
1952 C2 72 19           JNZ     PTNC25
                    ;
                    ;
                    ;
1955 AF             PTNC40:     XRA     A
1956 32 38 74           STA     ERROR
1959 C9                 RET
                    ;
                    ;
                    ;
195A F1             PTNC30:     POP     PSW
195B FE 08              CPI     08H
195D CA 55 19           JZ      PTNC40
1960 FE 09              CPI     09H
1962 CA 55 19           JZ      PTNC40
1965 C3 72 19           JMP     PTNC25
                    ;
                    ;
                    ;
1968 E6 0F          PTNC10:     ANI     0FH
196A F5                 PUSH    PSW
196B 3A 3A 74           LDA     DGTPAT
```

```
196E C3 3C 19      JMP     PTNC15
                  ;
                  ;
1971 F1           PTNC20:  POP     PSW
1972 3E 08        PTNC25:  MVI     A,08H              ;ERROR :=8
1974 32 38 74      STA     ERROR
1977 B7            ORA     A                  ;NOT HOME ERROR
1978 C9            RET                        ;EXIT
                  ;;
                  ;
                  ;
1979              SENSIN:
1979 7B            MOV     A,E                ;CHECK MOTOR BANK/DIGIT
197A B7            ORA     A
197B 3A 00 68      LDA     PORT2A
197E CA 83 19      JZ      PLH05              ;MOTOR (BANK,DIGIT)
1981 0F            RRC
1982 0F            RRC
1983 E6 03        PLH05:   ANI     DGTMSK
1985 C9            RET
                  ;
                  ;
                  ;
1986 CD 79 19 DPHOME:     CALL    SENSIN
1989 CA 91 19      JZ      DPH1
198C FE 03         CPI     03H
198E C2 95 19      JNZ     DPH5
1991 CD DF 18 DPH1:       CALL    PH0011
1994 C9            RET
                  ;
                  ;
                  ;
1995 CD FD 18 DPH5:       CALL    PH0110
1998 C9            RET
                  ;

                  ; (***********************************************************)
                  ;
                  ; PROCEDURE READ_ENCODERS;
                  ;
                  ;Objective: Read the encoder status and store the information in ram
                  ;           storage and update the terminal count.  Flag errors of
                  ;           1.  digit motor moved on a bank motor move
                  ;           2.  digit motor moved too fast
                  ;           3.  bank motor moved on a digit motor move
                  ;           4.  bank motor moved too fast
                  ;
                  ;Initialisation requirements:
                  ;           Initial patterns of bank and digit sensors be stored in the
                  ;           respective locations before this module is invoked, during
                  ;           power up activities.
                  ;Level:
                  ;           Calls ENCMOV, DEL300 and DEL75 modules.
                  ;           Delay routines are used for adjusting the stepper motor rate.
                  ;
                  ;
                  ;Procedure READENC(DGTPAT,BNKPAT,NUMREAD,MOTOR,ENCCOUNT: ENCCOUNT,ERROR)
                  ;Do While (NUMREAD greater than 0 and ERROR  equal to 0
                  ;   NUMREAD := NUMREAD - 1
                  ;   Input (PORT.SENSOR,SENSPTN)
                  ;   SENSPTN1 := SENSPTN
                  ;   SENSPTN := SENSPTN.DSNSRMASK
                  ;   SENSPTN1 := (SENSPTN.BSNSRMASK)/4
                  ;   Case MOTOR = BANK
                  ;          If SENSPTN = (DGTPAT) then
                  ;                         Procedure ENCMOV(BNKPAT,SENSPTN1:COUNTINC)
                  ;                         If COUNTINC = 2 then
                  ;                                        ERROR:= 3
                  ;                                        End Case
                  ;                         If ENCCOUNT greater than 0 then
                  ;                                        ENCCOUNT:= ENCCOUNT-COUNTINC
                  ;                         else           ENCCOUNT:= ENCCOUNT+COUNTINC
                  ;          else           ERROR:= 1      ;DIGIT ON BANK
                  ;          End If
```

```
                     ;
                     ;          MOTOR = DIGIT
                     ;             If SENSPTN1 = BNKPAT then
                     ;                              Procedure ENCMOV(DGTPAT,SENSPTN:COUNTINC)
                     ;                              If COUNTINC = 2 then
                     ;                                              ERROR = 4
                     ;                                              End Case
                     ;                              If ENCCOUNT greater than 0 then
                     ;                                              ENCCOUNT=ENCCOUNT-COUNTINC
                     ;                              else            ENCCOUNT=ENCCOUNT+COUNTINC
                     ;             else             ERROR:= 2
                     ;             End If
                     ;          End Case
                     ;End Do
                     ;BNKPAT := SENSPTN1
                     ;DGTPAT := SENSPTN
                     ;End RENC.
                     ;
                     ;
                     ;
                     ; PARAM VAR (*C-REG*) COUNT : BYTE;
                     ;   (*E-REG*) MOTOR : MOTORS;
                     ;   (*L-REG*) NUM_READS : BYTE;
                     ;
                     ; VAR        (*A-REG*) COUNT_INC : BYTE;
                     ;   (*B-REG*) NEW_BANK_PAT : ENCODER_PATTERNS;
                     ;   (*D-REG*) NEW_DIGIT_PAT : ENCODER_PATTERNS;
                     ;
0001                 ERRR1      EQU     01H
0002                 ERROR2     EQU     02H
0003                 ERROR3     EQU     03H
0004                 ERROR4     EQU     04H
                     RENC:                      ; BEGIN
1999
1999 7D              RENC05:    MOV     A,L     ; WHILE (NUM_READS > 0) AND (ERROR = NO_ERRORS) DO
199A B7                 ORA     A
199B C8                 RZ
199C 3A 38 74           LDA     ERROR
199F B7                 ORA     A
19A0 C0                 RNZ
                                          ;    BEGIN
19A1 2D                 DCR     L         ;    NUM_READS := NUM_READS - 1;
19A2 3A 00 68           LDA     PORT2AD ;      NEW_BANK_PAT := (PORTA AND 0CH) ROR 2;
19A5 E6 0C              ANI     BNKMSK
19A7 0F                 RRC
19A8 0F                 RRC
19A9 47                 MOV     B,A
19AA 3A 00 68           LDA     PORT2AD ;      NEW_DIGIT_PAT := PORTA AND 03H;
19AD E6 03              ANI     DGTMSK
19AF 57                 MOV     D,A
19B0 7B                 MOV     A,E       ;    CASE MOTOR OF
19B1 B7                 ORA     A
19B2 CA E6 19           JZ      RENC20
19B5 3A 3A 74           LDA     DGTPAT    ;      BANK:  IF NEW_DIGIT_PAT <> DIGIT_PAT THEN
19B8 BA                 CMP     D
19B9 CA C4 19           JZ      RENC10
19BC 3E 01              MVI     A,ERRR1 ;                 ERROR := DIG_ON_BANK
19BE 32 38 74           STA     ERROR
19C1 C3 14 1A           JMP     RENC35

                     RENC10:                    ;                 ELSE
                                          ;                 BEGIN
19C4 C5                 PUSH    B         ;                 COUNT_INC := ENCODER_
19C5 3A 39 74           LDA     BNKPAT    ;                     MOVE (NEW_BANK_PAT, BANK_PAT);
19C8 4F                 MOV     C,A
19C9 D5                 PUSH    D
19CA 58                 MOV     E,B
19CB E5                 PUSH    H
19CC CD AB 15           CALL    ENCMOV
19CF E1                 POP     H
19D0 D1                 POP     D
19D1 C1                 POP     B
```

```
19D2 FE 02          CPI     2.      ;                IF COUNT_INC = 2 THEN
19D4 C2 DF 19       JNZ     RENC15
19D7 3E 03          MVI     A,ERROR3        ;                ERROR := BANK_TOO_FAST
19D9 32 38 74       STA     ERROR
19DC C3 14 1A       JMP     RENC35
19DF 2F     RENC15: CMA                     ;            ELSE COUNT := COUNT - COUNT_INC
19E0 3C             INR     A
19E1 81             ADD     C
19E2 4F             MOV     C,A
19E3 C3 14 1A       JMP     RENC35
                                    ;                END;
19E6 3A 39 74 RENC20: LDA   BNKPAT  ;        DIGIT: IF NEW_BANK_PAT <> BANK_PAT THEN
19E9 B8             CMP     B
19EA CA F5 19       JZ      RENC25
19ED 3E 02          MVI     A,ERROR2        ;            ERROR := BANK_ON_DIG
                                            ;NOTE .ERROR CODE MASKED FOR DEMO.........
19EF 32 38 74       STA     ERROR
19F2 C3 14 1A       JMP     RENC35
            RENC25:                         ;              ELSE
                                    ;                BEGIN
19F5 C5             PUSH    B       ;                COUNT_INC := ENCODER_
19F6 3A 3A 74       LDA     DGTPAT  ;                    MOVE (NEW_DIGIT_PAT, DIGIT_PAT);
19F9 4F             MOV     C,A
19FA D5             PUSH    D
19FB 5A             MOV     E,D
19FC E5             PUSH    H
19FD CD AB 15       CALL    ENCMOV
1A00 E1             POP     H
1A01 D1             POP     D
1A02 C1             POP     B
1A03 FE 02          CPI     2.      ;                IF COUNT_INC = 2 THEN
1A05 C2 10 1A       JNZ     RENC30
1A08 3E 04          MVI     A,ERROR4;                    ERROR := DIG_TOO_FAST
1A0A 32 38 74       STA     ERROR
1A0D C3 14 1A       JMP     RENC35
1A10 2F     RENC30: CMA                     ;            ELSE COUNT := COUNT - COUNT_INC
1A11 3C             INR     A
1A12 81             ADD     C
1A13 4F             MOV     C,A
                                    ;                END;
            RENC35:                         ;     END;
1A14 78             MOV     A,B     ;     BANK_PAT := NEW_BANK_PAT;
1A15 32 39 74       STA     BNKPAT
1A18 7A             MOV     A,D     ;     DIGIT_PAT := NEW_DIGIT_PAT;
1A19 32 3A 74       STA     DGTPAT
1A1C CD 55 15       CALL    DEL300  ;     DELAY (375)
1A1F CD 64 15       CALL    DEL75
1A22 C3 99 19       JMP     RENC05  ;     END
                                    ; END;
                    ;
                    ; (*****************************************************************)
                    ;
                    ; PROCEDURE SET_CLOSED;
                    ;
                    ;
                    ; VAR       (*C-REG*) CUR_BANK_VAL : BYTE;
                    ;   (*E-REG*) INDEX : PRINT_BANKS;
                    ;
1A25                MVPOST:
1A25 CD 3F 15 SETCLS:    CALL    LEDON
1A28 CD 38 1A       CALL    CHPOST
1A2B CD 4A 15       CALL    LEDOFF
1A2E CD BC 18       CALL    MODLN
1A31 CD B0 18       CALL    ERRHDR
1A34 C4 B5 18       CNZ     EXTERR
1A37 C9             RET
                    ;
                    ;
                    ;Procedure MOVPOST
                    ;Objective
                    ;    sets the print wheels to a new postage value upon execution.
```

```
;    updates the postage value upon a sucessfull completion of a
;    new setting.
;Level
;   Calls GNIB, MOVCLS, ERRHDR
;Note:      What action is to be taken up on detection of an error is
;   determined solely by the invoking routine.
;
;INDEX1 := 0
;Do while INDEX1 <> 4
;   VALUE1 := GNIB(POSVAL,INDEX1:VALUE)
;   VALUE2 := GNIB(POSREQ,INDEX1:VALUE)
;   If VALUE1 = VALUE2 then INDEX1 := INDEX1+1; Continue Do
;   MOTOR := DIGIT
;   DIRECTION := CCW
;   RETRIES := 3
;   MCOUNT := 2
;   SPEED := 8 .................... CORRESPONDING TO 160 STEPS/SEC
;   Procedure MOVCLS( MOTOR,DIRECTION,MCOUNT,RETRIES,SPEED: ERROR)
;   Procedure ERRHDR( ERRORFLAG )
;   If ERRORFLAG = 0 then CURBNKVAL := 0
;                         BNKVAL(HOM) := 0
;                         INDEX := 0
;                         Do while INDEX <> 4
;                                   DELTA :=(GNIB (POSREQ,INDEX:VALUE)-
;                                           GNIB (POSVAL,INDEX:VALUE))
;                                   If DELTA <> 0 then
;                                        If INDEX >= 2 then
;                                            INDEX2:= INDEX - 1
;                                        else INDEX2:= INDEX-2
;                                        INDEX2 := COMPLMNT(INDEX2)
;                                        BNKVALINDEX := INDEX2 + 1
;                                        MOTOR := BANK
;                                        MCOUNT := BNKVALINDEX - CURBNKVAL
;                                        RETRIES := 3
;                                        SPEED := 08
;                                        Procedure MOVCLS(MOTOR,MCOUNT,-
;                                                  -RETRIES,SPEED:ERROR)
;                                        Procedure ERRHDR(ERRFLAG)
;                                        If ERRFLAG = 0 then
;                                                  MOTOR := DIGIT
;                                                  RETRIES := 3
;                                                  MCOUNT := DELTA
;                                                  SPEED := 08
;                                                  Procedure MOVCLS
;                                                         (MOTOR,RETRIES,
;                                                         MCOUNT,SPEED:ERROR)
;                                                  ProcedureERRHDR(ERRFLAG))
;                                                  If ERRFLAG<>0 then End
;                                                  end if
;                                        end if
;                                   else INDEX := INDEX + 1
;
;                              End do
;                              MOTOR := BANK
;                              RETRIES := 3
;                              SPEED := 08
;                              MCOUNT := BNKVALHOM - CURMBNKVAL
;                              Procedure MOVCLS (MOTOR,SPEED,RETRIES,
;                                                MCOUNT:ERROR)
;                              Procedure ERRHDR(ERRFLAG)
;                              If ERRFLAG = 0 then
;                                        RETRIES := 3
;                                        MOTOR := DIGIT
;                                        MCOUNT := 2
;                                        SPEED := 08
;                                        Procedure MOVCLS(
;                                           MOTOR,MCOUNT,
;                                           SPEED,RETRIES:ERROR)
;                                        Procedure ERRHDR(EFLAG)
;                                        If ERRFLAG = 0 then
;                                                  For Z=1 to 4 by 1
;                                                      POSTVAL(Z)
```

```
                ;                                                := POSREQ(Z)
                ;                                              Z:= Z + 1
                ;                                          end for
                ;                               end if
                ;                  end
                ;   end
                ;End movpost
7421            PREG      EQU     7421H          ;POSTAGE VALUE LOCATION
7460            TWORK1    EQU     7460H          ;
7466            POSREQ    EQU     7466H          ;WORK1+((16-NBANKS)/2))
7421            POSVAL    EQU     PREG
                ;
                ;
                ;
                ;
                          ;
1A38 1E 00      CHPOST:   MVI     E,00.   ; IF POST_REQ = POST_VAL THEN RETURN;
1A3A 21 21 74   SETC05:   LXI     H,POSVAL
1A3D CD DB 1A      CALL   GNIB                   ;
1A40 47            MOV    B,A                    ;
1A41 21 66 74      LXI    H,POSREQ               ;
1A44 CD DB 1A      CALL   GNIB                             ;
1A47 90            SUB    B                      ;
1A48 C2 54 1A      JNZ    SETC10                 ;
1A4B 7B            MOV    A,E                    ;
1A4C 3C            INR    A                      ;
1A4D FE 04         CPI    04                     ;ALL BANKS CHECKED?
1A4F C8            RZ                            ;EXIT
1A50 5F            MOV    E,A                    ;
1A51 C3 3A 1A      JMP    SETC05                 ;
                ;
                ;
1A54 0E 02      SETC10:   MVI     C,+2    ; MOVE_CLOSED (DIGIT_TRIES, DIGIT,
1A56 1E 00         MVI    E,00H   ;          DIGIT_VALUE (SET) - DIGIT_VALUE (LOCK));
1A58 21 03 08      LXI    H,803H
1A5B CD 03 14      CALL   MOVCLS
1A5E CD B0 18      CALL   ERRHDR          ;ERROR PROCESSING
1A61 C0            RNZ                    ;FATAL ERROR EXIT
1A62 4F            MOV    C,A     ; CUR_BANK_VAL := BANK_VALUE (HOME);
1A63 57            MOV    D,A     ; FOR INDEX := PENNIES TO TEN_DOLLARS DO
1A64 5F         SETC15:   MOV     E,A
1A65 21 21 74      LXI    H,POSVAL;     IF POST_REQ [INDEX] <> POST_VAL [INDEX] THEN
1A68 CD DB 1A      CALL   GNIB
1A6B 47            MOV    B,A
1A6C 21 66 74      LXI    H,POSREQ                        ;
1A6F CD DB 1A      CALL   GNIB                                  ;
1A72 90            SUB    B
1A73 CA A5 1A      JZ     SETC25
1A76 F5            PUSH   PSW     ;        BEGIN
1A77 7B            MOV    A,E     ;        MOVE_CLOSED (BANK_TRIES, BANK,
1A78 FE 02         CPI    02H     ;                 BANK_VALUE (INDEX) - CUR_BANK_VAL;
1A7A D2 7E 1A      JNC    SETC20
1A7D 3D            DCR    A
1A7E 3D         SETC20:   DCR     A
                ;  CMA
                ;  INR    A
1A7F F5            PUSH   PSW
1A80 91            SUB    C
1A81 4F            MOV    C,A
1A82 D5            PUSH   D
1A83 1E 01         MVI    E,01H
1A85 21 03 08      LXI    H,803H
1A88 CD 03 14      CALL   MOVCLS
1A8B D1            POP    D
1A8C F1            POP    PSW     ;        CUR_BANK_VAL := BANK_VALUE (INDEX);
1A8D 4F            MOV    C,A
1A8E F1            POP    PSW
1A8F 6F            MOV    L,A
1A90 CD B0 18      CALL   ERRHDR          ;
1A93 C0            RNZ                    ;FATAL ERROR EXIT
1A94 C5            PUSH   B       ;        MOVE_CLOSED (DIGIT_TRIES, DIGIT,
```

```
1A95 4D            MOV     C,L     ;                    POST_REQ [INDEX] - POST_VAL [INDEX];
1A96 D5            PUSH    D
1A97 1E 00         MVI     E,00H
1A99 21 03 08      LXI     H,803H
1A9C CD 03 14      CALL    MOVCLS
1A9F D1            POP     D
1AA0 C1            POP     B
1AA1 CD B0 18      CALL    ERRHDR          ;
1AA4 C0            RNZ                     ;FATAL ERROR EXIT
                                   ;         END;
1AA5 7B       SETC25:  MOV     A,E
1AA6 3C            INR     A
1AA7 FE 04         CPI     04H
1AA9 DA 64 1A      JC      SETC15
1AAC 79            MOV     A,C     ; MOVE_CLOSED (BANK_TRIES, BANK, BANK_VALUE (HOME)
1AAD 2F            CMA             ;             - CUR_BANK_VAL;
1AAE 3C            INR     A
1AAF 4F            MOV     C,A
1AB0 1E 01         MVI     E,01
1AB2 21 03 08      LXI     H,803H
1AB5 CD 03 14      CALL    MOVCLS
1AB8 CD B0 18      CALL    ERRHDR                  ;
1ABB C0            RNZ                             ;FATAL ERROR EXIT
1ABC 0E FE         MVI     C,-2.   ; MOVE_CLOSED (DIGIT_TRIES, DIGIT, DIGIT_VALUE (LOCK)
1ABE 1E 00         MVI     E,00H   ;             - DIGIT_VALUE (SET));
1AC0 21 03 08      LXI     H,803H
1AC3 CD 03 14      CALL    MOVCLS
1AC6 CD B0 18      CALL    ERRHDR          ;
1AC9 C0            RNZ             ;FATAL ERROR
1ACA 0E 02         MVI     C,2.    ; FOR INDEX := PENNIES TO TEN_DOLLARS DO
1ACC 11 66 74      LXI     D,POSREQ;     POST_VAL [INDEX] := POST_REQ [INDEX]
1ACF 21 21 74      LXI     H,POSVAL
1AD2 1A       SETC30:  LDAX    D
1AD3 77            MOV     M,A
1AD4 13            INX     D
1AD5 23            INX     H
1AD6 0D            DCR     C
1AD7 C2 D2 1A      JNZ     SETC30
1ADA C9            RET             ; END;
              ;
              ;
              ;
              ;
              ;
              ;GETNIB ROUTINE
              ;HLREGISTER HAS THE BASE ADDRESS:E REGISTER HAS THE BANK INDEX
              ;RETURNS THE INDEXED NIBBLE IN ACCUMULATOR
              ;
              ;
1ADB D5       GNIB:    PUSH    D               ;SAVE REGISTER DE
1ADC AF            XRA     A               ;SET CY = 0
1ADD 57            MOV     D,A             ;SETTING FOR DAD OPERATION
1ADE 7B            MOV     A,E             ;
1ADF 1F            RAR                     ;DIVIDE BY 2
1AE0 5F            MOV     E,A             ;
1AE1 19            DAD     D               ;ADDRESS GENERATION
1AE2 D1            POP     D               ;
1AE3 7B            MOV     A,E             ;MSB/LSB SELECTION
1AE4 E6 01         ANI     01H             ;00,02,04ETC &01,03,05....
1AE6 3E 0F         MVI     A,0FH           ;MASK FOR LSB
1AE8 C2 F3 1A      JNZ     GNI10           ;
              ;
              ;
1AEB 3E F0         MVI     A,0F0H          ;MASK FOR MSB SELECTION
1AED A6            ANA     M
1AEE 0F            RRC                     ;
1AEF 0F            RRC                     ;
1AF0 0F            RRC                     ;
1AF1 0F            RRC                     ;
1AF2 C9            RET                     ;
              ;
              ;
```

```
9511 1AF3 A6        GNI10:     ANA    M                     ;
9512 1AF4 C9          RET                          ;
9513                ;
9514                ;
9515                ;
9516 1AF5
9517                ;
9518 1AF5              END
M85 assembly errors =    0
```

CROSS REFERENCE

```
LABEL    VALUE     REFERENCE

ACCFMT   008F       -375  7167
ACCOD1   131B      -7105  7120
ACCOD2   132A       7110 -7116
ACCOD3   1330       7115 -7121
ACCOD4   1340       7132 -7134
ACCOD5   135A       7160 -7166
ACCODE   12EE       3374 -7042
AMTBUF   00E0       -254  3107  4568  4756  4773  7274  7327  7401
                    7415  7435
ASCCRC   0040       -101  2796  3845  4146
ASCFMT   0080       -376  2605
ASCRES   0038        -96  2451  2605  2778  2789  3839  4143
ASCSIZ   0008       -260  2451  2454  2473  2484  2484  2607  2775
                    2778  2789  3822  3839  4143
BADCRC   0000       -410  2427  4238  6754
BADCYC   0004       -414  2881  2927  4292
BADRAM   000A       -421  1111
BADSW    0011       -397
BALIGN   1812       8312  8329 -8651
BARF     0017       -399  3240
BASES    1673       8218 -8231
BASEAD   17DC       8510 -8547
BCDC     000F      -7553  7578
BCDD     000C      -7552  7576
BERSET   182B      -8668  8679
BINOC1   1364      -7191  7206
BINOC2   1366      -7194  7202
BINOCT   135D      -7183
BKL50    1530       7790 -7805
BKLASH   151B       7721 -7786
BLKTMR   0050       -136   699
BNKMSK   000C      -7556  9193
BNKPAT   7439       -210  7729  7885  8401  9036  9213  9233  9265
BODC     0003      -7551  7574
BODD     0000      -7550  7572
BUFOVR   0012       -398  3685
CDBUF    0316      -1435  1701  1839
CDBUF1   0320       1414 -1443
CDBUFC   0306      -1409  1777  1799  1870
CDBUFD   030F      -1424
CHPOST   1A38       9284 -9303
CHRBKT   0058       -156   573  1553  5494
CLKD01   0046        531  -539
CLKD02   0049        538  -543
CLKDEC   0040       -530   654
CLKDGT   0043       -537   634
CLRBLK   0E85       1234  3381  4081  4120  4660  4844  4973 -5252
                    7045
CMDBUF   00F0       -259  3113  4539  7359
CMDDSB   05CD      -2272  3358
CMDENB   05F3      -2317  3356
CMPAR1   0E93      -5283  5306
CMPAR2   0EA9       5285  5298 -5307
CMPARE   0E8E       3799  4189  4210  4678 -5277
CONFIG   062C      -2383  2583
CONSU1   0647       2415 -2425
CONSU2   064C       2424 -2431
```

```
CONSUM    063A    -2410  2565  4164  7049
CRC       0EB1     1282  2487  2792  2815  3842  3850  4227 -5334
                   7126  7236  7446
CRC1      0EB8    -5341  5350
CRCNI1    0ECD    -5379  5394
CRCNI2    0ED6     5388 -5390
CRCNIB    0EC6     5345 -5367  6295  6737  6985
CSMFMT    0080     -377  2607
CSTEP0    1660     8207 -8213
CTLBKT    0056     -151   574  1503  3543  5485
CTLCRC    0010      -31  2422  3837
CTLREG    7000     -324   899   961  1087
CTLSU1    065B     2462 -2465
CTLSUM    064E     2412 -2449  3833
CURBKT    005A     -161  1550  1967
DALIGN    17E7     8296  8322  8345 -8590
DATA1     6800     -325   330  4288
DBCTR     005C     -166   565  1190
DBLAN1    0EEF    -5433  5462
DBLAN2    0EEF    -5434  5438
DBLANK    0EDE     1063  1494  1962  2922 -5411  6147
DBLH01    068D    -2531  3386
DBLH02    06A6     2518 -2551
DBLH03    06C5     2564 -2576
DBLH04    06E2     2516 -2598
DBLH05    06E3     2521  2532  2537  2554  2559  2568  2578 -2601
DBLHDR    0671    -2512  3390
DBOUN1    005D      568  -575
DBOUNC    0040     -562   733
DBUF      0080     -219  1412  1439  1442  1653  1719  1803  1803
                   1879  1904  1910  1933  2050  2056  2168  2182
                   2186  2217  3642  5039  5050  5075  5087
DBVAL     0002     -342   580
DECAD1    06FE    -2633  2654
DECADD    06F8     2476 -2624  2781  2829  7420
DECCOM    070C     2636 -2675  2736
DECERR    0720     2629 -2704  2729
DECSU1    0731    -2733  2757
DECSUB    072B    -2724  2804
DEFDCM    006C     -201  1164  3906
DEL1      1567    -7855  7856
DEL300    155E    -7843  8500  9268
DEL30M    17A9     7801  7804  7876  8201  8204  8310  8340 -8498
                   8532  8726
DEL6M     17A3    -8492  8721
DEL75     1564     7845  7846  7847  7848 -7853  7867  9269
DELM1     17AC     8494 -8500  8502
DFLUSH    0EF6      737  5417 -5454
DGTMSK    0003    -7555  7616  7870  7872  7879  7884  8700  9094
                   9198
DGTPAT    743A     -211  7734  7880  8371  8403  9074  9203  9244
                   9267
DIAFMT    005F     -378  2604
DIEDCM    006A     -196  1161  3910  4790  4867  4936  7326
DIMAGE    0000     -265   776  1462  1633  1649  1698  1847  1849
                   1850  2179  2243
DISAB1    05D5     2276 -2282
DISAB2    05EF     2292 -2300
DISABL    05D3    -2278  4182
DISP01    0072      607  -609
DISP02    0072      605  -610
DISP03    007D     -620   658
DISP04    007F     -623   642
DISPLY    0062     -596   738
DOACCT    0744     1018 -2773  2964
DOSTAT    0778    -2850  3509
DOTR01    07D9    -2973  2983
DOTR02    07ED     2978 -2994
DOTR03    07F7    -3008  3018
DOTR04    080D     3013 -3030
DOTR05    080F     3026 -3036
DOTR06    0811    -3040  3310
```

```
DOTRIP   07A5   -2921  3220  3584
DPH1     1991    9100 -9103
DPH5     1995    9102 -9108
DPHOME   1986    8593  8603  8655  8678 -9099
DPTS05   17D4    8515 -8537
DPTS10   17C7   -8523  8540
DPTSP    17B5   -8510  8611  8616  8661  8668
DSBKBD   0F02    3370 -5476
DSCDRC   0036     -91  1286  2819  3854  4156  7240  7450
DSCFMT   0070    -379  2606
DSCRDG   002F     -86  1274  2466  2471  2606  2801  2812  3847
                 4153  4206  7071  7231  7416  7434
DSCSIZ   0007    -341  1274  2471  2473  2798  2801  2812  3822
                 3847  4089  4123  4153  4209  4556  7230  7416
                 7417  7417  7435  7436
DSPCHR   0008    -349  1884  1891  2239
DSPTMR   0052    -141   704  1515  1544  1853  2254
DSPVAL   0007    -343  1543  1852  2253
EJEC     0000    -473
ENABL1   05FC    2321 -2327
ENABL2   0627    2355 -2362
ENABL3   0627    2342 -2363
ENABL4   0627    2337 -2364
ENABLE   05F9   -2323  4196
ENAKBD   0F14    3368 -5500
ENCMOV   15AB   -7913  9218  9249
ENCT     15B8    7921 -7925
ENDENT   0819   -3062  3378
ENDM05   15CC   -7971  8024
ENDM20   15E0    7974 -7987
ENDM25   15EB    7984 -7995
ENDM30   15F9    7999 -8006
ENDM35   15FB    8003 -8010
ENDM40   160F   -8027
ENDMOV   15C8   -7969  8898  8912  8969
ENTAMT   082E   -3106  3464
ENTCM1   0839    3110 -3116
ENTCMB   0835   -3112  3468
ENTSER   0848   -3146  3360
EREXIT   165A    8195 -8208
ERRCNT   0016     -51  3254  3831
ERRCOD   0014     -46  3246  3829
ERRH05   18B0   -8808
ERRHDR   18B0    8072  8417  8446  8464  8479  8487  8762  8785
                -8807  9287  9404  9436  9446  9460  9466
ERROR    7438    -209  7567  7591  7679  7723  7741  7748  7895
                 7970  8043  8209  8377  8396  8429  8808  8823
                 8900  8980  9058  9080  9187  9207  9225  9238
                 9256
ERROR2   0002   -9179  9236
ERROR3   0003   -9180  9224
ERROR4   0004   -9181  9255
ERROR5   0005   -7562  7740
ERROR6   0006   -7563  7747
ERRR1    0001   -9178  9206
ERRST    0013     -41  2604
ERSET    180C    8604 -8616
EXTERR   18F5    8073  8763  8786 -8822  9288
EXTSER   0852   -3166  3362
EXTIRP   0860   -3190  3364
FATE01   089E    3245 -3260
FATERR   0880    1041  1220  1242  2706  2953  2988  3002 -3241
                 3330  3603  3688  4707  6205
FATINT   087E     502   506 -3237
FATRST   0003    -413  1270  7252
FILDI1   0327   -1464  1469
FILDIM   0322    1145 -1459  1672  1842  2159
FILN01   0F26    5258 -5527
FILN02   0F27   -5531  5541
FILN03   0F32    5533 -5542
FILNIB   0F24    1140  1212  1229  1278  1326  3825  4234 -5524
                 7232
```

| | | | | | | | | | |
|---|---|---|---|---|---|---|---|---|---|
| FINTR1 | 08AA | -3287 | 3291 | | | | | | |
| FINTR2 | 08BC | -3295 | 3306 | | | | | | |
| FINTR3 | 08DF | 3301 | -3309 | | | | | | |
| FINTR4 | 08DC | 3022 | -3327 | | | | | | |
| FINTRP | 08A0 | 1026 | 2991 | -3276 | | | | | |
| FIXSED | 0000 | -21 | 351 | 1136 | 1136 | | | | |
| GETN01 | 0F3D | -5574 | | | | | | | |
| GETN02 | 0F45 | 5578 | -5584 | | | | | | |
| GETNIB | 0F35 | 1654 | 1806 | 1905 | 2169 | 2174 | 2223 | 2679 | 2689 |
| | | 3122 | 3661 | 3890 | 3899 | 4085 | 4651 | 4667 | 4757 |
| | | 4762 | 4806 | 4858 | 4917 | 4957 | 5288 | 5294 | 5342 |
| | | -5563 | 5816 | 6127 | 6931 | 7087 | 7106 | | |
| GNI10 | 1AF3 | 9499 | -9511 | | | | | | |
| GNIB | 1ADB | 9385 | 9388 | 9410 | 9413 | -9488 | | | |
| HACODE | 0090 | -486 | 7167 | | | | | | |
| HAREG | 0082 | -477 | 2605 | | | | | | |
| HCLRSV | 0047 | -436 | 3361 | | | | | | |
| HCONFG | 00AB | -487 | 2389 | | | | | | |
| HCSUM | 0084 | -479 | 2607 | | | | | | |
| HDIAGS | 008D | -484 | 2604 | | | | | | |
| HDISAB | 0042 | -433 | 1427 | 3357 | 3410 | | | | |
| HDISKB | 0063 | -439 | 3369 | | | | | | |
| HDLOCK | 008A | -481 | 2602 | | | | | | |
| HDREG | 0083 | -478 | 2606 | | | | | | |
| HDR001 | 091C | 3371 | -3393 | | | | | | |
| HDR002 | 091F | 3352 | -3398 | | | | | | |
| HDR003 | 092D | 3402 | -3407 | | | | | | |
| HDR004 | 093F | 3414 | -3420 | | | | | | |
| HDR005 | 093F | 3411 | -3421 | | | | | | |
| HDRONY | 08D5 | -3349 | 3635 | 5063 | | | | | |
| HDRP01 | 0954 | 3447 | -3452 | | | | | | |
| HDRP02 | 0954 | 3445 | -3453 | | | | | | |
| HDRP03 | 0979 | 3471 | -3485 | | | | | | |
| HDRP04 | 097C | 3460 | -3489 | | | | | | |
| HDRPLS | 0941 | -3439 | 3672 | 5051 | | | | | |
| HDSEEK | 163B | 8069 | -8191 | | | | | | |
| HENABL | 0041 | -432 | 2078 | 3355 | | | | | |
| HENAKB | 0062 | -438 | 3367 | | | | | | |
| HENDEN | 0043 | -434 | 1496 | 3377 | | | | | |
| HENTAM | 00C5 | -444 | 2018 | 3444 | 3463 | | | | |
| HENTCO | 00C6 | -445 | 2017 | 3446 | 3467 | | | | |
| HEXTRP | 004E | -437 | 3363 | | | | | | |
| HHSLIM | 008E | -485 | 2542 | | | | | | |
| HLOPOS | 0085 | -482 | 2526 | | | | | | |
| HMTRNO | 008C | -483 | 2603 | | | | | | |
| HPCNT | 0085 | -480 | 2608 | | | | | | |
| HPHAM1 | 0044 | -8046 | 8199 | | | | | | |
| HPHASE | 0089 | -8047 | 8202 | | | | | | |
| HPSET | 0081 | -476 | 2077 | 2198 | 4511 | | | | |
| HREQAC | 0040 | -453 | 1723 | 3373 | | | | | |
| HREQAR | 0052 | -456 | 2032 | 2553 | 3546 | | | | |
| HREQCF | 005B | -460 | 2582 | | | | | | |
| HREQCS | 0054 | -458 | 2563 | | | | | | |
| HREQDL | 0052 | -467 | 2520 | | | | | | |
| HREQDR | 0053 | -457 | 2028 | 2558 | 3555 | | | | |
| HREQDS | 0055 | -470 | 2536 | | | | | | |
| HREQLP | 0053 | -468 | 2525 | | | | | | |
| HREQMN | 0054 | -469 | 2530 | | | | | | |
| HREQPC | 0055 | -459 | 2024 | 2577 | 3564 | | | | |
| HREQPO | 0051 | -455 | 1532 | 3381 | 3525 | 3639 | | | |
| HREQSL | 0056 | -471 | 2541 | | | | | | |
| HREQSN | 005C | -461 | 3385 | | | | | | |
| HREQST | 0050 | -454 | 3365 | | | | | | |
| HSETDA | 00C4 | -443 | 2016 | 2586 | 5044 | | | | |
| HSETMN | 00C0 | -441 | 3473 | | | | | | |
| HSETPO | 00C1 | -442 | 2064 | 3477 | | | | | |
| HSETSV | 0046 | -435 | 1757 | 3359 | | | | | |
| HSTAT | 0080 | -475 | 3991 | | | | | | |
| IDLE | 097E | 1191 | -3503 | 3506 | | | | | |
| IDLE01 | 09A4 | 3523 | -3529 | | | | | | |
| IDLE02 | 09D1 | 3538 | -3572 | | | | | | |
| IDLE03 | 09D1 | 3534 | -3573 | | | | | | |

| | | | | | | | | | |
|---|---|---|---|---|---|---|---|---|---|
| IDLE04 | 09E6 | 3580 | -3587 | | | | | | |
| INITSM | 156D | 1134 | -7865 | | | | | | |
| INT75 | 009D | 514 | -673 | | | | | | |
| KDCTRL | 004E | -131 | 598 | 723 | 1487 | 1510 | 1588 | 1621 | 1834 |
| | | 1838 | 2163 | 2210 | 3194 | 3581 | 4018 | 5479 | 5481 |
| | | 5506 | 5508 | | | | | | |
| KDIO | 00A7 | -697 | 1564 | | | | | | |
| KDIO01 | 00B7 | 706 | -708 | | | | | | |
| KDIO02 | 00B7 | 702 | -709 | | | | | | |
| KDIO03 | 00D0 | 721 | -731 | | | | | | |
| KDSKIP | 0002 | -344 | 1565 | | | | | | |
| KEYB01 | 034A | 1489 | 1493 | -1501 | | | | | |
| KEYB02 | 0370 | 1524 | -1530 | | | | | | |
| KEYB03 | 0375 | 1529 | -1536 | | | | | | |
| KEYB04 | 0375 | 1517 | -1537 | | | | | | |
| KEYB05 | 0375 | 1513 | -1538 | | | | | | |
| KEYB06 | 0378 | 1508 | -1540 | | | | | | |
| KEYB07 | 038C | 1547 | -1555 | | | | | | |
| KEYB08 | 038C | 1539 | -1556 | | | | | | |
| KEYB09 | 038C | 1500 | -1557 | | | | | | |
| KEYBKT | 0054 | -146 | 563 | 736 | 851 | 5504 | | | |
| KEYBRD | 032D | -1486 | 3588 | | | | | | |
| KEYINT | 4C96 | -345 | 1566 | | | | | | |
| KILCOD | 02BE | -326 | 1126 | 1168 | 6179 | 6186 | 6912 | | |
| LEDOFF | 154A | -7827 | 7886 | 8070 | 8760 | 8783 | 9285 | | |
| LEDON | 153F | -7815 | 7866 | 8068 | 8755 | 8778 | 9283 | | |
| LOKFMT | 0040 | -380 | 2602 | | | | | | |
| LOWWRN | 001C | -61 | 2526 | 4084 | 4556 | | | | |
| LSNMAS | 000F | -7961 | 7981 | 7987 | | | | | |
| LSNMSK | 000F | -7557 | 7571 | 7639 | 7643 | 7796 | 8215 | 8738 | |
| LSTAT1 | 0F63 | 5622 | -5625 | | | | | | |
| LSTATE | 0F4E | 1030 | 1153 | 1180 | 1315 | 1521 | 1627 | 1679 | 2339 |
| | | 2513 | 2873 | 3072 | 3531 | 3728 | 4528 | 4627 | -5610 |
| | | 6134 | 6422 | 6777 | 7242 | 7316 | 7391 | | |
| MANRST | 09E9 | 3083 | -3600 | | | | | | |
| MAXINT | 7FA1 | -346 | | | | | | | |
| MEMORY | M 0000 | 0 | | | | | | | |
| MESAG1 | 0A17 | 3640 | -3655 | | | | | | |
| MESAG2 | 0A17 | 3638 | -3656 | | | | | | |
| MESAG3 | 0A1A | 3632 | -3658 | | | | | | |
| MESAG4 | 0A2E | 3669 | -3676 | | | | | | |
| MESAG5 | 0A31 | 3675 | -3681 | | | | | | |
| MESAG6 | 0A31 | 3657 | -3682 | | | | | | |
| MESAGE | 09EE | 3576 | -3620 | | | | | | |
| MODD01 | 03AD | 1593 | -1599 | | | | | | |
| MODD02 | 03D8 | 1637 | -1639 | | | | | | |
| MODD03 | 03E3 | 1645 | -1647 | | | | | | |
| MODD04 | 03F5 | 1630 | -1664 | | | | | | |
| MODD05 | 03FC | 1668 | -1671 | | | | | | |
| MODD06 | 03FF | 1663 | -1675 | | | | | | |
| MODD07 | 03FF | 1598 | -1676 | | | | | | |
| MODD08 | 0408 | 1682 | -1684 | | | | | | |
| MODD09 | 040E | -1690 | 1702 | | | | | | |
| MODD10 | 0419 | 1693 | -1699 | | | | | | |
| MODDSP | 03A0 | 1562 | -1586 | | | | | | |
| MODLN | 18BC | 8071 | 8761 | 8784 | -8837 | 9286 | | | |
| MOP01 | 1869 | 8714 | -8723 | | | | | | |
| MOP02 | 185C | -8718 | 8725 | | | | | | |
| MOP05 | 1851 | -8711 | 8722 | | | | | | |
| MOP10 | 186D | 8717 | -8726 | | | | | | |
| MOPEN | 184F | -8710 | 8734 | 8736 | | | | | |
| MOVB01 | 0F8A | 5654 | 5672 | -5705 | | | | | |
| MOVB02 | 0F9A | 5716 | -5719 | | | | | | |
| MOVB03 | 0FAB | 5726 | -5732 | | | | | | |
| MOVBIT | 0F68 | -5647 | 5965 | 7196 | | | | | |
| MOVC05 | 1426 | -7585 | 7717 | | | | | | |
| MOVC1 | 143D | -7599 | | | | | | | |
| MOVC10 | 145E | -7629 | | | | | | | |
| MOVC15 | 145F | 7625 | -7630 | 7681 | | | | | |
| MOVC20 | 1473 | 7634 | -7643 | | | | | | |
| MOVC25 | 147E | 7642 | -7651 | | | | | | |
| MOVC30 | 148C | 7655 | -7660 | | | | | | |

| | | | | | | | | | |
|---|---|---|---|---|---|---|---|---|---|
| MOVC35 | 148E | 7659 | -7664 | | | | | | |
| MOVC4 | 1407 | -7570 | | | | | | | |
| MOVC40 | 14A8 | 7678 | -7682 | | | | | | |
| MOVC42 | 14CF | 7706 | -7711 | | | | | | |
| MOVC45 | 14BC | 7694 | -7697 | | | | | | |
| MOVC50 | 14D5 | 7587 | 7590 | 7593 | -7722 | | | | |
| MOVC55 | 14ED | 7731 | -7734 | | | | | | |
| MOVC6 | 144D | 7610 | -7616 | | | | | | |
| MOVC60 | 14F9 | 7580 | 7733 | -7740 | | | | | |
| MOVC65 | 14FF | 7736 | 7738 | -7744 | | | | | |
| MOVC7 | 1423 | 7573 | 7575 | 7577 | 7579 | -7583 | | | |
| MOVC70 | 14D8 | -7721 | | | | | | | |
| MOVC8 | 1456 | 7598 | 7618 | -7620 | | | | | |
| MOVCLS | 1403 | -7565 | 8376 | 8395 | 8416 | 8428 | 8445 | 8463 | 8478 |
| | | 8486 | 8759 | 8782 | 9403 | 9430 | 9443 | 9459 | 9465 |
| MRSTS1 | 0048 | -116 | 1009 | 1020 | 1204 | 1307 | 1330 | 1602 | 2289 |
| | | 2343 | 2588 | 2966 | 3147 | 3167 | 3200 | 3535 | 3998 |
| | | 4102 | 4169 | 4286 | 4491 | 4640 | 5617 | 6502 | 6794 |
| MRSTS2 | 004A | -121 | 354 | 2862 | 3242 | 5614 | | | |
| MSERN1 | 0A6D | 3766 | -3794 | | | | | | |
| MSERN0 | 0A38 | 3474 | -3713 | 4571 | | | | | |
| MSG2M1 | 0AC4 | 3904 | -3907 | | | | | | |
| MSG2M2 | 0AF2 | 3966 | -3971 | | | | | | |
| MSG2M3 | 0AF2 | 3939 | -3972 | | | | | | |
| MSG2M4 | 0AF2 | 3921 | -3973 | | | | | | |
| MSG2M5 | 0AF2 | 3912 | -3974 | | | | | | |
| MSG2MU | 0AAA | -3878 | 4577 | 4636 | | | | | |
| MSNFMT | 007F | -381 | 2603 | | | | | | |
| MSNMAS | 00F0 | -7960 | 7977 | 7991 | | | | | |
| MSNMSK | 00F0 | -7558 | 7635 | 7647 | 7793 | | | | |
| MTRCHR | 0046 | -111 | 1136 | 1159 | 2394 | | | | |
| MTRSTS | 0AF4 | 3520 | -3990 | 4261 | | | | | |
| MULKEY | 0080 | -347 | 855 | 5503 | | | | | |
| MVDD01 | 00F0 | -779 | 803 | | | | | | |
| MVDD02 | 00FA | 783 | -791 | | | | | | |
| MVDDAT | 00DE | 626 | 646 | -760 | | | | | |
| MVLN01 | 0FF4 | -5761 | | | | | | | |
| MVLNIB | 0FEC | 1913 | 3129 | 3647 | 3770 | 3783 | 4093 | 4127 | 4591 |
| | | 4716 | 4779 | 4853 | 5001 | 5079 | -5759 | 7063 | 7075 |
| | | 7437 | | | | | | | |
| MVLO05 | 1899 | -8779 | | | | | | | |
| MVLOCK | 1896 | 2997 | -8778 | | | | | | |
| MVPOST | 1A25 | 1215 | 1237 | 4700 | -9282 | | | | |
| MVRN01 | 0FC3 | 5773 | -5801 | 5929 | | | | | |
| MVRN02 | 0FC8 | -5812 | 5846 | | | | | | |
| MVRN03 | 0FDB | 5827 | -5832 | | | | | | |
| MVRN04 | 0FDB | 5823 | -5833 | | | | | | |
| MVRN05 | 0FE2 | 5836 | -5841 | | | | | | |
| MVRN06 | 0FE7 | 5814 | -5847 | | | | | | |
| MVRNIB | 0FC2 | 1938 | 2455 | 3930 | -5799 | | | | |
| MVTR05 | 187F | -8756 | | | | | | | |
| MVTRIP | 187C | 2948 | -8755 | | | | | | |
| NARG | 0000 | 0 | | | | | | | |
| NBANKS | 0004 | -362 | 383 | 1208 | 1208 | 1225 | 1322 | 2775 | 2778 |
| | | 2798 | 2801 | 4123 | 4126 | 4188 | 4562 | 4587 | 4588 |
| | | 4635 | 4674 | 4674 | 4677 | 4712 | 4715 | | |
| NDISP | 0002 | -348 | 349 | 773 | 1461 | 1462 | 1649 | 1687 | 1688 |
| | | 2179 | 2243 | | | | | | |
| NINCYC | 0018 | -400 | 2987 | | | | | | |
| NORFLG | 004C | -126 | 1490 | 1558 | 1761 | 2089 | 2285 | 2331 | 3063 |
| | | 3117 | 3399 | 3442 | 3516 | 4320 | 4487 | 4691 | 5092 |
| | | 5127 | 6486 | | | | | | |
| NORSIZ | 0022 | -354 | 6689 | | | | | | |
| NORSTR | 0028 | -352 | 353 | 354 | 6690 | | | | |
| NPAUS1 | 0B1B | -4045 | 4047 | | | | | | |
| NPAUSE | 0B19 | 1367 | 2980 | 3015 | 3288 | 3303 | -4042 | 6041 | 6345 |
| | | 6892 | | | | | | | |
| NUMRD1 | 0014 | -7962 | 8015 | | | | | | |
| NUM30F | 1031 | 1391 | -6029 | 6201 | 6335 | 6671 | 7020 | | |
| NUM30G | 103E | -6040 | 6044 | | | | | | |
| NUM30T | 1047 | 1361 | -6063 | 6187 | 6330 | 6652 | 6821 | 6850 | 6963 |
| NUMBAD | 0001 | -411 | 1378 | 6378 | 6452 | 6917 | | | |

```
NVMBYT   1058   -6088  6305  6461  6748
NVMCH1   1077    6137 -6140
NVMCHG   1068    2707  3511 -6124
NVMCTL   0066    -186  2335  6126  6402  6493  6574  6691  6717
                 6960  7016
NVMDE1   1099    1266 -6191  6922
NVMDE2   10A0    6182 -6200
NVMDED   1085    1117  1381  2428  2885  2931  4239  4293 -6176
                 6312  6379  6409  6455  6755  6928  7253
NVMDXB   10A9   -6222  6667  6824  6852
NVMER    10B1   -6248  6648  6785  6807
NVMER1   10D1   -6288  6302
NVMER2   10DF    6290 -6303
NVMER3   10EB    6309 -6315
NVMER4   10EB    6282 -6316
NVMER5   10FE    6326 -6329
NVMER6   1101   -6331  6375
NVMER7   110F   -6344  6349
NVMER8   111A    6355 -6358
NVMERS   4000    -329  1363  6319
NVMFN1   114E    6425 -6434
NVMFN2   114E   -6435  6465
NVMFND   112F   -6401  6496  6510  6568
NVMLOD   116B    1151 -6485
NVMMAP   1191    6226  6269  6442 -6537  6718  6965
NVMNB1   11B9    6579  6588 -6599
NVMNBK   119F    6250 -6565  6656  6815  6841
NVMNXT   11BB    6097  6299  6360  6369 -6617  6742  6994  7008
NVMOPN   11C4    1300  6156 -6639
NVMPRP   11DF    6263 -6688  6713  6952
NVMRD    11EE    6500  6514 -6711
NVMRD1   11FD   -6726  6745
NVMRD2   120F    6728 -6746
NVMRED   4400    -328  1126  1168  1336  1373  1375  6179  6274
                 6447  6722  6884  6912
NVMRET   0002    -412  6311
NVMST1   1221    6780 -6783
NVMST2   1232    6796 -6799
NVMSTO   1219    1356  3858 -6776
NVMWN    1261    1388  6188  6231 -6875  6970  6989  7005  7012
NVMWN1   1274   -6891  6895
NVMWN2   1287    6904 -6908
NVMWN3   129A    6910 -6931
NVMWN4   129A    6907 -6932
NVMWR    129E    1065  1351  3810  6150  6831 -6950
NVMWR1   12B9   -6975  6997
NVMWR2   12CD    6977 -6998
NVMWR3   12E6    6962 -7021
NVMWRT   4800    -327  6880
OLDSWT   0068    -191
PAUTHK   041F   -1717  2002
PCEFMT   007F    -382  2608
PCEREG   002B     -81   352  2608  2826  3822
PCESIZ   0007    -363  2823  2826  3822
PCLRK    0447   -1776  1993
PDCMK    0450   -1796  1996
PDCMK1   0461    1810 -1816
PERDSP   0464   -1831  3259  4269
PFLAG0   0000   -7554  7583
PH0011   18DF    8871 -8895  9103
PH0110   18FD    8863 -8947  9108
PHC5     18F9    8902 -8915
PHASE1   0011   -7559  7619
PHASE2   0044   -7560  7617
PLH05    1983    9091 -9094
PLH10    18DB    8868 -8871
PLH12    18D4    8860 -8867
PLH14    18D9    8862 -8870
PLH52    1903   -8955
PLH57    190D    8952 -8963
PLH65    1912    8960 -8966
```

```
PLH66     1915      -8968  8977
PLH67     1916      -8969
PLH68     1919      -8970
PLH70     1918      -8975
PLH83     1923      -8979
PLHOME    18C5      -8859
PNUMK     048A      -1868  1988
PNUMK1    04A5       1895 -1899
POHOME    18C5       8388  8408  8439 -8858
PORT2A    6800       -330  7570  7609  7868  7877  8214  8699  9090
                     9192  9197
PORTA     7001       -331   612   840  1062  1092  1186  2959  3042
                     3278  4452  5455  6033  6035  6066  6068  7816
                     7818  7828  7830
PORTB     7002       -332   712   908   963  1060  7638  7646  7651
                     7791  7800  7803  7875  7980  7990  7995  8200
                     8203  8309  8337  8339  8511  8720  8838  8840
                     9026
PORTBI    006E       -206   209   210   211   711   907   964
PORTC     7003       -333   847  4459
POSFMT    0040       -383  4511
POSREG    0042       -106  1225  1322  2778  2801  4123  4185  4511
                     4712
POSREQ    7466      -9376  9387  9412  9469
POSUP1    0B85       4111  4138 -4205
POSUP2    0B92       4147  4157 -4226
POSUPD    0B23       3510 -4074
POSVAL    7421      -9377  9384  9409  9470
PREG      7421      -9374  9377
PROERR    0BA1        494   496   498   500   504   508   512  1736
                     1745  2547  2587  3068  3192  3482  3678  3715
                    -4260  4494  4533  4542  4551  4582  4625  4753
                     5008  7054  7297  7311  7321  7371  7396  7405
                     7429
PROKE1    04DB      -1974  1978
PROKE2    04E3       1976 -1979
PROKE3    0502       1982 -2012
PROKEY    04CE       1554 -1961
PSETK     0516       1999 -2048
PSETK1    052F       2052 -2075
PSETK2    0536       2054 -2097
PTNC10    1968       9027 -9072
PTNC15    1970      -9037  9075
PTNC20    1971       9038  9043 -9078
PTNC25    1972       9053  9065 -9079
PTNC30    195A       9045 -9063
PTNC40    1955       9051 -9057  9065  9067
PTNCHK    192A       8362  8365  8608  8658  8915  8971 -9024
PTR       0010        -16    21   -23    23    26   -28    28    31
                      -33    33    36   -38    38    41   -43    43
                       46   -48    48    51   -53    53    56   -58
                       58    61   -63    63    66   -68    68    71
                      -73    73    76   -78    78    81   -83    83
                       86   -88    88    91   -93    93    96   -98
                       98   101  -103   103   106  -108   108   111
                     -113   113   116  -118   118   121  -123   123
                      126  -128   128   131  -133   133   136  -138
                      138   141  -143   143   146  -148   148   151
                     -153   153   156  -158   158   161  -163   163
                      166  -168   168   171  -173   173   176  -178
                      178   181  -183   183   186  -188   188   191
                     -193   193   196  -198   198   201  -203   203
                      206  -208   208   214  -216   216   216   219
                     -221   221   224  -226   226   229  -231   231
                      234  -236   236   239  -241   241   241   244
                     -246   246   249  -251   251   254  -256   256
                      259  -261   261  -262   265  -267   267
PUTN01    1007       5886 -5896
PUTNIB    0FEE       1813  1928  2650  2753  4670  4815  4821  4987
                     4992  5535  5819 -5868  6733  7096  7112  7328
PWRAB1    01A7       1014 -1025
```

What is claimed is:

1. A method for monitoring the trip status of the trip cycle in an electronic postage meter, comprising the steps of:

reading the state of a bistable member having at Home and In Cycle states;

setting a plurality of bits if the bistable member is Home;

re-reading the state of the bistable member after a predetermined period of time has elapsed;

storing a fatal error bit if the bistable member is in the Home state after the re-reading and attempting to complete the trip cycle;

further re-reading the state of the bistable member after a predetermined period of time has elapsed if the re-reading of the state of the bistable member dislcoses that the bistable member is In Cycle;

resetting certain of the set bits if the further reading of the bistable member discloses that it is Home; and ending the trip cycle.

2. The method recited in claim 1, including the steps of:

moving a trip selection mechanism from a lock position to a trip position after the reading of the bistable member if the bistable member is Home;

moving the trip selection mechanism from the trip position to the lock position after re-reading of the bistable member if the bistable member is In Cycle.

3. The method recited in claim 1, including the step of:

declaring and logging a fatal error bit if the bistable member is in the In Cycle state when it is initially read.

4. The method recited in claim 1, including the step of:

declaring and logging a fatal error bit if the bistable member is Home after the re-reading thereof.

5. The method recited in claim 1, including the step of:

declaring and logging a fatal error bit if the bistable member is In Cycle at the end of the further re-reading thereof.

6. The method recited in claim 1, including the steps of:

moving a trip selection mechanism from a lock position to a trip position subsequent to the setting of the plurality of bits;

declaring and logging a fatal error if the trip selection mechanism fails to reach the trip position.

7. The method recited in claim 1, including the steps of:

waiting a predetermined period of time subsequent to the initial reading of the bistable member to re-read the state of the bistable member;

waiting a further predetermined period of time subsequent to the re-reading of the bistable member to further re-read the state of the bistable member.

8. The method recited in claim 1. including the step of:

storing certain of the set bits in a non-volatile memory.

9. The method recited in claim 1, wherein:

the fatal error bit is stored in a non-volatile memory.

10. A method for monitoring the trip status during the trip cycle of an electronic postage meter, comprising the steps of:

initially reading the state of a bistable member;

setting certain bits in response to the state of the bistable member;

placing the postage meter in a trip condition if the bistable member is in its Home state;

conducting a second reading of the state of the bistable member;

placing the postage meter in a lock condition if the bistable member is In Cycle after the second reading;

delaying a predetermined period of time;

conducting a final reading of the state of the bistable member;

resetting certain bits if the bistable member is Home after the final reading; and ending the trip cycle.

11. The method recited in claim 10, including the steps of:

continuing the second reading of the bistable member for a predetermined maximum period of time to determine if the bistable member is In Cycle;

declaring and logging a fatal error bit if the state of the bistable member is still Home after the expiration of the maximum predetermined period of time.

12. The method recited in claim 10, including the step of:

continuing the final reading of the bistable member for a predetermined maximum period of time to determine whether the bistable member is Home if the second reading of the bistable member has determined that the bistable member is In Cycle.

13. A method for monitoring the trip status during the trip cycle of an electronic postage meter, comprising the steps of:

reading the state of a bistable member having Home and In Cycle states;

delaying a predetermined period of time;

re-reading the state of the bistable member;

continuing to re-read the state of the bistable member for a specified period of time if the bistable member is in its Home state;

further re-reading the state of the bistable member after a further predetermined period of time if after the re-reading the bistable member is in its In Cycle state;

continuing to re-read the state of the bistable member for a specified period of time if the bistable member is still in its In Cycle state; and ceasing the trip cycle if the last re-reading of the bistable member discloses that it is in its Home state.

14. Apparatus for monitoring the trip status during the trip cycle of an electronic postage meter, comprising:

a bistable member having Home and In Cycle states; means for reading the state of said bistable member; means for setting a plurality of bits in response to the reading of a Home state in said bistable member; address means for storing certain of said plurality of bits;

trip selector means for tripping a cycle in response to certain of said plurality of bits; and means for resetting certain of said bits in response to said reading means reading a state of Home in said bistable member after having read an In Cycle state indicating the completion of the trip cycle.

15. The apparatus recited in claim 14, including:

means for setting a fatal error bit in said address means if said bistable member is In Cycle when it is initially read by said reading means.

16. The apparatus recited in claim 14, including:
means for setting a fatal error bit in said address means if said bistable member is still in its Home state during the trip cycle.

17. The apparatus recited in claim 14, including:
means for setting a fatal error bit in said address means if said bistable member is In Cycle at the end of the trip cycle.

18. The apparatus recited in claim 14, including:
trip selection means having a lock position and a said trip position and;
means for setting a fatal error bit in said address means if said trip selection means fails in its movement therebetween.

19. The apparatus recited in claim 14, wherein:
said reading means reads the state of said bistable member initially, at the end of the trip cycle and during the trip cycle.

20. The apparatus recited in claim 19, including:
delay means for delaying a predetermined period of time subsequent to the initial reading of said bistable member prior to reading of the state of said bistable member during the trip cycle;
delay means for waiting a further predetermined period of time subsequent to the reading of said bistable member during the trip cycle prior to re-reading the state of said bistable member during the trip cycle prior to re-reading the state of said bistable member.

21. The apparatus recited in claim 19, including:
trip selection means having a trip position and a lock position;
means for moving the trip mechanism from its lock position to the trip position subsequent to the initial reading of said bistable member and from its trip position to its lock position subsequent to the reading of said bistable member during the trip cycle.

22. The apparatus recited in claim 21, including:
means for completing the trip cycle in response to the storing of a fatal error bit.

23. The apparatus recited in claim 14, including: means for setting a fatal error bit in response to said bistable member being in an In cycle state upon the initial reading by said reading means.

24. Apparatus for monitoring the trip status during the trip cycle of an electronic postage meter, comprising:
a cycle switch;
means for reading the state of said cycle switch;
address means capable of storing bits;
means for setting certain bits in said address means in response to the state of said cycle switch read by said reading means;
means for moving a trip selection means from a lock position to a trip position if said cycle switch is Home after an initial reading by said reading means;
means for detecting whether the movement of said trip selection means from the lock position to the trip position is accomplished;
said reading means re-reading the state of said cycle switch during the trip cycle;
said moving means moving said trip selection said from the trip position to the lock position if said cycle switch is In Cycle after re-reading by said reading means;
said detecting means detecting whether the movement of said trip selection means from the trip position to the lock position is accomplished;
said reading means conducting a final re-reading the state of said cycle switch after a predetermined period of time;
means for resetting some of said set bits if the state of said cycle switch is Home after the final reading by said reading means; and
means for terminating the trip cycle.

25. The apparatus recited in claim 24, wherein:
said means for reading said cycle switch continues re-reading said cycle switch for a predetermined maximum period of time during the trip cycle to determine whether said cycle switch is In Cycle;
said means for reading said cycle switch continues the final re-reading of said cycle switch for a predetermined maximum period of time to determine whether said cycle switch is Home if the re-reading of said cycle switch during the trip cycle has determined it was In Cycle;
said means for setting certain bits in said address means sets a fatal error bit therein if said cycle switch is still In Cycle after the final re-reading thereof.

26. The apparatus recited in claim 24, wherein:
said means for reading the state of the cycle switch continues to re-read the state of said cycle switch for a predeteremined maximum period of time during the trip cycle to determine whether said cycle switch is In Cycle;
said means for setting certain bits in said address means sets a fatal error bit therein if said cycle switch is still Home after the expiration of the predetermined maximum period of time during the trip cycle.

* * * * *